US007698396B2

(12) United States Patent
Aoyagi et al.

(10) Patent No.: US 7,698,396 B2
(45) Date of Patent: Apr. 13, 2010

(54) METHOD OF AUTOMATICALLY RECOGNIZING NETWORK CONFIGURATION INCLUDING INTELLIGENT PACKET RELAY EQUIPMENT, METHOD OF DISPLAYING NETWORK CONFIGURATION CHART, AND SYSTEM THEREOF

(75) Inventors: Yoshimitsu Aoyagi, Kanagawa (JP); Hideki Fujioka, Kanagawa (JP)

(73) Assignee: Hitachi Software Engineering Co., Ltd., Kanagawa (JP)

( * ) Notice: Subject to any disclaimer, the term of this patent is extended or adjusted under 35 U.S.C. 154(b) by 882 days.

(21) Appl. No.: 09/772,709

(22) Filed: Jan. 29, 2001

(65) Prior Publication Data

US 2002/0032761 A1 Mar. 14, 2002

(30) Foreign Application Priority Data

Jan. 31, 2000 (JP) ............................. 2000-022749
Apr. 24, 2000 (JP) ............................. 2000-121962

(51) Int. Cl.
*G06F 15/173* (2006.01)

(52) U.S. Cl. ...................................... 709/223; 709/224

(58) Field of Classification Search ................. 709/223, 709/224
See application file for complete search history.

(56) References Cited

U.S. PATENT DOCUMENTS

| | | | | |
|---|---|---|---|---|
| 5,774,669 A * | 6/1998 | George et al. | ................ | 709/224 |
| 5,875,296 A * | 2/1999 | Shi et al. | ....................... | 726/5 |
| 6,049,828 A * | 4/2000 | Dev et al. | ................... | 709/224 |
| 6,157,950 A * | 12/2000 | Krishnan | .................... | 709/223 |
| 6,377,987 B1 * | 4/2002 | Kracht | ....................... | 709/220 |
| 6,574,662 B2 * | 6/2003 | Sugiyama et al. | ........... | 709/223 |
| 6,574,737 B1 * | 6/2003 | Kingsford et al. | ............. | 726/25 |

OTHER PUBLICATIONS

Gavalas, Damianos et al. "An Infrastructure for Distributed and Dynamic Network Management based on Mobile Agent Technology," Jun. 1999, IEEE, vol. 2, pp. 1362-1366.*

Zapf, M. et al. "Decentralized SNMP Management with Mobile Agents," May 1999, IEEE, pp. 623-635.*

* cited by examiner

*Primary Examiner*—Patrice Winder
*Assistant Examiner*—Azizul Choudhury
(74) *Attorney, Agent, or Firm*—Stites & Harbison PLLC; Juan Carlos A. Marquez, Esq.

(57) ABSTRACT

A method and system is described for detecting a physical device configuration inside a network node and displaying the configuration of a network in connection with a plurality of devices, in a network environment including SNMP-implemented intelligent network devices. ICMP echo requests are sent from an administrator terminal implementing an SNMP manager to individual network devices in the network node so that active devices are detected on the basis of responses therefrom. Then, transfer requests for information stored in the management information bases of the respective devices are sent to the SNMP agents in the individual devices detected, so that the types of the devices in the network node are detected based on the information stored in the management information bases returned.

15 Claims, 108 Drawing Sheets

Network Configuration Chart

SNMP Message Format

Internet OID (Object Identifier) Tree

MIB2 Object Configuration

Fig. 5 interfaces Group Object Configuration interfaces(2)  501 ifNumber(1)
  ifTable(2)
    ifEntry (1)
      ifIndex(1)
      ifDescr(2)
      ifType(3)
      ifMtu(4)
      ifSpeed(5)
      ifPhysicalAddress(6)
      ifAdminStatus(7)
      ifOperStatus(8)
      ifLastChange(9)
      ifInOctets(10)
      ifInUcastPkts(11)
      ifInNUcastPkts(12)
      ifInDiscards(13)
      ifInErrors(14)
      ifInUnknownProtos(15)
      ifOutOctets(16)
      ifOutUcastPkts(17)
      ifOutNUcastPkts(18)
      ifOutDiscards(19)
      ifOutErrors(20)
      ifOutQLen(21)
      ifSpecific(22)

Program Configuration Chart

Fig. 7

OID(Object IDentifier) Table Configuration Chart

621

| Object Name | Object Identifier | type | Object Path |
|---|---|---|---|
| sysDescr | 43.6.1.2.1.1.1.0 | String | system.sysDescr |
| sysObjectID | 43.6.1.2.1.1.2.0 | Binary | system.sysObjectID |
| ... | ... | ... | ... |

AT(Address Translation) Table Configuration Chart

622

| IP Address | Mac Address |
|---|---|
| 13X.XXX.2.1 | 00:e0:f7:26:a4:e3 |
| 13X.XXX.2.2 | 08:00:20:11:ee:73 |
| ... | ... |

TI (Terminal Information) Table Configuration Chart

623

| IP Address | Mac Address | Host Name | type | alive | mib2 | forwarding | bridge | repeater | print |
|---|---|---|---|---|---|---|---|---|---|
| 13X.XXX.2. | 00:e0:f7:26:a4:e3 | ori-irouter.ori.xxx.co.jp | R | On | On | On | On | Off | Off |
| 13X.XXX.2. | 08:00:20:a1:33:ab | ori.ori.xxx.co.jp | T | On | On | Off | Off | Off | Off |
| 13X.XXX.2. | - | - | - | On | Off | Off | Off | Off | Off |
| ... | ... | ... | ... | ... | ... | ... | ... | ... | ... |

901　902　903　　　　904　905　906　907　908　909　910

(U:Unkown:0,R:Router:1,SH:SwitchingHub:2,IH:IntelligentHub:3,
B:Bridge:4,R:Repeater:5,T:Terminal:6,P:Printer:7)(On:1,Off:0)

Fig. 10
PF(Port Forwarding) Table Configuration Chart

| Source IP Address 1001 | Source Mac Address 1002 | Source Port 1003 | Destination IP Address 1004 | Destination Mac Address 1005 |
|---|---|---|---|---|
| 13X.XXX.2.1 | 00:e0:f7:26:a4:e3 | 2 | 13X.XXX.2.2 | 08:00:20:a1:33:ab |
| | | 2 | 13X.XXX.2.102 | 00:e0:18:00:27:d7 |
| ... | ... | ... | ... | ... |
| 13X.XXX.2.246 | 08:00:4e:4f:ad:27 | 2 | 13X.XXX.2.246 | 08:00:4e:4f:ad:27 |
| ... | ... | ... | ... | ... |
| | | 2 | 13X.XXX.2.1 | 00:e0:f7:26:a4:e3 |
| ... | ... | ... | ... | ... |

TS(Tree Structure) Table Configuration Chart

| Terminal IP Address | Terminal Mac Address | Terminal Port | Parent IP Address | Parent Mac Address | Parent Port |
|---|---|---|---|---|---|
| 13X.XXX.2.1 | 00:e0:f7:26:a4:e3 | — | — | — | 1 |
| 13X.XXX.2.246 | 08:00:4e:4f:ad:27 | 2 | 13X.XXX.2.1 | 00:e0:f7:26:a4:e3 | 2 |
| 13X.XXX.2.102 | 00:e0:18:00:27:d7 | — | 13X.XXX.2.246 | 08:00:4e:4f:ad:27 | 3 |
| ⋮ | ⋮ | ⋮ | ⋮ | ⋮ | ⋮ |
| 13X.XXX.2.243 | 00:00:f4:71:01:37 | 1 | 13X.XXX.2.246 | 08:00:4e:4f:ad:27 | 1 |
| ⋮ | ⋮ | ⋮ | ⋮ | ⋮ | ⋮ |
| 13X.XXX.2.2 | 08:00:20:a1:33:ab | — | 13X.XXX.2.243 | 00:00:f4:71:01:37 | 2 |
| ⋮ | ⋮ | ⋮ | ⋮ | ⋮ | ⋮ |

Mechanism of Sending/Receiving SNMP

Fig. 13

Method of Detecting Device Type

| Device \\ MIB | Router | Bridge | Switching Hub | Intelligen Hub | Non Intelligent Hub (Repeater) | Printer | Terminal |
|---|---|---|---|---|---|---|---|
| ip Group ipForwarding Object | ○ (Value =1) | ○ (Value =0) | ○ (Value =1 or Value=0) | ○ (Value =0) | — | ○ (Value =0) | ○ (Value =0) |
| dot1dBridge Group Any Object | ○ | ○ | ○ | × | — | × | × |
| snmpDot3Rptr Mgt Group Any Object | × | × | ○ | ○ | — | × | × |
| printmib Group Any Object | × | × | × | × | — | ○ | × |

Note)(○ : Implemented, × : Unimplemented, — : MIB Unsupported)

Definition Diagram of Packet Relay Equipment Relation

Fig. 15

Detection of Connection between Pieces of Packet Relay Equipment by Using interfaces MIB

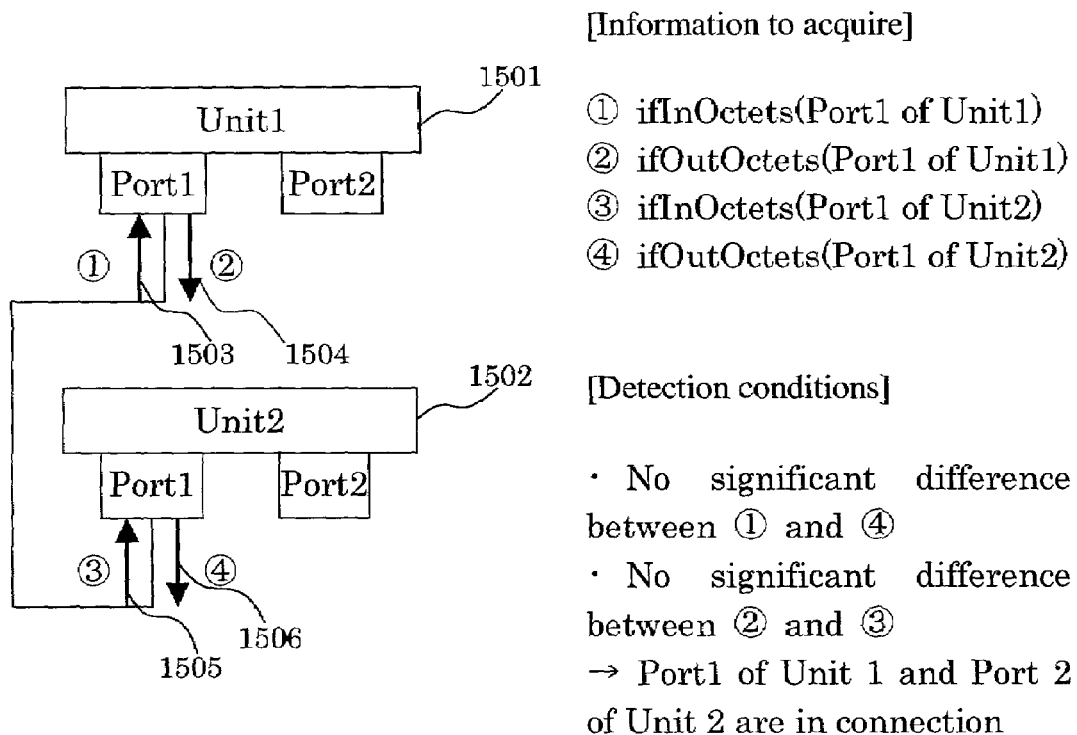

[Information to acquire]

① ifInOctets(Port1 of Unit1)
② ifOutOctets(Port1 of Unit1)
③ ifInOctets(Port1 of Unit2)
④ ifOutOctets(Port1 of Unit2)

[Detection conditions]

· No significant difference between ① and ④
· No significant difference between ② and ③
→ Port1 of Unit 1 and Port 2 of Unit 2 are in connection

Fig. 16

Network Device Classification

| Network Device | Description |
|---|---|
| R | Packet relay equipment for segment division (Router) |
| CF | Packet relay equipment that has no imperfection in MIB object information stored and can create PF table listing all the connection ports of the packet relay equipment and terminals |
| IF | Packet relay equipment that has some imperfections in MIB object information stored and sometimes fails to detect connection port numbers to other pieces of packet relay equipment excepting R |
| SF | Packet relay equipment that has some imperfections in MIB object information stored, cannot detect any of the ports connected to all the other pieces of packet relay equipment including R, and can detect the port(s) connected to one or more terminals |
| NF | Packet relay equipment holding no MIB (Non Intelligent Hub, Repeater) |
| Term | Device other than packet relay equipment (Printer, Terminal) |

Mechanism of Connection Detection for R-CF-* Model
(* represents any one of CF2,IF2,SF2)

Fig. 18

PF Table Entry for Use in Connection Detection for R-CF-* Model

624

| Source IP Address | Source Mac Address | Source Port | Destination IP Address | Destination Mac Address |
|---|---|---|---|---|
| ... | ... | ... | ... | ... |
| 13X.XXX.2.246 | 08:00:4e:4f:ad:27 | 1 | 13X.XXX.2.243 | 00:00:f4:71:01:37 |
| 13X.XXX.2.246 | 08:00:4e:4f:ad:27 | 2 | 13X.XXX.2.1 | 00:e0:f7:26:a4:e3 |
| 13X.XXX.2.246 | 08:00:4e:4f:ad:27 | 3 | 13X.XXX.2.102 | 00:e0:18:00:27:d7 |
| ... | ... | ... | ... | ... |
| 13X.XXX.2.243 | 00:00:f4:71:01:37 | 1 | 13X.XXX.2.102 | 00:e0:18:00:27:d7 |
| 13X.XXX.2.243 | 00:00:f4:71:01:37 | 1 | 13X.XXX.2.1 | 00:e0:f7:26:a4:e3 |
| ... | ... | ... | ... | ... |

1801, 1802, 1803, 1804, 1805

Mechanism of Connection Detection for R-IF-* Model
(* represents any one of CF2,IF2,SF2)

Fig. 20

PF Table Entry for Use in Connection Detection for R-IF-* Model

624

| Source IP Address | Source Mac Address | Source Port | Destination IP Address | Destination Mac Address | |
|---|---|---|---|---|---|
| ... | ... | ... | ... | ... | |
| 13X.XXX.2.246 | 08:00:4e:4f:ad:27 | 1 | 13X.XXX.2.2 | 00:e0:f7:26:a4:e3 | ← 2001 |
| 13X.XXX.2.246 | 08:00:4e:4f:ad:27 | 1 | 13X.XXX.2.110 | 00:e0:18:00:3a:9f | ← 2002 |
| 13X.XXX.2.246 | 08:00:4e:4f:ad:27 | 3 | 13X.XXX.2.102 | 00:e0:18:00:27:d7 | ← 2003 |
| 13X.XXX.2.246 | 08:00:4e:4f:ad:27 | 2 | 13X.XXX.2.1 | 00:e0:f7:26:a4:e3 | ← 2004 |
| ... | ... | ... | ... | ... | |
| 13X.XXX.2.243 | 00:00:f4:71:01:37 | 1 | 13X.XXX.2.102 | 00:e0:18:00:27:d7 | ← 2005 |
| 13X.XXX.2.243 | 00:00:f4:71:01:37 | 2 | 13X.XXX.2.2 | 00:e0:f7:26:a4:e3 | ← 2006 |
| 13X.XXX.2.243 | 00:00:f4:71:01:37 | 3 | 13X.XXX.2.110 | 00:e0:18:00:3a:9f | ← 2007 |
| 13X.XXX.2.243 | 00:00:f4:71:01:37 | 1 | 13X.XXX.2.1 | 00:e0:f7:26:a4:e3 | ← 2008 |
| 13X.XXX.2.243 | 00:00:f4:71:01:37 | 1 | 13X.XXX.2.246 | 08:00:4e:4f:ad:27 | ← 2009 |
| ... | ... | ... | ... | ... | |

Mechanism of Connection Detection for R-SF-* Model
(* represents any one of CF2,IF2,SF2)

Fig. 22

PF Table Entry for Use in Connection Detection for R-SF-IF Model

| Source IP Address | Source Mac Address | Source Port | Destination IP Address | Destination Mac Address |
|---|---|---|---|---|
| ... | ... | ... | ... | ... |
| 13X.XX.2.246 | 08:00:4e:4f:ad:2 | 1 | 13X.XXX.2.2 | 00:e0:f7:26:a4:e3 |
| 13X.XXX.2.246 | 08:00:4e:4f:ad:2 | 2 | 13X.XXX.2.51 | 00:00:92:96:b4:43 |
| 13X.XXX.2.246 | 08:00:4e:4f:ad:2 | 3 | 13X.XXX.2.102 | 00:e0:18:00:27:d7 |
| ... | ... | ... | ... | ... |
| 13X.XXX.2.243 | 00:00:f4:71:01:3 | 1 | 13X.XXX.2.51 | 00:00:92:96:b4:43 |
| 13X.XXX.2.243 | 00:00:f4:71:01:3 | 1 | 13X.XXX.2.102 | 00:e0:18:00:27:d7 |
| 13X.XXX.2.243 | 00:00:f4:71:01:3 | 2 | 13X.XXX.2.2 | 00:e0:f7:26:a4:e3 |
| 13X.XXX.2.243 | 00:00:f4:71:01:3 | 1 | 13X.XXX.2.1 | 00:e0:f7:26:a4:e3 |
| 13X.XXX.2.243 | 00:00:f4:71:01:3 | 1 | 13X.XXX.2.246 | 08:00:4e:4f:ad:27 |
| ... | ... | ... | ... | ... |

Mechanism of Connection Detection for R-* Model
(* represents any one of CF,IF,SF)

Fig. 24

PF Table Entry for Use in Connection Detection for R-* Model

| Source IP Address | Source Mac Address | Source Port | Destination IP Address | Destination Mac Address |
|---|---|---|---|---|
| ... | ... | ... | ... | ... |
| 13X.XXX.2.1 | 00:e0:f7:26:a4:e3 | 2 | 13X.XXX.1.246 | 08:00:4e:4f:ad:27 |
| 13X.XXX.2.246 | 08:00:4e:4f:ad:27 | 1 | 13X.XXX.1.1 | 08:00:20:74:d5:86 |
| 13X.XXX.2.246 | 08:00:4e:4f:ad:27 | 2 | 13X.XXX.2.1 | 00:e0:f7:26:a4:e3 |
| ... | ... | ... | ... | ... |

Fig. 25

Method of Detecting Connections among Pieces of Packet Relay Equipment

| Connection Model | *1 | *2 | *3 | Condition for Connection Detection |
|---|---|---|---|---|
| R-CF1-CF2 | ○ | ○ | ○ | − |
| R-CF-IF | ○ | ○ | ○ | − |
| R-CF-SF | ○ | △ | ○ | (1) one or more devices connected to ports other than connection port of CF to SF<br>(2) device(s) of (1) stored in SF forwarding table |
| R-IF-CF | ○ | △ | △ | (1) one or more devices connected to ports other than connection port of CF to IF<br>(2) device(s) of (1) stored in IF forwarding table |
| R-IF1-IF2 | △ | △ | △ | (1) one or more devices connected to ports other than connection port of IF1 to R<br>(2) device(s) of (1) stored in R-containing port entries of IF2 forwarding table<br>(3) one or more devices connected to ports other than connection port of IF2 to R<br>(4) device(s) of (3) stored in port entries of IF1 forwarding table except R-containing port entries |
| R-IF-SF | △ | △ | △ | (1) two or more devices connected to ports other than connection port of IF to R<br>(2) device(s) of (1) stored in particular port entries of SF forwarding table<br>(3) device(s) of (1) other than those of (2) stored in port entries of SF forwarding table except those of (2)<br>(4) one or more devices connected to ports other than connection port of IF to R, except ports of (1)<br>(5) device(s) of (4) stored in particular port entries of SF forwarding table |

Note)
*1 : Parent-to-Child Connection Port
*2 : Child-to-Parent Connection Port
*3 : Vertical Dependency ○ : connection detectable
△ : connection detectable if the condition for connection detection is satisfied
✕ : connection undetectable

Fig. 26

Method of Detecting Connections among Pieces of Packet Relay Equipment

| Connection Model | *1 | *2 | *3 | Condition for Connection Detection |
|---|---|---|---|---|
| R-SF-CF | △ | ○ | × | (1) one or more devices connected to ports other than connection port of CF to SF<br>(2) device(s) of (1) stored in particular port entries of SF forwarding table |
| R-SF-IF | △ | △ | × | (1) more than two device connected to the same port as connection port of IF to R<br>(2) devices of (1) stored in particular port entries of SF forwarding table<br>(3) devices of (1) other than those of (2) stored in port entries of SF forwarding table except those of (2)<br>(4) one or more devices connected to ports other than the connection port of IF to R<br>(5) device(s) of (4) connected to particular port entries of SF forwarding table |
| R-SF1-SF2 | × | × | × | — |
| R-CF | △ | ○ | ○ | R forwarding table includes port with internal network IP address |
| R-IF | △ | ○ | ○ | R forwarding table includes port with internal network IP address |
| R-SF | △ | △ | ○ | (1) R forwarding table includes port with internal network IP address<br>(2) SF forwarding table includes port with backbone network IP address |

Note)
*1 : Parent-to-Child Connection Port
*2 : Child-to-Parent Connection Port
*3 : Vertical Dependency ○ : connection detectable
△ : connection detectable if the condition for connection detection is satisfied
× : connection undetectable Mechanism of Connection Detection for *-TERM Model
(* represents any one of CF,IF,SF)

Fig. 28

PF Table Entry for Use in Connection Detection for *-TERM Model

| Source IP Address | Source Mac Address | Source Port | Destination IP Address | Destination Mac Address |
|---|---|---|---|---|
| ... | ... | ... | ... | ... |
| 13X.XXX.2.246 | 08:00:4e:4f:ad:27 | 1 | 13X.XXX.2.102 | 00:e0:18:00:27:d7 |
| ... | ... | ... | ... | ... |

Fig. 29

Method of Detecting Connection between Packet Relay Equipment and Terminal

| Equipment Connection model | Detection of Terminal Connection | Condition for Connection Detection |
|---|---|---|
| CF-TERM | ◯ | — |
| IF-TERM | ◯ | — |
| SF-TERM | △ | One terminal connected to a port |

Detection of Vertical Dependency through Combination of Plurality of Models
(Example of detecting the vertical dependency in R-SF-CF model by combining R-CF-CF model and R-CF-SF model)

Fig. 31

TS Table Entry for Use in Detection of Vertical Dependency through Combination of a plurality of Models

625

| Terminal IP Address | Terminal Mac Address | Terminal Port | Parent IP Address | Parent Mac Address | Parent Port |
|---|---|---|---|---|---|
| ... | ... | ... | ... | ... | ... |
| 13X.XXX.2.243 | 00:00:f4:71:01:37 | 1 | 13X.XXX.2.246 | 08:00:4e:4f:ad:27 | 1 |
| 13X.XXX.2.247 | 00:00:81:39:df:aa | 2 | 13X.XXX.2.246 | 08:00:4e:4f:ad:27 | 1 |
| 13X.XXX.2.243 | 00:00:f4:71:01:37 | 2 | 13X.XXX.2.247 | 00:00:81:39:df:aa | 2 |
| 13X.XXX.2.247 | 00:00:81:39:df:aa | 2 | 13X.XXX.2.243 | 00:00:f4:71:01:37 | 2 |
| ... | ... | ... | ... | ... | ... |

3101
3102
3103
3104

[Conditions]
① when connection is detectable and vertical dependency is not, TS table stores two symmetric entries to indicate this (13X.XXX.2.243 and 13X.xxx.2.247 connected to each other at Port2; vertical dependency unknown)
② both 13X.XXX.2.243 and 13X.XXX.2.247 are child devices of 13X.XXX.2.246, connected through Port1 and Port2, respectively
③ then, 13X.XXX.2.243 is a parent to 13X.XXX.2.247
→ given that 13X.XXX.2.243 is a parent, a contradiction occurs since 13X.XXX.2.246 can be connected via both Port1 and Port2 of 13X.XXX.2.243
→ a contradiction also occurs on the assumption that 13X.XXX.2.243 and 13X.XXX.2.247 are connected to a non intelligent hub and horizontally dependent on each other Method of Predicting Connection of Non Intelligent Hub

Fig. 33

TS Table Entry for Use in Prediction of Non Intelligent Hub Connection

| Terminal IP Address | Terminal Mac Address | Terminal Port | Parent IP Address | Parent Mac Address | Parent Port |
|---|---|---|---|---|---|
| ⋮ | ⋮ | ⋮ | ⋮ | ⋮ | ⋮ |
| 13X.XXX.2.98 | 00:60:97:0f:69:e4 | — | 13X.XXX.2.246 | 08:00:4e:4f:ad:2 | 1 |
| 13X.XXX.2.13 | 08:00:09:e1:51:5e | — | 13X.XXX.2.24 | 08:00:4e:4f:ad:27 | 1 |
| ⋮ | ⋮ | ⋮ | ⋮ | ⋮ | ⋮ |

Fig. 34

Detection of Inactive Terminal and Connection Destination Modification

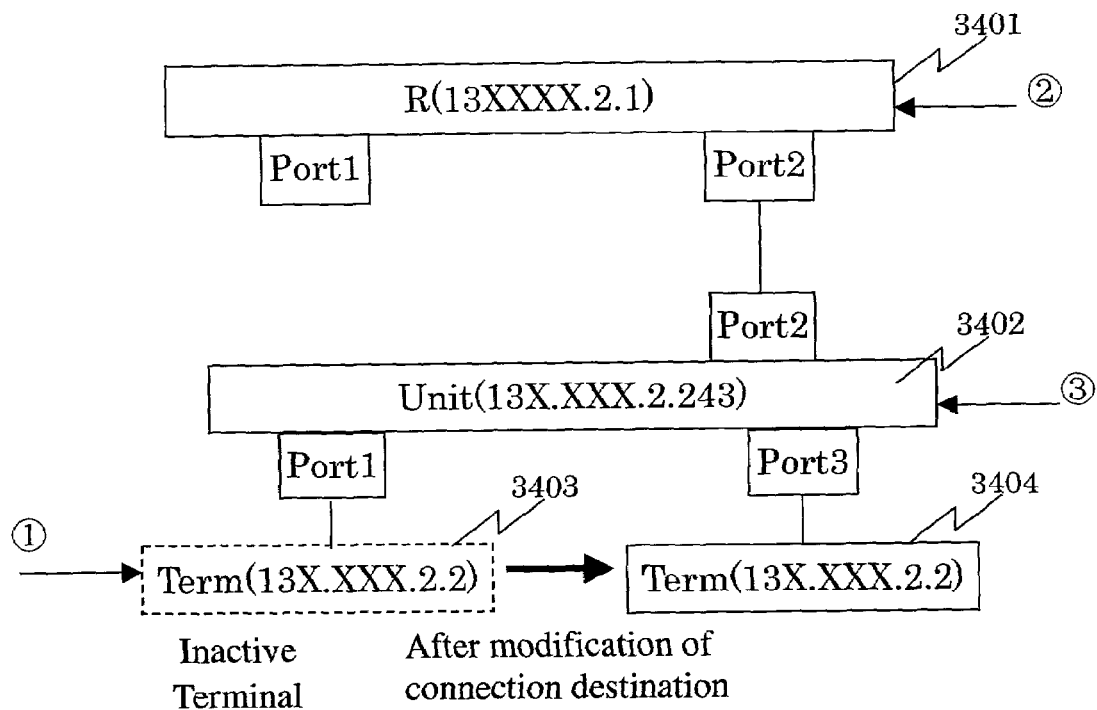

[Conditions]

① inactive terminal (133.108.2.2) returns no response to polling, making FALSE the alive value in corresponding entry in TI table ② an entry of inactive terminal (133.108.2.2) is cached in APR table of Router, allowing creation of AT table entry ③ connection information of inactive terminal (133.108.2.2) is cached in packet relay equipment (133.108.2.243) to which the terminal is connected, allowing creation of PF and TS table entries

Fig. 35

TS Table Entry for Use in Detection of Connection Destination Modification

625

3501

| Terminal IP Address | Terminal Mac Address | Terminal Port | Parent IP Address | Parent Mac Address | Parent Port |
|---|---|---|---|---|---|
| ⋮ | ⋮ | ⋮ | ⋮ | ⋮ | ⋮ |
| 13X.XXX.2.2 | 08:00:20:a13X:ab | — | 13X.XXX.2.243 | 00:00:f4:71:01:37 | 2 |
| ⋮ | ⋮ | ⋮ | ⋮ | ⋮ | ⋮ |

→ After modification of connection destination 3502
3503

| Terminal IP Address | Terminal Mac Address | Terminal Port | Parent IP Address | Parent Mac Address | Parent Port |
|---|---|---|---|---|---|
| ⋮ | ⋮ | ⋮ | ⋮ | ⋮ | ⋮ |
| 13X.XXX.2.2 | 08:00:20:a13X:ab | — | 13X.XXX.2.243 | 00:00:f4:71:01:37 | 2 |
| 13X.XXX.2.2 | 08:00:20:a13X:ab | — | 13X.XXX.2.243 | 00:00:f4:71:01:37 | 3 |
| ⋮ | ⋮ | ⋮ | ⋮ | ⋮ | ⋮ |

Example of Network Configuration Chart Display

Operation Flowchart for Active Status Detection Module
(Active Status Detection Process through Sending/Receiving of ICMP Echo Requests)

Operation Flowchart for MIB Access Module (Process of Creating PDUs (Protocol Data Units) and Sending/Receiving SNMP Messages)

Operation Flowchart 1 for Auto Discovery Module
(Process for AT Table Creation)

Operation Flowchart 2 for Auto Discovery Module
(Process for TI Table Creation)

Operation Flowchart 3 for Auto Discovery Module
(TI Table Creation (Process of Acquiring TI Table Item Values))

Operation Flowchart 4 for Auto Discovery Module(Process of Acquiring TI Table ITEM Value(Device Type Recognition Process (Fig.13)))

Operation Flowchart 5 for Auto Discovery Module
(Process for PF Table Creation)

Operation Flowchart 6 for Auto Discovery Module
(PF Table Creation (Processing for Bridge MIB))

Operation Flowchart 7 for Auto Discovery Module
(PF Table Creation (Processing for Repeater MIB))

Operation Flowchart 8 for Auto Discovery Module
(Processing for Repeater MIB (Forwarding Information Learning process))

Operation Flowchart 9 for Auto Discovery Module
(Processing for Repeater MIB (Forwarding Information Predicting Process))

Operation Flowchart 10 for Auto Discovery Module
(PF Table Creation (Processing for interfaces MIB))

Operation Flowchart 11 for Auto Discovery Module
(Processing for interfaces MIB (Process of Detecting Administrator Terminal's Connection Ports))

Operation Flowchart 12 for Auto Discovery Module
(Processing for interfaces MIB (Process of Detecting Connection Ports of Device Other than Administrator Terminal))

Operation Flowchart 13 for Auto Discovery Module
(Process for TS Table Creation)

Operation Flowchart 14 for Auto Discovery Module
(TS Table Creation (Root Device Determination process))

Operation Flowchart 15 for Auto Discovery Module
(TS Table Creation (Process of Determining Connections between Pieces of Packet Relay Equipment))

Operation Flowchart 16 for Auto Discovery Module
(TS Table Creation (Connection Model Determination process)

Operation Flowchart 17 for Auto Discovery Module
(TS Table Creation (Network Device Classification Process)(Fig.16))

Operation Flowchart 18 for Auto Discovery Module
(TS Table Creation (Connection Detection Condition Checking Process)
(Fig.25))

Operation Flowchart 19 for Auto Discovery Module
(TS Table Creation(Connection Detection Condition Checking Process for Set (R, CF, CF)) (Fig.25))

Operation Flowchart 20 for Auto Discovery Module
(TS Table Creation(Connection Detection Condition Checking Process for Set (R, CF, IF)) (Fig.25))

Operation Flowchart 21 for Auto Discovery Module
(TS Table Creation(Connection Detection Condition Checking Process for R-IF-CF Model) (Fig.25))

Operation Flowchart 22 for Auto Discovery Module
(TS Table Creation(Connection Detection Condition Checking Process for R-CF-IF Model) (Fig.25))

Operation Flowchart 23 for Auto Discovery Module
(TS Table Creation(Connection Detection Condition Checking Process for Set (R, CF, SF)) (Fig.25))

Operation Flowchart 24 for Auto Discovery Module
(TS Table Creation(Connection Detection Condition Checking Process for R-SF-CF Model) (Fig.25))

Operation Flowchart 25 for Auto Discovery Module
(TS Table Creation(Connection Detection Condition Checking Process for
R-CF -SF Model) (Fig.25))

Operation Flowchart 26 for Auto Discovery Module
(TS Table Creation(Connection Detection Condition Checking Process for Set (R, IF, IF)) (Fig.25))

Operation Flowchart 27 for Auto Discovery Module
(TS Table Creation(Connection Detection Condition Checking Process for R-IF-IF Model) (Fig.25))

Operation Flowchart 28 for Auto Discovery Module
(TS Table Creation(Connection Detection Condition Checking Process for Set (R, IF, SF)) (Fig.25))

Operation Flowchart 29 for Auto Discovery Module
(TS Table Creation(Connection Detection Condition Checking Process for R-SF-IF Model) (Fig.25))

Operation Flowchart 31 for Auto Discovery Module
(TS Table Creation(Connection Detection Condition Checking Process for Set (R, SF, SF)) (Fig.25))

Operation Flowchart 32 for Auto Discovery Module
(TS Table Creation (Entry Addition Process on TS Table))

Operation Flowchart 33 for Auto Discovery Module
(TS Table Creation (Root Entry Addition process on TS Table))

Operation Flowchart 34 for Auto Discovery Module TS Table Creation (TS Table Creation (Entry Addition process for Packet Relay Equipment Unknown of Vertical Dependency And Connections))

Operation Flowchart 35 for Auto Discovery Module TS Table Creation (TS Table Creation (Entry Addition process for Packet Relay Equipment Unknown of Vertical Dependency Alone))

Operation Flowchart 36 for Auto Discovery Module TS Table Creation
(TS Table Creation (Entry Addition process for Packet Relay Equipment with
Evident Vertical Dependency And Connections))

Operation Flowchart 37 for Auto Discovery Module TS Table Creation
TS Table Creation (Vertical Dependency Determination process))

Operation Flowchart 38 for Auto Discovery Module TS Table Creation
(TS Table Creation (Process of Combining Plurality of Models (Fig.30)))

Operation Flowchart 39 for Auto Discovery Module TS Table Creation
TS Table Creation (TS Table Entry Linking Process)

Operation Flowchart 40 for Auto Discovery Module TS Table Creation
TS Table Creation (Process of Determining Packet Relay Equipment Unknown of Connections)

Operation Flowchart 41 for Auto Discovery Module TS Table Creation
TS Table Creation (Process of Determining Vertical Dependency between Root and Packet Relay Equipment)

Operation Flowchart 42 for Auto Discovery Module TS Table Creation
TS Table Creation (Process of Determining Connection Ports of Root and Packet Relay Equipment)

Operation Flowchart 43 for Auto Discovery Module TS Table Creation
TS Table Creation (Process of Determining Connections between Packet Relay Equipment and Terminal)

Operation Flowchart 44 for Auto Discovery Module TS Table Creation
TS Table Creation (Interfaces MIB Evaluation Process)

Operation Flowchart 1 for Chart Display Program
Network Configuration Chart Display Process Operation Flowchart 2 for Chart Display Program
Network Configuration Chart Display (Drawing Process)

Operation Flowchart 3 for Chart Display Program Drawing (Non Intelligent Hub Predicting Process)

Operation Flowchart 4 for Chart Display Program
Information Drawing Process

Operation Flowchart 5 for Chart Display Program
Process of Monitoring Modification of Connection Destination

METHOD OF AUTOMATICALLY RECOGNIZING NETWORK CONFIGURATION INCLUDING INTELLIGENT PACKET RELAY EQUIPMENT, METHOD OF DISPLAYING NETWORK CONFIGURATION CHART, AND SYSTEM THEREOF

BACKGROUND OF THE INVENTION

1. Field of the Invention

The invention relates to a method and system for automatically recognizing and displaying on a computer display the physical network configuration of devices on a network that is connected to routers, switches, bridges, repeaters, hubs, terminals, and the like, and includes intelligent packet relay equipment implementing SNMP (Simple Network Management Protocol).

2. Description of the Related Art

Technologies of recognizing the physical network configuration of devices on a network that is connected to routers, switches, bridges, repeaters, hubs, terminals, and the like, and technologies of displaying the configuration are indispensable to network supervisory and management systems, network chart creation systems, and the like.

The conventional technologies for recognition of network configuration were able to recognize a network that is divided into IP (Internet Protocol) network segments (divided into router-partitioned segments). In this range of technologies, there was a problem that port-to-port connections between devices in each network segment cannot be detected.

To solve the foregoing problem, there have been made the following proposals: that is, "NETWORK CONNECTOR TYPE DETECTING METHOD" (Japanese Patent Laid-Open Publication No. Hei 11-96094), "NETWORK MONITOR AND METHOD FOR RECOGNIZING TERMINAL CONNECTED TO REPEATER HUB" (Japanese Patent Laid-Open Publication No. Hei 11-146003), "ROUTER AND NETWORK MANAGEMENT EQUIPMENT" (Japanese Patent Laid-Open Publication No. Hei 10-336228), "SYSTEM FOR AUTOMATICALLY GENERATING NETWORK MAP USING BGP ROUTING INFORMATION" (Japanese Patent Laid-Open Publication No. Hei 9-181722), "NETWORK TOPOLOGY RECOGNITION METHOD AND NETWORK TOPOLOGY RECOGNITION DEVICE" (Japanese Patent Laid-Open Publication No. Hei 9-186716), and "METHOD FOR RECOGNIZING NETWORK CONSTITUTION" (Japanese Patent Laid-Open Publication No. Hei 8-191326).

In addition, the conventional technologies of displaying a network configuration, and even the products including Open View from Hewlett-Packard Company and Visio from Microsoft Corporation, could only provide such a display function as connects a figure corresponding to a network device and a figure corresponding to another network device with a single line segment.

For detection of network configurations, "NETWORK CONNECTOR TYPE DETECTING METHOD" provides a technique of sending test packets to the inter-device links to recognize loop connections lying between bridges and devices connected to the bridges. However, there is a problem of specialization to loop connections.

"NETWORK MONITOR AND METHOD FOR RECOGNIZING TERMINAL CONNECTED TO REPEATER HUB" provides a technique of using a repeater MIB (Management Information Base) to recognize terminal connected to individual repeater ports, whereas it has a problem of undetectability when a plurality of terminals are connected to a repeater port.

"ROUTER AND NETWORK MANAGEMENT EQUIPMENT" provides a technique of detecting connections of packet relay equipment. However, this means is dependent on special hardware, and has a problem of availability in existing network configurations.

"SYSTEM FOR AUTOMATICALLY GENERATING NETWORK MAP USING BGP ROUTING INFORMATION" provides a method for detecting interconnections between autonomous systems (ASs) tailored to BGP (Border Gateway Protocol)-capable routers. This method, however, has a problem that it cannot identify connections within network segments.

"NETWORK TOPOLOGY RECOGNITION METHOD AND NETWORK TOPOLOGY RECOGNITION DEVICE" provides a technique of grasping the connection statuses of bridge devices by using the spanning tree protocol, whereas there is a problem that interconnections cannot be detected of bridges for source routing protocols.

"METHOD FOR RECOGNIZING NETWORK CONSTITUTION" provides a technique of collecting information as to the MAC address of the connection destination of each port of a hub (intelligent hub) by using repeater MIBs under the condition that the connection destination of each hub port is a single terminal, and thereby obtaining the grasp of the physical addresses of the devices to which the ports are connected. This technique, however, cannot detect the configuration of the connection destination of each hub port when hubs are cascaded one another. The terminals each require some means for periodic signal origination, and therefore agent software needs to be introduced to all the terminals. Besides, repeater MIB implementing specifications vary from one vendor to another. Thus, the technique is far from being a solution for general-purpose repeaters.

As for the display of network configurations, there is no method or system of displaying a network configuration chart that allows easy understanding of port-by-port connections of network devices and the like.

SUMMARY OF THE INVENTION

An object of the present invention is to provide a network configuration automatic recognition method and system in which at least one administrator terminal can automatically detect the physical device configuration inside a network node in a network environment including SNMP-implemented intelligent network devices in operation, without requiring implementation of any special software other than an SNMP agent and irrespective of the mode of SNMP implementation. Another object of the present invention is to provide a network configuration chart displaying method and system in which the port-by-port connections of network devices can be read at a glance.

To achieve the foregoing objects, the present invention basically comprises: a first step of sending an ICMP echo request from an administrator terminal implementing an SNMP manager to individual network devices in a network node, and detecting active network devices on the basis of responses therefrom, in a network environment having the network node which includes at least one or more intelligent network devices each implementing an SNMP agent and a management information base; and a second step of sending to the SNMP agents in the individual network devices detected a transfer request for information stored in the management information bases of the respective network devices, and detecting the types of the network devices in the network node based on the information stored in the management information bases returned.

Besides, the present invention further comprises a third step of acquiring a set of physical addresses of network devices connected to ports of a network device from the management information base of the network device, the network device being a type of device to have a bridge function; a fourth step of acquiring information as to physical-IP address correspondence from the management information base of a network device having a routing function; and a fifth step of recognizing at an IP level the devices connected to the ports of the network device having a bridge function, based on the acquired information as to physical-IP address correspondence.

Moreover, the present invention further comprises a sixth step of: recognizing that network devices from which a response to the ICMP echo request is returned are active and network devices from which no response is returned are nonexistent; and referring to the information as to physical-IP address correspondence acquired in the fourth step, and if there is correspondence information of any network device other than those recognized to be active, recognizing this network device to be inactive.

Furthermore, the present invention comprises a seventh step of displaying on-screen a configuration chart of port-by-port network connection based on the connection information collected in the first through sixth steps.

The nature, principle, and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 5 is a diagram showing the configuration of the interfaces group object for use in the network configuration automatic recognition method according to the present invention;

FIG. 7 is a chart showing the configuration of an OID table for use in the network configuration automatic recognition method according to the present invention;

FIG. 8 is a chart showing the configuration of an AT table for use in the network configuration automatic recognition method according to the present invention;

FIG. 9 is a chart showing the configuration of a TI table for use in the network configuration automatic recognition method according to the present invention;

FIG. 10 is a chart showing the configuration of a PF table for use in the network configuration automatic recognition method according to the present invention;

FIG. 11 is a chart showing the configuration of a TS table for use in the network configuration automatic recognition method according to the present invention;

FIG. 13 is a chart explaining the method of detecting device type in the network configuration automatic recognition method according to the present invention;

FIG. 15 is a diagram showing the method of detecting connection between pieces of packet relay equipment by using interfaces MIBS, in the network configuration automatic recognition method according to the present invention;

FIG. 16 is a chart explaining the network device classification in the network configuration automatic recognition method according to the present invention;

FIG. 18 is a chart showing examples of PF table entries for use in the connection detection for R-CF-* model in the network configuration automatic recognition method according to the present invention;

FIG. 20 is a chart showing examples of PF table entries for use in the connection detection for R-IF-* model in the network configuration automatic recognition method according to the present invention;

FIG. 22 is a chart showing examples of PF table entries for use in the connection detection for R-SF-* model in the network configuration automatic recognition method according to the present invention;

FIG. 24 is a chart showing examples of PF table entries for use in the connection detection for R-* model in the network configuration automatic recognition method according to the present invention;

FIG. 25 is a chart explaining the method of detecting connections among pieces of packet relay equipment in the network configuration automatic recognition method according to the present invention;

FIG. 26 is a chart continued from FIG. 25;

FIG. 28 is a chart showing examples of PF table entries for use in the connection detection for *-Term model in the network configuration automatic recognition method according to the present invention;

FIG. 29 is a chart explaining the method of detecting connections between packet relay equipment and a terminal in the network configuration automatic recognition method according to the present invention;

FIG. 31 is a chart showing examples of TS table entries for use in the detection of vertical dependency through a combination of a plurality of models, in the network configuration automatic recognition method according to the present invention;

FIG. 33 is a chart showing examples of TS table entries for use in the prediction of non-intelligent hub connection in the network configuration automatic recognition method according to the present invention;

FIG. 34 is a diagram explaining the method of detecting inactive terminals and connection destinations in the network configuration automatic recognition method according to the present invention;

FIG. 35 is a chart showing the method of detecting a modification of connection destination in the network configuration automatic recognition method according to the present invention;

DETAILED DESCRIPTION OF THE PREFERRED EMBODIMENT

Hereinafter, an embodiment of the present invention will be described with reference to the drawings.

Figure 1:
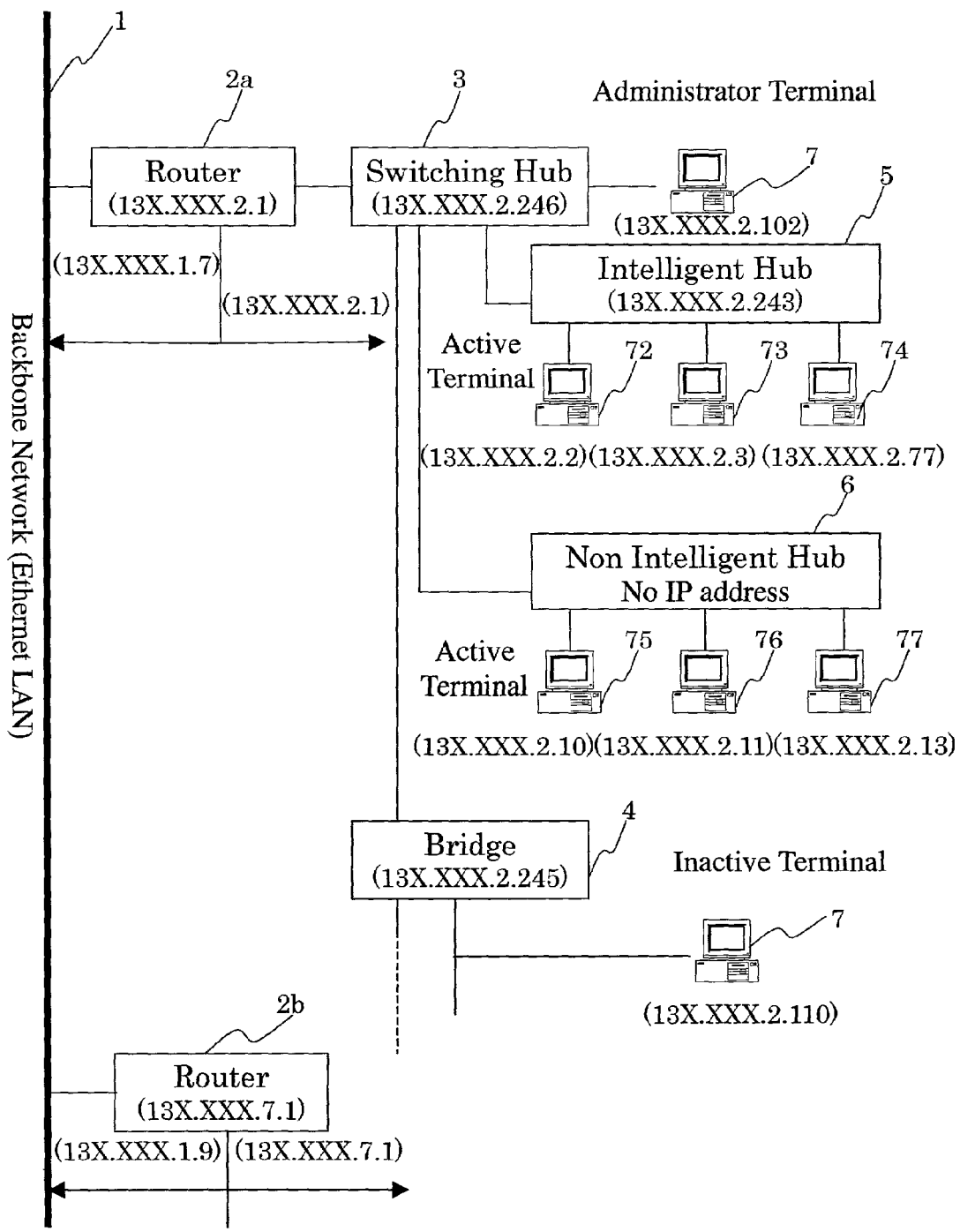
FIG. 1 is a chart showing an embodiment of the network system for which the network configuration automatic recognition method according to the present invention is intended.

FIG. 1 is a chart showing an embodiment of a network system that practices the present invention. The shown network, constructing a local area network (LAN) around a backbone network 1, comprises pieces of packet relay equipment including routers 2a and 2b, a switching hub 3, a bridge 4, an intelligent hub 5, and a non-intelligent hub 6. Unique IP addresses such as "13X.XXX.2.1" are assigned to these relay devices.

The router 2a (IP address "13X.XXX.2.1") divides an internal segment from the backbone network 1. That is, it establishes the division between the network of IP addresses "13X.XXX.1.*" and the network of "13X.XXX.2.*". The router 2a is recognized with an IP address of "13X.XXX.1.7" from the "13X.XXX.1.*" network, and with an IP address of "13X.XXX.2.1" from the "13X.XXX.2.*" network.

Likewise, the router (IP address "13X.XXX.7.1") 2b divides an internal segment from the backbone network. That is, it establishes the division between the network of IP addresses "13X.XXX.1.*" and the network of "13X.XXX.7.*". The router 2b is recognized with an IP address of "13X.XXX.1.9" from the "13X.XXX.1.*" network and with an IP address of "13X.XXX.7.1" from the "13X.XXX.7.*" network.

Each internal segment is further divided by pieces of packet relay equipment including a switch device such as the switching hub (IP address "13X.XXX.2.246") 3, as well as the bridge (IP address "13X.XXX.2.245") 4, the intelligent hub (IP address "13X.XXX.2.243") 5, and the non-intelligent hub (with no IP address) 6.

These pieces of packet relay equipment are connected with other pieces of packet relay equipment and terminals 71-78 to construct the LAN.

The shown network is connected with a single administrator terminal 71. On this administrator terminal 71 run the programs for automatically detecting a network configuration. The terminals 72-78 can be classified into active terminals 72-77 and an inactive terminal 78, both of which are the subjects of recognition by the network configuration automatic recognition method in the present embodiment.

FIG. 1 shows an example in which: the router 2a is connected to the switching hub 3; the switching hub 3 is connected to the bridge 4, the intelligent hub 5, and the non-intelligent hub 6; and the administrator terminal 71 is connected to the switching hub 3. In the example, the bridge 4 is also connected to a single inactive terminal 78, and the intelligent hub 5 and the non-intelligent hub 6 each are connected to three active terminals 72-77.

In the present embodiment, the automatic recognition of connection configuration between devices is effected without adding programs to the terminals 72-78 but the single administrator terminal 71, or by simply adding a network configuration automatic recognition service program and a chart display program to the administrator terminal 71.

Incidentally, the automatic recognition service program mentioned above also has the function of an SNMP manager. The network devices to be recognized consist of those implementing an SNMP agent and those not.

Description will first be given of the general outlines of the network configuration automatic recognition method in the present embodiment.

The network configuration automatic recognition service program is composed of three modules, namely, an active status detection module, a MIB access module, and an auto discovery module.

The active status detection module is a software module for detecting the active status of each device on the network by using ICMP (Internet Control Message Protocol) echo requests. This module has the function of detecting the active status of each device on the network while avoiding unnecessary communications, by making determinations that devices with IP addresses from which no replies are returned to ICMP echo requests are inactive.

The MIB access module is a software module having the function of creating SNMP messages (Get-Request PDU, Get-Next PDU, and Set-Request PDU), sending the SNMP messages, and receiving SNMP messages (Get-Response PDU) to acquire MIB object values. This MIB access module is based on the implementation of SNMP MIB objects on each network device.

The auto discovery module is a software module having the function of detecting a network configuration. The auto discovery module detects a network configuration through the following processes:

(1) process of detecting the active statuses of devices
(2) process of detecting device information (IP address, Mac address, hostname, supported MIB, and device type)
(3) process of acquiring MIB object information
(4) process of detecting connections (connection ports) between pieces of packet relay equipment
(5) process of predicting non-intelligent hubs In the process of (1), the active status detection module is used to detect the active statuses of devices.

In the process of (2), the MIB access module is used to make actual accesses to MIBs and check whether responses or errors are returned to detect the MIBs supported by the devices. As for device type detection, pieces of information on the IP MIB (the value of the ipForwarding object), the presence/absence of bridge MIB support, and the presence/absence of repeater MIB support are combined to classify the devices into one of the router, bridge, switching hub, intelligent hub, terminal, and printer (see FIG. 13).

In the process of (3), the values of MIB objects for use in detection of connections between devices are acquired and stored into tables (see FIGS. 8-11). Here, if information on those devices (IP addresses) determined as inactive in the process of (1) is cached in the MIB objects, connection information of the inactive devices can also be acquired (see FIG. 34).

In the process of (4), bridge MIBs, repeater MIBs, and/or interfaces MIBs are consulted to detect connections between pieces of packet relay equipment in the devices described above, excepting terminals.

A bridge MIB contains an object storing the Mac addresses of devices connected to the individual ports of the packet relay equipment, whereby port-by-port connections of each piece of packet relay equipment can be detected. A repeater MIB contains an object storing the Mac address of the source of a frame that is received the last among frames sent from any device connected to each port. The repeater MIB can learn the source Mac addresses at predetermined time intervals, to detect port-by-port connections of each piece of packet relay equipment. Incidentally, depending on the mode of repeater MIB implementation, there may be some packet relay equipment that will not update the Mac addresses of the sources of last received frames, so that Mac addresses cannot be learned even by using the repeater MIBs described above. In such cases, port-by-port connections of each piece of relay packet equipment can be detected by the following methods. One method is to change port statuses in the interfaces MIB to lock out ports temporarily, and determine the devices that no longer respond to ICMP echo requests as connected to the ports locked out. The other is to acquire port-by-port statistics of send/receive frames in the interfaces MIBs of a plurality of pieces of packet relay equipment, test for significant differences in the statistics, and determine the ports having no significant differences as connected to each other. Moreover, the port-by-port connection information obtainable from the MIBs does not always contain the connection information of all the devices on the network. The port-by-port connection information may sometimes be imperfect to detect connections between devices. In such cases, the packet relay equipment is classified into a plurality of packet relay equipment models (see FIG. 16) on the basis of the connection information obtainable from the MIBs. Then, models of connections between devices are defined to generalize the conditions for detecting the connections between devices and the detectabilities of the connections (see FIGS. 25 and 26). Even if port-by-port connection information is imperfect to detect the connections between devices, this generalization allows the connections between devices to be detected when pieces of information on connections to other devices are combined to satisfy the connection detection conditions.

Figure 30:
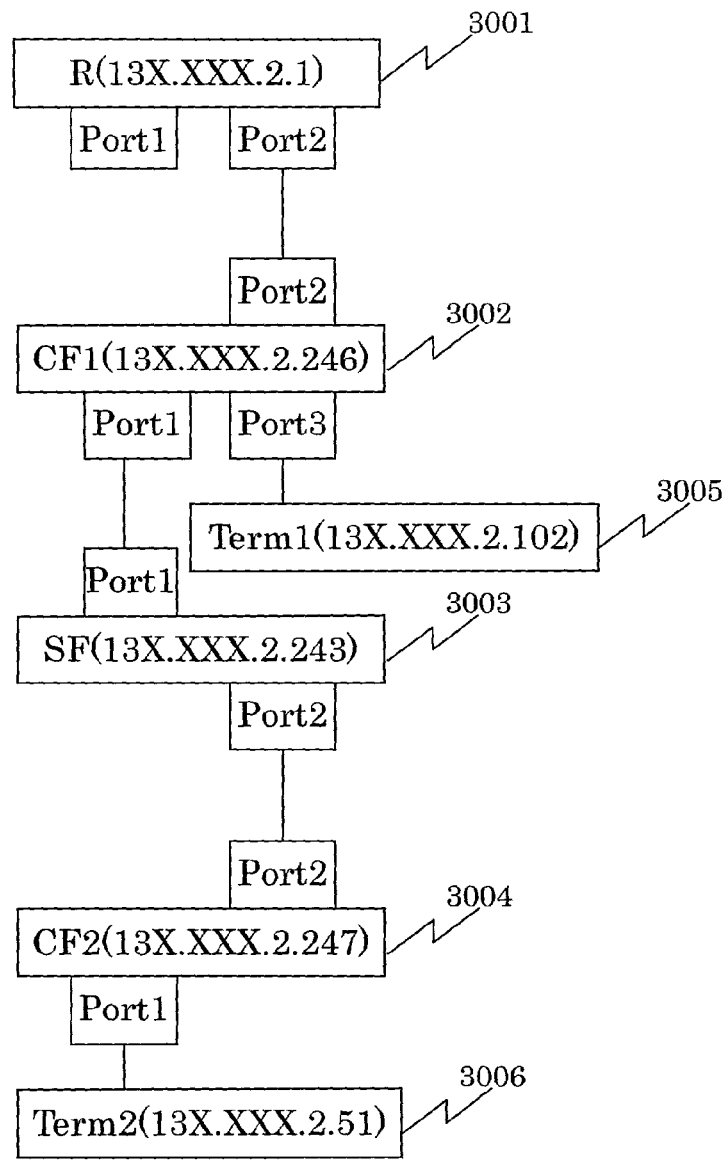
FIG. 30 is a diagram explaining the method of detecting vertical dependency through a combination of a plurality of models, in the network configuration automatic recognition method according to the present invention.

In addition, a plurality of inter-device connection models can sometimes be combined with each other to detect such connections as cannot be detected from individual inter-device connection models alone (see FIG. 30).

In the process of (5), connection of non-intelligent hubs is predicted by a method of detecting whether a plurality of devices are connected to a port of packet relay equipment, and if so, determining that those connected to the port of the packet relay equipment includes at least one non-intelligent hub in operation.

The chart display program is a program for rendering on-screen the GUI display (see FIG. 36) of a network configuration detected by the network configuration automatic recognition service program. The chart display program can employ the display modes of, e.g., displaying the network configuration in a tree structure and displaying its layout on a floor map.

Incidentally, when the active status of a device or the network configuration is changed, the floor map also needs to be changed accordingly at once. Changes in the active statuses of devices include activations and suspensions. Changes in the network configuration include modifications of connection destinations and modifications of IP addresses of devices.

The chart display program collects MIB object values by using the auto discovery module periodically or at irregular intervals according to a predetermined schedule. The chart display program monitors a change in the MIB object values to detect a change in the active statuses of devices or a change in the network configuration, and automatically reflects the change in the network configuration onto the network configuration chart to inform the user of the change (see FIG. 34).

Figure 2:
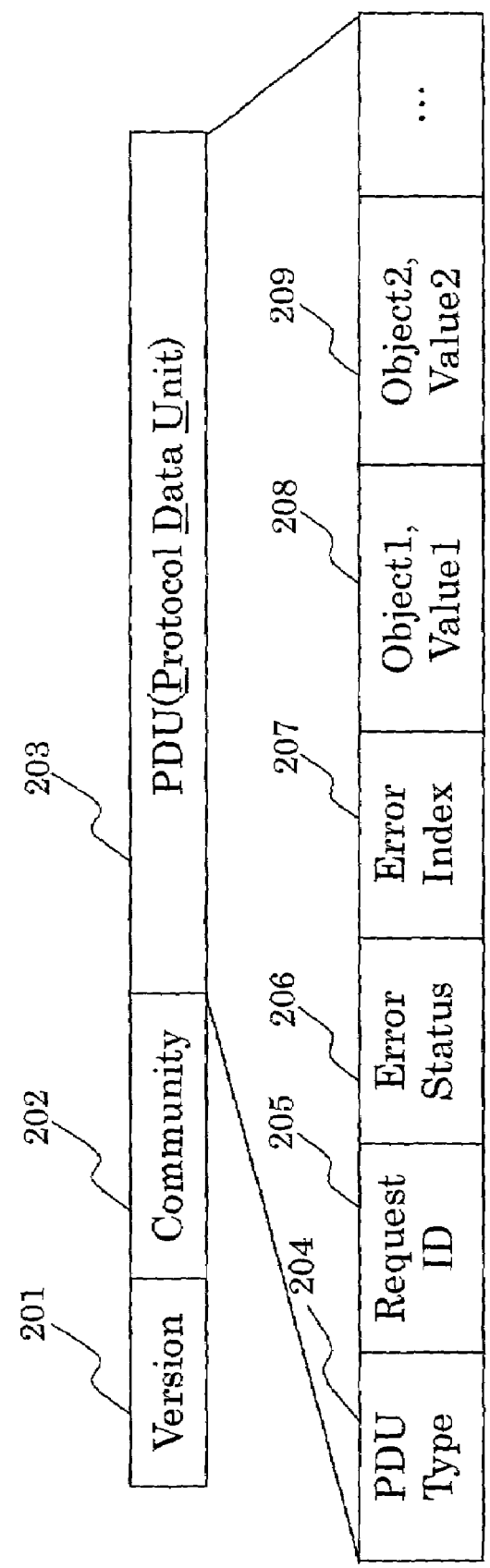
FIG. 2 is a diagram showing the SNMP message format for use in the network configuration automatic recognition method according to the present invention.

FIG. 2 is a diagram showing the message format of SNMP, which is the standard protocol for accessing MIB objects for use in the detection of connections between devices.

An SNMP message consists of the fields of Version 201 for storing an SNMP version number, Community 202 for storing a community name, and PDU (Protocol Data Unit) 203 for storing an SNMP message body. SNMP messages are classified into five types of messages, namely, Get-Request, Get-Next, Get-Response, Set-Request, and Trap.

Get-request and Get-Next are messages for instructing a device having a MIB to return a MIB value. Here, Get-response is returned.

Set-Request is a message issued to modify a MIB value. Trap is a message for autonomously posting a to-be-monitored event (significant event) occurring in a managed device having a MIB to the administrator terminal 71.

The network configuration automatic recognition method according to the present invention uses those messages other than Trap.

Get-Request, Get-Next, Get-Response, and Set-Request messages have a PDU configuration of the same format. As shown in FIG. 2, the PDU field consists of PDU Type 204 for storing a message type (above-mentioned four types), Request ID 205 for storing a unique identifier for the message, Error Status 206 for storing an error message ID, Error Index 207 for storing the point of occurrence of an error, and a list 208-209 for storing information for identifying the MIB objects to access. Each component of the list that stores the information for MIB object identification consists of an OID (Object Identifier), which is an identifier for identifying a MIB object uniquely, and the value of the MIB object.

Figure 3:
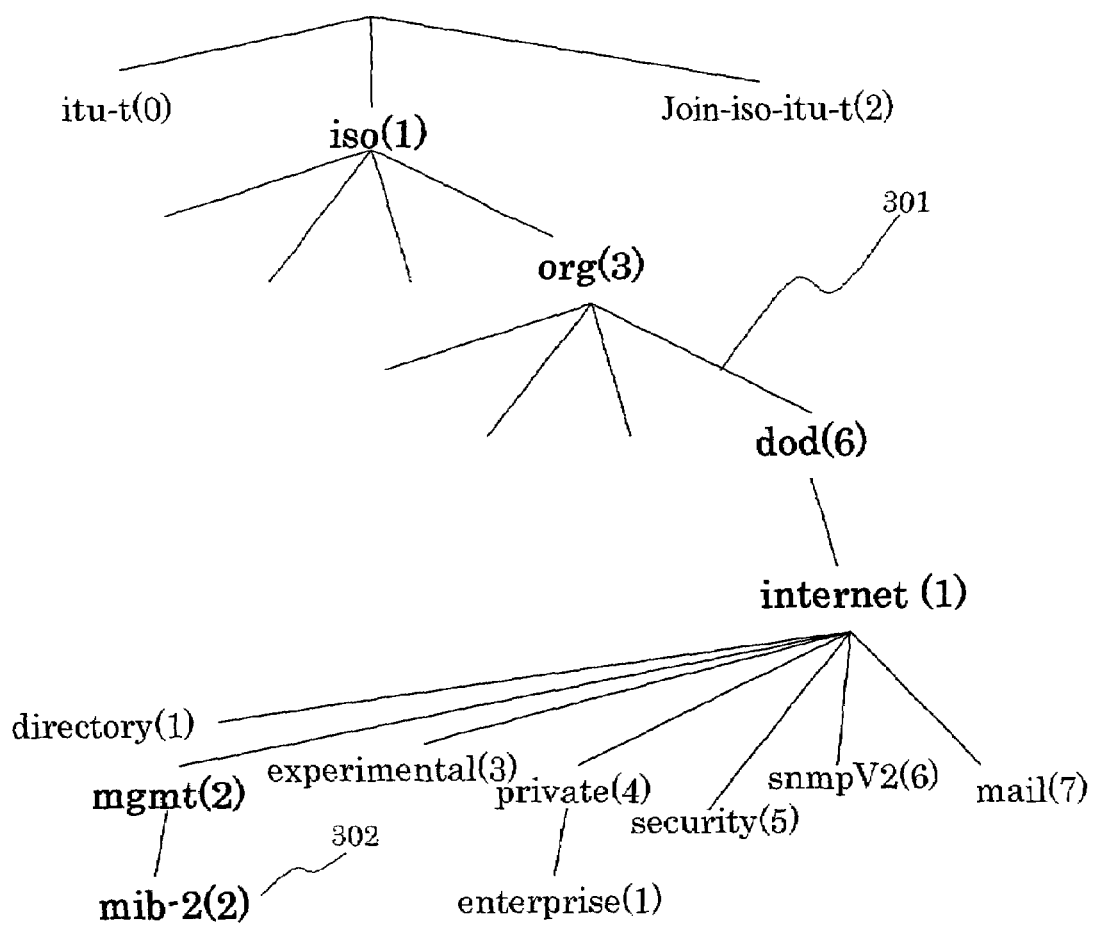
FIG. 3 is a diagram showing the Internet OID tree for use in the network configuration automatic recognition method according to the present invention.

FIG. 3 is a diagram showing the Internet OID tree for which the present embodiment is intended. Packet relay equipment stores MIB objects 301 in a tree structure. Of these, information of MIB2 which is the standard in network management is stored in a node 302 of iso(1)-org(3)-dod(6)-internet(1)-mgmt(2)-mib-2(2), with an OID of "1.3.6.1.2.2".

The present embodiment will deal with a MIB2-based method. In addition to this, there are methods using vendor MIBs (iso(1)-org(3)-dod(6)-internet(1)-private(4)-enterprise (1)) provided by individual vendors. However, MIB2, or the standard protocol in network management, is preferably used in favor of higher system versatility.

Figure 4:
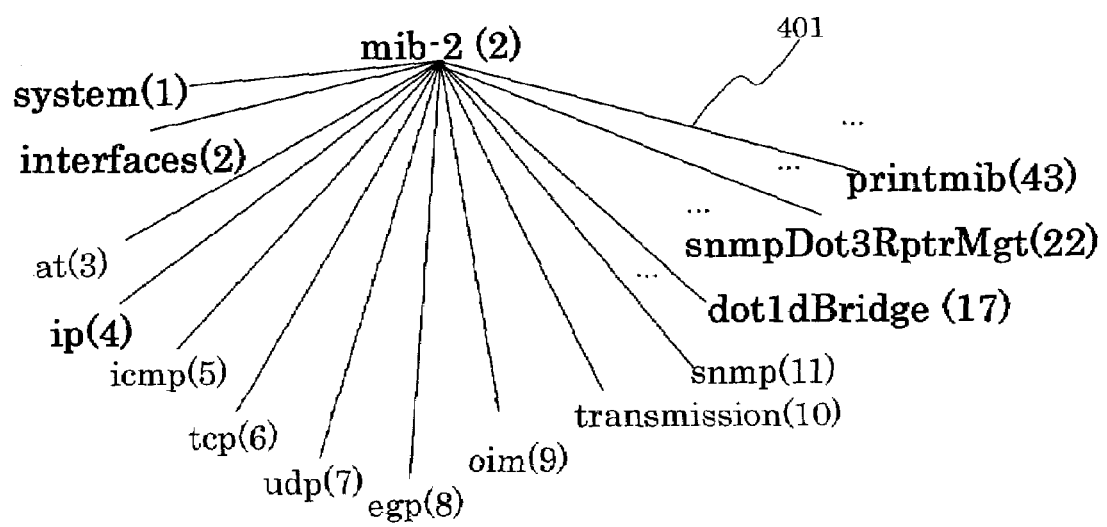
FIG. 4 is a diagram showing the configuration of the MIB II objects for use in the network configuration automatic recognition method according to the present invention.

FIG. 4 is a diagram showing the configuration of the MIB2 objects for which the present embodiment is intended. MIB2 presently has fifty standardized objects, each of which is managed as a descendant object 401 of mib-2(2) (iso(1)-org (3)-dod(6)-internet(1)-mgmt(2)-mib-2(2)). MIB2 includes group objects such as system(1), interfaces(2), at(3), ip(4), icmp(5), and so on. The present embodiment shows an example where those group objects shown in bold, namely, system(l), interfaces(2), ip(4), dot1dBridge(17), snmpDot3RptrMgt(22), and printMIB(43) are used for the automatic recognition of network configuration.

FIG. 5 is a diagram showing the configuration of the interfaces group object for which the present embodiment is intended, as an example of the group object configurations. The interfaces group object has a series of descendent objects 501, or ifNumber(1), ifTable(2), and so on. The ifTable(2) shows data in a table form. The ifEntry(1) indented below the ifTable(2) represents a row of the ifTable (2). The ifIndex(1), ifDescr(2), . . . , ifSpecific(22) indented below the ifEntry(1) represents individual columns of the ifEntry(1).

Packet relay equipment (router, bridge, repeater, switch, etc.) stores into the ifTable(2) the interface-by-interface (port-by-port) information of the packet relay equipment. Hereinafter, tabled data in each MIB object will be considered to be stored in accordance with the rules described above. The present embodiment shows an example where the boldfaced ifAdminStatus(7), ifInOctets(10), ifInUcastPkts(11), ifIn-NUcastPkts(12), ifInDiscards(13), ifInErrors(14), ifOutOctets(16), ifOutUcastPkts(17), ifOutNUcastPkts(18), ifOut-Discards(19), and ifOutErrors(20) are used for the automatic recognition of network configuration.

The ifAdminStatus(7) is an object representing the setting of an interface (port), and is available for controlling the status of the port from exterior.

The ifInOctets(10) is an object for indicating the number of octets received by the interface (port); the ifInUcastPkts(11) the number of unicast packets passed to higher protocols; the ifInNUcastPkts(12) the number of non-unicast packets passed to higher protocols; the ifInDiscards (13) the number of incoming packets discarded for reasons other than errors; and the ifInErrors(14) the number of incoming packets not passed to higher protocols because of errors.

Similarly, the ifOutOctets(16) is an object for indicating the number of octets transferred by the interface (port); the ifOutUcastPkts(17) the number of unicast packets received from higher protocols; the ifOutNUcastPkts(18) the number of non-unicast packets received from higher protocols; the ifOutDiscards(19) the number of outgoing packets discarded for reasons other than errors; and the ifOutErrors(20) the number of outgoing packets not transferred because of errors. The ifInOctets(10) through ifOutErrors(20) are available for comparing statistical information of individual ports to detect ports in connection. Aside from the interfaces group object, the present embodiment also utilizes the system, ip, dod1dBridge, snmpDot3RptrMgt, and printMIB group objects.

The sysDescr in the system group object is an object for indicating entity (system) information. The sysDescr object is available for grasping whether MIB2 is supported or not, since the system group object is always implemented on every device that implements MIB2.

The ipForwarding in the ip group object is an object for indicating whether or not the entity (system) has an IP routing function. The ipforwarding object is available for determining whether or not the packet relay equipment is a router.

The ipNetToMediaPhysAddress is an object for indicating a media-dependent physical address. The ipNetToMediaN-etAddress is an object for indicating the IP address corresponding to the media-dependent physical address.

Such packet relay equipment as a router stores into the ipNetToMediaPhysAddress and ipNetToMediaNetAddress the information cached in ARP (Address Resolution Protocol; conversion procedure from IP addresses to hardware addresses) processing on the network segment connected. Accordingly, these objects can be used to obtain the ARP table (a combination of Mac address and IP address) of the segment.

The dot1dTpFdbAddress in the dot1dBridge group object is an object for indicating the MAC address to which a bridge transmits forwarding/filtering information. The dot1dTpFdbPort is an object for indicating the port number of a frame whose source address is identical to the dot1dTpFdbAddress. Packet relay equipment supporting a bridge MIB stores into the dot1dTpFdbAddress and dot1dTpFdbPort a set of Mac addresses of the devices connected to the individual ports of the packet relay equipment. These objects are therefore available for acquiring the port-by-port information of devices connected to the packet relay equipment.

In the snmpDot3RptrMgt group object, the rptrAddrTrackPrtIndex is an object for indicating the identifier of a port belonging to the group. The rptrAddrTrackLastSourceAddress is an object for indicating the source address of a last-received frame. The rptrAddrTrackSourceAddrChanges is an object for indicating the frequency of changes to the rptrAddrTrackLastSourceAddress.

Packet relay equipment supporting a repeater MIB stores into the rptrAddrTrackPortIndex and rptrAddrTrackLastSourceAddress the Mac address of any one of the devices connected to the ports of the packet relay equipment. Packet relay equipment that is implemented to RFC (Request for Comment) specifications updates the value of the rptrAddrTrackLastSourceAddress each time it receives a frame. Therefore, it can learn the information of the rptrAddrTrackLastSourceAddress to acquire a set of Mac addresses of the devices connected to the individual ports of the packet relay equipment. On the other hand, packet relay equipment not implemented to RFC specifications may fail to update the value of the rptrAddrTrackLastSourceAddress on frame receptions. The rptrAddrTrackSourceAddrChanges is available for determining whether or not packet relay equipment is implemented to RFC specifications.

Since it indicates the frequency of changes of the rptrAddrTrackLastSourceAddress, the rptrAddrTrackSourceAddrChanges increases with time in packet relay equipment implemented to RFC specifications, whereas it will not change in packet relay equipment not implemented to RFC specifications. Here, the rptrAddrTrackSourceAddrChanges may contain the number of connected devices detected on each port.

Similarly, the ptrGeneralConfigChanges in the printMIB group object is an object for indicating the number of changes to printer setting, and is available for grasping whether the device is a printer or not since the printMIB group object is implemented on printers.

Figure 6:
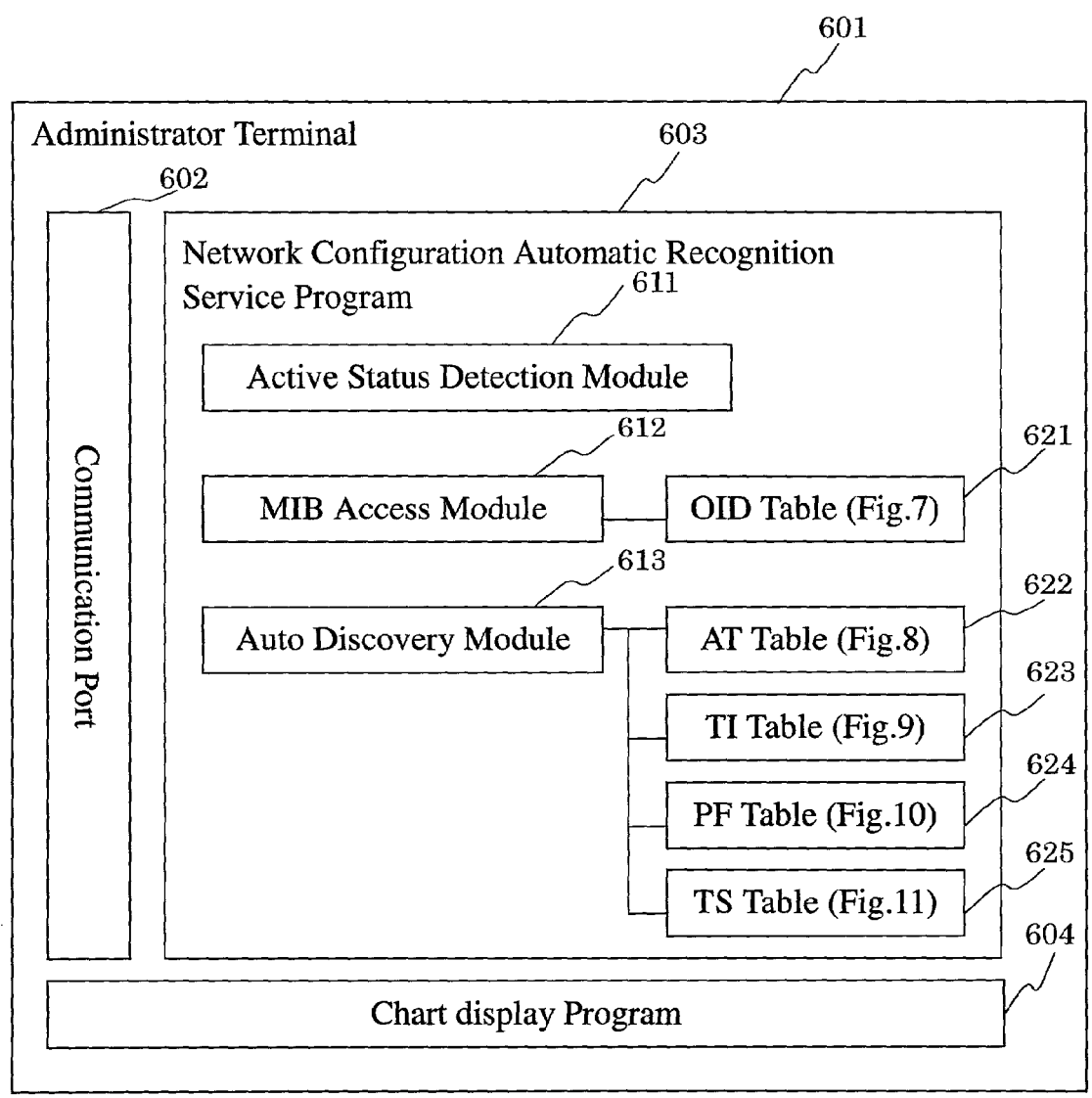
FIG. 6 is a chart showing an example of program configuration on the administrator terminal for implementing the network configuration automatic recognition method according to the present invention.

FIG. 6 is a chart showing the configuration of programs to be implemented on the administrator terminal 71.

In order for that single administrator terminal 71 on the network to recognize the network configuration automatically in the system of FIG. 1, the administrator terminal 71 implements a communication port 602, a network configuration automatic recognition service program 603, and a chart display program 604. Incidentally, these network configuration automatic recognition service program 603 and chart display program 604 can be offered to users as recorded in record media such as a CD-ROM or a DVD-ROM so that they can be installed and run on general-purpose computers. Moreover, these programs may be distributed to users at cost through communication media or communication means such as the Internet.

The network configuration automatic recognition service program 603 consists of three modules, namely, an active status detection module 611, a MIB access module 612, and an auto discovery module 613.

The MIB access module 612 manages an OID table (see FIG. 7) for storing MIB2 OID information.

The auto discovery module 613 manages an AT table (see FIG. 8) for storing address conversion information from Mac addresses to IP addresses, a TI table (see FIG. 9) for storing device-specific information, a PF table (see FIG. 10) for storing port-by-port connection device information of packet relay equipment, and a TS table (see FIG. 11) for storing tree-structured connection information of the network configuration.

FIG. 7 is a chart showing the configuration of an OID (Object Identifier) table 621 which the MIB access module 612 uses in sending/receiving SNMP messages.

The OID table 621 holds items including Object Name 701, Object Identifier 702, type 703, and Object Path 704.

The Object Name 701 contains unique object names to be used as a key when the MIB access module 612 searches the OID table 621. The Object Identifier 702 contains unique object identifiers for use in SNMP message description. The type 703 contains object types. The Object Path 704 stores the full path names of the objects.

The MIB access module 612 accesses the OID table 621 in creating SNMP messages, so as to retrieve the identifiers of MIB objects to be acquired or reserve receiving buffers according to the types of the objects.

FIG. 8 is a chart showing the configuration of the AT (Address Translation) table 622 the auto discovery module 613 creates.

The AT table 622 holds items including IP Address 801 and Mac Address 802. The IP Address 801 contains the IP address values of devices, and the Mac Address 802 contains the Mac Address values of the devices. Since it shows a set of pairs of IP and Mac addresses of devices, the AT table 622 is created from information acquired from such a device as a router which caches the address information of the whole segment. The AT table 622 is used to retrieve the MAC address of a device with the IP address as the key, or to resolve an IP address with a Mac address.

FIG. 9 is a chart showing the configuration of the TI (Terminal Information) table 623 the auto discovery module 613 creates.

The TI table 623 holds items including IP Address 901, Mac Address 902, Host Name 903, type 904, alive 905, mib2 906, forwarding 907, bridge 908, repeater 909, and print 910.

The IP Address 901 contains the IP address values of devices, the Mac Address 902 the MAC address values of the devices, and the Host Name 903 the hostnames of the devices. The Type 904 contains identifiers representing device types. In FIG. 9, "0" is assigned to U that represents Unknown, "1" to R representing Router, . . . , and "7" to P representing Printer.

The alive 905 contains flag values for indicating whether the devices are in action or not. In FIG. 9, "1" and "0" are assigned to On and Off, respectively. The mib2 906 contains flag values for indicating whether or not the devices support MIB2. The forwarding 907 contains flag values for indicating whether or not the devices exercise IP forwarding. The bridge 908 contains flag values for indicating whether or not the devices support a bridge MIB. The repeater 909 contains flag values for indicating whether or not the devices support a repeater MIB. The Printer 910 contains flag values for indicating whether or not the devices support a printer MIB.

By creating the TI table 623, the auto discovery module 613 can grasp active devices within a segment and avoid needless accesses to MIBs.

FIG. 10 is a chart showing the configuration of the PF (Port Forwarding) table 624 the auto discovery module 613 creates.

The PF table 624 holds items including Source IP Address 1001, Source Mac Address 1002, Source Port 1003, Destination IP Address 1004, and Destination Mac Address 1005.

The Source IP Address 1001 contains the IP address values of packet relay equipment, the source Mac Addresses 1002 the MAC address values of the packet relay equipment, and the Source Port 1003 port numbers of the packet relay equipment.

Moreover, the Destination IP Address 1004 contains the IP address values of active devices connected to the ports listed in the Source Port 1003. The Destination IP Address 1004 contains the MAC address values of the devices listed in the Destination IP Address 1004. The PF table 624 shows information of the connections from pieces of packet relay equipment operating in a segment to other pieces of packet relay equipment or terminals.

FIG. 11 is a chart showing the configuration of the TS (Tree Structure) table 625 the auto discovery module 613 creates.

The TS table 625 holds items including Terminal IP Address 1101, Terminal Mac Address 1102, Terminal Port 1103, Parent IP Address 1104, Parent Mac Address 1105, and Parent Port 1106.

The Terminal IP Address 1101 contains the IP address values of devices in action. The Terminal Mac Address 1102 contains the MAC address values of the devices whose IP addresses are listed in the Terminal IP Address 1101. The Terminal Port 1103 stores the connected port numbers of the devices. When the devices are terminals, or packet relay equipment with unknown port numbers, NULL values are stored into the Terminal Port 1103. The Parent IP Address 1104 contains the IP address values of pieces of packet relay equipment which are directly connected to the ports whose port numbers are listed in the Terminal Port 1103. The Parent Mac Address 1105 contains the MAC address values of the pieces of packet relay equipment listed in the Patent IP Address 1104. The Parent Port 1106 contains connection port numbers.

A difference between the TS table 625 and the PF table 624 consists in that: the PF table 624 contains the information of all the active devices connected to any of the ports of packet relay equipment, and thus a single device can be added to the entries of a plurality of packet relay equipment, whereas what is added to the TS table 625 is only the information of packet relay equipment directly connected to a device.

Figure 12:
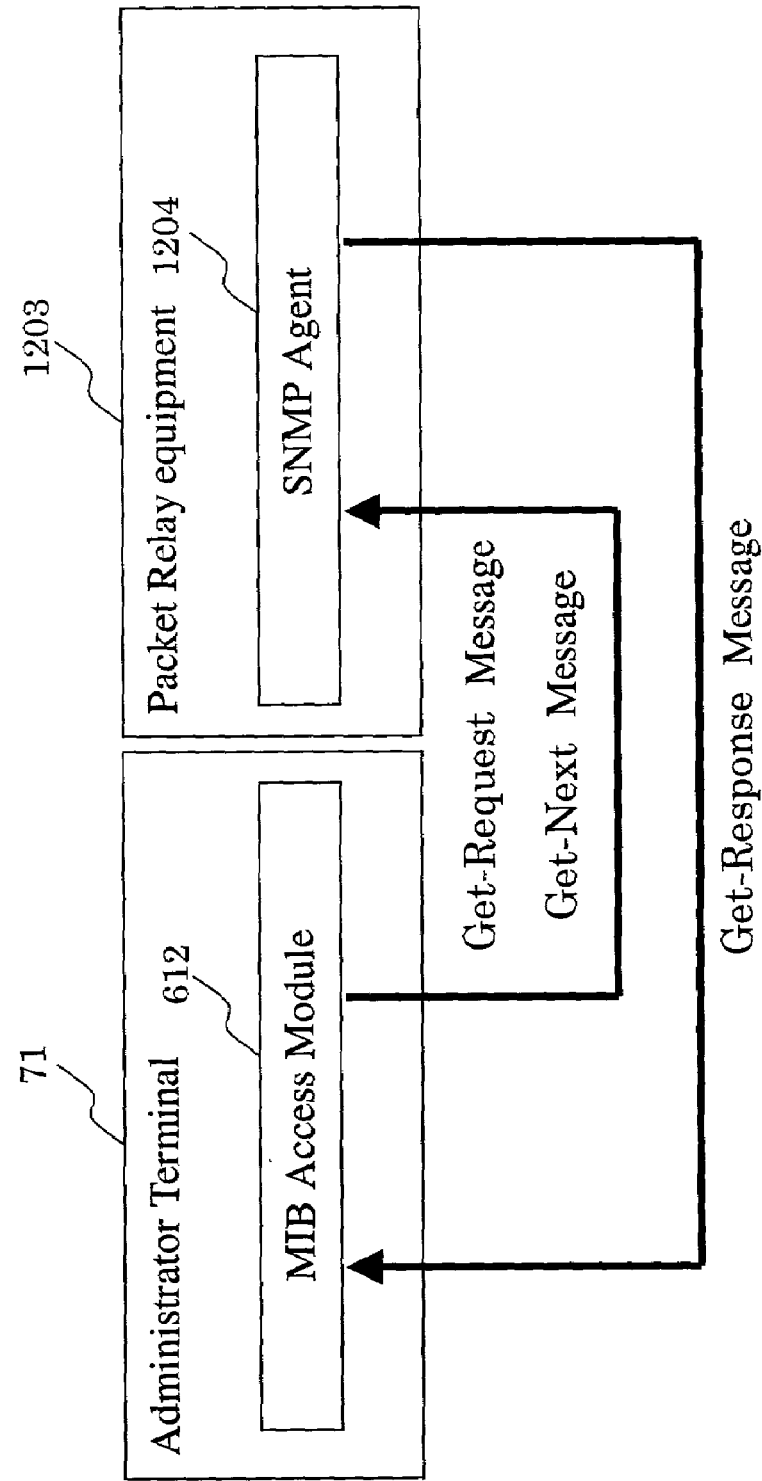
FIG. 12 is a diagram showing the mechanism of SNMP message sending/receiving in the network configuration automatic recognition method according to the present invention.

FIG. 12 is a diagram showing the mechanism how the MIB access module 612 sends/receives SNMP messages.

The MIB access module 612 running on the administrator terminal 71 creates an SNMP message (Get-Request message or Get-Next message), and transmits the SNMP message to an SNMP agent 1204 running on packet relay equipment (or a device such as a terminal and a printer) 1203 that has the information to acquire. On receiving an SNMP message, the SNMP agent 1204 interprets the SNMP message, creates an SNMP message (Get-Response) containing a MIB object value required, and returns the SNMP message to the MIB access module 612. Thereby, the MIB access module 612 can acquire any MIB object value of the packet relay equipment 1203.

FIG. 13 is a chart explaining a method of detecting device types.

The ipForwarding object value in the ip group and the implementation patterns of a bridge MIB, repeater MIB, and printer MIB vary in combination from one device type to another. Examining the combination therefore allows the detection of device types.

Figure 14:
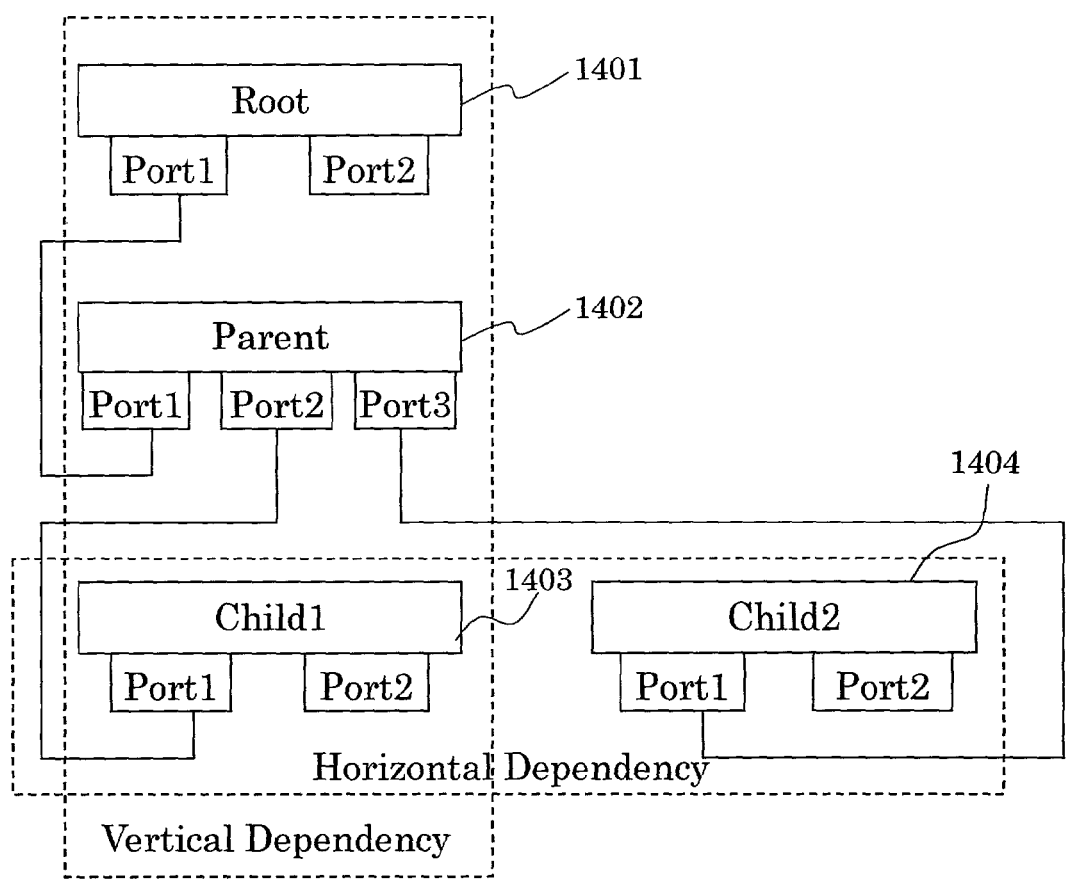
FIG. 14 is a diagram showing the definitions of relation among pieces of packet relay equipment in consideration of the network configuration automatic recognition method according to the present invention.

FIG. 14 is a diagram explaining the definition of relation among pieces of packet relay equipment.

FIG. 14 shows vertical dependency among four different pieces of packet relay equipment. The piece of packet relay equipment that is connected to the backbone network and is at the segment end is defined as a Root device 1401. Connected to the Port1 of the Root device 1401 are three pieces of packet relay equipment in action. The piece of packet relay equipment directly connected to the Port1 of the Root device 1401 will be referred to as a Parent device 1402, the one connected to the Port2 of the Parent device 1402 as a Child1 device 1403, and the one connected to the Port3 of the Parent device 1402 as a Child2 device 1404. Then, vertical dependency is defined between an arbitrary piece of packet relay equipment and any active piece(s) of packet relay equipment connected to its port(s) except the port to which the Root device is connected.

In the example of FIG. 14, there is vertical dependency between the Root device 1401 and the Parent device 1402, the Child1 device 1403, and the Child2 device 1404. Besides, there is vertical dependency between the Parent device 1402, the Child1 device 1403, and the Child2 device 1404.

Moreover, horizontal dependency is defined between an arbitrary piece of packet relay equipment and a set of pieces of packet relay equipment at the same hop count to the Root device, among those active pieces of packet relay equipment connected to the port to which the Root device is connected.

In the example of FIG. 14, the Port1 of the Child1 device 1403 is connected to the Root device 1401, Parent device 1402, and Child2 device 1404 in action, and the hop count from the Child1 device 1403 to the Root device 1401 is "1." The hop count from the Child2 device 1404 to the Root device 1401 is also "1." Then, there is horizontal dependency between the Child1 device 1403 and the Child2 device 1404.

FIG. 15 is a diagram explaining the method of detecting a connection between pieces of packet relay equipment by using the interfaces MIB in the present embodiment. When two different pieces of packet relay equipment, or Unit1 device 1501 and Unit2 device 1502, operate as in the shown example, both the value of the ifInOctets object and the value of the ifOutOctets object in the interfaces MIB on each of the packet relay equipment ports are acquired at the same time.

The example of FIG. 15 shows that the ifInOctets value 1503 and ifOutOctets value 1504 on the Port1 of the Unit1 device 1501, and the ifInOctets value 1505 and ifOutOctets value 1506 on the Unit2 device 1502 are acquired.

A difference between the ifInOctets value 1503 on the Port1 pf the Unit1 device 1501 and the ifOutOctets value 1506 on the Unit2 device 1502, or between the ifOutOctets value on the Port1 of the Unit1 device 1501 and the ifInOctets value 1505 on the Unit2 device 1502 is tested. If no significant difference is worked out, then it is tested that there is a connection between the Port1 of the Unit1 device 1501 and the Port1 of the Unit2 device 1502. Here, a significant difference means that two values differ from each other in statistical terms; one example is that when a difference between two values exceeds a certain threshold value, the two values are different.

FIG. 16 is a chart showing the mode of classification of packet relay equipment in the present embodiment.

Network device models in the present embodiment consist of R, CF, IF, SF, and Term.

R represents a piece of packet relay equipment for segment division (Router), serving as a parent to all the other devices in the segment. Packet relay equipment is also classified into CF, IF, and SF in accordance with device connection information obtainable from MIBs. CF represents a piece of packet relay equipment that has no imperfections in its MIB object information stored, and is capable of creating a PF table (FIG. 10) containing the connection ports of all the pieces of packet relay equipment and the terminals.

IF represents a piece of packet relay equipment that. has some imperfections in its MIB object information stored, and may fail to detect connection port numbers to other pieces of packet relay equipment except R.

SF represents a piece of packet relay equipment that has some imperfections in its MIB object information stored, cannot detect any of the ports connected to each piece of packet relay equipment including R, and can detect the port(s) connected to one or more terminals. Non-intelligent hubs and repeaters with no MIB implemented thereon will be referred to as NFs. Devices other than packet relay equipment, such as a printer and a terminal, will be referred to as Terms.

Figure 17:
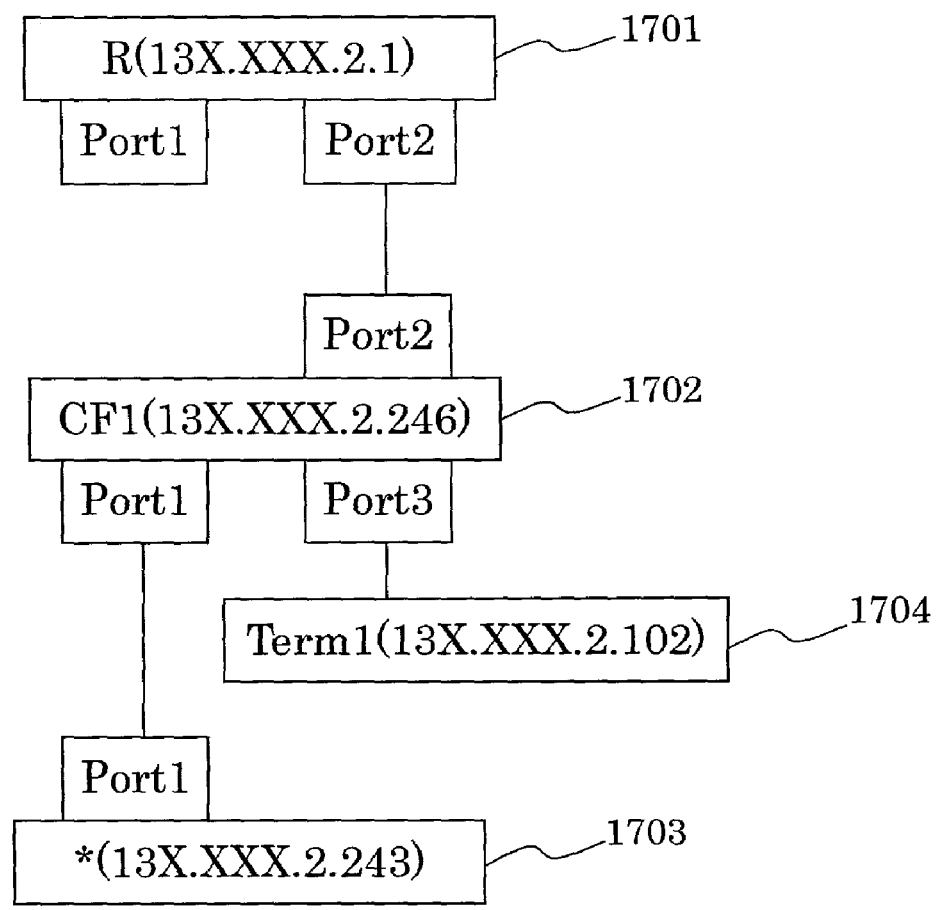
FIG. 17 is a diagram showing the mechanism of connection detection for R-CF-* model in the network configuration automatic recognition method according to the present invention.

FIG. 17 is a diagram showing the mechanism of connection detection for R-CF-* models in the present embodiment. As an example of the R-CF-* models, FIG. 17 shows a case where: the Port2 of an R (IP address "13X.XXX.2.1") 1701 and the Port2 of a CF1 (IP address "13X.XXX.2.246") 1702 are connected to each other; the Port1 of the CF1 and the Port1 of * (IP address "13X.XXX.2.243") 1703 are connected to each other; and the Port3 of the CF1 is connected to an arbitrary Term1 (IP address "13X.XXX.2.102") 1704. Here, * represents any one of CF2, IF2, and SF2.

FIG. 18 shows examples of entries in the PF table 624 for use in the connection detection for the R-CF-* models in FIG. 17.

From the connection information in the entry 1801, it can be detected that the connection port of the CF1 to * is 1.

From the connection information in the entry 1802, it can be detected that the connection port of the CF1 to the R is 2.

From the connection information in the entry 1803, it can be detected that the connection port of the CF1 to the Term1 is 3.

From the connection information in the entry 1804, it can be detected that the connection port of * to the Term1 is 1.

Since the connection port of the CF1 to the R differs from the connection port of the CF1 to *, it can be detected that the CF1 is a parent to *.

Since the connection port of the CF1 to * differs from the connection port of the CF1 to the Term1, it can be detected that the Term1 is not a device connected to *.

The connection port of * to the Term1 is 1, and the Term1 is not a device connected to *; therefore, the connection port of * to the CF1 is the same as the connection port of * to the Term1. Accordingly, it can be detected that the connection port of * to the CF1 is 1.

For an R-CF-SF model, the PF table 624 contains the entries 1801-1803, whereas it is not assured to contain the entry 1804. Therefore, the connection ports and vertical dependency of the devices can be detected under the condition that the connection information of the CF1 and the Term1 and the connection information of * and the Term1 be stored in the PF table 624.

From the connection information in the entry 1805, it can be detected that the connection port of * to the R is 1.

Since CF1 is a parent of *, the connection port of * to the CF1 is the same as the connection port of * to the R. Accordingly, it can be detected that the connection port of * to the CF1 is 1.

For an R-CF-CF model and an R-CF-IF model, the PF table 624 contain the entries 1801 through 1805. Therefore, the connection ports and vertical dependency of the devices can be detected under any conditions.

Figure 19:
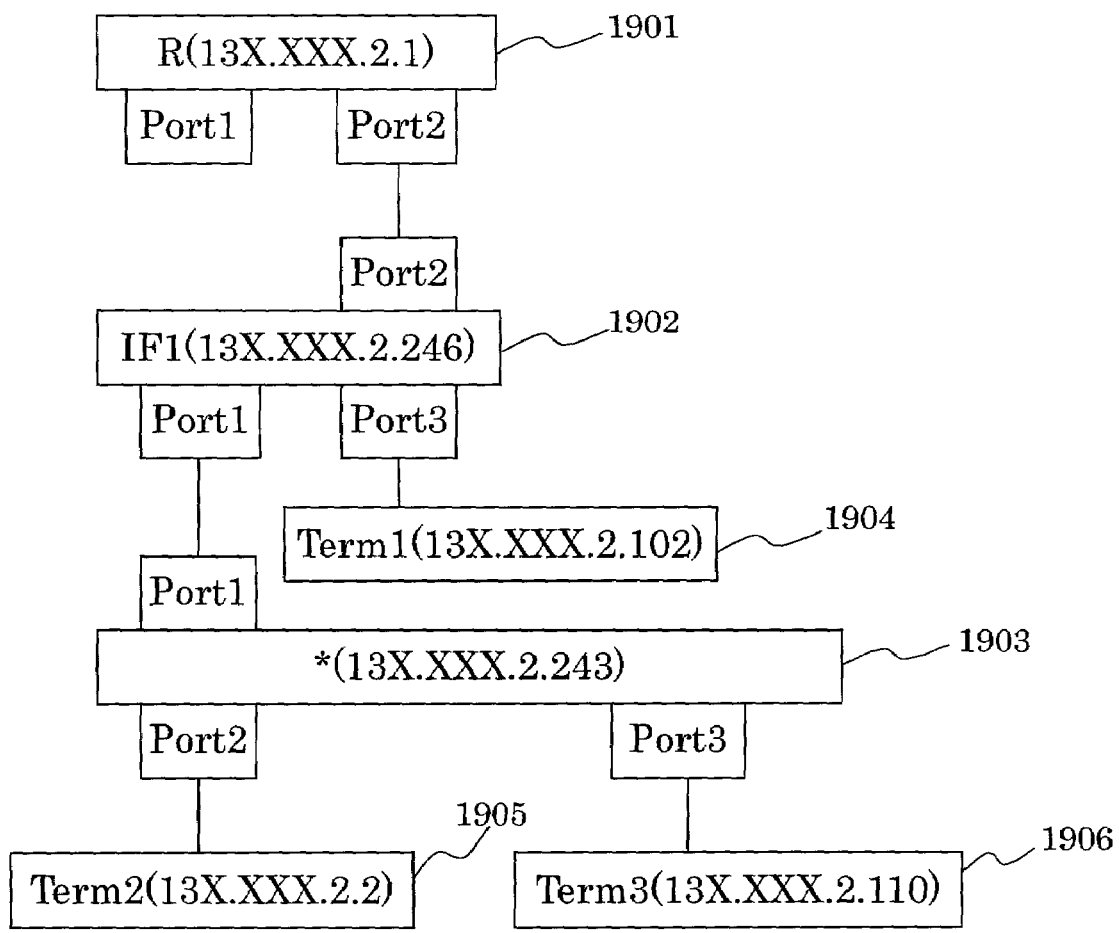
FIG. 19 is a diagram showing the mechanism of connection detection for R-IF-* model in the network configuration automatic recognition method according to the present invention.

FIG. 19 is a diagram showing the mechanism of connection detection for R-IF-* models in the present embodiment. As an example of the R-IF-* models, FIG. 19 shows a case where: the Port2 of an R (IP address "13X.XXX.2.1") 1901 and the Port2 of an IF1 (IP address "13X.XXX.2.246") 1902 are connected to each other; the Port1 of the IF1 and the Port1 of * (IP address "13X.XXX.2.243") 1903 are connected to each other; the Port3 of the IF1 is connected to an arbitrary Term1 (IP address "13X.XXX.2.102") 1904; the Port2 of * is connected to an arbitrary Term2 (IP address "13X.XXX.2.2") 1905; and the Port3 of * is connected to an arbitrary Term 3 (IP address "13X.XXX.2.110") 1906. Here, * represents any one of CF2, IF2, and SF2.

FIG. 20 shows examples of entries in the PF table 624 for use in the connection detection for the R-IF-* models in FIG. 19.

From the connection information in the entry 2001, it can be detected that the connection port of the IF1 to the Term2 is 1.

From the connection information in the entry 2002, it can be detected that the connection port of the IF1 to the Term3 is 1.

From the connection information in the entry 2003, it can be detected that the connection port of the IF1 to the Term1 is 3.

From the connection information in the entry 2005, it can be detected that the connection port of * to the Term1 is 1.

From the connection information in the entry 2006, it can be detected that the connection port of * to the Term2 is 2.

From the connection information in the entry 2007, it can be detected that the connection port of * to the Term3 is 3.

Since the connection port of the IF1 to the R differs from the connection port of the IF1 to the Term2, it can be detected that the IF1 is a device interposed between the R and the Term2.

Since the connection port of IF1 to the R differs from the connection port of the IF1 to the Term3, it can be detected that the IF1 is a device interposed between the R and the Term3.

Since the connection port of * to the Term2 differs from the connection port of * to the Term3, it can be detected that * is a device interposed between the Term2 and the Term3. Accordingly, it can be detected that * is a device interposed between the IF1 and the Term2/Term3, and that the IF1 is a parent to *.

Since the connection port of the IF1 to * is identical to the connection port of the IF1 to the Term2/Term3, it can be detected that the connection port of the IF1 to * is 1.

Since the connection port of the IF1 to the R differs from the connection port of the IF1 to the Term1, it can be detected that the IF1 is a device interposed between the R and the Term1.

Since the connection port of the IF1 to * differs from the connection port of the IF1 to the Term1, it can be detected that the IF1 is a device interposed between * and the Term1.

Accordingly, the connection port of * to the IF1 is identical to the connection port of * to the Term1, and thus it can be detected that the connection port of * to the IF1 is 1.

For an R-IF-SF model, the PF table 624 contains the entries 2001-2003, whereas it is not assured to contain the entries 2005-2007.

In the R-IF-SF model, the connection ports and vertical dependency of the devices can be detected under the condition that the connection information of the IF1 and the Term1-Term3 and the connection information of * and the Term1-Term3 be stored in the PF table 624.

From the connection information in the entry 2004, it can be detected that the connection port of the IF1 to the R is 2.

From the connection information in the entry 2008, it can be detected that the connection port of * to the R is 1.

Since the connection port of * to the R is different from the connection port of * to the Term2, the Term2 is a device connected to *. Then, the connection port of the IF1 to the R differs from the connection port of the IF1 to the Term2. Accordingly, it can be detected that the IF1 is a parent to * and the connection port of the IF1 to * is 1.

Since the IF1 is a parent to * and the connection port of * to the R is identical to the connection port of * to the IF1, it can be detected that the connection port of * to the IF1 is 1.

For an R-IF-IF model, the PF table 624 contains the entries 2001 through 2008.

In the R-IF-IF model, the connection ports and vertical dependency of the devices can be detected under the condition that the connection information of the IF1 and the Term1/Term2 and the connection information of * and the Term1/Term2 be stored in the PF table 624.

From the connection information in the entry 2009, it can be detected that the connection port of * to the IF1 is 1.

For an R-IF-CF model, the PF table 624 contains the entries 2001 through 2009.

In the R-IF-CF model, the connection ports and vertical dependency of the devices can be detected under the condition that the connection information of the IF1 and the Term2 and the connection information of * and the Term2 be stored in the PF table 624.

Figure 21:
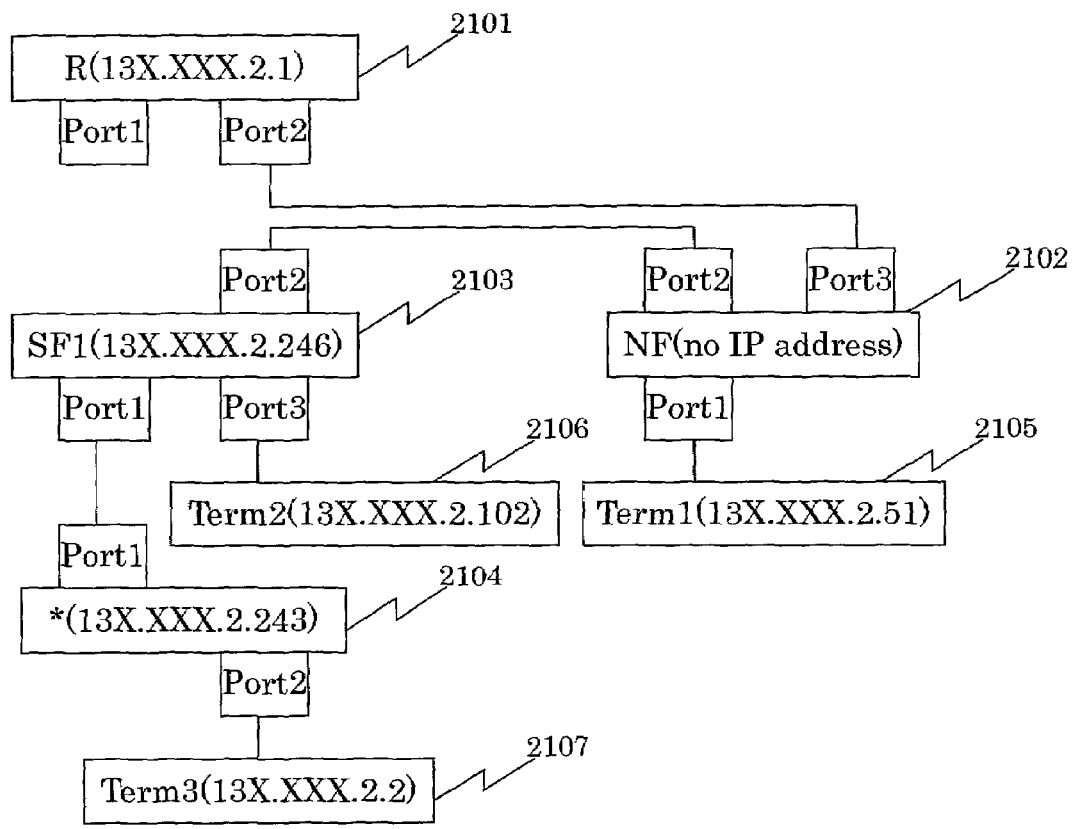
FIG. 21 is a diagram showing the mechanism of connection detection for R-SF-* model in the network configuration automatic recognition method according to the present invention.

FIG. 21 is a diagram showing the mechanism of connection detection for R-SF-* models in the present embodiment. As an example of the R-SF-* models, FIG. 21 shows a case where: the Port2 of an R (IP address "13X.XXX.2.1") 2101 and the Port3 of an NF (no IP address) 2102 are connected to each other; the Port2 of the NF and the Port2 of an SF1 (IP address "13X.XXX.2.246") 2103 are connected to each other; the Port2 of the SF1 and the Port1 of * (IP address "13.XXX.2.243") 2104 are connected to each other; the Port1 of the NF is connected to an arbitrary Term1 (IP address "13X.XXX.2.51") 2105; the Port3 of the SF1 is connected to an arbitrary Term2 (IP address "13X.XXX.2.102") 2106; and the Port2 of * is connected to an arbitrary Term3 (IP address "13X.XXX.2.2" 2107. Here, * represents any one of CF2, IF2, and SF2.

FIG. 22 shows examples of entries in the PF table 624 for use in the connection detection of the R-SF-* models in FIG. 21.

From the connection information in the entry 2201, it can be detected that the connection port of the SF1 to the Term3 is 1.

From the connection information in the entry 2202, it can be detected that the connection port of the SF1 to the Term1 is 2.

From the connection information in the entry 2203, it can be detected that the connection port of the SF1 to the Term2 is 3.

From the connection information in the entry 2204, it can be detected that the connection port of * to the Term1 is 1.

From the connection information in the entry 2205, it can be detected that the connection port of * to the Term2 is 1.

From the connection information in the entry 2206, it can be detected that the connection port of * to the Term3 is 2.

For an R-SF-SF model, the PF table 624 may contain the entries 2201-2206.

From the entries in the PF table 624, it cannot be determined whether the Port1 of the SF1 and the Port1 of * have a connection, and whether the Port2 of the SF1 and the Port2 of * have a connection. Therefore, detection of connection ports is impossible.

Since the SF1-R connection and the *-R connection cannot be detected, detection of vertical dependency is also impossible. In the R-SF-SF model, the connection ports and vertical dependency of the devices cannot be detected under any conditions.

From the connection information in the entry 2207, it can be detected that the connection port of * to the R is 1.

Since the connection port of the SF1 to the Term1 differs from the connection port of the SF1 to the Term2, it can be detected that the SF1 is a device interposed between the Term1 and the Term2.

Since the connection port of * to the R is the same as the connection port of * to the Term1, it can be detected that the Term1 is a device interposed between the R and *.

Since the connection port of * to the R is the same as the connection port of * to the Term2, it can be detected that the Term2 is a device interposed between the R and *.

Accordingly, the connection port of * to the SF1 is identical to the connection port of * to the Term1/Term2; therefore, it can be detected that the connection port of * to the SF1 is 1.

Since the connection port of * to the R differs from the connection port of * to the Term3, it can be detected that * is a device interposed between the R and the Term3.

Since the SF1 is interposed between the R and *, it can be detected that * is interposed between the SF1 and the Term3. Accordingly, the connection port of the SF1 to * is identical to the connection port of the SF1 to the Term3, and therefore it can be detected that the connection port of the SF1 to * is 1.

Since the connection port of the SF1 to the R cannot be detected, the vertical dependency of the SF1 and * is undetectable (FIG. 21 shows an example of horizontal dependency).

For an R-SF-IF model, the PF table 624 contains the entries 2201 through 2207.

In the R-SF-IF model, only the connection ports of the devices can be detected under the condition that the connection information of the SF1 and the Term1-Term3 and the connection information of * and the Term1-Term3 be stored in the PF table 624.

From the connection information in the entry 2208, it can be detected that the connection port of * to the SF1 is 1.

Since the connection port of * to the R is the same as the connection port of * to the SF1, it can be detected that the SF1 and * have vertical or horizontal dependency and the connection port of * to the SF1 is 1.

Since the connection port of the SF1 to the Term1 differs from the connection port of the SF1 to the Term2, it can be detected that the SF1 is a device interposed between the Term1 and the Term2.

Since the connection port of * to the SF1 is different from the connection port of * to the Term3, * is a device interposed between the SF1 and the Term3, and the connection port of the SF1 to the Term3 is the same as the connection port of the SF1 to *. Accordingly, it can be detected that the connection port of the SF1 to * is 1.

Since the connection port of the SF1 to the R cannot be detected, the vertical dependency between the SF1 and * is undetectable (if the NF is interposed between the SF1 and *, the SF1 and * will have horizontal dependency).

For an R-SF-CF model, the PF table 624 contains the entries 2201 through 2208.

In the R-SF-CF model, only the connection ports of the devices can be detected under the condition that the connection information of the SF1 and the Term1/Term2 and the connection information of * and the Term1/Term2 be stored in the PF table 624.

Figure 23:
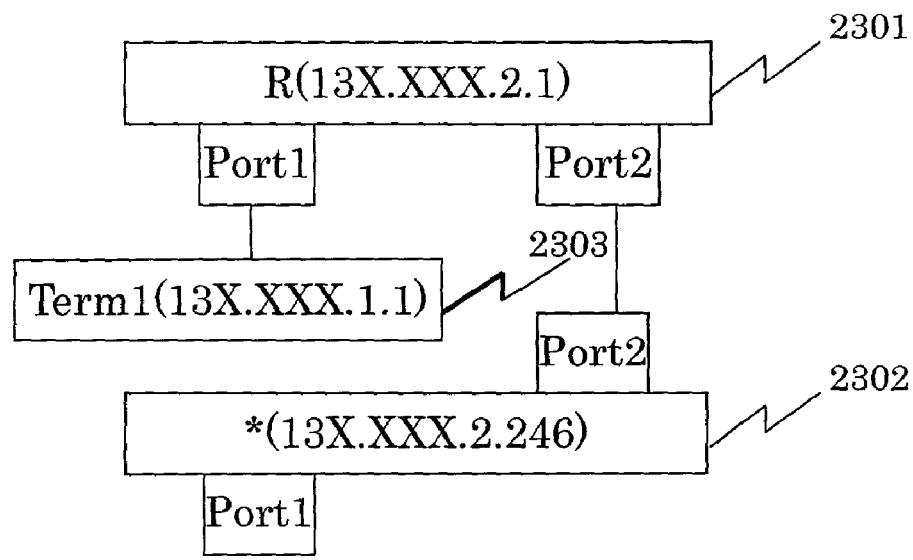
FIG. 23 is a diagram showing the mechanism of connection detection for R-* model in the network configuration automatic recognition method according to the present invention.

FIG. 23 is a diagram showing the mechanism of connection detection for R-* models in the present embodiment. As an example of the R-* models, FIG. 23 shows a case where: the Port2 of an R (IP address "13X.XXX.2.1") 2301 and the Port2 of * (IP address "13X.XXX.2.246") 2302 are connected to each other; and the Port1 of the R is connected to an arbitrary Term1 (IP address "13X.XXX.1.1") 2303. Here, * represents any one of CF, IF, and SF.

FIG. 24 shows examples of entries in the PF table 624 for use in the connection detection for the R-* models in FIG. 23.

From the connection information in the entry 2401, it can be detected that the connection port of the R to * is 2.

From the connection information in the entry 2402, it can be detected that the connection information of * to the device connected to a different segment (the connection information containing the Term1 which is not a device belonging to the "13X.XXX.2.*" network) indicates the same connection port as that of * to the R, or 2.

From the connection information in the entry 2403, it can be detected that the connection port of * to the R is 2.

Even in the absence of R-to-* connection information, the connection information of the R and any device on the "13X.XXX.2.*," if exists, shows the connection port of the R to *.

Even in the absence of *-to-R connection information, the connection information of * and the device connected to the different segment, if exists, shows the connection port of * to the R.

For an R-CF model and an R-IF model, the PF table 624 contains the entries 2401 through 2403.

In the R-CF model and the R-IF model, the connection ports and vertical dependency of the devices can be detected under any conditions.

Even in the absence of R-to-* connection information, the connection information of the R and any device on the "13X.XXX.2.*" network, if exists, shows the connection port of the R to *.

For an R-SF model, the PF table 624 contains the entries 2401 and 2402.

In the R-SF model, the connection ports and vertical dependency of the devices can be detected under the condition that the connection information of devices connected to different segments be obtainable.

FIGS. 25 and 26 are charts explaining the method of detecting connections between pieces of packet relay equipment in the present embodiment.

FIGS. 25 and 26 give a summary, in table form, of the conditions for detecting the connections and vertical dependency between pieces of packet relay equipment shown in FIGS. 17-24.

Detection conditions are established for each of the connection models 2501, 2601. Detectabilities are shown of parent-to-child connection ports 2502, 2602, child-to-parent connection ports 2503, 2603, and vertical dependency 2504, 2604.

Items marked with "○" indicate that the detection is possible irrespective of the conditions for connection detection 2505, 2605. Items marked with "Δ" indicate that the detection is possible as long as the conditions for connection detection are satisfied. Items marked with "X" indicate that the detection is impossible under any conditions.

Figure 27:
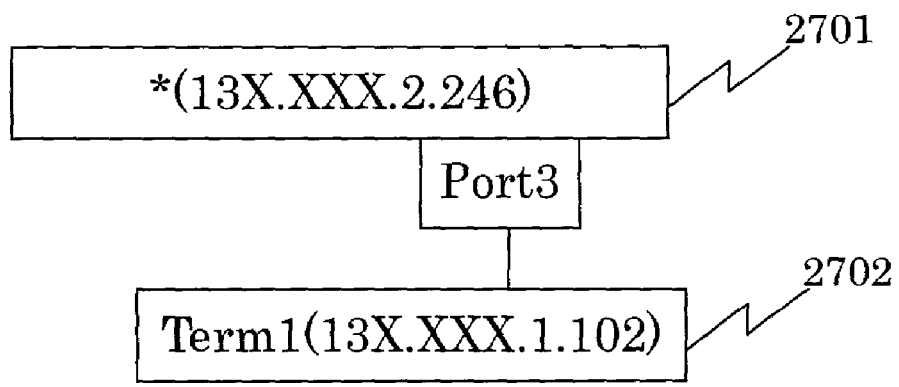
FIG. 27 is a diagram showing the mechanism of connection detection for *-Term model in the network configuration automatic recognition method according to the present invention.

FIG. 27 is a diagram showing the mechanism of connection detection for *-Term models in the present embodiment. As an example of CF-Term model, FIG. 27 shows a case where the Port1 of a * (IP address "13X.XXX.2.246) 2701 and a Term1 (IP address "13X.XXX.2.102") 2702 are connected to each other. Here, * represents any one of CF, IF, and SF.

FIG. 28 shows examples of entries in the PF table 624 for use in the connection detection for the *-Term models in FIG. 27.

From the connection information in the entry 2801, it can be detected that the connection port of * to the Term1 is 1.

For a CF-Term model and an IF-Term model, the PF table 624 contains as much entries 2801 as the number of devices even when an arbitrary number of devices are connected to the Port1 of *.

In the CF-Term model and the IF-Term model, the connection ports and vertical dependency of the devices can be detected under any conditions.

For an SF-Term model, the PF table 624, if a plurality of devices are connected to the Port1 of *, contains the entry 2801 for a single device; therefore, an arbitrary Term can be detected.

In the SF-Term model, the connection ports and vertical dependency of the devices can be detected under the condition that ports of the packet relay equipment be connected to a single device each.

FIG. 29 is a chart explaining the ways of detecting connections between a piece of packet relay equipment and a terminal by the network configuration automatic recognition method in the present embodiment. FIG. 29 gives a summary, in table form, of the conditions for detecting the connections and vertical dependency between a piece of packet relay equipment and a terminal shown in FIGS. 27 and 28.

Here, possibilities of detection of terminal connection are shown for each connection model 2901. The connection detectability varies depending on the conditions for connection detection 2903.

The items marked with "○" indicate that the detection is possible irrespective of the conditions for connection detection. The item marked with "Δ" indicates that the detection is possible as long as the conditions for connection detection are satisfied.

FIG. 30 is a diagram explaining the detection of vertical dependency through the combination of a plurality of models in the present embodiment. FIG. 30 shows an example in which the R-CF-CF model and the R-CF-SF model are combined to detect the vertical dependency of the R-SF-CF model.

In the shown example, the Port2 of an R (IP address "13X.XXX.2.1") 3001 and the Port2 of a CF1 (IP address "13X.XXX.2.246") 3002 are connected to each other. The Port1 of the CF1 and the Port1 of an SF (IP address "13X.XXX.2.243") 3003 are connected to each other. The Port2 of the SF and the Port2 of a CF2 (IP address "13X.XXX.2.247") 3004 are connected to each other. The Port3 of the CF1 is connected to an arbitrary Term1 (IP address "13X.XXX.2.102") 3005. The Port1 of the CF2 is connected to an arbitrary Term2 (IP address "13X.XXX.2.51") 3006.

FIG. 31 shows examples of the entries for detecting the R-SF-CF model based on the R-CF-CF and R-CF-SF models of FIG. 30 in the present embodiment.

In the R-CF-SF model, vertical dependency can be detected under the condition that both the CF and the SF hold the connection information to the Term1. Then, the TS table 625 contains the entry 3101 indicating that the CF1 is a parent to the SF.

In the R-CF-CF model, vertical dependency can be detected under any conditions. Then, the TS table 625 contains the entry 3102 indicating that the CF1 is a parent to the CF2. Here, since the vertical dependency in the R-SF-CF model is undetectable, the vertical dependency between SF and CF2 is unknown.

As an example in which connections (connection ports) are detectable but vertical dependency is not, FIG. 31 shows a case where the entry 3103 indicating that the CF2 is a parent to the SF and the entry 3104 indicating that the SF is a parent to the CF2 are both stored. Since the connection port of the SF to the CF1 differs from the connection port of the SF to the CF2, it can be detected that the SF is interposed between the CF1 and the CF2. Moreover, since the CF1 is a parent to the SF, it can be detected that the SF is a parent to the CF2.

Although vertical dependency is undetectable in the R-SF-CF model, the R-CF-CF model and R-CF-SF model can be combined to allow the detection of vertical dependency.

Figure 32:
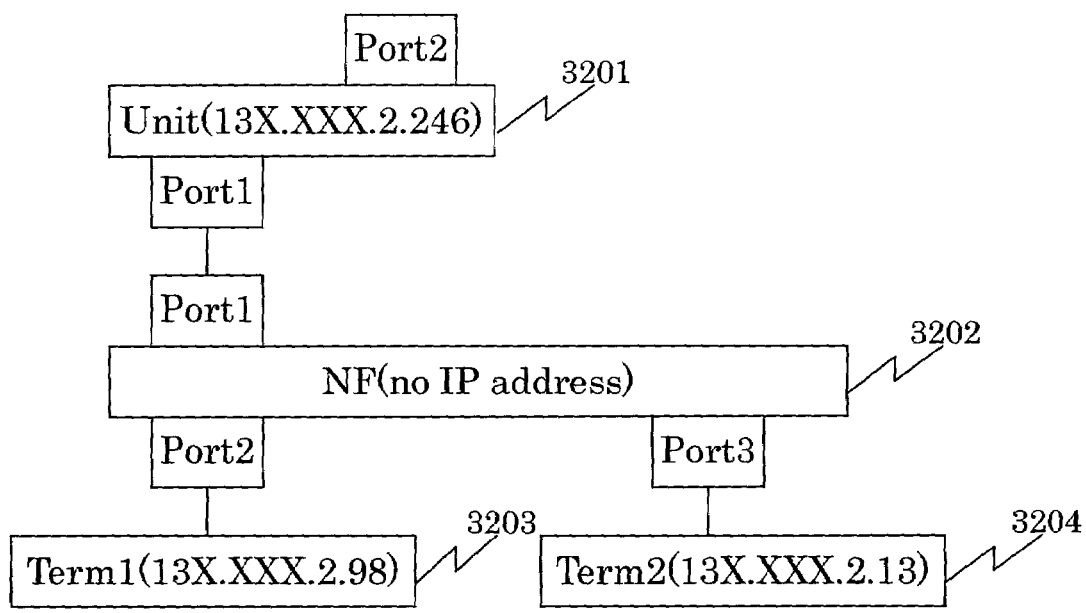
FIG. 32 is a diagram showing the method of predicting non-intelligent hub connection in the network configuration automatic recognition method according to the present invention.

FIG. 32 is a diagram explaining the method of predicating connection of a non-intelligent hub in the present embodiment. As an example of predicting a non-intelligent hub, FIG. 32 shows a case where: the Port1 of a Unit (IP address "13X.XXX.2.246") 3201 and the Port1 of an NF (no IP address) 3202 are connected to each other; the Port2 of the NF is connected to an arbitrary Term1 (IP address "13X.XXX.2.98") 3203; and the Port3 of the NF is connected to an arbitrary Term2 (IP address "13X.XXX.2.13") 3204.

FIG. 33 shows examples of entries in the TS table 625 for use in the prediction of non-intelligent hub connection of FIG. 32 in the present embodiment.

The entry 3301 contains the connection information indicating that the Term1 is connected as a child to the Port1 of the Unit.

The entry 3302 contains the connection information indicating that the Term2 is connected as a child to the Port1 of the Unit.

When a plurality of child devices are connected to a common port of a piece of packet relay equipment and there is no other piece of packet relay equipment, connection of at least one non-intelligent hub can be detected.

Even when a plurality of devices are connected each as a child to a common port of a piece of packet relay equipment and there is another piece of packet relay equipment, connection of at least one non-intelligent hub is detectable if the plurality of devices are interposed between the pieces of packet relay equipment and the connected devices includes no packet relay equipment.

FIG. 34 is a diagram explaining the method of detecting inactive terminals and modifications of connection destinations in the present embodiment. FIG. 34 shows two cases. One is that: the Port2 of an R (IP address "13X.XXX.2.1") 3401 and the Port2 of a Unit (IP address "13X.XXX.2.243") 3402 are connected to each other; the Port1 of the Unit is connected to an arbitrary Term (IP address "13X.XXX.2.2") 3403; and the Term is an inactive terminal. The other is that: the connection destination of the arbitrary Term, which has been connected to the Port2 of the Unit, is altered to the Port3 of the Unit.

In FIG. 34, as an example of detecting the connection and vertical dependency of the inactive terminal 3403, polling is conducted to IP addresses on the network. If there is a device with an IP address not responding to the polling, the device corresponding to that IP address is regarded as non-existent or inactive. Then, an entry is added to the TI table 623 (FIG. 9) with FALSE in the alive value. Next, the ARP cache in the router is consulted and, if the ARP cache contains the entry of the IP address not responding to the polling, the device corresponding to that IP address is detected as inactive. Moreover, if the MIB objects for use in the detection of the connections and vertical dependency between pieces of packet relay equipment contain the connection information of the inactive terminal, it becomes possible to create entries of the inactive terminal in the PF table 624 and the TS table 625. As a result, the connections and vertical dependency of the inactive terminal become possible to detect.

FIG. 35 shows examples of entries in the TS table 625 for use in the detection of connection destination modification of FIG. 34 in the present embodiment.

The TS table 625 prior to a modification of connection destination has the entry 3501 which contains the connection information indicating that the Term is connected as a child to the Port2 of the Unit. The TS table entries after the modification of connection destination include the entry 3502 indicating that the Term is connected as a child to the Port2 of the Unit and the entry 3503 indicating that the Term is connected as a child to the Port3 of the Unit. Between the TS table 625 before the modification of connection destination and the TS table 625 after the modification of connection destination, a modification is also made to the information on the connection destination of the device. Therefore, TS tables 625 can be periodically created for a difference to allow detection of connection destination modifications.

Here, old connection information such as the entry 3502, even if left cached in the MIB objects, presents no problem. When a device undergoes an IP address modification, the device can be detected as an additional device on the network, having that IP address.

Figure 36:
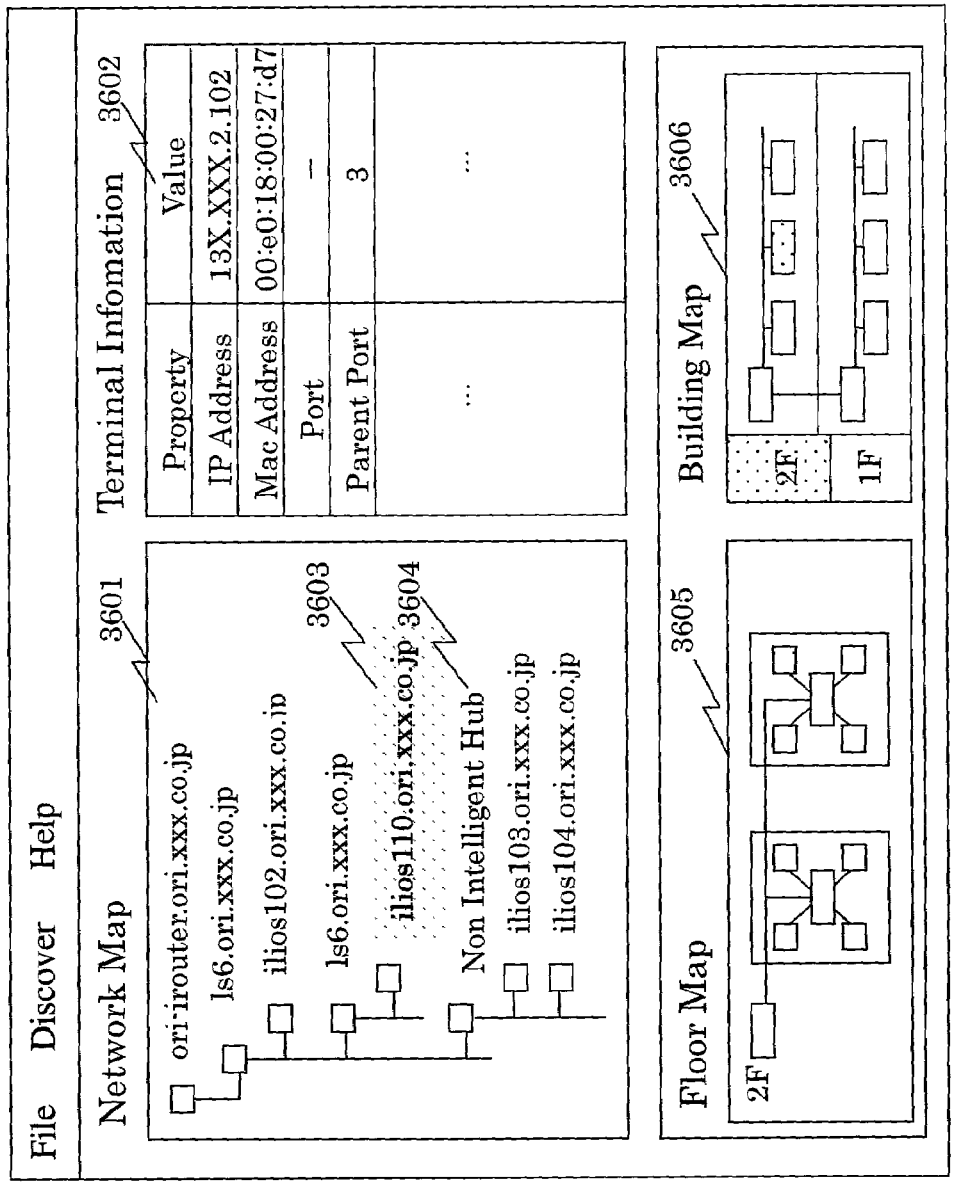
FIG. 36 is a diagram showing an example of the network configuration chart display in the network configuration automatic recognition method according to the present invention.
Figure 37:
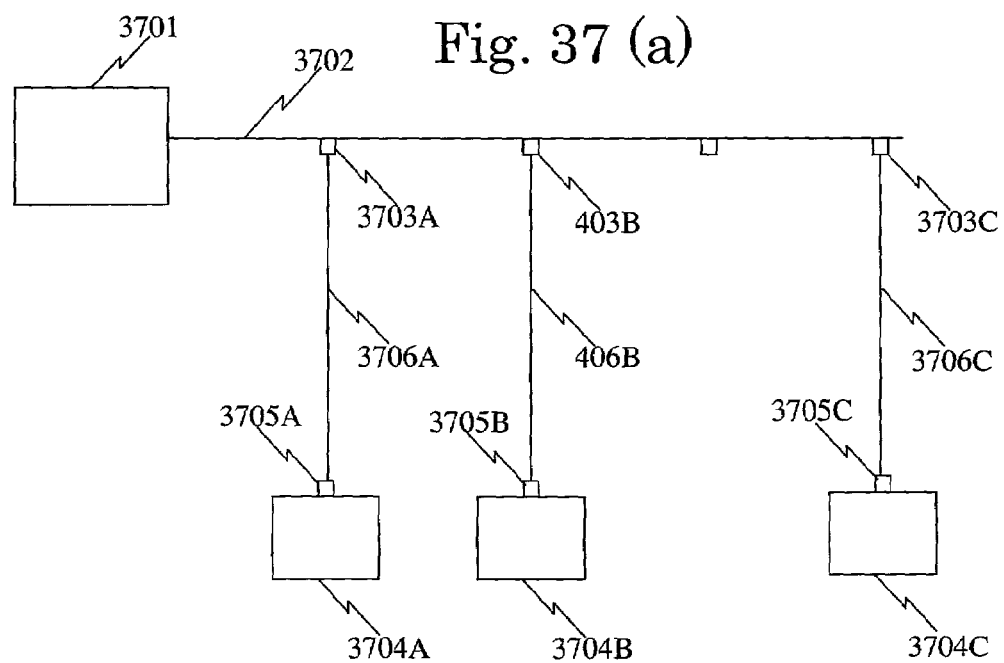
FIGS. 37(a) and 37(b) are diagrams showing examples of the connection configuration chart between a hub and devices connected to the hub, to be displayed by the chart display program according to the present invention.
Figure 37:
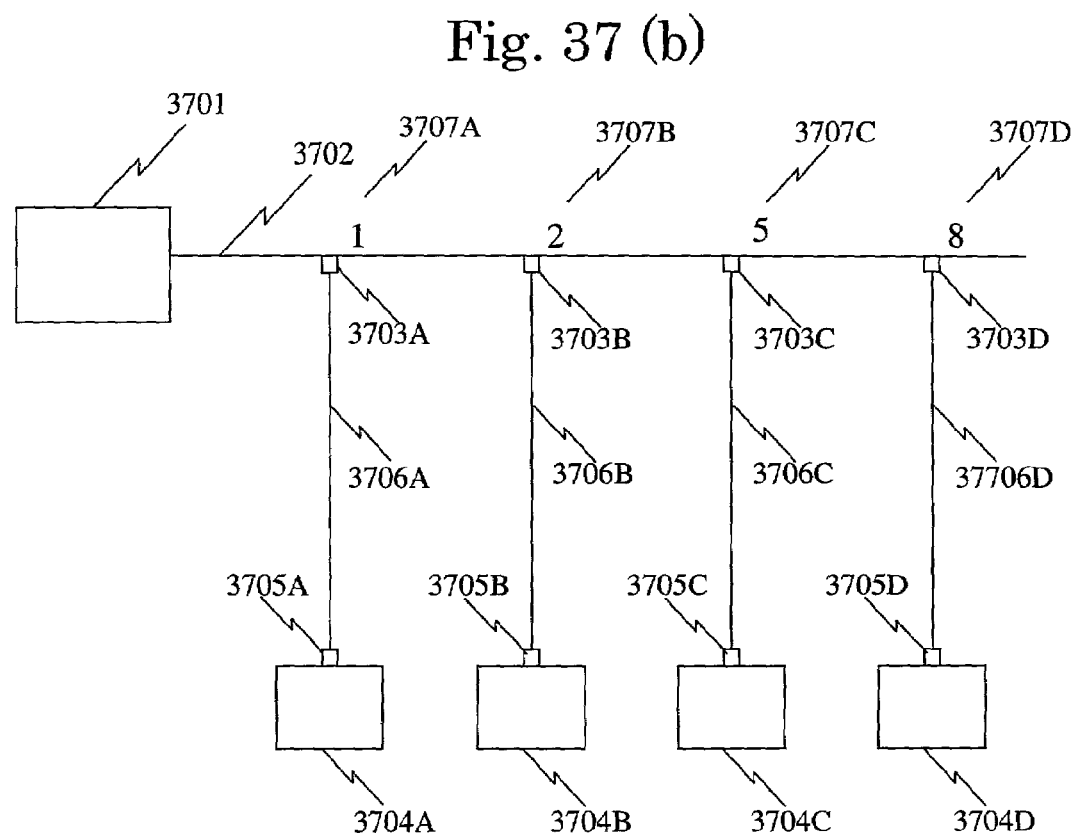

FIG. 36 is a diagram showing a display example of the network configuration chart created by the chart display program 604 in the present embodiment.

The GUI of the chart display program 605 consists of a Network Map display area 3601, a Terminal Information display area 3602, a Floor Map display area 3605, and a Building Map display area 3606.

In the Network Map display area 3601, a network segment configuration automatically detected through the execution of the auto discovery module is displayed in a tree structure as shown in the diagram. When a cursor is placed on any device display in this Network Map display area 3601 by using a pointing device such as a mouse, the device display is highlighted as shown by the reference numeral 3603. The information of the device is displayed in the Terminal Information display area 3602.

FIG. 36 shows a case where the corresponding device information in the TI table 623 (FIG. 9) is displayed. Moreover, a non-intelligent hub 3604 predicted of connection can also be displayed.

While the user can recognize inactive terminals by consulting information on the Terminal Information display area 3602, GUI representations such as render the concerned devices in low light or low color on the Network Map display area 3601 are also available. It is also possible for the user to drag and drop individual devices by using a pointing device to edit connection destinations originally.

The Floor Map display area 3605 displays physical floor layouts and the like. The Building Map display area 3606 displays the network configuration and the like of the entire building in outline. In the Floor Map display area 3605 and the Building Map display area 3606, devices corresponding to the device selected on the Network Map display area 3601 are highlighted automatically. Moreover, when a cursor is placed on the Floor Map display area 3605 or the Building Map display area 3606 by using a pointing device such as a mouse, the cursor pointing is automatically reflected on the Network Map display area 3601. The figures on the Floor Map display area 3605 and the Building Map display area 3606 are displayed by the display methods shown in FIGS. 37(a)-50.

FIG. 37(a) is an example of the connection configuration chart between a hub and devices connected to the hub, to be displayed by the chart display program 604 in the present embodiment. The chart display program 604 displays a FIG. 3701 of a packet relay equipment object corresponding to a piece of packet relay equipment, typified by a hub, and a FIG. 3702 of a distribution object. On the distribution object are displayed FIGS. 3703A, 3703B, and 3703C of connection objects corresponding to connection ports of the packet relay equipment, the figures as many as the number of ports.

FIGS. 3704A, 3704B, and 3704C corresponding to the device objects to be connected to the packet relay equipment are connected from the FIGS. 3705A, 3705B, and 3705C of their accompanying connection objects to the figures of the connection objects corresponding to the actually-connected ports of the packet relay equipment, with line segments 3706A, 3706B, and 3706C, respectively. Thereby the connection configuration is displayed. Here, the connection objects on the distribution object correspond to port numbers 1, 2 . . . in the order from the packet relay equipment object.

FIG. 37(b) is another example of the connection configuration chart between a hub and devices connected to the hub, to be displayed by the chart display program 604 in the present embodiment. The chart display program 604 displays a FIG. 3701 of a packet relay equipment object corresponding to a piece of packet relay equipment, typified by a hub, and a FIG. 3702 of a distribution object. On the distribution object are displayed FIGS. 3703A, 3703B, 3703C, and 3703D of connection objects corresponding to connection ports of the packet relay equipment, the figures as many as the number of device-connected ports. In addition, the connection objects are accompanied with corresponding port numbers 3707A, 3707B, 3707C, and 3707D of the packet relay equipment, respectively.

FIGS. 3704A, 3704B, 3704C, and 3704D corresponding to the device objects to be connected to the packet relay equipment are connected from the FIGS. 3705A, 3705B, 3705C, and 3705D of their accompanying connection objects to the figures of the connection objects corresponding to the actually-connected ports of the packet relay equipment, with line segments 3706A, 3706B, 3706C, and 3706D, respectively. Thereby the connection configuration is displayed.

Figure 38:
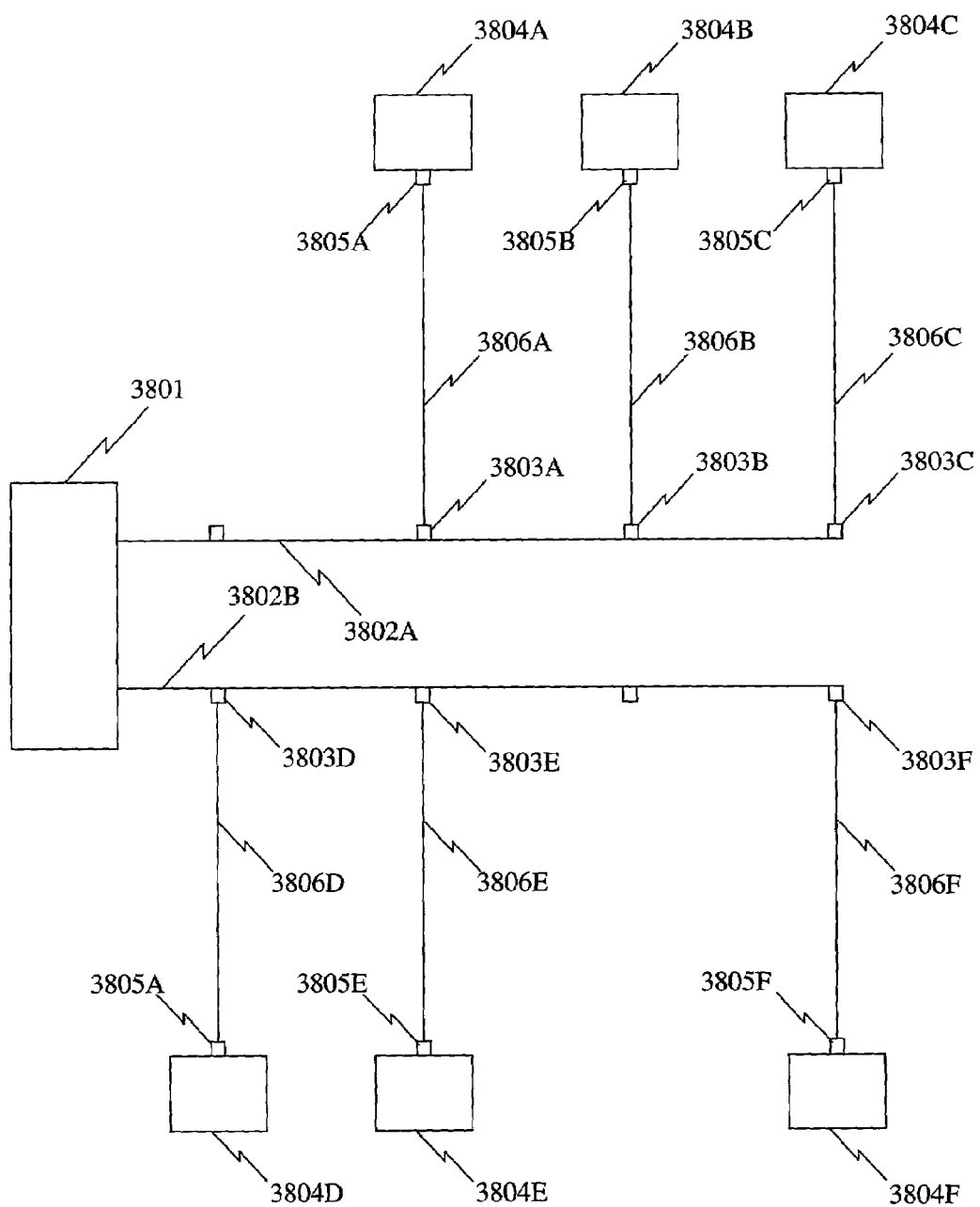
FIG. 38 is a diagram showing an example of the connection configuration chart between a hub and devices connected to the hub, to be displayed by the chart display program according to the present invention.

FIG. 38 is another example of the connection configuration chart between a hub and devices connected to the hub, to be displayed by the chart display program 604 in the present embodiment. The chart display program 604 displays a FIG. 3801 of a packet relay equipment object corresponding to a piece of packet relay equipment, typified by a hub, and FIGS. 3802A and 3802B of distribution objects each for a set of connection objects. Displayed on the respective distribution objects are FIGS. 3803A, 3803B, 3803C, 3803D, 3803E, and 3803F of connection objects corresponding to connection ports.

FIGS. 3804A, 3804B, 3804C, 3804D, 3804E, and 3804F corresponding to the device objects to be connected to the packet relay equipment are connected from the FIGS. 3805A, 3805B, 3805C, 3805D, 3805E, and 3805F of their accompanying connection objects to the figures of the connection objects corresponding to the actually-connected ports of the packet relay equipment, with line segments 3806A, 3806B, 3806C, 3806D, 3806E, and 3806F, respectively. Thereby the connection configuration is displayed.

Figure 39:
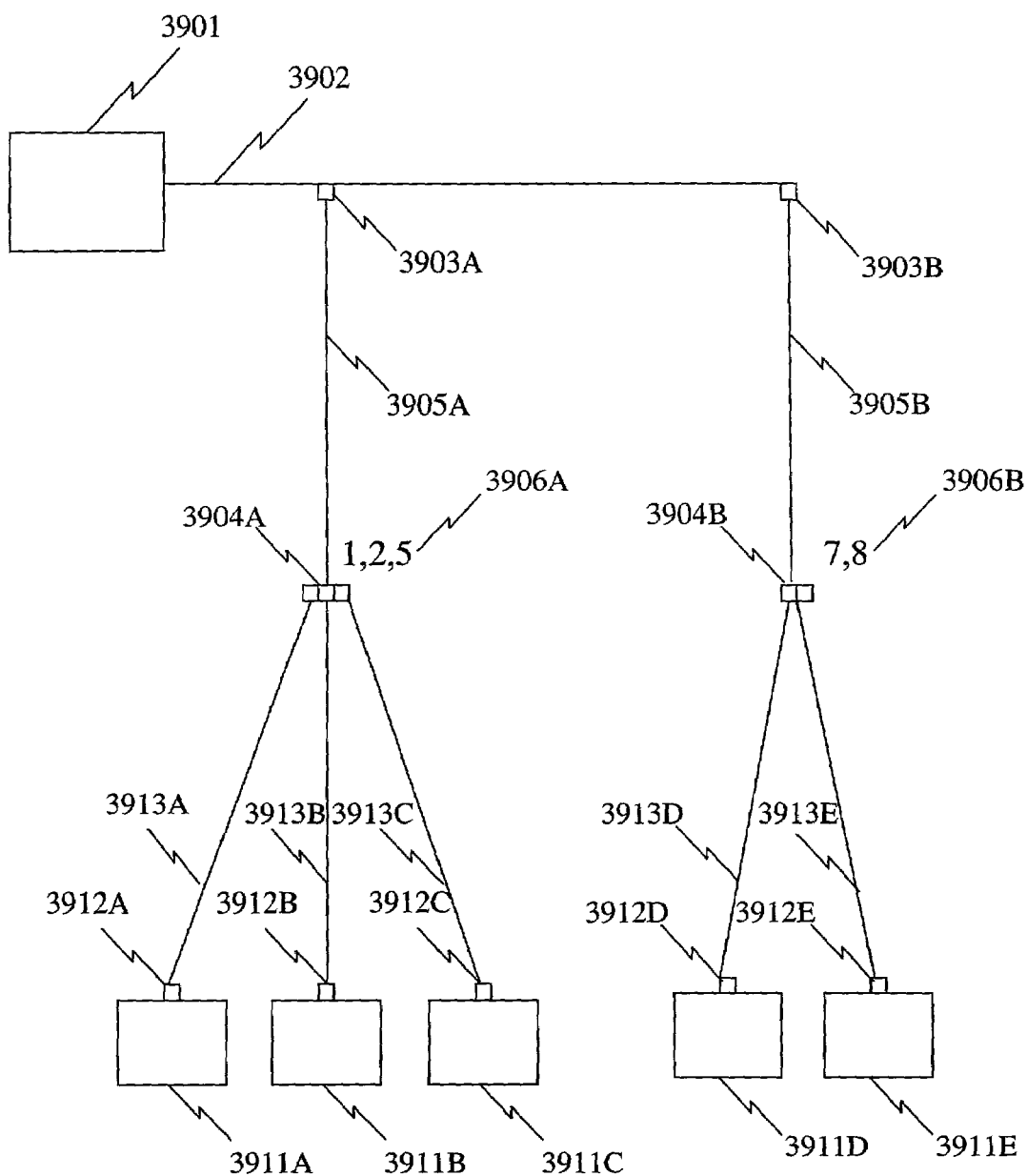
FIG. 39 is a diagram showing an example of the connection configuration chart between a hub and devices connected to the hub, to be displayed by the chart display program according to the present invention.
Figure 40:
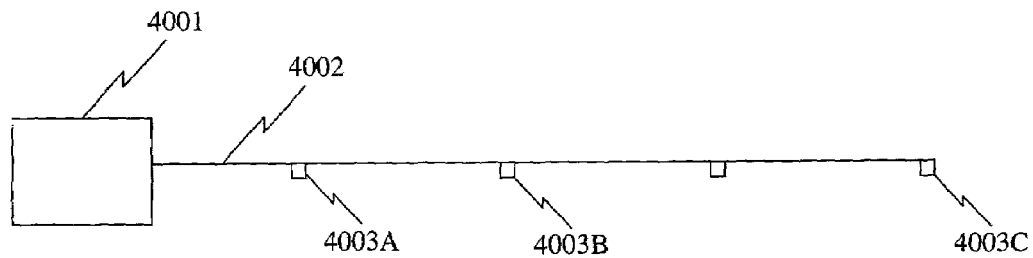
FIGS. 40(a) and 40(b) are diagrams showing examples of the connection configuration chart between a hub and devices connected to the hub, to be displayed by the chart display program according to the present invention.
Figure 40:
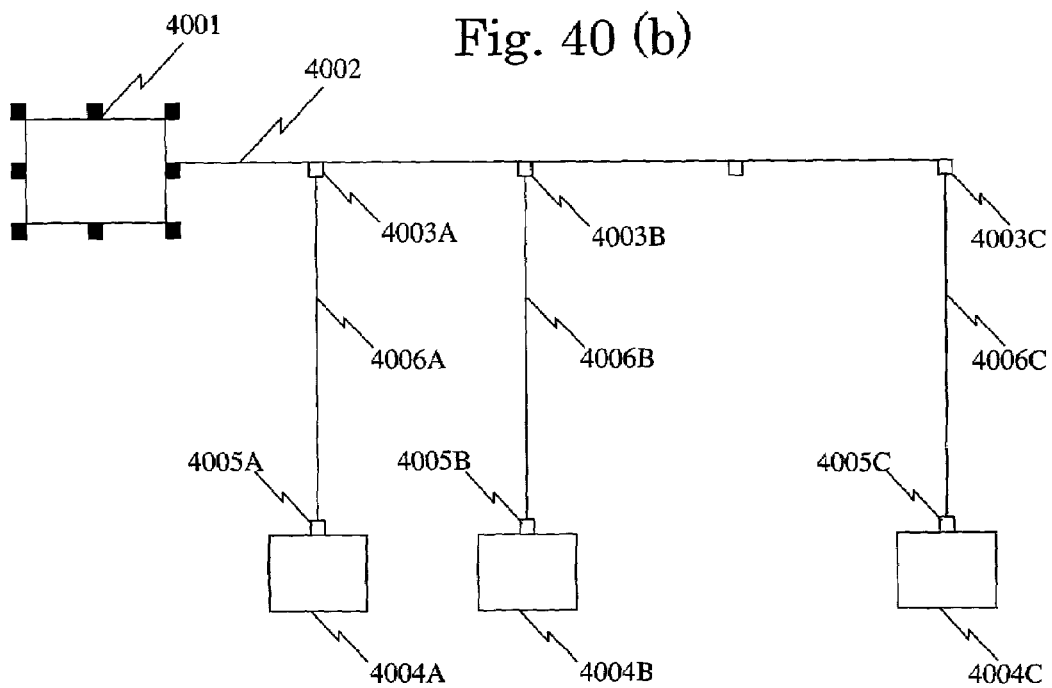

FIG. 39 is another example of the connection configuration chart between a hub and devices connected to the hub, to be displayed by the chart display program 604 in the present embodiment. The chart display program 604 displays a FIG. 3901 of a packet relay equipment object corresponding to a piece of packet relay equipment, typified by a hub, and a FIG. 3902 of a distribution object for each set of connection objects. On the distribution object are displayed FIGS. 3903A and 3903B of connection objects corresponding to the sets of connection ports, the figures as many as the number of sets.

FIGS. 3904A and 3904B representing ports corresponding to the sets of connection ports are linked to the figures of the connection objects corresponding to the sets of connection ports, with line segments 3905A and 3905B, respectively. Thereby, the connection configuration is displayed with the sets of connection objects as devices. Moreover, the figures representing the ports corresponding to the sets of connection ports are accompanied with sets of corresponding port numbers 3906A and 3906B of the packet relay equipment.

FIGS. 3911A, 3911B, 3911C, 3911D, and 3911E corresponding to the device objects to be connected to the packet relay equipment are connected from the FIGS. 3912A, 3912B, 3912C, 3912D, and 3912E of their accompanying connection objects to the figures of the connection objects representing the ports corresponding to the sets of connection ports, with line segments 3913A, 3913B, 3913C, 3913D, and 3913E, respectively. Thereby the connection configuration is displayed.

FIG. 40(a) is another example of the connection configuration chart between a hub and devices connected to the hub, to be displayed by the chart display program 604 in the present embodiment. The chart display program 604 displays a FIG. 4001 of a packet relay equipment object corresponding to a piece of packet relay equipment, typified by a hub, and a FIG. 4002 of a distribution object. On the distribution object are displayed FIGS. 4003A, 4003B, and 4003C of connection objects corresponding to connection ports of the packet relay equipment, the figures as many as the number of ports. Here, when the figure of the packet relay equipment object corresponding to a piece of packet relay equipment, typified by a hub, is selected by using a device such as a mouse or a keyboard, the graphic display of FIG. 40(b) appears.

FIG. 40(b) is a display example of the case where the figure of the packet relay equipment object corresponding to a piece of packet relay equipment of FIG. 40(a), typified by a hub, is selected by using a device such as a mouse or a keyboard.

The chart display program 604 displays the FIG. 4001 representing the packet relay equipment, typified by a hub, when the packet relay equipment object corresponding to the packet relay equipment is selected by using a device such as a mouse or a keyboard, along with the FIG. 4002 of the distribution object. on the distribution object are displayed the FIGS. 4003A, 4003B, and 4003C of the connection objects corresponding to the connection ports of the packet relay equipment, the figures as many as the number of ports.

FIGS. 4004A, 4004B, and 4004C corresponding to the device objects to be connected to the packet relay equipment are connected from the FIGS. 4005A, 4005B, and 4005C of their accompanying connection objects to the figures of the connection objects corresponding to the actually-connected ports of the packet relay equipment, with line segments 4006A, 4006B, and 4006C, respectively. Thereby the connection configuration is displayed. Here, the connection objects on the distribution object correspond to port numbers 1, 2 . . . in the order from the packet relay equipment.

Figure 41:
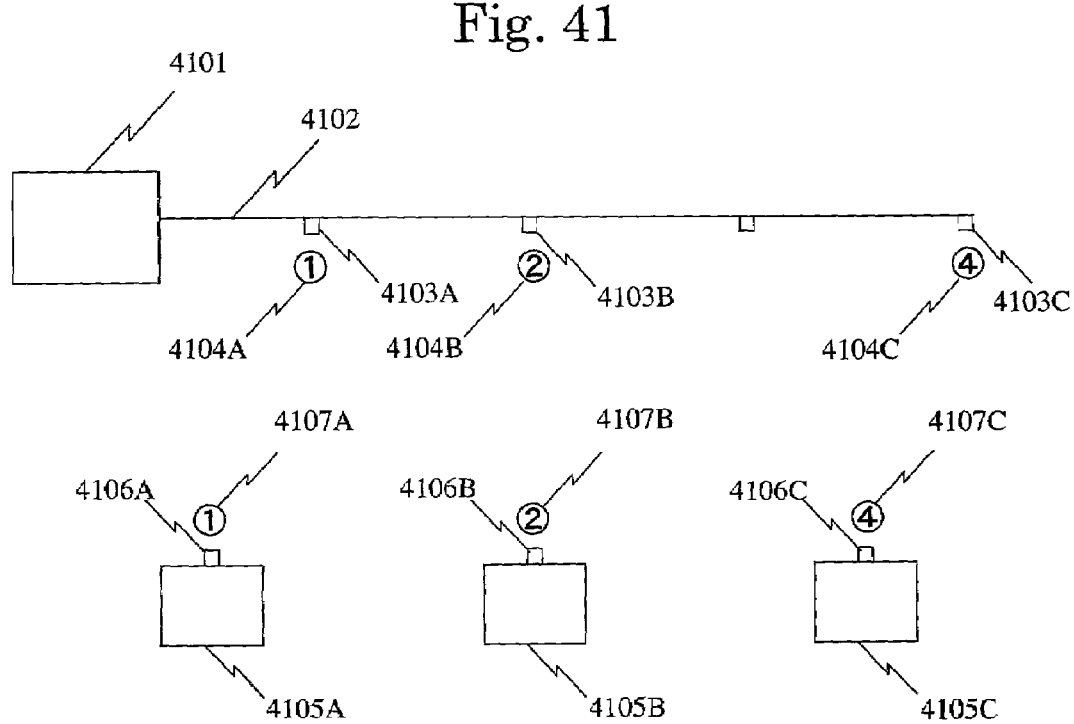
FIG. 41 is a diagram showing an example of the connection configuration chart between a hub and devices connected to the hub, to be displayed by the chart display program according to the present invention.

FIG. 41 is another example of the connection configuration chart between a hub and devices connected to the hub, to be displayed by the chart display program 604 in the present embodiment. The chart display program 604 displays a FIG. 4101 of a packet relay equipment object corresponding to a piece of packet relay equipment, typified by a hub, and a FIG. 4102 of a distribution object. On the distribution object are displayed FIGS. 4103A, 4103B, and 4103C of connection objects corresponding to connection ports of the packet relay equipment, the figures as many as the number of ports. In addition, the connection objects are accompanied with ID objects 4104A, 4104B, and 4104C, respectively, for allowing unique identification of the connection objects of the devices to be connected.

FIGS. 4105A, 4105B, and 4105C corresponding to the device objects to be connected to the packet relay equipment are displayed with ID objects 4107A, 4107B, and 4107C which allow unique identification of the figures of the connection objects corresponding to the packet relay equipment ports to be actually connected from the FIGS. 4106A, 4106B, and 4106C of the connection objects accompanying the device objects.

Figure 42:
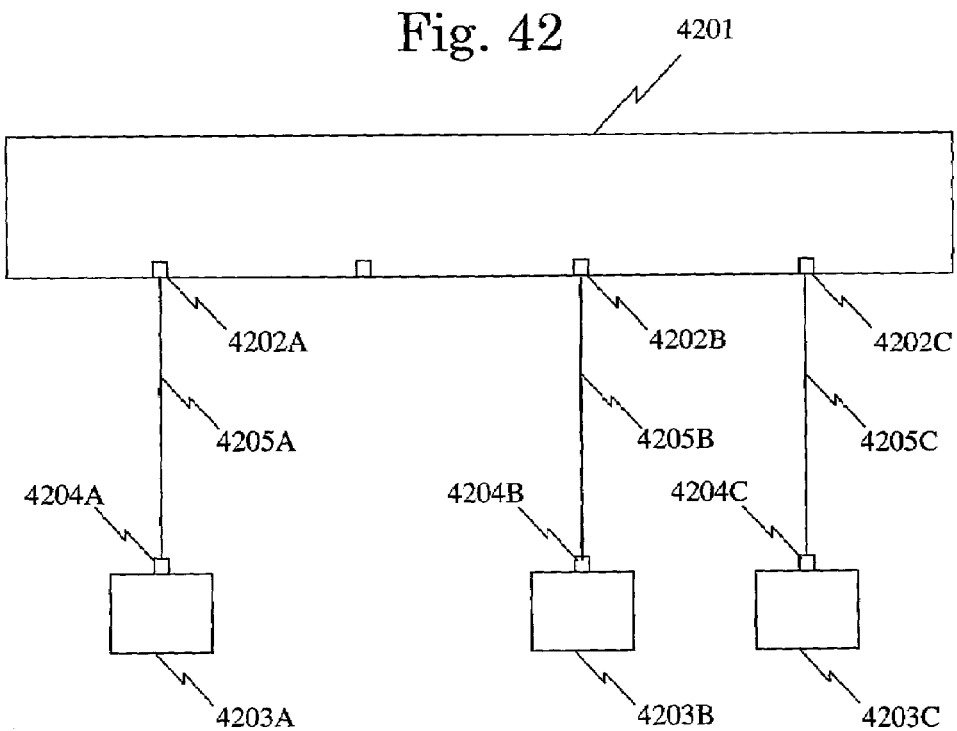
FIG. 42 is a diagram showing an example of the connection configuration chart between a hub and devices connected to the hub, to be displayed by the chart display program according to the present invention.

FIG. 42 is another example of the connection configuration chart between a hub and devices connected to the hub, to be displayed by the chart display program 604 in the present embodiment. The chart display program 604 displays a FIG. 4201 of a packet relay equipment object corresponding to a piece of packet relay equipment, typified by a hub. The FIG. 4201 is displayed including FIGS. 4202A, 4202B, and 4202C of connection objects corresponding to connection ports of the packet relay equipment, the figures of the connection objects as many as the number of ports.

FIGS. 4203A, 4203B, and 4203C corresponding to the device objects to be connected to the packet relay equipment are connected from the FIGS. 4204A, 4204B, and 4204C of their accompanying connection objects to the figures of the connection objects corresponding to the actually-connected ports of the packet relay equipment, with line segments 4205A, 4205B, and 4205C, respectively. Thereby the connection configuration is displayed.

Figure 43:
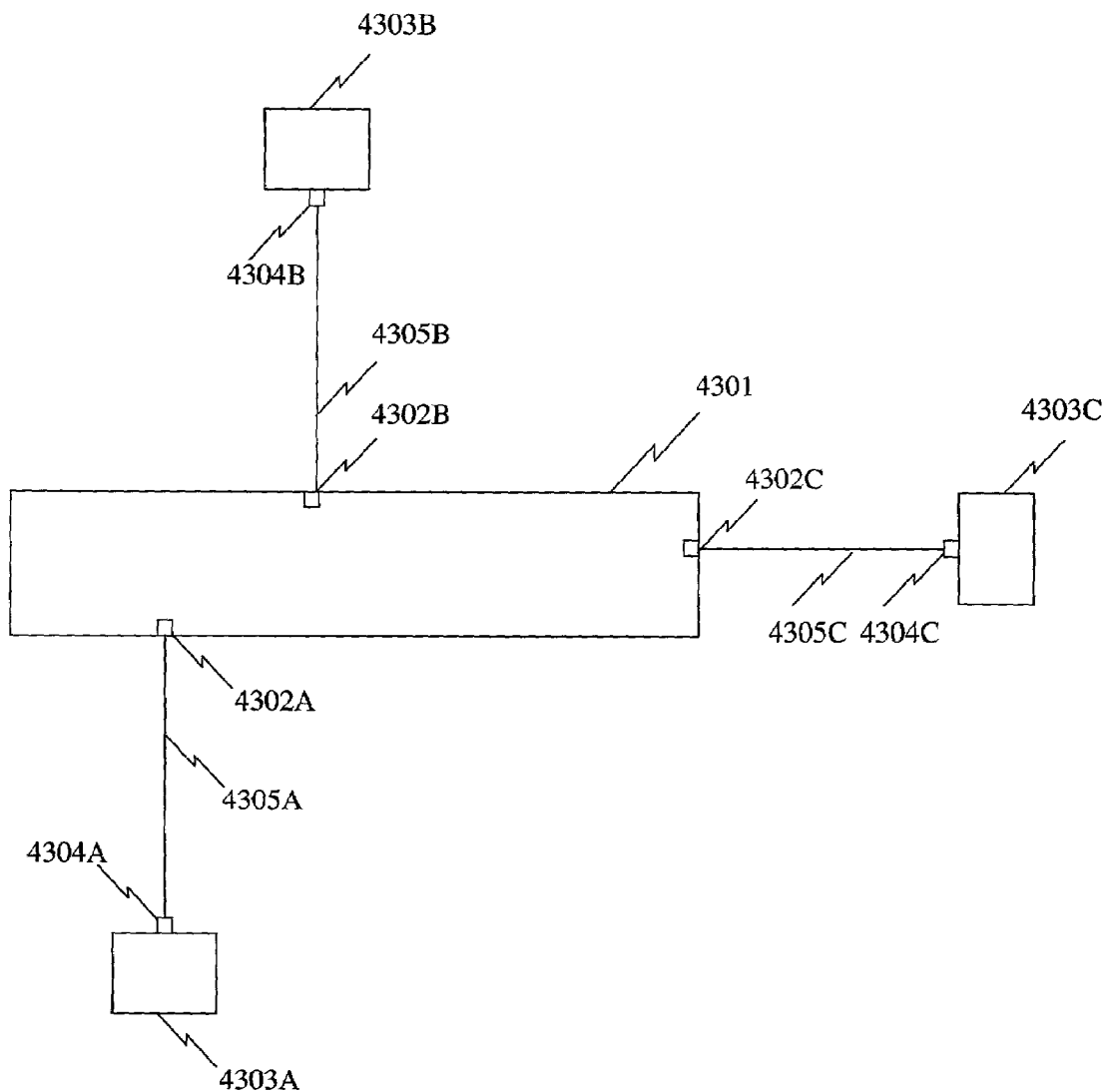
FIG. 43 is a diagram showing an example of the connection configuration chart between a hub and devices connected to the hub, to be displayed by the chart display program according to the present invention.

FIG. 43 is another example of the connection configuration chart between a hub and devices connected to the hub, to be displayed by the chart display program 604 in the present embodiment. The chart display program 604 displays a FIG. 4301 of a packet relay equipment object corresponding to a piece of packet relay equipment, typified by a hub. The FIG. 4301 is displayed including FIGS. 4302A, 4302B, and 4302C of connection objects corresponding to connection ports of the packet relay equipment, the figures of the connection objects as many as the number of ports. The figures of the connection objects are freely movable inside the packet relay equipment; therefore, they can be laid out on any side of the figure of the packet relay equipment object for display.

FIGS. 4303A, 4303B, and 4303C corresponding to the device objects to be connected to the packet relay equipment are connected from the FIGS. 4304A, 4304B, and 4304C of their accompanying connection objects to the figures of the connection objects corresponding to the actually-connected ports of the packet relay equipment, with line segments 4305A, 4305B, and 4305C, respectively. Thereby the connection configuration is displayed.

Figure 44:
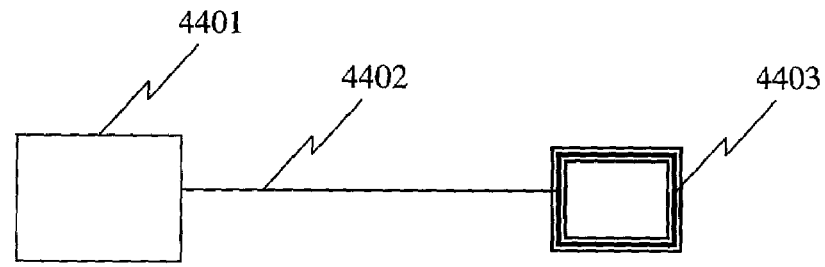
FIG. 44 is a diagram showing an example of the connection configuration chart between a hub and devices connected to the hub, to be displayed by the chart display program according to the present invention.

FIG. 44 is another example of the connection configuration chart between a hub and devices connected to the hub, to be displayed by the chart display program 604 in the present embodiment. The chart display program 604 displays a FIG. 4401 of a packet relay equipment object corresponding to a piece of packet relay equipment, typified by a hub, and a distribution object 4402. All the devices connected to the packet relay equipment are displayed as a group object 4403, on the endpoint of the distribution object other than the one connected to the figure of the packet relay equipment.

Figure 45:
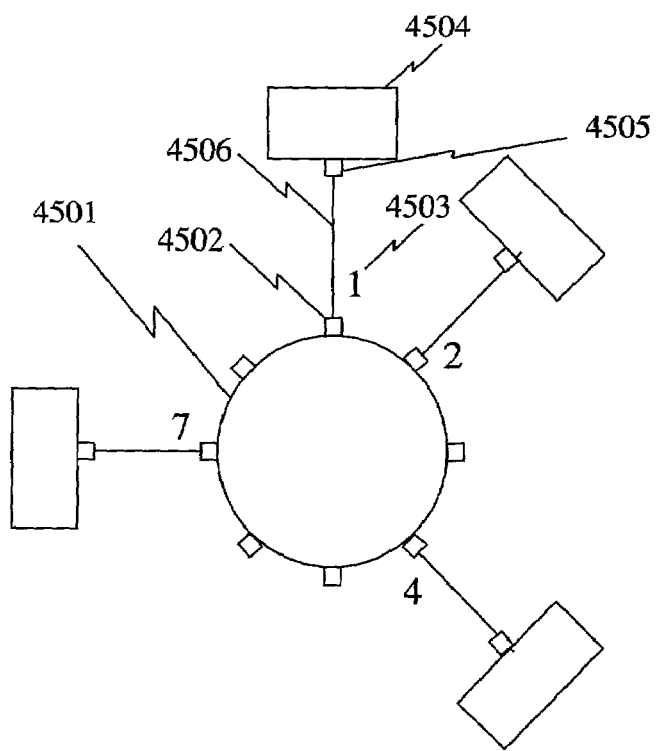
FIG. 45 is a diagram showing an example of the connection configuration chart between a hub and devices connected to the hub, to be displayed by the chart display program according to the present invention.

FIG. 45 is another example of the connection configuration chart between a hub and devices connected to the hub, to be displayed by the chart display program 604 in the present embodiment. The chart display program 604 displays a FIG. 4501 of a packet relay equipment object corresponding to a piece of packet relay equipment, typified by a hub, and connection objects 4502 concentrically arranged thereon, the connection objects as many as the number of connection ports of the packet relay equipment. Among the connection objects, those connected to devices are accompanied with corresponding port numbers 4503 of the packet relay equipment.

FIGS. 4504 corresponding to the device objects to be connected to the packet relay equipment are connected from the FIGS. 4505 of their accompanying connection objects to the figures of the connection objects corresponding to the actually-connected ports of the packet relay equipment, with line segments 4506. Thereby the connection configuration is displayed.

Figure 46:
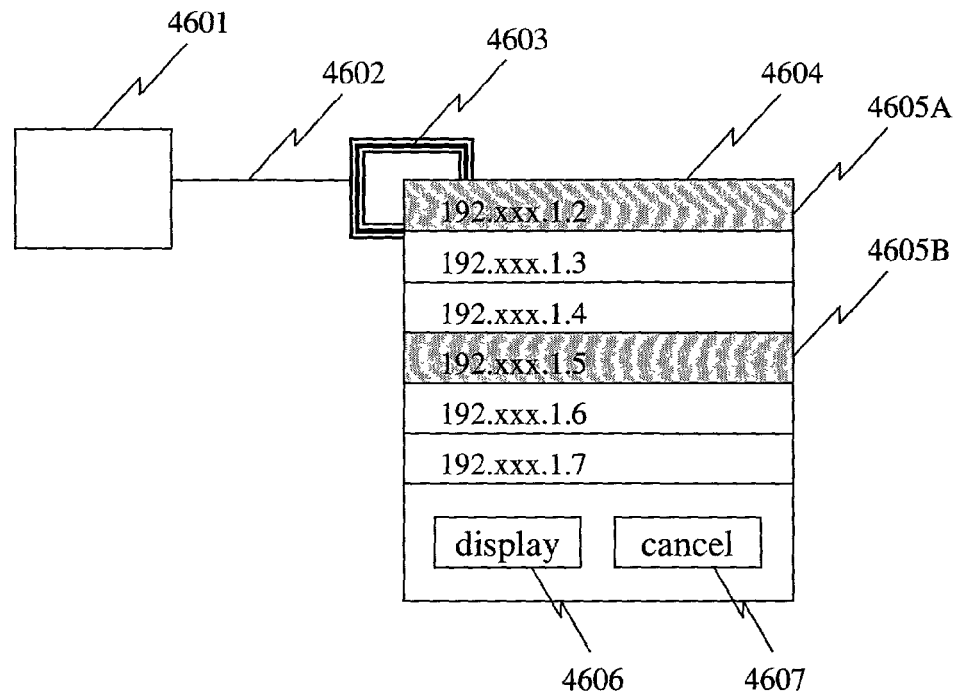
FIGS. 46(a) and 46(b) are diagrams showing examples of the screen display for selecting a group object and selecting device objects to display on-screen, in the chart display program according to the present invention.
Figure 46:
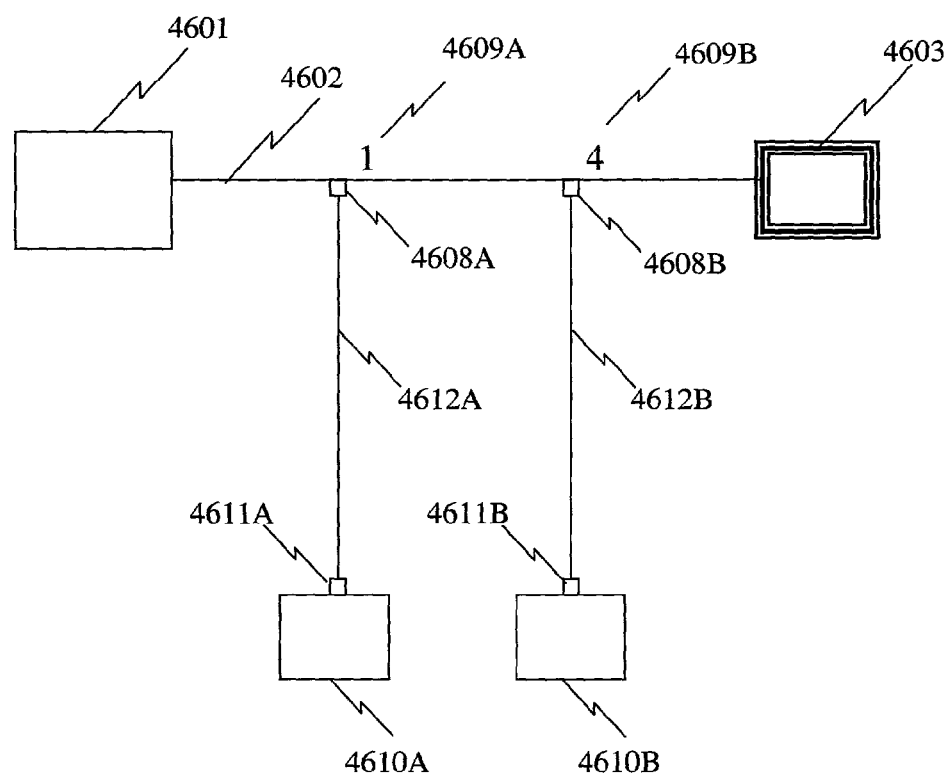

FIG. 46(*a*) is a display example of selecting a group object and selecting device objects to display onscreen by the chart display program 604 in the present embodiment.

When a group object 4603 connected to a distribution object 4602 of a packet relay equipment object 4601 is selected by using a device such as a mouse or a keyboard, an intra-group device object list 4604 is displayed. When devices 4605A and 4605B to display are selected from this list and the Display button 4606 is pressed, graphic display of FIG. 46(*b*) appears. When the cancel button 4607 is pressed, the screen simply returns to the original group symbol display.

FIG. 46(*b*) is a display example of the case where devices to display are selected from the intra-group device object list of FIG. 46(*a*) and the display button is pressed. Connection objects 4608A and 4608B corresponding to the ports to which the selected devices are connected are displayed on the distribution object 4602, accompanied with their port numbers 4609A and 4609B, respectively. Moreover, object FIGS. 4610A and 4610B corresponding to the selected devices are displayed along with connection objects 4611A and 4611B. The pairs of connection objects corresponding to the respective connection ports to which the devices are connected are linked to each other with line segments 4612A and 4612B, respectively. The objects of the selected and displayed devices are deleted from the group object.

Figure 47:
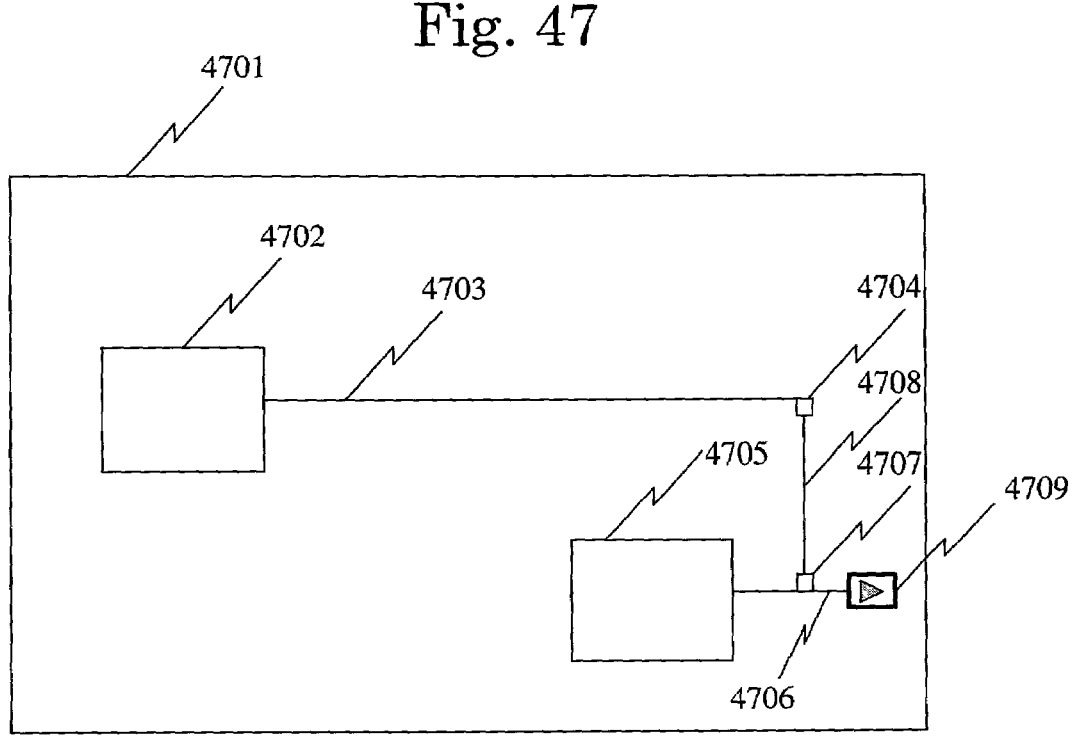
FIG. 47 is a diagram showing a screen example of displaying packet relay equipment on an edge of the window on-screen by the chart display program according to the present invention.

FIG. 47 is a screen example where a piece of packet relay equipment is displayed on an edge of the window on-screen by the chart display program 604 in the present embodiment. The chart display program 604 displays, in a window 4701 displayed on the display screen, a FIG. 4702 of a packet relay equipment object corresponding to a piece of packet relay equipment, typified by a hub, and a FIG. 4703 of a distribution object. On the distribution object is displayed a FIG. 4704 of a connection object corresponding to a connection port of the packet relay equipment. Besides, a FIG. 4705 of a packet relay equipment object corresponding to another piece of packet relay equipment and a FIG. 4706 of a distribution object are displayed. On the distribution object is displayed a connection object 4707, which is linked to the connection object 4704 by a line segment 4708. A scroll button 4709 for instructing a screen scroll is displayed on a window-edge portion of the distribution object 4706 which leads to a window edge.

Figure 48:
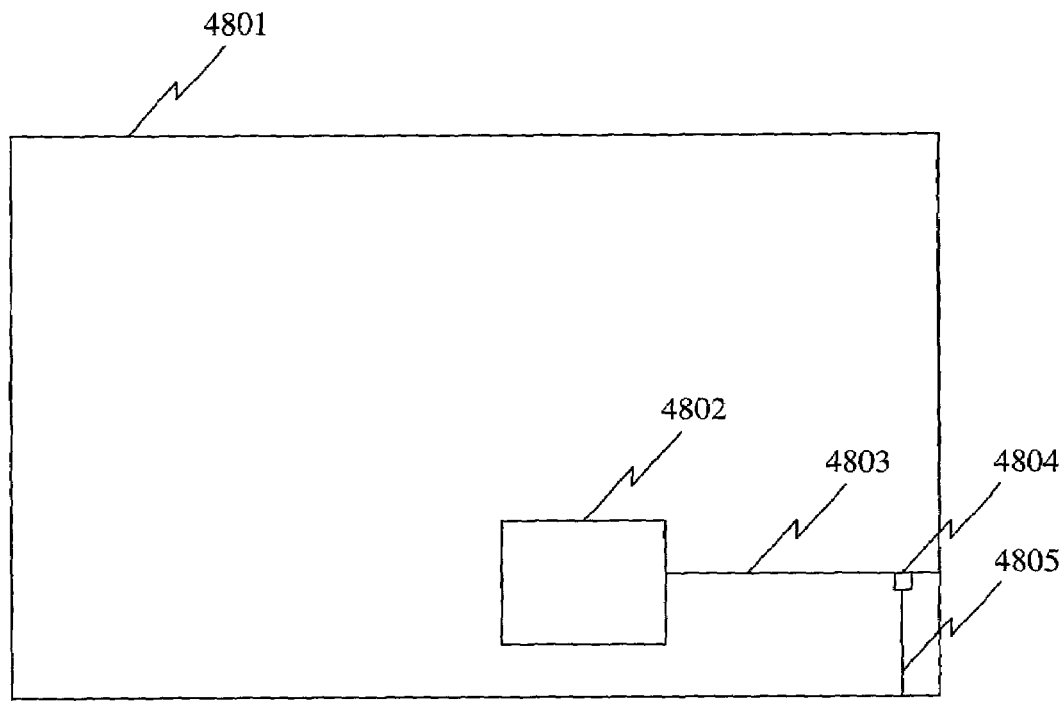
FIGS. 48(a) and 48(b) is a diagram showing a screen example of displaying packet relay equipment on an edge of the window on-screen by the chart display program according to the present invention.
Figure 48:
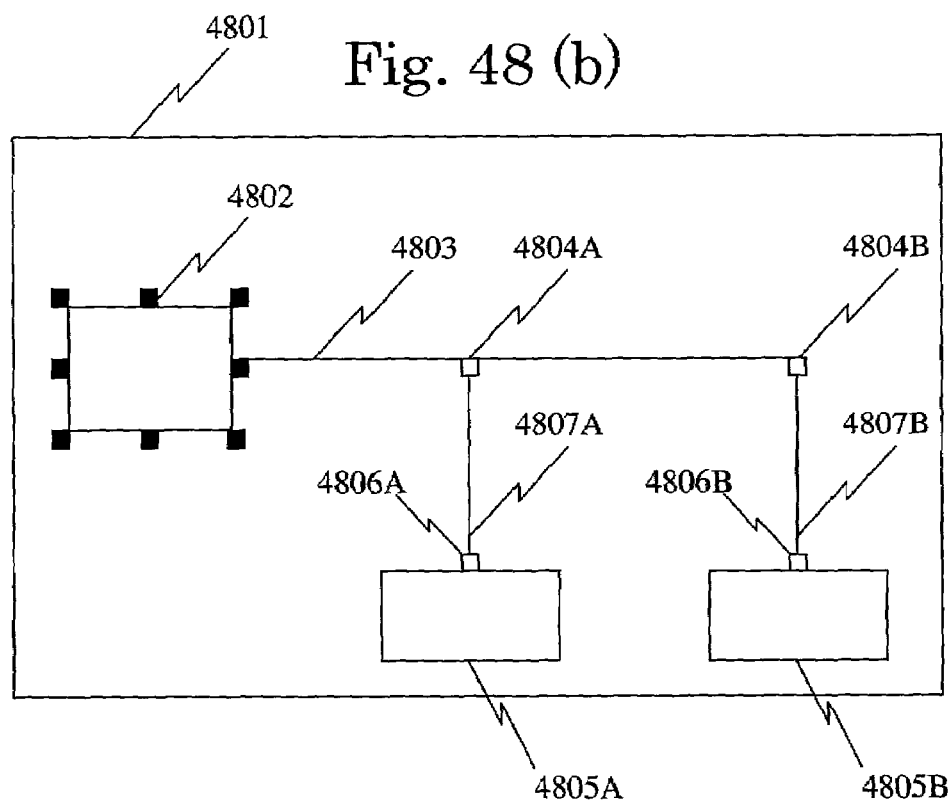
Figure 49:
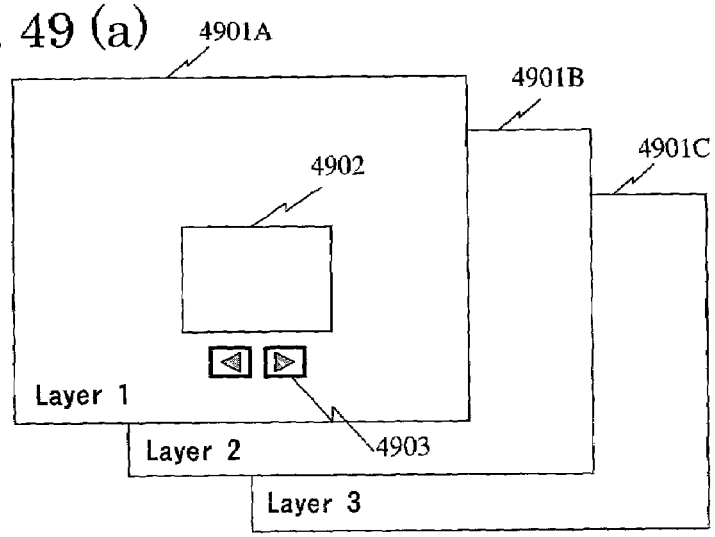
FIGS. 49(a)-49(c) are diagrams showing configuration examples of layers for the cases where a plurality of layers exist, and a configuration example of layers after a transition when a layer display button is pressed.
Figure 49:
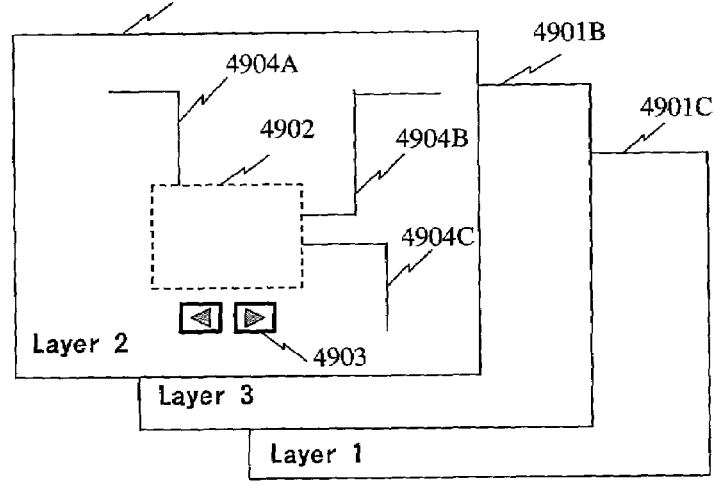
Figure 49:
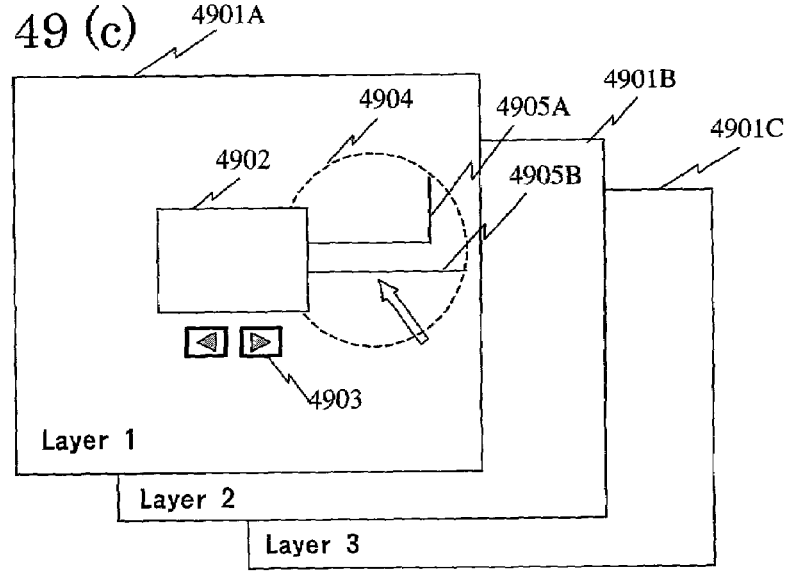

FIG. 48(*a*) is another screen example where a piece of packet relay equipment is displayed at on an edge of the window on-screen by the chart display program 604 in the present embodiment. The chart display program 604 displays, in a window 4801 displayed on the display screen, a FIG. 4802 of a packet relay device object corresponding to a piece of packet relay equipment, typified by a hub, and a figure 4803 of a distribution object. On the distribution object is displayed a FIG. 4804 of a connection object corresponding to a connection port of the packet relay equipment. FIG. 48(*a*) shows a case where only part of a line segment 4805 linked to the connection object 4804 is displayed. Here, if the figure of the packet relay equipment object corresponding to a piece of packet relay equipment, typified by a hub, is selected by using a device such as a mouse or a keyboard, the graphic display of FIG. 48(b) appears.

FIG. 48(b) is a display example where the figure of the packet relay equipment object corresponding to the piece of packet relay equipment of FIG. 48(a), typified by a hub, is selected by using a device such as a mouse or a keyboard. The chart display program 604 in the present embodiment displays, in a window 4801 displayed on the display screen, the FIG. 4802 representing the piece of packet relay equipment selected by using a device such as a mouse or a keyboard, and the FIG. 4803 of the distribution object. On the distribution object are displayed FIGS. 4804A and 4804B of the connection objects corresponding to connection ports of the packet relay equipment.

FIGS. 4805A and 4805B corresponding to the device objects to be connected to the packet relay equipment are connected from the FIGS. 4806A and 4806B of their accompanying connection objects to the figures of the connection objects corresponding to the actually-connected ports of the packet relay equipment, with line segments 4807A and 4807B, respectively. Thereby the connection configuration is displayed.

FIG. 49(a) shows a configuration example of a plurality of layers, if exist, to be displayed by the chart display program 604 in the present embodiment. The chart display program 604 displays a FIG. 4902 of a packet relay equipment object corresponding to a piece of packet relay equipment, typified by a hub, on a layer1 out of layers 4901A, 4901B, and 4901C to display. Layer display buttons 4903 displayed near the figure of the packet relay equipment object can be pressed to move to the layer display of FIG. 49(b). The layer display buttons 4903 can be pressed a plurality of times in the same direction to return to the originally displayed layer.

FIG. 49(b) is a display example where the layers of FIG. 49(a) are changed by using the layer display buttons 4903. The chart display program 604 displays a virtual FIG. 4902 of the packet relay equipment object corresponding to a piece of packet relay equipment, typified by a hub, on the layer2 out of the layers 4901A, 4901B, and 4901C to display. The layer display buttons 4903 are displayed near the virtual figure of the packet relay equipment object corresponding to the packet relay equipment. Displayed on the layer2 are underfloor distribution arrangements 4904A, 4904B, and 4904C.

FIG. 49(c) shows a configuration example of a plurality of layers, if exist, to be displayed by the chart display program 604 in the present embodiment. The chart display program 604 displays the FIG. 4902 of the packet relay equipment object corresponding to the packet relay equipment, typified by a hub, on the layer1 out of the layers 4901A, 4901B, and 4901C to display. The layer display buttons 4903 are displayed near the figure of the packet relay equipment object. When an arbitrary position on the layer1 of FIG. 49(c) is selected by using a device such as a mouse or a keyboard, and if any displayable objects exist in the vicinity of the corresponding positions on the other layers (layer2, layer3), then the displayable distribution objects 4905A and 4905B on the layer2 are displayed inside an object 4904 which indicates the vicinity of the position on the layer1, selected by using the device such as a mouse or a keyboard.

Figure 50:
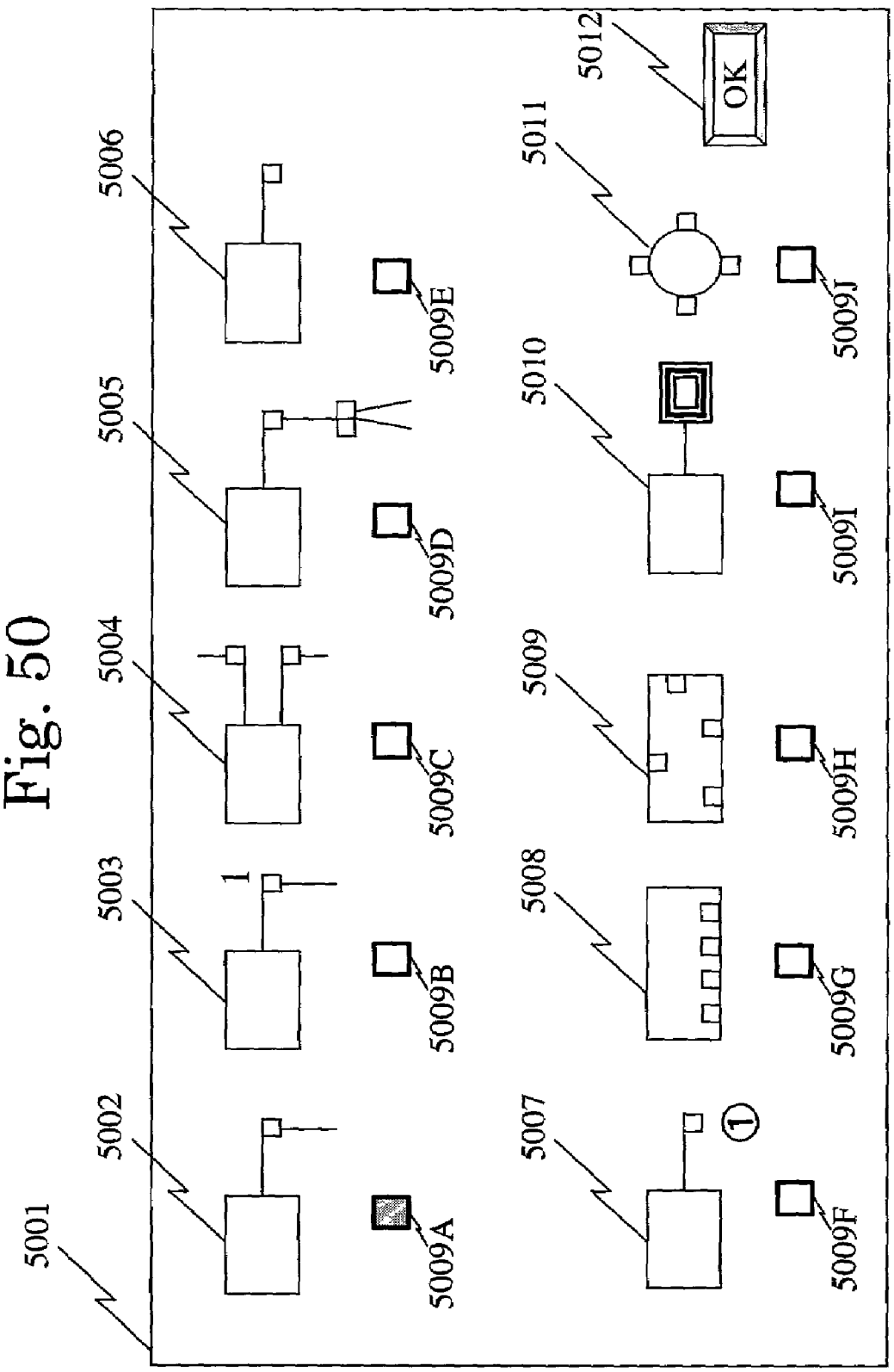
FIG. 50 is a diagram showing a screen example for selecting the display mode of packet relay equipment objects, distribution objects, and connection objects, by the chart display program according to the present invention.

FIG. 50 is a screen example of selecting a method of displaying packet relay equipment objects, distribution objects, and connection objects, by the chart display program 604 in the present embodiment. Displayed in a window 5001 are the following: a packet relay equipment object display method 5002 in the mode of FIG. 37(a); a packet relay equipment object display method 5003 in the mode of FIG. 37(b); a packet relay equipment object display method 5004 in the mode of FIG. 38; a packet relay equipment object display method 5005 in the mod of FIG. 39; a packet relay equipment object display method 5006 in the mode of FIGS. 40(a) and 40(b); a packet relay equipment object display method 5007 in the mode of FIG. 41; a packet relay equipment object display method 5008 in the mode of FIG. 42; a packet relay equipment object display method 5009 in the mode of FIG. 43; a packet relay equipment object display method 5010 in the mode of FIG. 44; and a packet relay equipment object display method 5011 in the mode of FIG. 45. Select buttons 5009A-5009J to make a display method selection are displayed under the figures representing the respective display methods.

Also displayed is the OK button 5012 for making a determination after a display method is selected. In this screen example, the select button 5009A is selected, which means that the display method of FIG. 37(a) is selected.

Hereinafter, the operations of the present embodiment will be described with reference to flowcharts.

Figure 51:
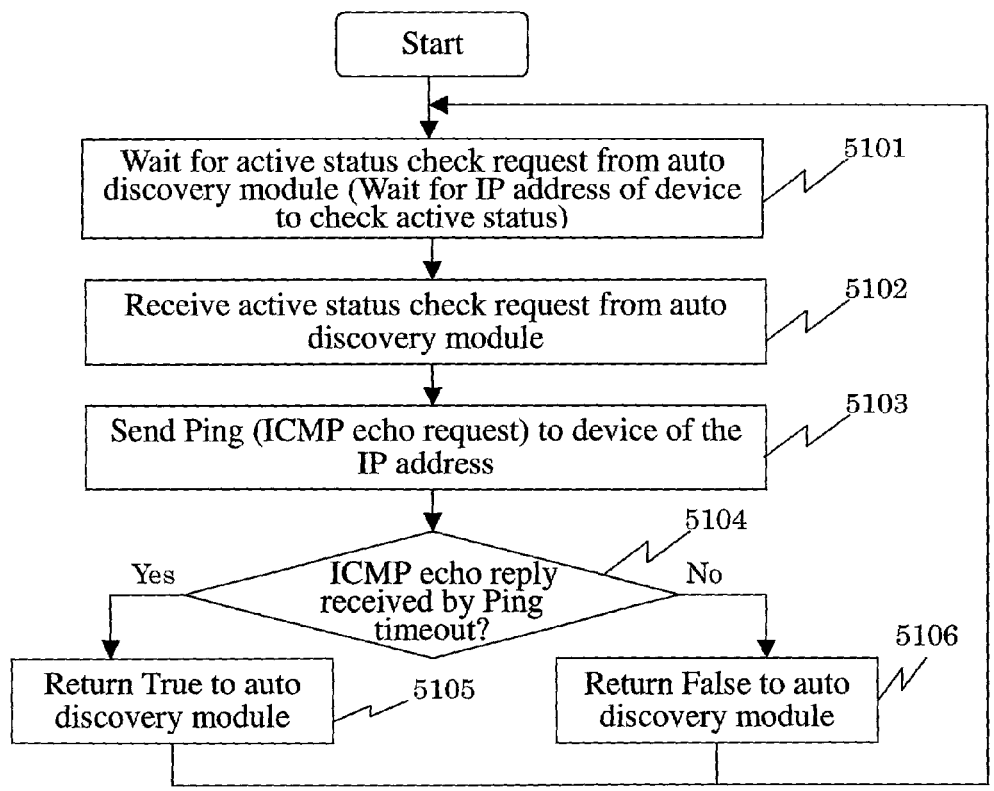
FIG. 51 is a flowchart showing a process in which the active status detection module sends/receives ICMP echo requests, in the network configuration automatic recognition method according to the present invention.

FIG. 51 is a flowchart showing a process in which the active status detection module 611 in the present embodiment sends/receives ICMP echo requests.

The active status detection module 611 waits for an active status check request from the auto discovery module 613 (step 5101). When it receives an IP address as the active status check request (step 5102), the active status detection module 611 sends a Ping (ICMP echo request message) to the device specified by the IP address (step 5103).

The active status detection module 611 checks whether an ICMP echo reply message is received by a Ping timeout (step 5104), and if an echo reply message is received, returns True to the auto discovery module 613 (step 5105). Otherwise, False is returned (step 5106).

After the completion of the step 5105 or 5106, the processing is repeated from the step 5101.

The active status detection module 611 detects the active statuses of devices from Ping replies.

Figure 52:
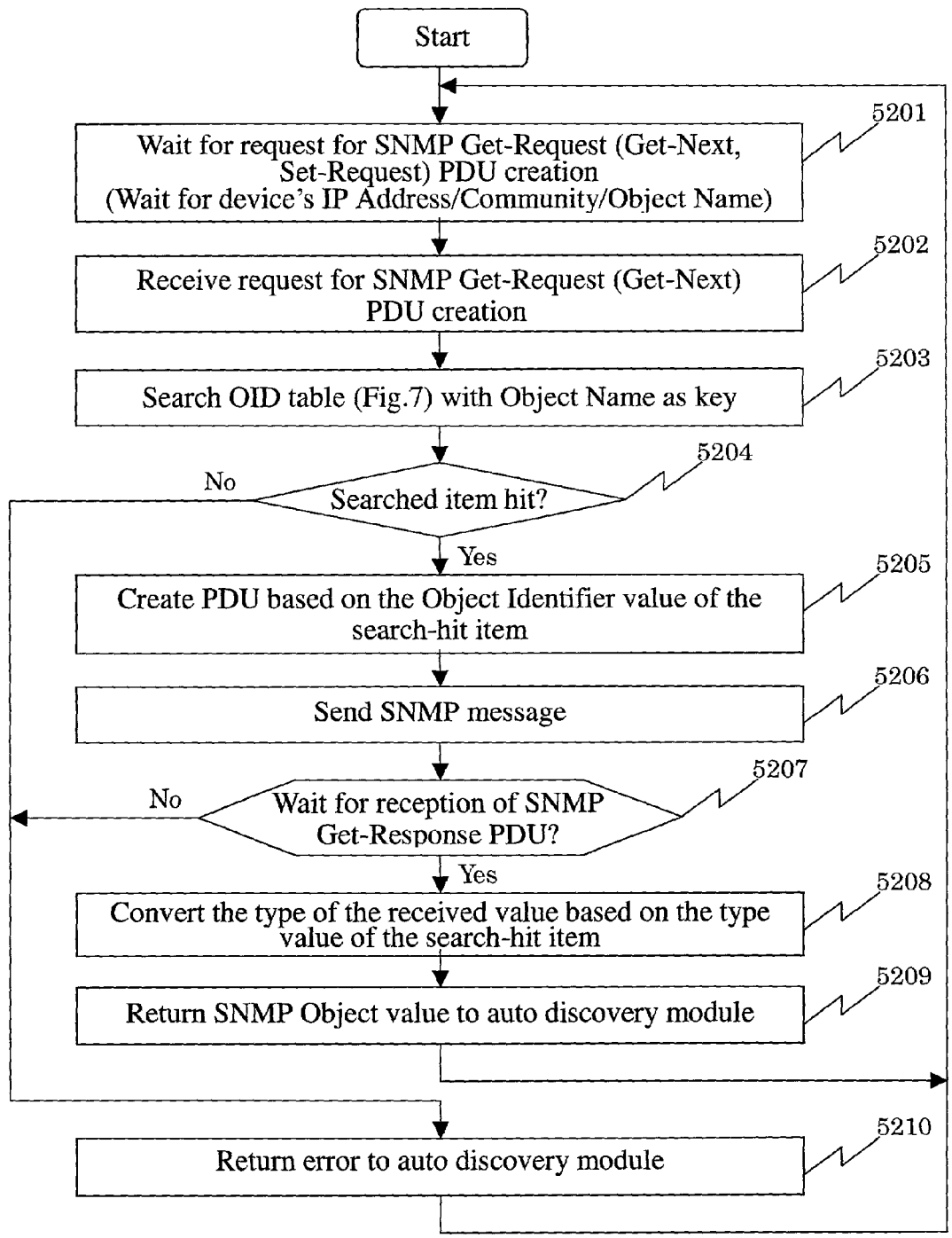
FIG. 52 is a flowchart showing a process in which the MIB access module creates PDUs and sends/receives SNMP messages, in the network configuration automatic recognition method according to the present invention.

FIG. 52 is a flowchart showing a process in which the MIB access module 612 in the present embodiment creates PDUs (Protocol Data Units) and sends/receives SNMP messages.

The MIB access module 612 waits for a request for SNMP Get-Request (or Get-Next/Set-Request) PDU creation from the auto discovery module 613 (step 5201). When it receives an IP address, a community name, and an object name as the request for SNMP Get-Request (or Get-Next/Set-Request) PDU creation (step 5202), the MIB access module 612 searches the OID table 621 of FIG. 7 with the object name as the key (step 5203). The MIB access module 612 checks whether the OID table 621 contains an entry having the object name in its Object Name item 701 (step 5204), and if an entry is hit, creates an SNMP Get-Request (or Get-Next/Set-Request) PDU from the value of the Object Identifier item 702 of the entry, the IP address, and the community name (step 5205). If there is no hit, an error is returned to the auto discovery module 613 (step 5210).

After the completion of the step 5205, an SNMP message is created from the PDU, and transmitted (step 5206). The MIB access module 612 waits for an SNMP (Get-Response) PDU as a response to the SNMP message (step 5207), and if it receives a response, applies a type conversion to the received value on the basis of the value of the type item 703 of the entry in the OID table 621 (step 5208). If it fails to receive a response, the MIB access module 612 returns an error to the auto discovery module 613 (step 5210).

After the completion of the step 5208, the type-converted value of the SNMP response is returned to the auto discovery module 613 (step 5209). After the completion of the step 5209 or 5210, the processing is repeated from the step 5201.

To check for MIB2 support, sysDescr is set as the object name; if the SNMP Get-Request message is successfully sent/received, the device is determined to support MIB2.

To check for an IP forwarding function, ipForwarding is set as the object name; if the SNMP Get-Request message is successfully sent/received, and the ipForwarding value is "1" (True), then the device is determined to have an IP forwarding function.

To check whether a bridge MIB is supported or not, dot1dBaseBridgeAddress is set as the object name; if the SNMP Get-Request message is successfully sent/received, the device is determined to support a bridge MIB.

To check whether a repeater MIB is supported or not, rptrGroupCapacity is set as the object name; if the SNMP Get-Request message is successfully sent/received, the device is determined to support a repeater MIB.

To check whether a printer MIB is supported or not, prt-GeneralConfigChanges is set as the object name; if the SNMP Get-Request message is successfully sent/received, the device is determined to support a printer MIB.

Figure 53:
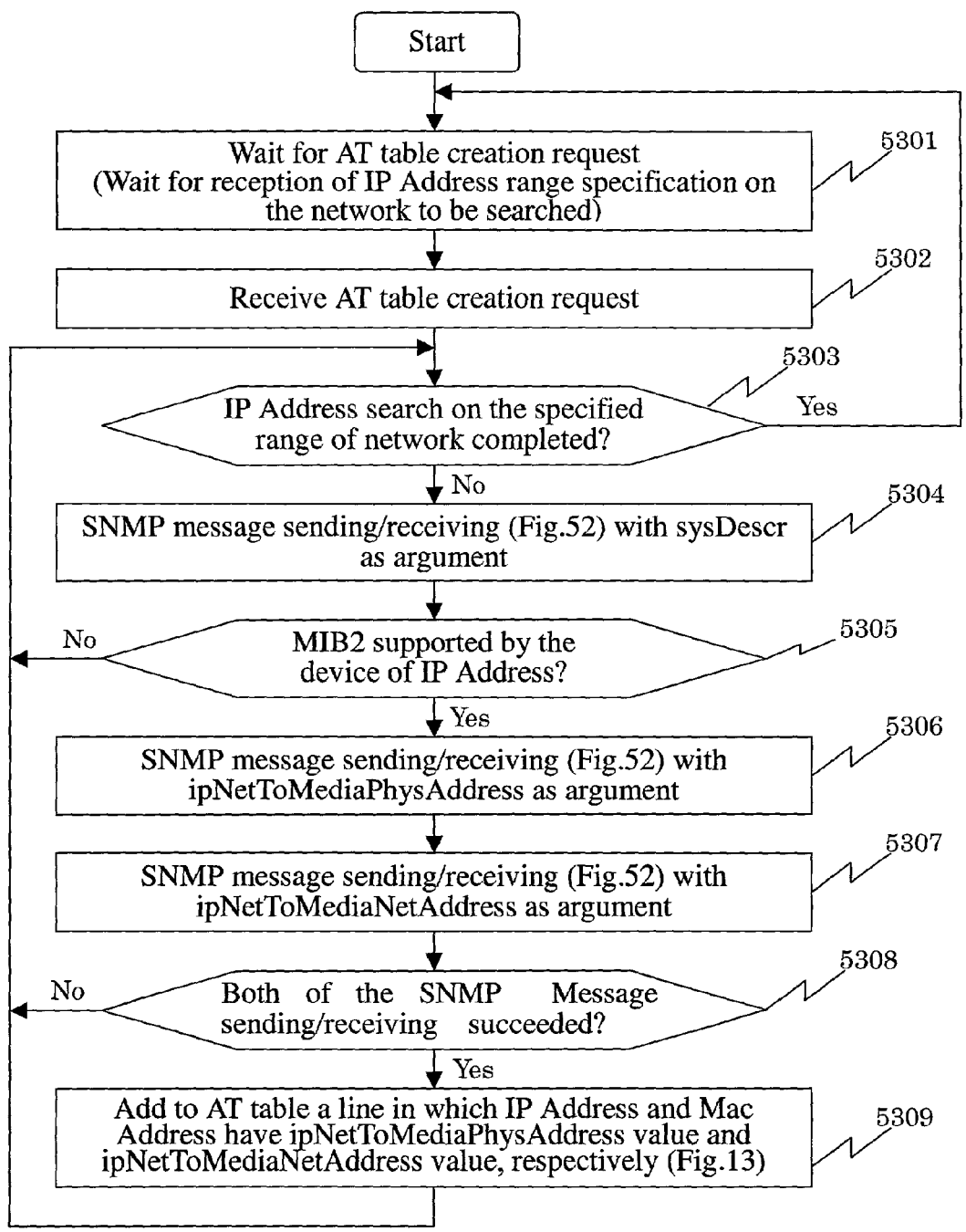
FIG. 53 is a flowchart showing a process in which the auto discovery module creates the AT table, in the network configuration automatic recognition method according to the present invention.

FIG. 53 is a flowchart showing a process in which the auto discovery module 613 in the present embodiment creates the AT table 622.

The auto discovery module 613 waits for an AT table creation request (step 5301), and when a range of IP addresses on the network in search is specified as the AT table creation request (step 5302), starts to search all the IP addresses included in the network range specified. The auto discovery module 613 checks for IP addresses unsearched (step 5303), and if there is no IP address unsearched, repeats the processing from the step 5301. If there is any IP address unsearched, the SNMP Get-Next message sending/receiving of FIG. 52 is performed with sysDescr (step 5304). The auto discovery module 613 checks whether the device specified by the IP address supports MIB2, based on the return value from the MIB access module 612 (step 5305). If MIB2 is supported, the SNMP Get-Next message sending/receiving of FIG. 52 is performed with ipNetMediaPhysAddress as the key (step 5306). Then, the SNMP Get-Next message sending/receiving of FIG. 52 is performed with ipNetToMediaNetAddress as the key (step 5307).

If the device does not support MIB2, the processing is repeated from the step 5303. After the completion of the step 5307, the auto discovery module 613 checks whether both of the SNMP Get-Next message sending/receiving at the steps 5306 and 5307 are performed successfully (step 5308). If both are successful, the auto discovery module 613 adds to the AT table 522 an entry having the ipNetToMediaNetAddress value and the ipNetMediaPhysAddress value set in the IP Address item and the Mac Address item, respectively (step 5309). When the SNMP Get-Next message sending/receiving failed, or after the completion of the step 5309, the processing is repeated from the step 5303.

Figure 54:
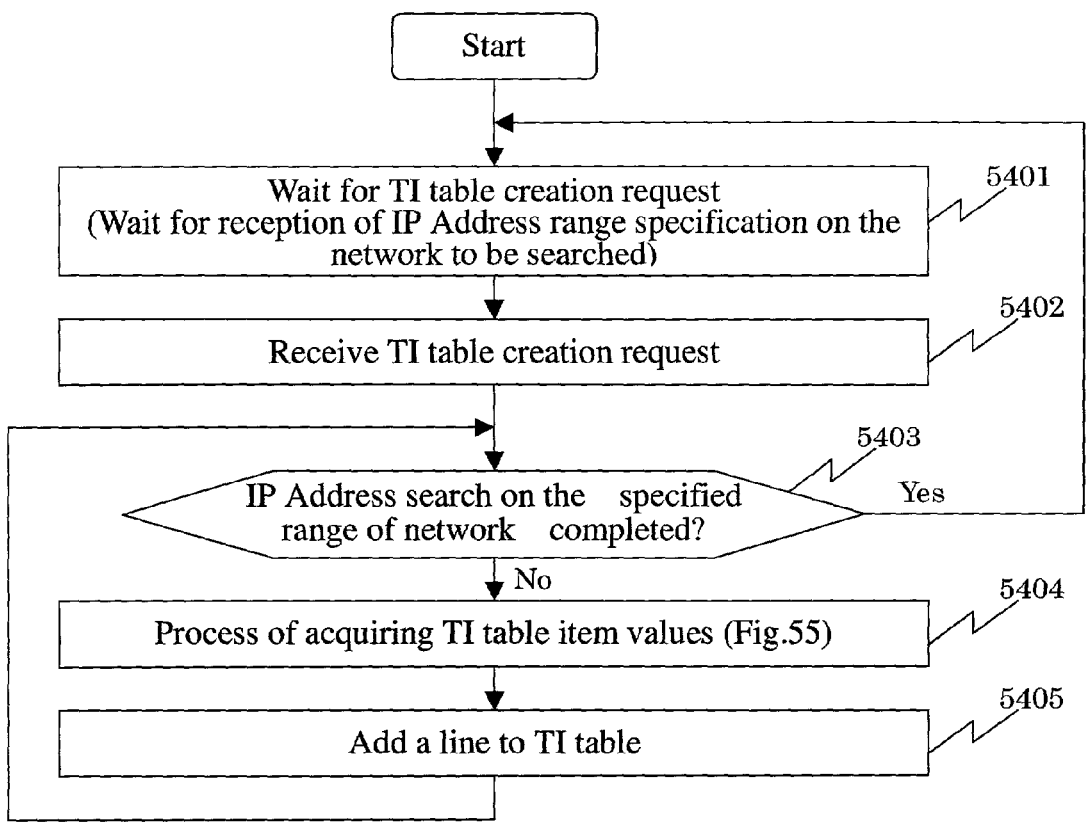
FIG. 54 is a flowchart showing a process in which the auto discovery module creates the TI table, in the network configuration automatic recognition method according to the present invention.

FIG. 54 is a flowchart showing a process in which the auto discovery module 613 in the present embodiment creates the TI table 623.

The auto discovery module 613 waits for a TI table creation request (step 5401), and when a range of IP addresses on the network in search is specified as the TI table creation request (step 5402), starts to search all the IP addresses included in the network range specified. The auto discovery module 613 checks for IP addresses unsearched (step 5403), and if there is no IP address unsearched, repeats the processing from the step 5401. If there is any IP address unsearched, the auto discovery module 613 executes the process of acquiring the value of each TI table item in FIG. 55, with the IP address (step 5404). After the completion of the step 5404, a new entry is added to the TI table 623 (step 5405), and the processing is repeated from the step 5403.

Figure 55:
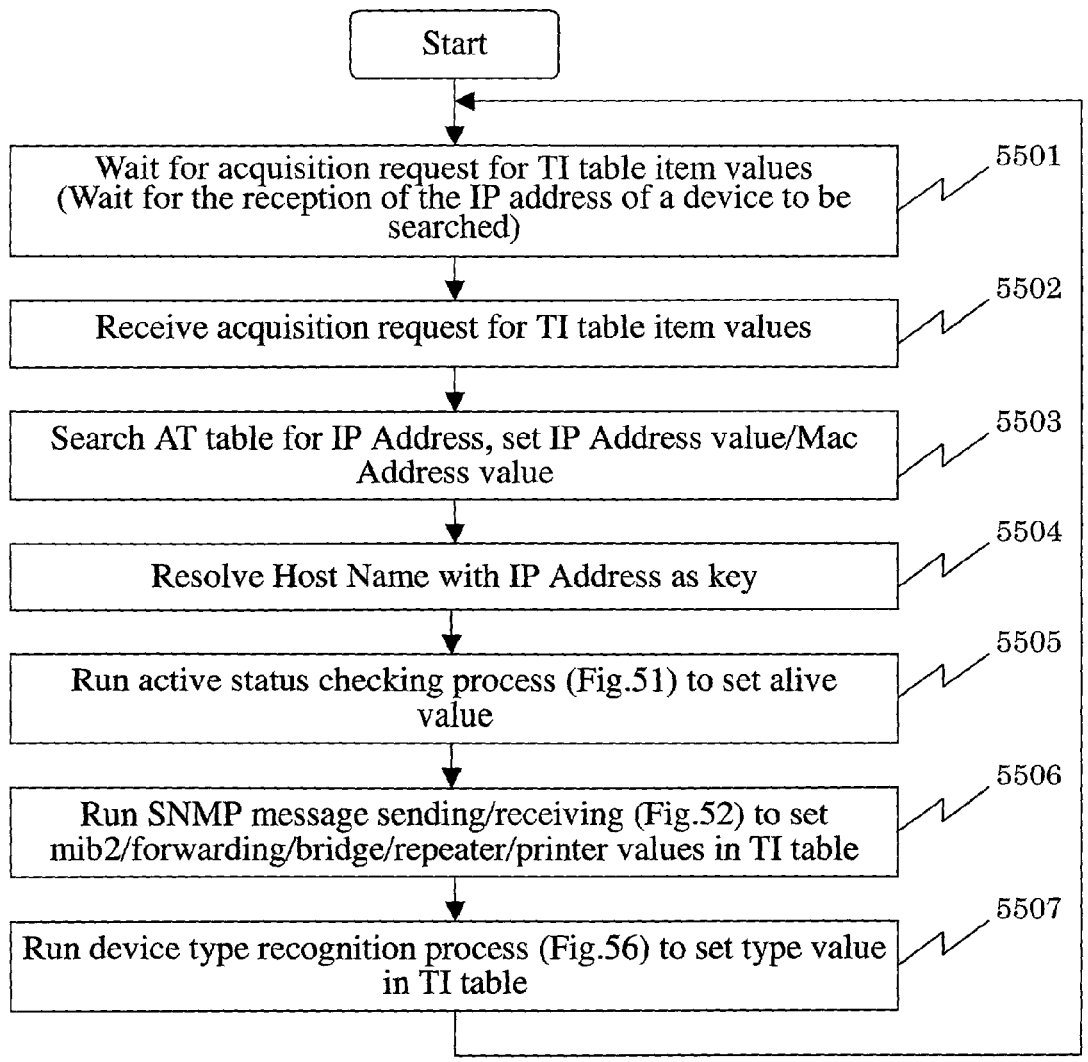
FIG. 55 is a flowchart showing a process in which the auto discovery module acquires the value of each TI table item in creating the TI table, in the network configuration automatic recognition method according to the present invention.

FIG. 55 is a flowchart showing a process in which the auto discovery module 613 in the present embodiment acquires the value of each item of the TI table 623 in creating the TI table 623.

The auto discovery module 613 waits for an acquisition request for the value of each item in the TI table 623 (step 5501). When it receives a to-be-searched IP address as the acquisition request for the value of each item in the table 623, the auto discovery module 613 searches the IP Address item of the AT table 622 with the IP address as the key, and sets the value of the Mac Address item of the acquired entry into the Mac Address item of the TI table 623 (step 5503).

Next, the auto discovery module resolves the hostname of the device with the IP address as the key, and sets the hostname into the Host Name item of the TI table 623 (step 5504). Next, the active status checking process of FIG. 51 is performed with the IP address as the key (step 5505), and the return value of the active status checking process is set into the alive item of the TI table 623.

Next, the SNMP message sending/receiving of FIG. 52 is performed (step 5506), and the return values of the MIB2 support checking process are set into the MIB2 item, the forwarding item, the bridge item, the repeater item, and the printer item of the TI table 623.

Figure 56:
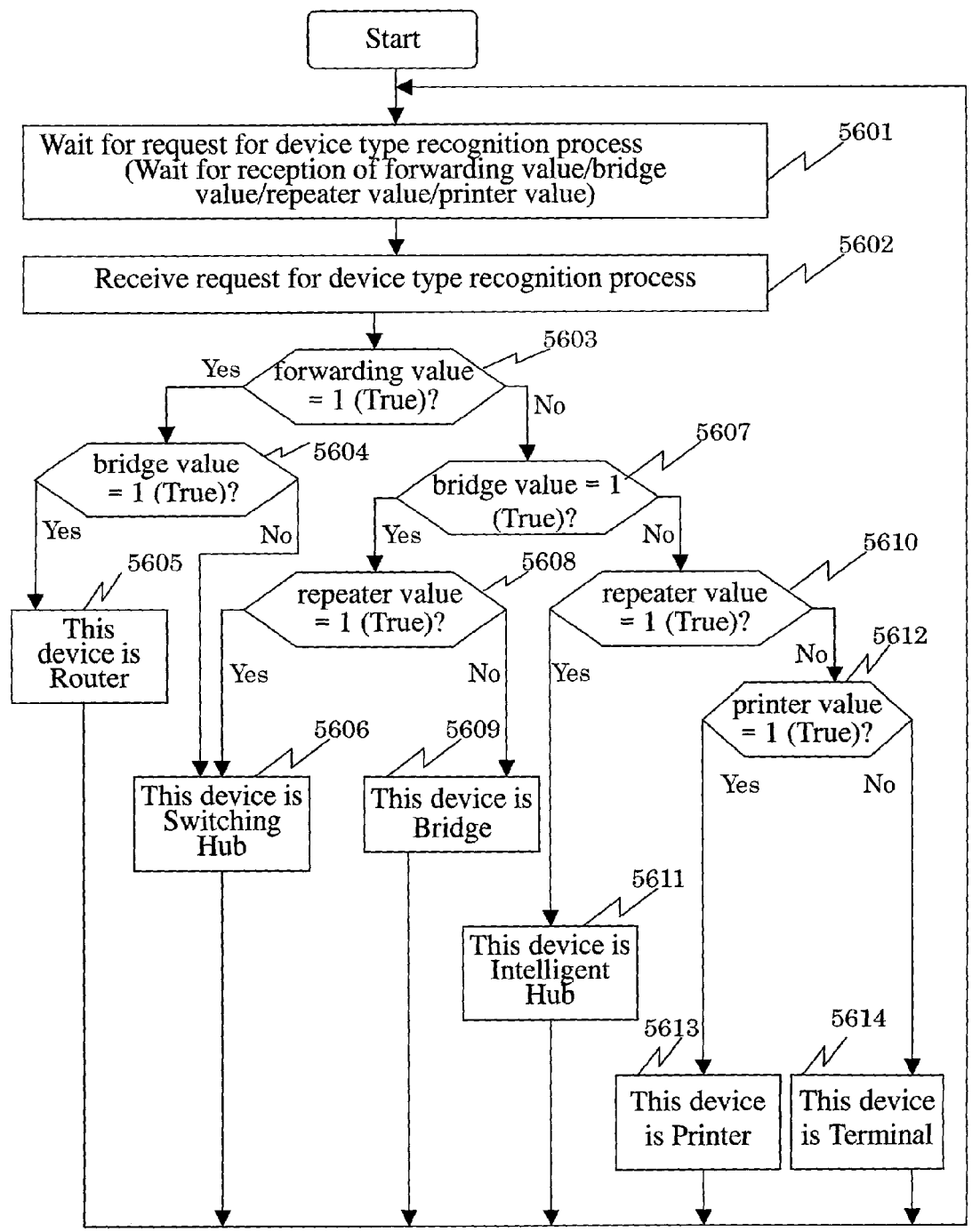
FIG. 56 is a flowchart showing a process in which the auto discovery module recognizes device types in creating the TI table, in the network configuration automatic recognition method according to the present invention.

Next, the device type recognition process of FIG. 56 is performed (step 5507), and the return value of the device type recognition process is set into the type item of the TI table 623. After the completion of the step 5507, the processing is repeated from the step 5501.

FIG. 56 is a flowchart showing a process in which the auto discovery module 613 in the present embodiment recognizes device types in creating the TI table 623.

The auto discovery module 613 waits for a request for device type recognition (step 5601). When it receives the forwarding item, the bridge item, the repeater item, and the printer item of the corresponding entry in the TI table 623 as the request for device type recognition, the auto discovery module 613 checks whether the value of the forwarding item is "1" (True) (step 5603).

If the value of the forwarding item is "1" (True), the auto discovery module 613 checks whether the value of the bridge item is "1" (True) (step 5604).

If the value of the forwarding item is "1" (True) and the value of the bridge item is "1" (True), then the device is recognized as a router (step 5605). If the value of the forwarding item is "1" (True) and the value of the bridge item is "0" (False), then the device is recognized as a switching hub (step 5606).

If the value of the forwarding item is "0" (False) at the step 5603, the auto discovery module 613 checks whether the value of the bridge item is "1" (True) (step 5607). If the value of the bridge item is "1" (True), the auto discovery module 613 checks whether the value of the repeater item is "1" (True) (step 5608). If the value of the forwarding item is "0" (False), the value of the bridge item is "1" (True), and the value of the repeater item is "1" (True), then the device is recognized as a switching hub (step 5606).

If the value of the forwarding item is "0" (False), the value of the bridge item is "1" (True), and the value of the repeater item is "0" (False), then the device is recognized as a bridge (step 5609). If the value of the bridge item is "0" (False) at the step 5607, the auto discovery module 613 checks whether the value of the repeater item is "1" (True) (step 5610). If the value of the forwarding item is "0" (False), the value of the bridge item is "0" (False), and the value of the repeater item is "1" (True), then the device is recognized as an intelligent hub (step 5611).

If the value of the repeater item is "0" (False) at the step 5610, the auto discovery module 613 checks whether the value of the printer item is "1" (True) (step 5612). If the value of the forwarding item is "0" (False), the value of the bridge item is "0" (False), the value of the repeater item is "0" (False), and the value of the printer item is "1" (True), then the device is recognized as a printer (step 5613). If the value of the forwarding item is "0" (False), the value of the bridge item is "0" (False), the value of the repeater item is "0" (False), and the value of the printer item is "0" (False), then the device is recognized as a terminal (step 5614). After the completion of the step 5605, 5606, 5609, 5611, 5613, or 5614, the processing is repeated from the step 5601.

Figure 57:
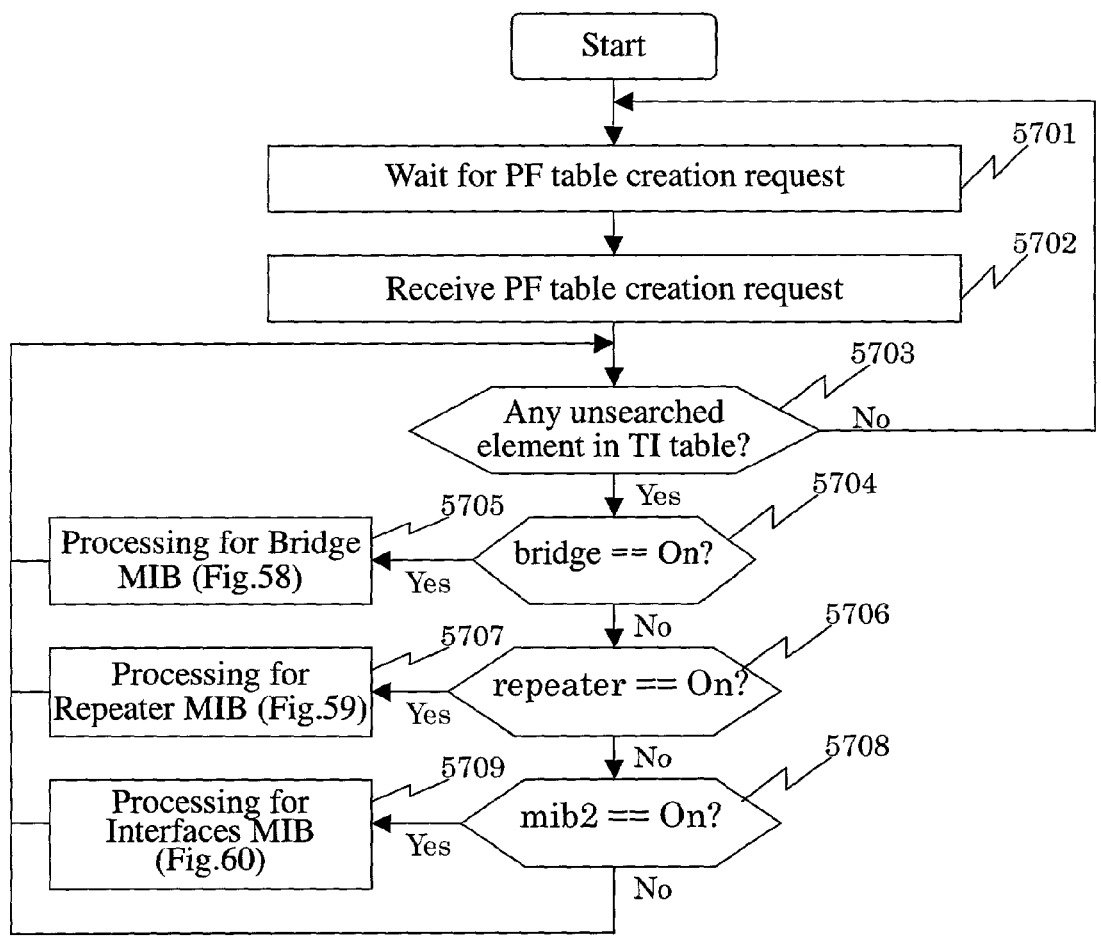
FIG. 57 is a flowchart showing a process in which the auto discovery module creates the PF table, in the network configuration automatic recognition method according to the present invention.

FIG. 57 is a flowchart showing a process in which the auto discovery module 613 in the present embodiment creates the PF table 624.

Figure 58:
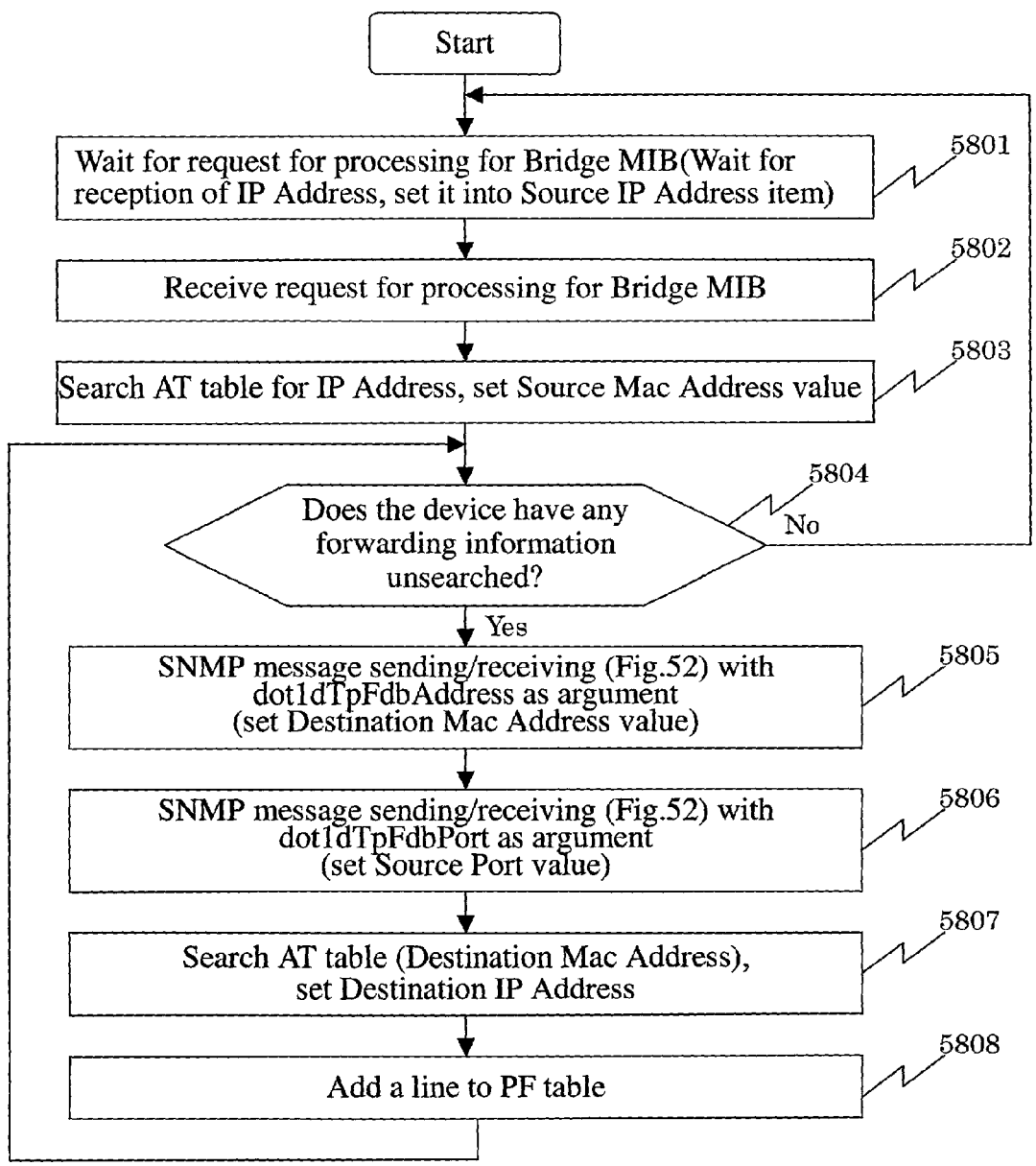
FIG. 58 is a flowchart showing the processing which the auto discovery module executes on bridge-MIB-supporting devices in creating the PF table, in the network configuration automatic recognition method according to the present invention.

The auto discovery module 613 waits for a request to create the PF table 624 (step 5701), and, on receiving the request to create the PF table 624 (step 5702), starts to retrieve all the entries of the TI table 623. The auto discovery module 613 checks whether the TI table 623 contains unsearched entries (step 5703), and if the TI table 623 contains no unsearched entry, repeats the processing from the step 5701. If the TI table 623 contains any unsearched entry, the auto discovery module 613 checks whether the value of the bridge item of the corresponding entry in the TI table 623 is "1" (True) (step 5704). If the value of the bridge item is "1" (True), the processing for bridge-MIB-supporting devices, shown in FIG. 58 is performed (step 5705). If the value of the bridge item is "0" (False), the auto discovery module 613 checks whether the value of the repeater item of the corresponding entry in the TI table 623 is "1" (True) (step 5706).

Figure 59:
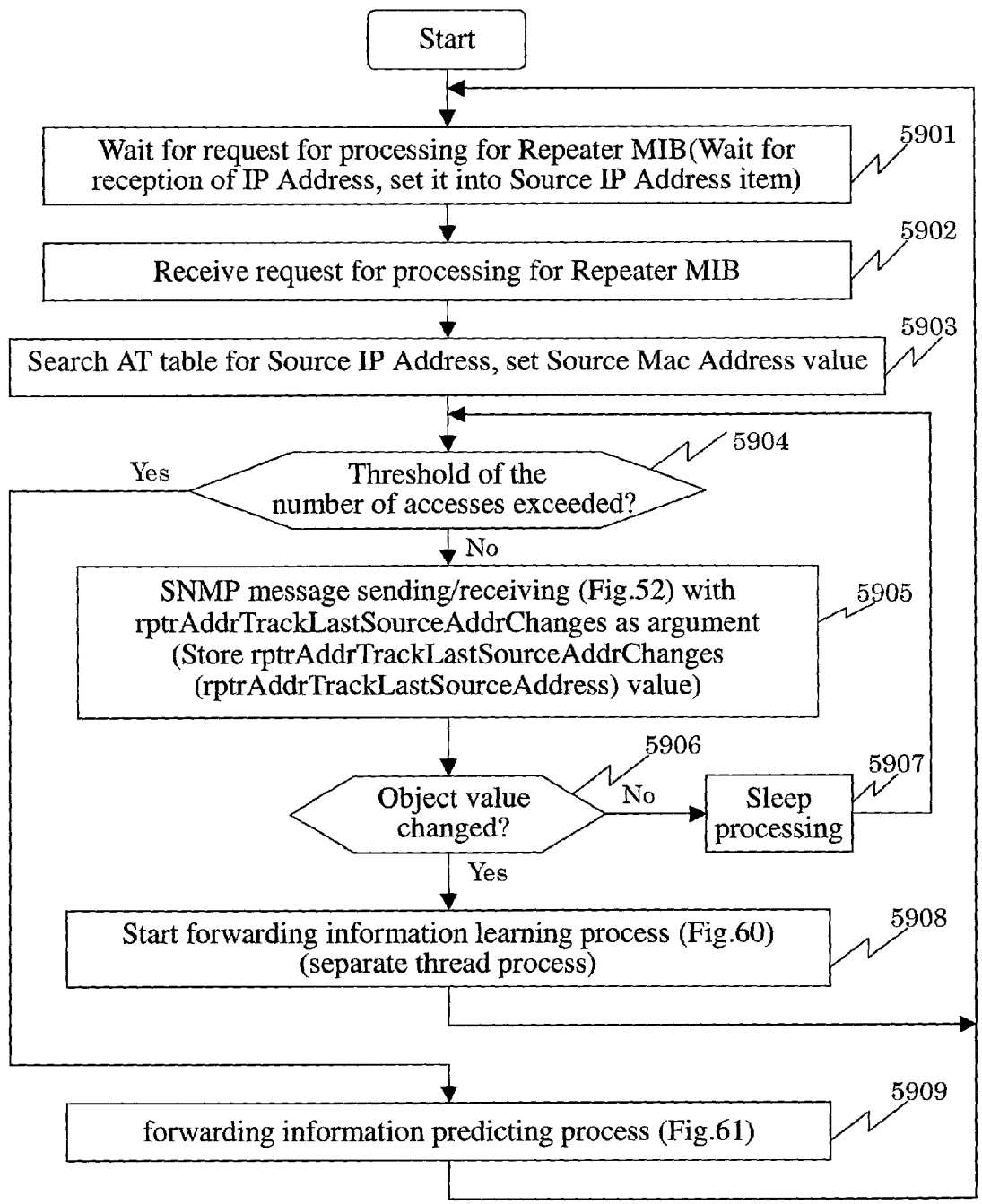
FIG. 59 is a flowchart showing the processing which the auto discovery module executes on repeater-MIB-supporting devices in creating the PF table, in the network configuration automatic recognition method according to the present invention.
Figure 60:
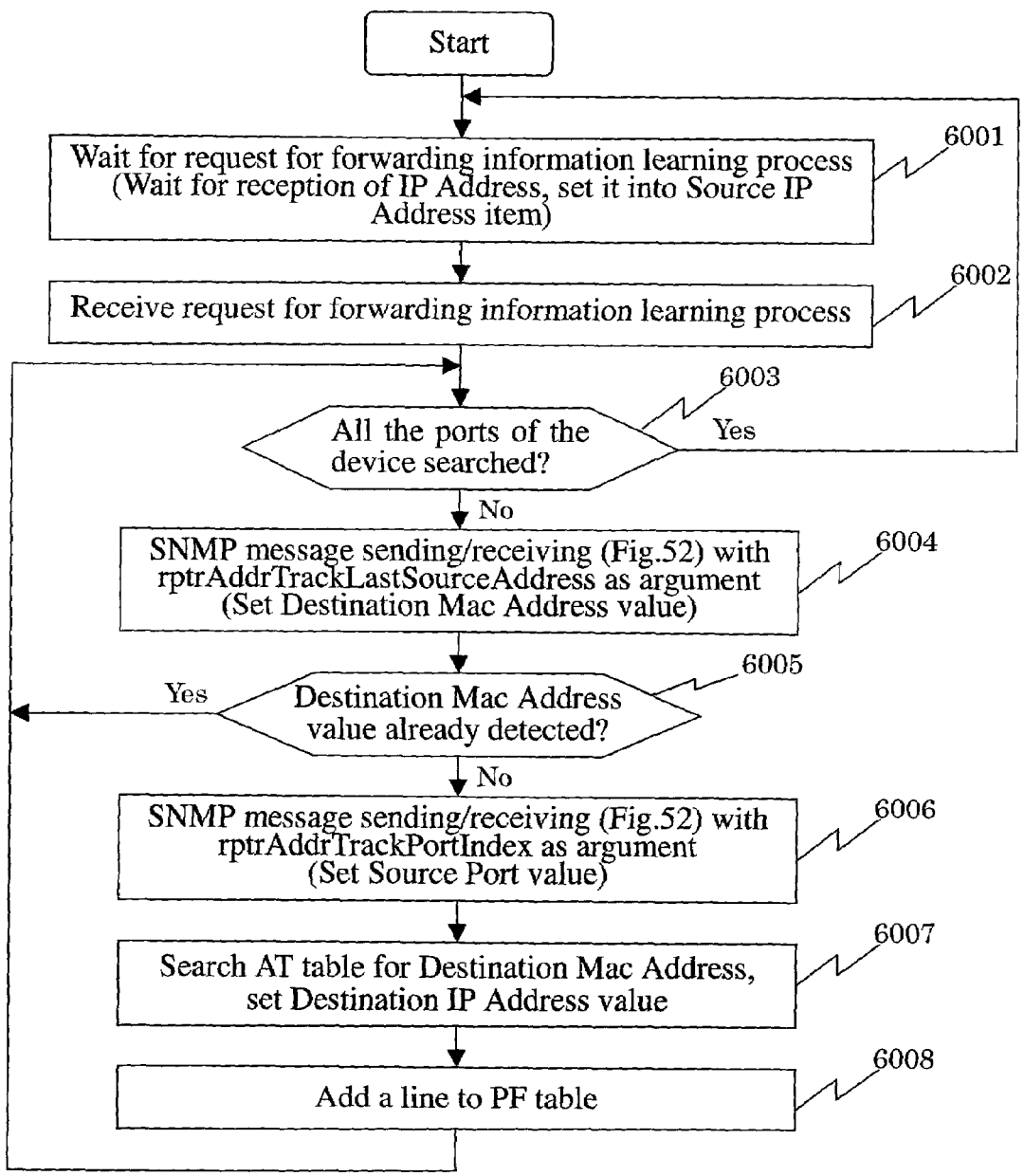
FIG. 60 is a flowchart showing a process in which the auto discovery module learns forwarding information in creating the PF table, in the network configuration automatic recognition method according to the present invention.

If the value of the repeater item is "1" (True), the processing for repeater-MIB-supporting devices, shown in FIG. 59 is performed (step 5707). If the value of the repeater item is "0" (False), the auto discovery module 613 checks whether the value of the MIB2 item of the corresponding entry in the TI table 623 is "1" (True) (step 5708). If the value of the MIB2 item is "1" (True), the processing for interfaces-MIB-supporting devices, shown in FIG. 60 is performed (step 5709). If the value of the MIB2 item is "0" (False), the processing is repeated from the step 5703. After the completion of any of the steps 5705, 5707, and 5709, the processing is repeated from the step 5703.

FIG. 58 is a flowchart showing the processing which the auto discovery module 613 in the present embodiment executes on bridge-MIB-supporting devices in creating the PF table 624.

The auto discovery module 613 waits for a request for the processing for bridge-MIB-support devices (step 5801). The auto discovery module 613 receives a value of the IP Address item in the TI table 623 as the request for the processing for bridge-MIB-supporting devices, and sets the value into the Source IP Address item of the PF table 624 (step 5802). Then, with the value of the IP Address item as the key, the auto discovery module 613 searches the IP Address item of the AT table 622, and sets the value of the Mac Address item of the hit entry into the Source Mac Address item of the PF table 624 (step 5803). Next, the auto discovery module 613 checks whether the device specified by the IP address holds unsearched forwarding information (executes the processing until the SNMP Get-Next message sending/receiving results in an error) (step 5804), and if there is no unsearched forwarding information, repeats the processing from the step 5801. If there is an unsearched piece of forwarding information, the SNMP Get-Next message sending/receiving is performed under the flow of FIG. 52 with dot1dTpFdbAddress as the object name. The return value is set into the Destination Mac Address item of the PF table 624 (step 5805).

Similarly, the SNMP Get-Next message sending/receiving is performed under the flow of FIG. 52 with dot1dTpFdbPort as the object name, and the return value is set into the Source Port item of the PF table 624 (step 5806). Next, the auto discovery module 612 searches the Mac Address item of the AT table 622 with the set value of the Designation Mac Address item as the key. The value of the IP Address item of the hit entry is set into the Destination IP Address item of the PF table 624 (step 5807). Finally, a new entry is added to the PF table 624 (step 5808), and the processing is repeated from the step 5804.

FIG. 59 is a flowchart showing the processing which the auto discovery module 613 in the present embodiment executes on repeater-MIB-supporting devices in creating the PF table 624.

The auto discovery module 613 waits for a request for the processing for repeater-MIB-support devices (step 5901). The auto discovery module 613 receives a value of the IP Address item of the TI table 623 as the request for the processing for repeater-MIB-supporting devices, and sets the value into the Source IP Address item of the PF table 624 (step 5902). Then, the auto discovery module 613 searches the IP Address item of the AT table 622 with the value of the IP Address item as the key, and sets the value of the Mac Address item of the hit entry into the Source Mac Address item of the PF table 624 (step 5903).

Figure 61:
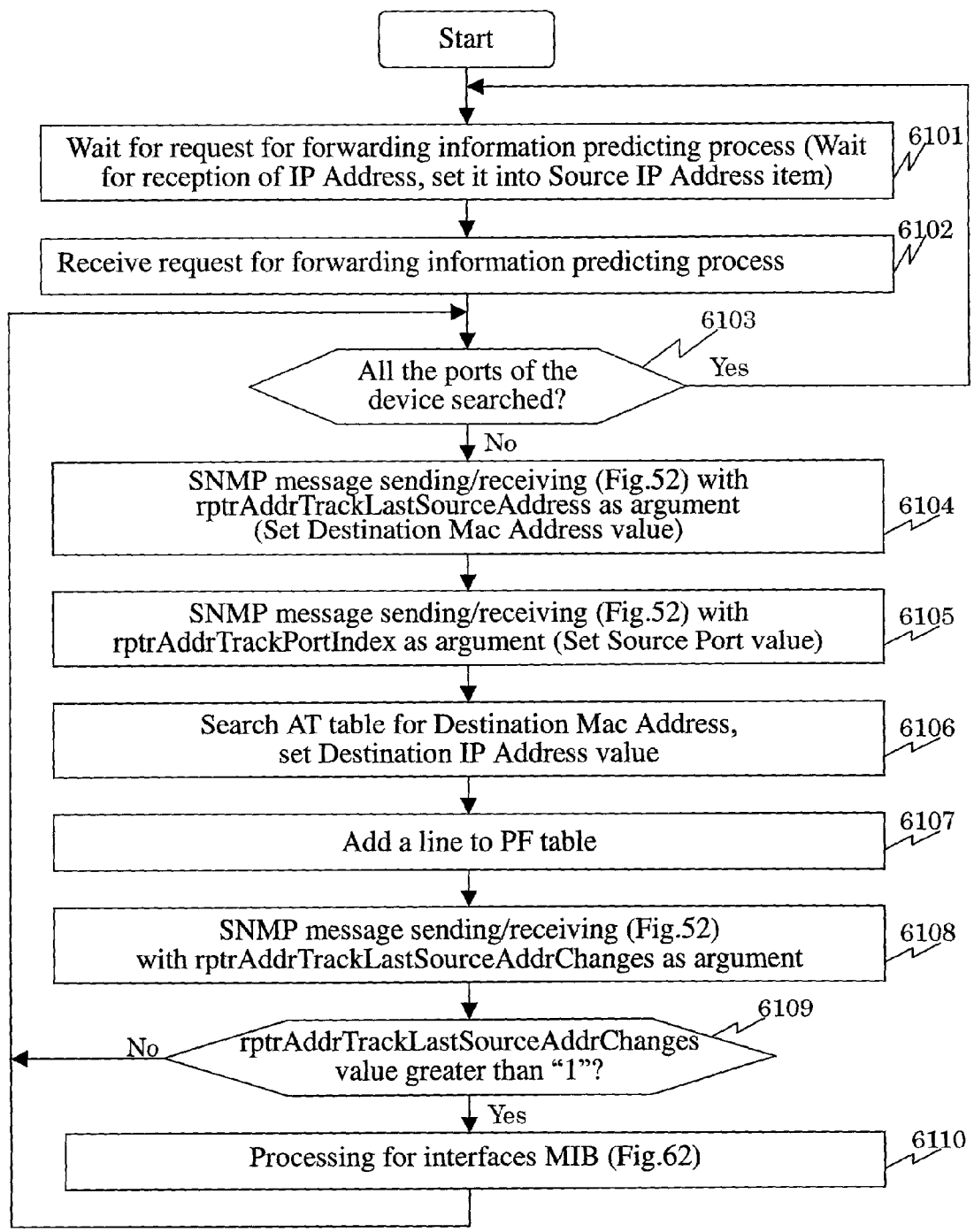
FIG. 61 is a flowchart showing a process in which the auto discovery module predicts forwarding information in creating the PF table, in the network configuration automatic recognition method according to the present invention.

Next, the auto discovery module 613 checks whether the number of accesses in the sending/receiving of SNMP Get-Next messages exceeds a preset threshold of the number of accesses (step 5904), and if the number of accesses exceeds the threshold, executes the forwarding information predicting process of FIG. 61 (step 5909). If the number of accesses falls within the threshold, the SNMP Get-Next message sending/receiving of FIG. 52 is performed with rptrAddrTrackLastSourceAddrChanges (step 5905).

After the completion of the step 5905, the return value of the SNMP Get-Next message sending/receiving, or the value of the rptrAddrTrackLastSourceAddrChanges, is stored and compared with the value of the previous access to check for a change in the object value (step 5906). If there is no change in the object value, the processing is suspended (Sleep processing) (step 5907). The processing is then repeated from the step 5904 until the number of access exceeds the threshold. If there is a change in the object value at the step 5906, the auto discovery module 613 creates a thread other than the currently running one, and initiates the forwarding information learning process of FIG. 60 on the thread created (step 5908).

After the completion of the step 5908 or 5909, the processing is repeated from the step 5901. The forwarding information learning process is a process of making periodical accesses to the repeater MIB of a device conformable to RFC repeater MIB specifications for the sake of information collection. The forwarding information predicting process is a process of detecting the forwarding information of a device not conformable to RFC repeater MIB specifications by using an interfaces MIB.

FIG. 60 is a flowchart showing the process in which the auto discovery module 613 learns forwarding information in creating the PF table 624.

The auto discovery module 613 waits for a request for the forwarding information learning process (step 6001). When it receives a value of the IP Address item of the TI table 623 as the request for the forwarding information learning request, and sets the same into the Source IP Address item of the PF table 624 (step 6002), the auto discovery module 613 checks whether all the ports of the device specified by the IP address have been searched (step 6003). If all the ports have been searched, the processing is repeated from the step 6001. If not, the SNMP Get-Next message sending/receiving of FIG. 52 is performed with rptrAddrTrackLastSourceAddress as the key, and the return value of the SNMP Get-Next message sending/receiving is set into the Destination Mac Address item of the PF table 624 (step 6004).

Next, the auto discovery module 613 checks whether the set value of the Destination Mac Address has already been detected (step 6005). If detected, the processing is repeated from the step 6003. If not, the SNMP Get-Next message sending/receiving of FIG. 52 is performed with rptrAddrTrackPortIndex as the key, and the return value is set into the Source Port item of the PF table 624 (step 6006).

Next, the auto discovery module 612 searches the Mac Address item of the AT table 622 with the set value of the Designation Mac Address item as the key, and sets the value of the IP Address item of the hit entry into the Destination IP Address item of the PF table 624 (step 6007). Finally, a new entry is added to the PF table 624 (step 6008), and the processing is repeated from the step 6003.

FIG. 61 is a flowchart showing the process in which the auto discovery module 613 predicts forwarding information in creating the PF table 624.

The auto discovery module 613 waits for a request for the forwarding information predicting process (step 6101). When the auto discovery module 613 receives a value of the IP Address item of the TI table 623 as the forwarding information predicting process request, and sets the same into the Source IP Address item of the PF table 624 (step 6102), then it checks whether all the ports of the device specified by the IP address have been searched (step 6103). If all the ports have been searched, the processing is repeated from the step 6101. If not, the SNMP Get-Next message sending/receiving of FIG. 52 is performed with rptrAddrTrackLastSourceAddress as the key, and the return value of the SNMP Get-Next message sending/receiving is set into the Destination Mac Address item of the PF table 624 (step 6104).

The SNMP Get-Next message sending/receiving of FIG. 52 is performed with rptrAddrTrackPortIndex as the key, and the return value is set into the Source Port item of the PF table 624 (step 6105).

Next, the auto discovery module 612 searches the Mac Address item of the AT table with the set value of the Designation Mac Address item as the key, and sets the value of the IP Address item of the hit entry into the Destination IP Address item of the PF table 624 (step 6106). Next, a new entry is added to the PF table 624 (step 6107). After the addition of an entry to the PF table 624, the SNMP Get-Next message sending/receiving of FIG. 52 is performed with rptrAddrTrackLastSourceAddrChanges as the key (step 6108). Then, the auto discovery module 613 checks whether the rptrAddrTrackLastSourceAddrChanges value, or the return value of the SNMP Get-Next message sending/receiving, is greater than "1" (step 6109).

If the rptrAddrTrackLastSourceAddrChanges value is greater than "1," the auto discovery module 613 executes the processing for MIB2 (interfaces MIB)-supporting devices to add remaining entries to the PF table 624 (step 6110). If the rptrAddrTrackLastSourceAddrChanges value is smaller than or equal to "1," the auto discovery module 613 repeats the processing from the step 6103. The completion of the step 6110 is also followed by the repetition of the processing from the step 6103.

Figure 62:
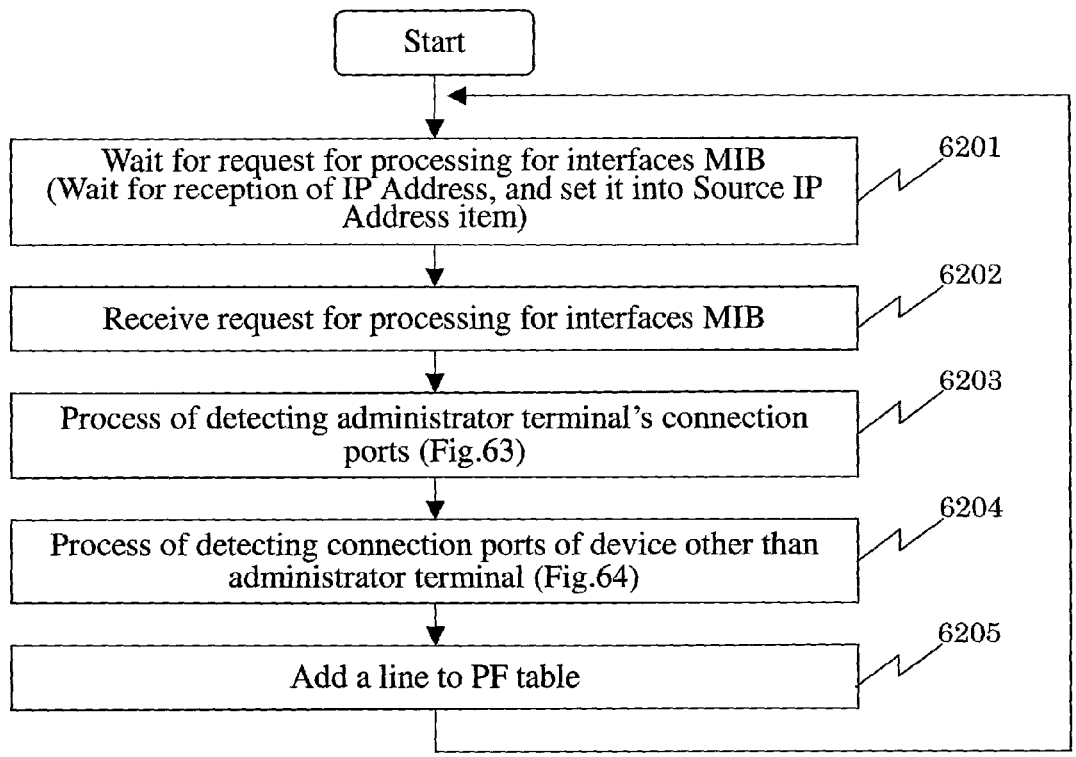
FIG. 62 is a flowchart showing the processing which the auto discovery module executes on MIB2 (interfaces MIB)-supporting devices in creating the PF table, in the network configuration automatic recognition method according to the present invention.

FIG. 62 is a flowchart showing the processing which the auto discovery module 613 executes on MIB2 (interfaces MIB)-supporting devices in creating the PF table 624.

The auto discovery module 613 waits for a request for the processing for MIB2 (interfaces MIB)-supporting devices (step 6201). The auto discovery module 613 receives a value of the IP Address item of the TI table 623 as the request for the processing for MIB2-supporting devices, and sets the same into the Source IP Address item of the PF table 624 (step 6202). Then, the auto discovery module 613 executes the process of detecting the connection ports of the administrator terminal in FIG. 63 (step 6203).

Figure 64:
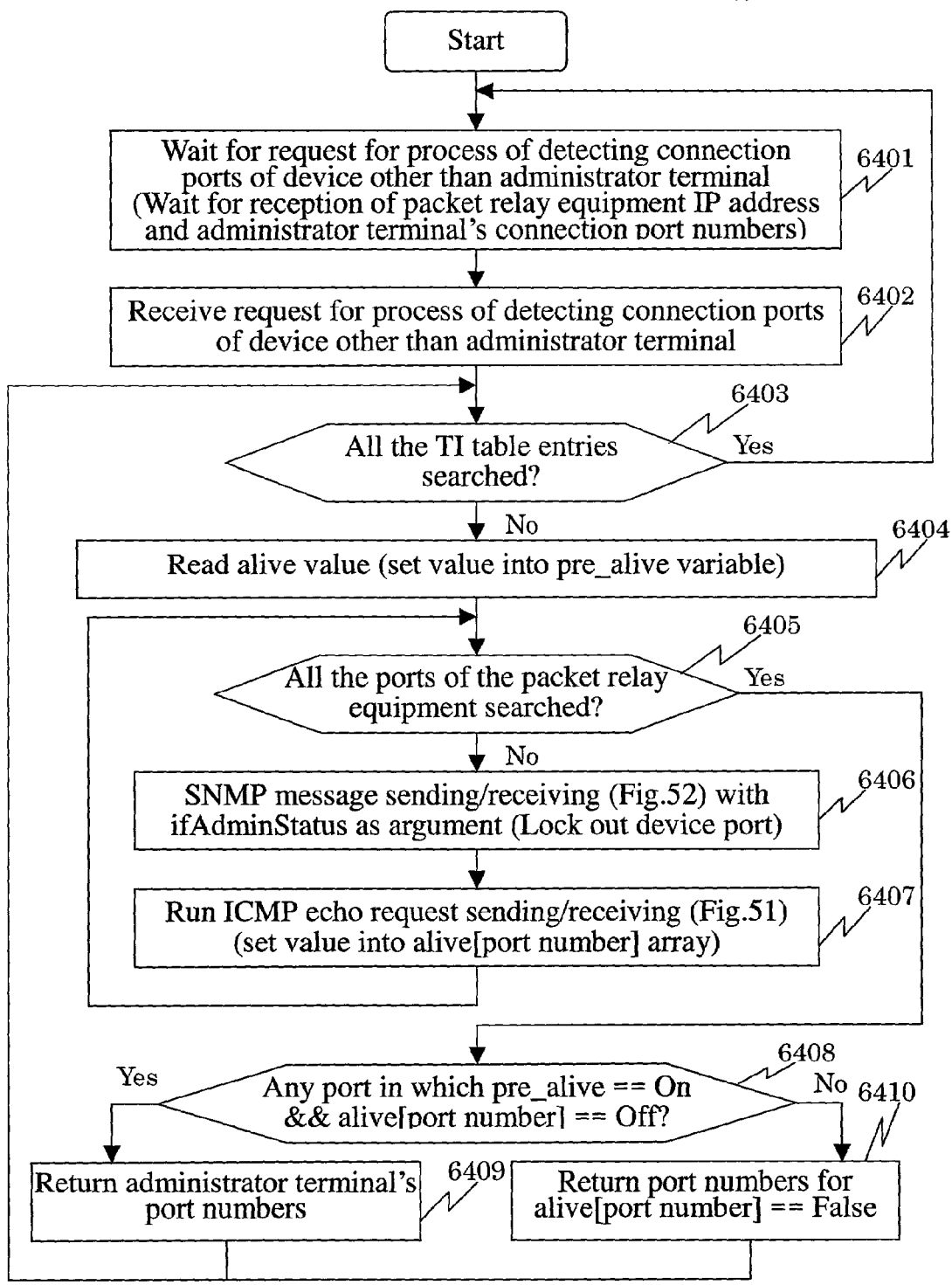
FIG. 64 is a flowchart showing a process in which the auto discovery module detects connection ports of devices other than the administrator terminal in creating the PF table, in the network configuration automatic recognition method according to the present invention.

Next, the auto discovery module 613 performs the process of detecting the connection ports of a device other than the administrator terminal in FIG. 64 (step 6204). Finally, a new entry is added to the PF table 624 (step 6205), and the processing is repeated from the step 6201.

Figure 63:
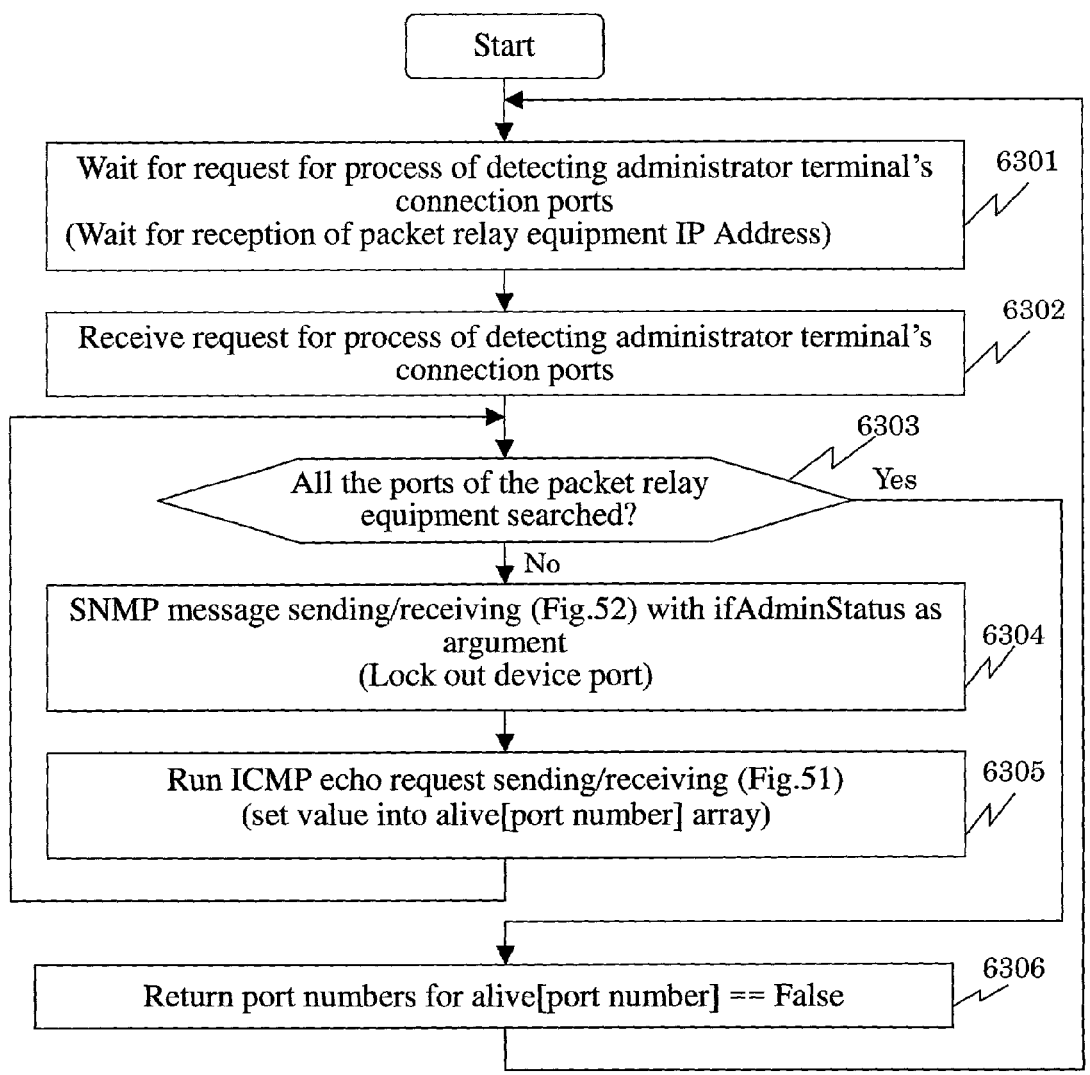
FIG. 63 is a flowchart showing a process in which the auto discovery module detects connection ports of the administrator terminal in creating the PF table, in the network configuration automatic recognition method according to the present invention.

FIG. 63 is a flowchart showing the process in which the auto discovery module 613 detects the connection ports of the administrator terminal 71 in creating the PF table 624.

The auto discovery module 613 waits for a request for the process of detecting the connection ports of the administrator terminal 71 (step 6301). When it receives the IP address value of packet relay equipment as the request for the process of detecting the connection ports of the administrator terminal 71 (step 6302), the auto discovery module 613 checks whether all the ports of the packet relay equipment specified by the IP address have been searched (step 6303). If all the ports have been searched, the auto discovery module 613 returns port numbers with which an array alive[port number] becomes "0" (False) in value (step 6306). If all the ports have not been searched, the SNMP Set-Request message sending/receiving of FIG. 52 is performed with ifAdminStatus as the key and with "0" (False) as the value, so that the corresponding port is locked out under the SNMP management protocol (step 6304).

The ICMP echo request sending/receiving of FIG. 51 is performed with the IP-address-specified packet relay equipment. If the return value is "1" (True), alive[port number] variable is set to "1." If the return value is "0" (False), alive [port number] variable is set to "0" (step 6305). Incidentally, alive[port number] is initialized to "0" (False).

After the completion of the step 6305, the processing is repeated from the step 6303. After the completion of the step 6306, the processing is repeated from the step 6301. The principle employed here is that: ICMP echo request sending/receiving is successfully conducted from the administrator terminal 71 to packet relay equipment when the ports other than those connected to the administrator terminal 71 are closed, whereas ICMP echo request sending/receiving results in no response when the ports connected to the administrator terminal 71 are closed.

FIG. 64 is a flowchart showing the process in which the auto discovery module 613 detects the connection ports of a device other than the administrator terminal in creating the PF table 624.

The auto discovery module 613 waits for a request for the process of detecting the connection ports of a device other than the administrator terminal 71 (step 6401). When it receives the IP address value of packet relay equipment and the numbers of the ports on the packet relay equipment to which the administrator terminal 71 is connected as the request for the process of detecting the connection ports of a device other than the administrator terminal 71 (step 6402), the auto discovery module 613 starts to search the TI table 623 to check for unsearched devices (step 6403). If there is any device unsearched, then the value of the alive item of its entry in the TI table 623 is set into pre_alive variable (step 6404). If none, the processing is repeated from the step 6401.

After the completion of the step 6404, the auto discovery module 613 checks whether all the ports of the IP-address-specified packet relay equipment have been searched (step 6405). If all the ports have been searched, the auto discovery module 613 checks for port numbers in which pre_alive variable is "1" (True) and alive [port number] is "0" (False) (step 6408). If all the ports have not been searched, the SNMP Set-Request message sending/receiving of FIG. 52 is performed with ifAdminStatus as the key and "0" (False) as the value, so as to lock out the corresponding port under the SNMP management protocol (step 6406). Then, the ICMP echo request sending/receiving of FIG. 51 is performed with the IP-address-specified packet relay equipment. If the return value is "1" (True), alive [port number] variable is set to "1." If the return value is "0" (False), alive [port number] variable is set to "0" (step 6407). Incidentally, alive [port number] is initialized to "0" (False).

After the completion of the step 6407, the processing is repeated from the step 6405. After the completion of the step 6408, the connected port numbers of the administrator terminal 71 are returned if there is found no port satisfying the conditions (step 6409). If ports satisfying the conditions are found, the port numbers with which alive [port number] variable becomes "0" (False) are returned (step 6410). After the completion of the step 6409 or 6410, the processing is repeated from the step 6401.

When ICMP echo requests to arbitrary devices are no longer responded after the lock-out of certain ports of packet relay equipment, these ports are the connection ports.

Figure 65:
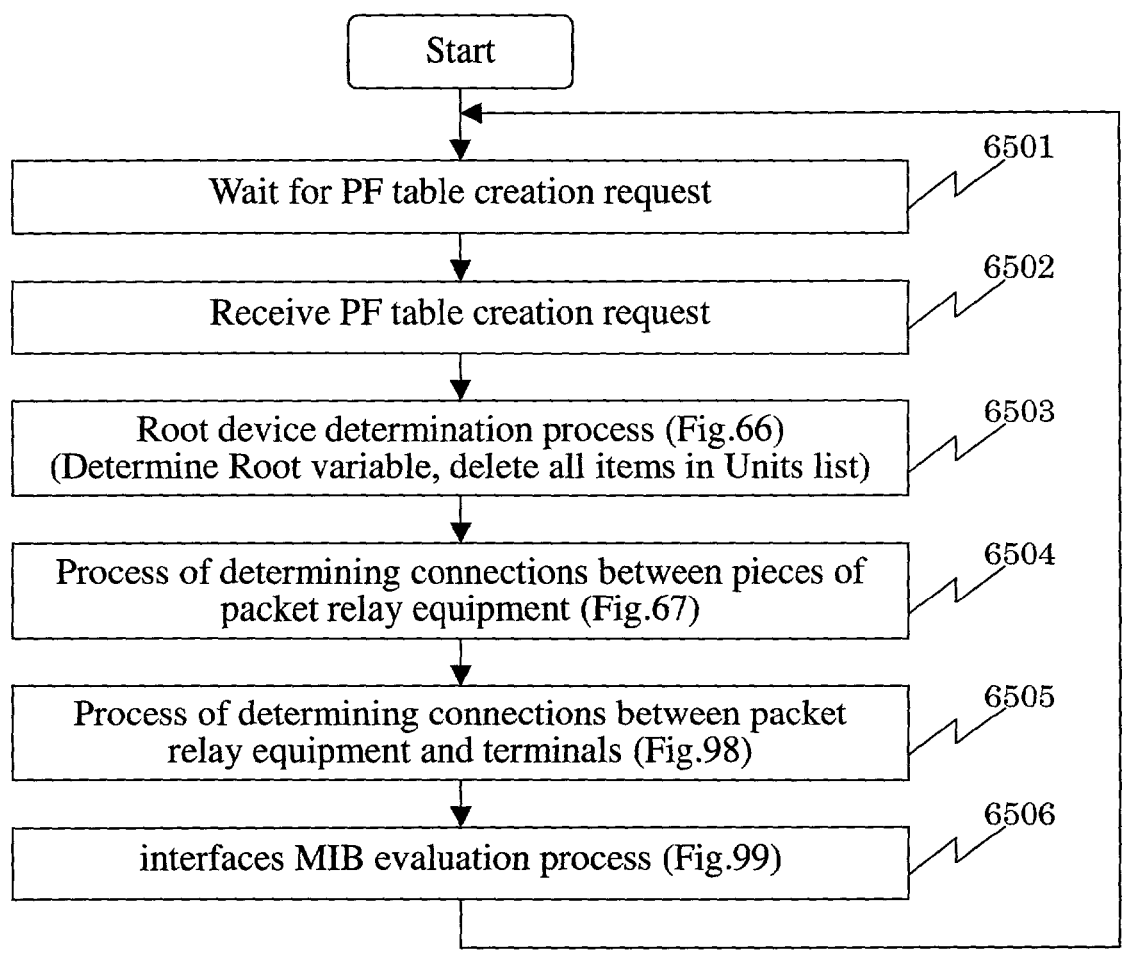
FIG. 65 is a flowchart showing a process in which the auto discovery module creates the TS table, in the network configuration automatic recognition method according to the present invention.

FIG. 65 is a flowchart showing a process in which the auto discovery module 613 creates the TS table 625.

The auto discovery module 613 waits for a request to create the PF table 624 (step 6501). Receiving the request to create the PF table 624 (step 6502), the auto discovery module 613 executes the Root device determination process of FIG. 66 so that the IP address of the Root device is set into Root variable and all the items of Units list variable are deleted for initialization (step 6503).

Figure 67:
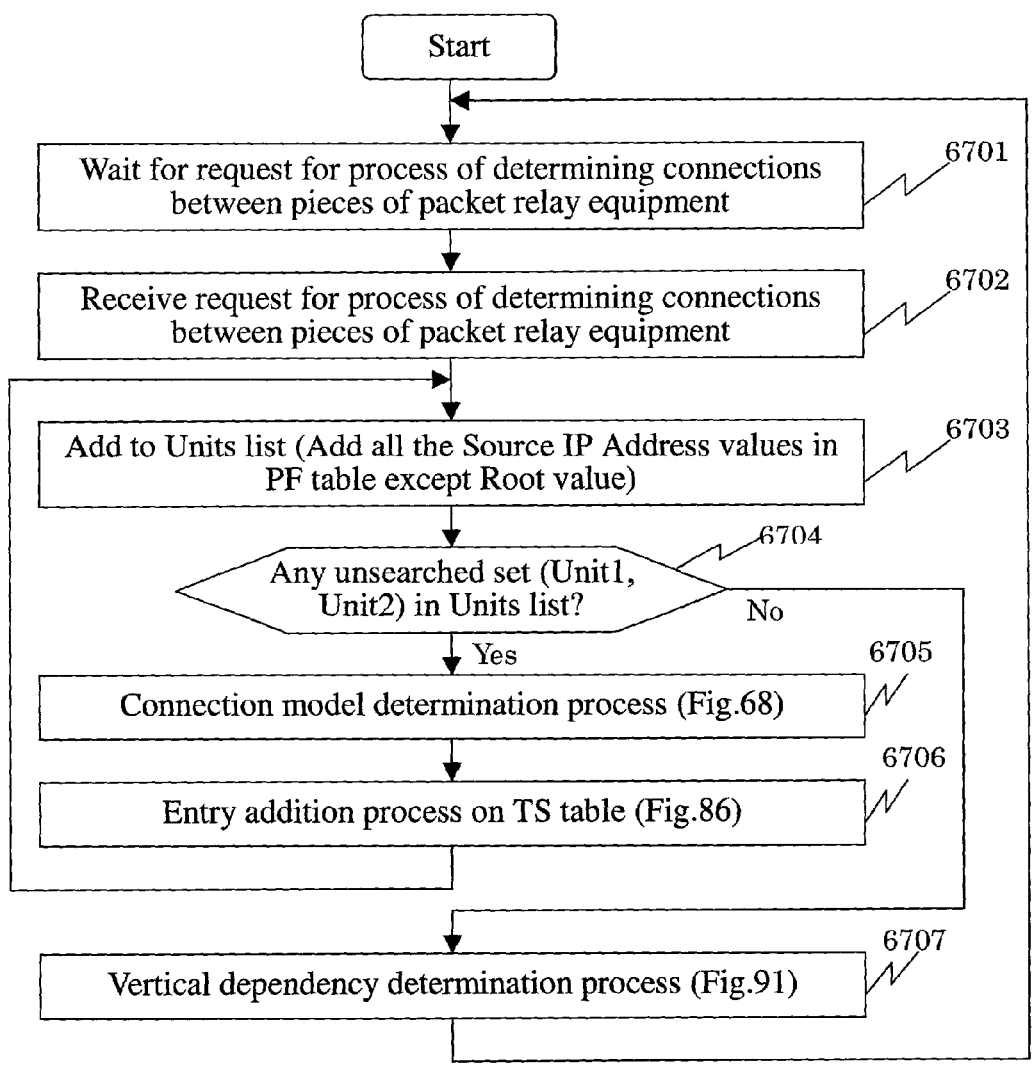
FIG. 67 is a flowchart showing a process in which the auto discovery module determines connections among pieces of packet relay equipment in creating the TS table, in the network configuration automatic recognition method according to the present invention.

Next, the auto discovery module 613 executes the process of determining the connections between pieces of packet relay equipment in FIG. 67 (step 6504). Next, the auto discovery module 613 executes the process of determining the connections between packet relay equipment and terminals in FIG. 98 (step 6505). Finally, the auto discovery module 613 executes the interfaces MIB evaluation process of FIG. 99 (step 6506), and repeats the processing from the step 6501.

Figure 66:
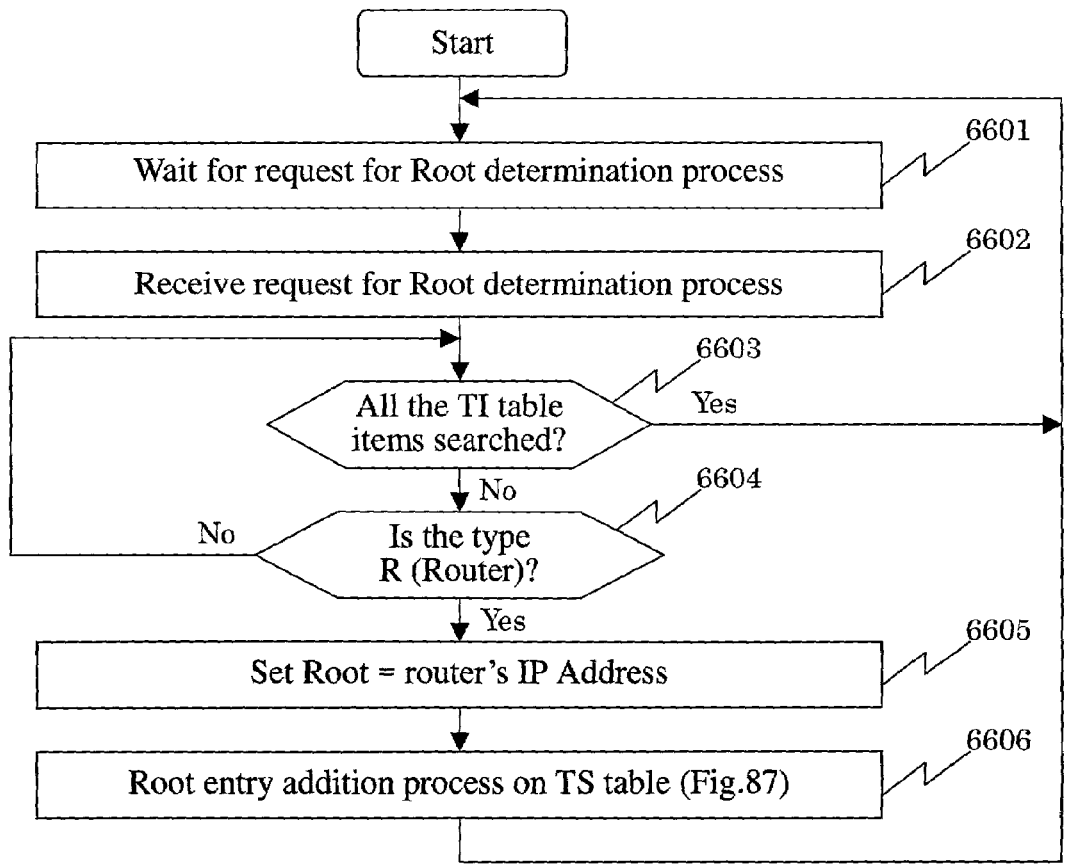
FIG. 66 is a flowchart showing a process in which the auto discovery module determines a Root device in creating the TS table, in the network configuration automatic recognition method according to the present invention.

FIG. 66 is a flowchart showing the process in which the auto discovery module 613 determines a Root device in creating the TS table 625.

The auto discovery module 613 waits for a request for the Root device determination process (step 6601), and on receiving the request for the Root device determination process (step 6602), starts to search the TI table 623 to check for unsearched devices (step 6603). If there is no unsearched device, the auto discovery module 613 repeats the processing from the step 6601. If there is any unsearched device, the auto discovery module 613 checks whether the value of the type item of the corresponding entry in the TI table 623 is R (an identifier representing a router) (step 6604). Unless the value of the type item is R, the auto discovery module 613 repeats the processing from the step 6603. If the value of the type item is R, the IP address of the router is added to Root variable (step 6605). Finally, the auto discovery module 613 executes the process of adding a Root entry to the TS table 625, shown in FIG. 87 (step 6606). After the completion of the step 6606, the processing is repeated from the step 6601.

FIG. 67 is a flowchart showing the process in which the auto discovery module 613 determines connections between pieces of packet relay equipment in creating the TS table 625.

The auto discovery module 613 waits for a request for the process of determining connections between pieces of packet relay equipment (step 6701). Receiving the request for the process of determining connection between pieces of packet relay equipment (step 6702), the auto discovery module 613 adds to Units list variable the values of the Source IP Address items of all the entries in the PF table 624, except the one identical to Root variable (step 6703).

Next, the auto discovery module 613 selects sets of combinations of arbitrary two elements from among the elements of Units list variable, and checks for an unsearched combination (set into Unit1 variable and Unit2 variable) (step 6704). If there is an unsearched combination, the auto discovery module 613 executes the connection model determination process of FIG. 68 (step 6705), executes the process of adding entries to the TS table 625 in FIG. 86 (step 6706), and then repeats the processing from the step 6704. In the connection model determination process, the connection model for the Unit1 and Unit2 is determined in the manners of FIGS. 17-24. In the process of adding entries to the TS table 625, entries are stored into the TS table 625 in the formats established for the respective connection models determined.

Figure 91:
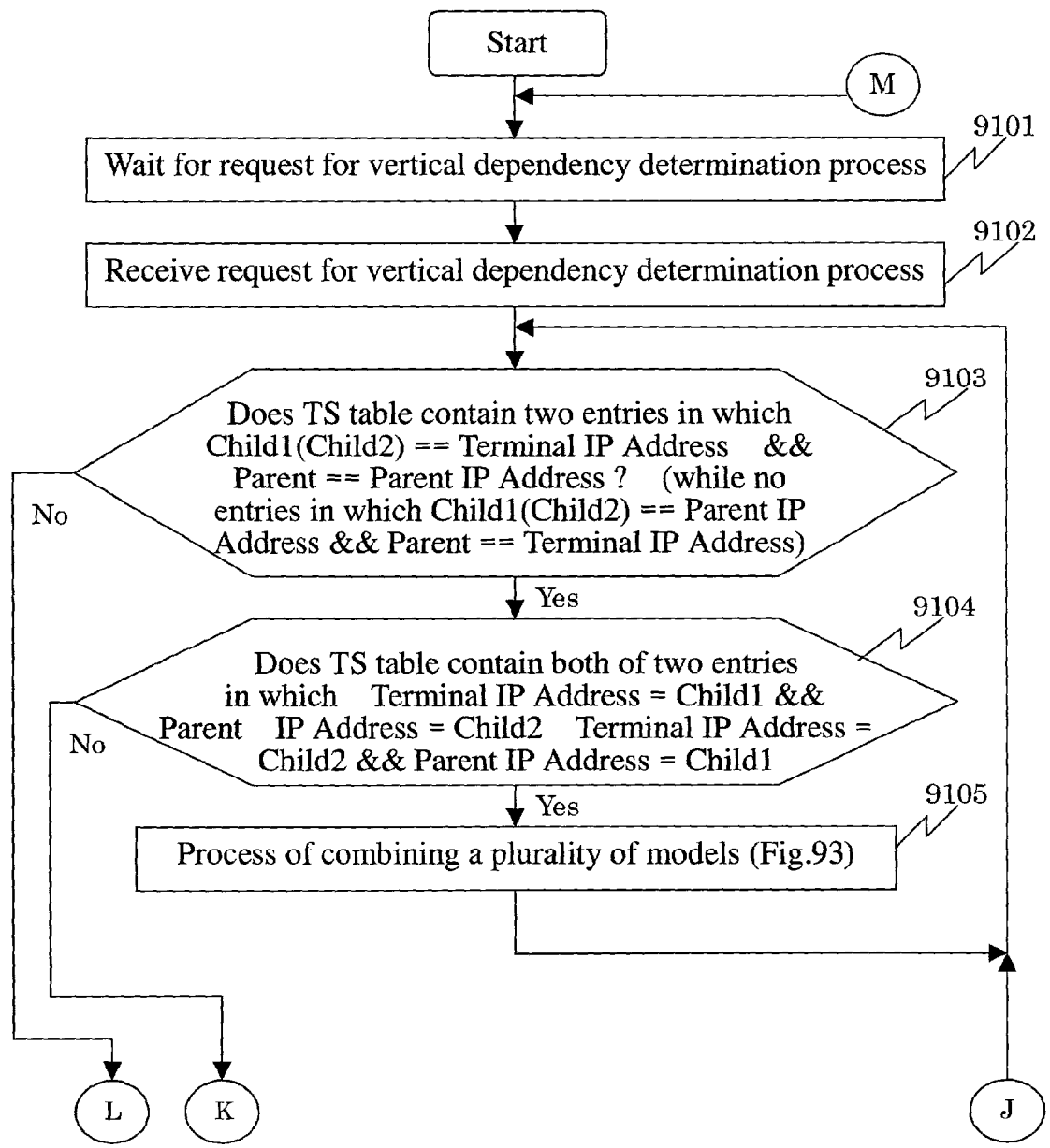
FIG. 91 is a flowchart showing a process in which the auto discovery module determines vertical dependency in creating the TS table, in the network configuration automatic recognition method according to the present invention.

If there is no unsearched combination at the step 6704, the auto discovery module 613 executes the vertical dependency determination process of FIG. 91 (step 6707), and repeats the processing from the step 6701. In the vertical dependency determination process, only the entries of vertically-dependent devices in the TS table 625 are extracted to determine the final form of the TS table 625.

Figure 68:
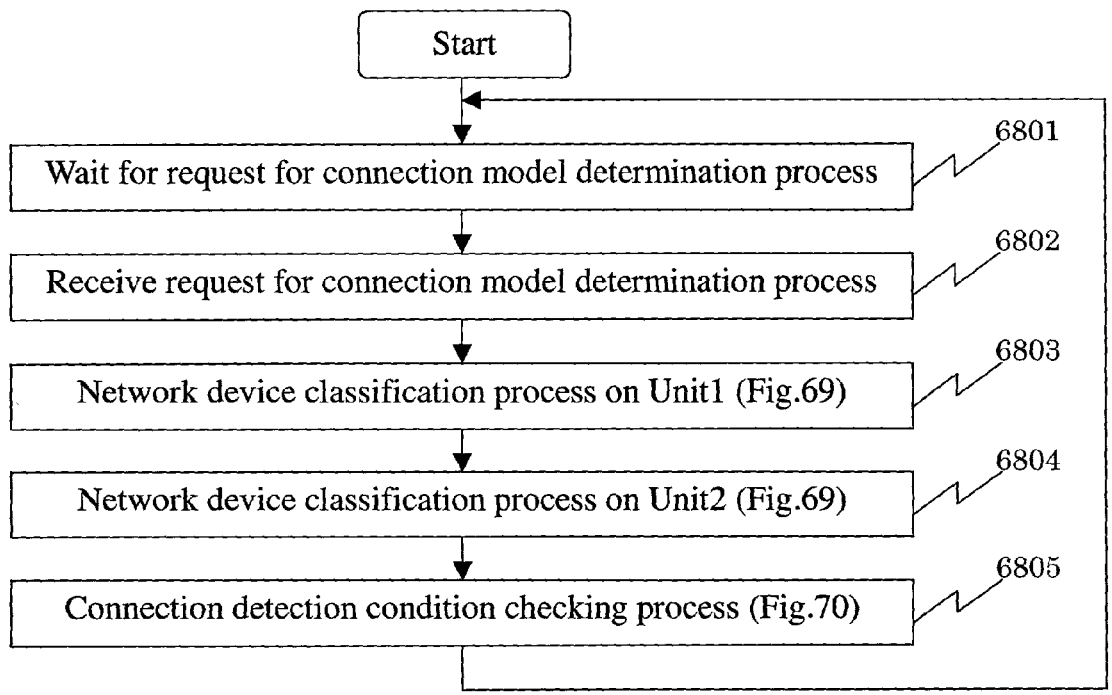
FIG. 68 is a flowchart showing a process in which the auto discovery module determines connection models in creating the TS table, in the network configuration automatic recognition method according to the present invention.

FIG. 68 is a flowchart showing the connection model determination process which the auto discovery module 613 executes in creating the TS table 625.

The auto discovery module 613 waits for a request for the connection model determination process (step 6801). Receiving the request for the connection model determination process (step 6802), the auto discovery module 613 performs network device classification on a device having the IP address identical to Unit1 variable in the method of FIG. 69 (step 6803). Similarly, the auto discovery module 613 performs network device classification on a device having the IP address identical to Unit2 variable in the method of FIG. 69 (step 6804). In the network device classification process, the auto discovery module 613 makes the classification of FIG. 16. Finally, the auto discovery module 613 executes a connection detection condition checking process of FIG. 70 (step 6805), and then repeats the processing from the step 6801. In the connection detection condition checking process, the auto discovery module 613 checks the connection detection conditions of FIGS. 25 and 26.

Figure 69:
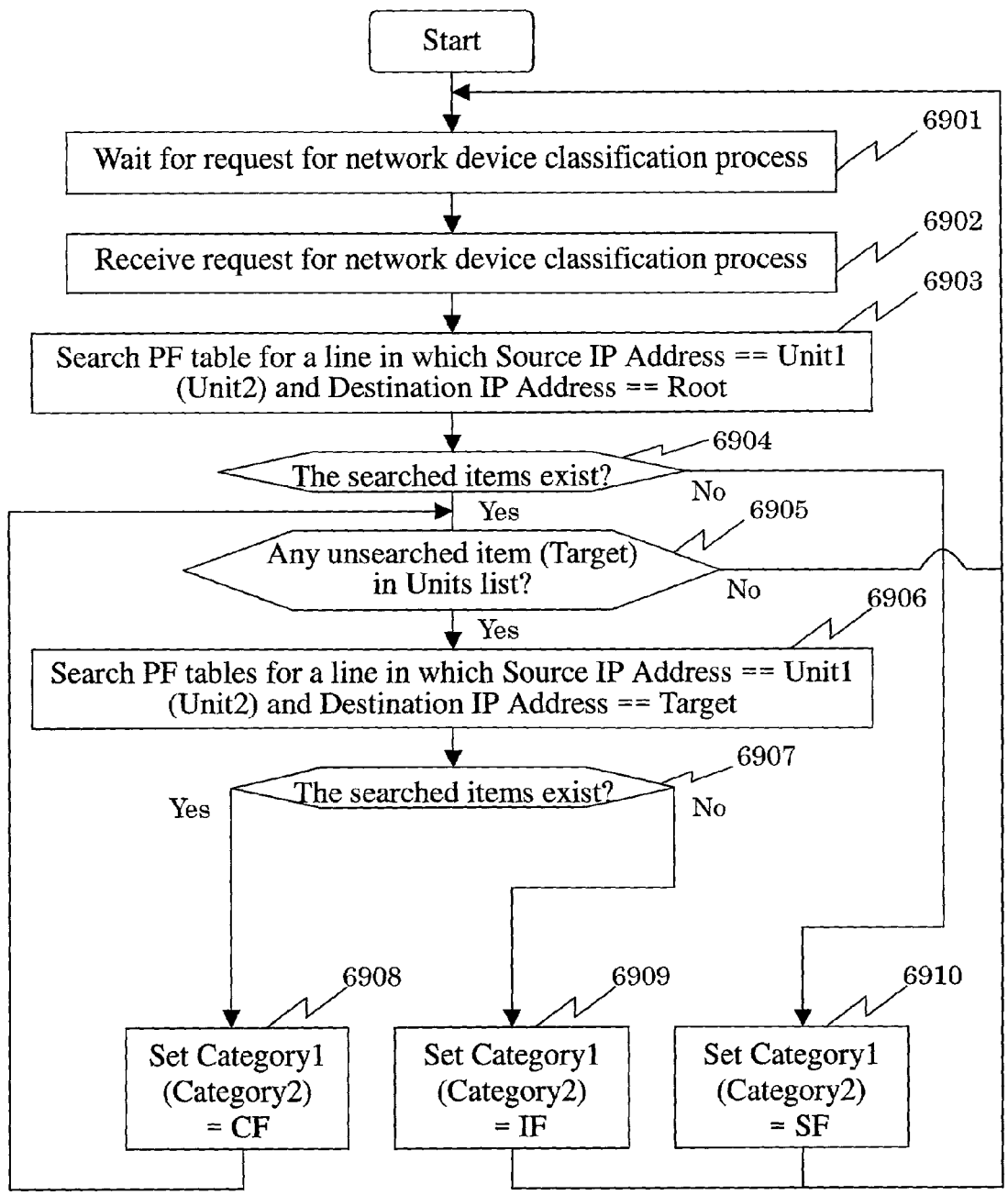
FIG. 69 is a flowchart showing a process in which the auto discovery module classifies network devices in creating the TS table, in the network configuration automatic recognition method according to the present invention.

FIG. 69 is a flowchart showing the network device classification process which the auto discovery module 613 executes in creating the TS table 625.

The auto discovery module 613 waits for a request for the network device classification process (step 6901). Receiving the request for the network device classification process (step 6902), the auto discovery module 613 searches all the entries of the PF table 624 for an entry whose Source IP Address item has the same value as Unit1 or Unit2 and whose Destination IP Address item has the same value as that of the Root variable (step 6903).

The auto discovery module 613 checks whether the searched entry exists (step 6904). If the searched entry exists at the step 6904, the auto discovery module 613 successively sets the entry of every piece of packet relay equipment included in Units list variable into Target variable, and checks whether this Target variable is unsearched one (step 6905).

If the searched entry does not exist at the step 6904 and if the value of the Source IP Address item is equal to Unit1 at the step 6903 as well, then SF is set into Category1 variable (step 6910). If the value of the Source IP Address item is equal to Unit2 at the step 6903, then SF is set into Category2 variable (step 6910).

If Target variable is unsearched one at the step 6905, the auto discovery module 613 searches all the entries of the PF table 624 for an entry whose Source IP Address item has the same value as Unit1 or Unit2 and whose Destination IP Address item has the same value as Target variable (step 6906).

If there is no unsearched Target variable at the step 6905, the auto discovery module 613 returns to the step 6901. Next, the auto discovery module 613 checks whether the searched items of the step 6906 exist (step 6907). If the searched items exist at the step 6907 and if the value of the Source IP Address item is equal to Unit1 at the step 6903 as well, then CF is set into Category1 variable (step 6908). If the value of the Source IP Address item is equal to Unit2 at the step 6903, then CF is set into Category2 variable (step 6908).

If the searched items do not exist at the step 6907 and is the value of the Source IP Address item is equal to Unit1 at the step 6903 as well, then IF is set into Category1 variable (step 6909). If the value of the Source IP Address item is equal to Unit2 at the step 6903, then IF is set into Category2 variable (step 6909).

That is, CF is set when the connection information covers all the devices included in Units list variable; IF is set when the connection information lacks even a single device.

Figure 70:
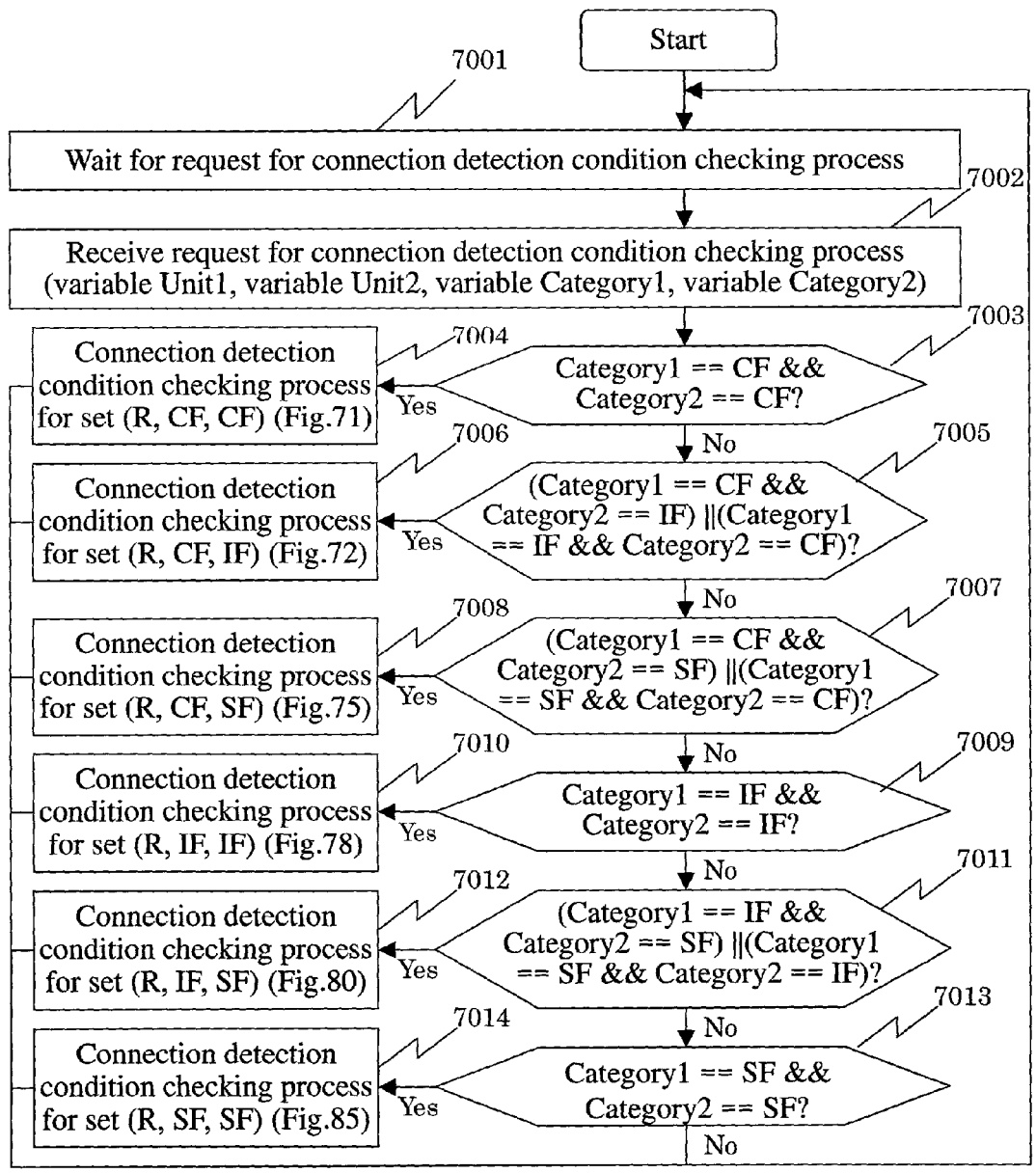
FIG. 70 is a flowchart showing a process in which the auto discovery module checks connection detection conditions in creating the TS table, in the network configuration automatic recognition method according to the present invention.

FIG. 70 is a flowchart showing the connection detection condition checking process which the auto discovery module 613 executes in creating the TS table 625.

The auto discovery module 613 waits for a request for the connection detection condition checking process (step 7001). As the request for connection detection condition checking process, the auto discovery module 613 receives Unit1 and Unit2 variables, which contain the IP addresses of two pieces of packet relay equipment, and Category1 and Category2 variables, which contain the classifications of the two pieces of packet relay equipment (step 7002). Then, it checks whether Category1 variable equals to CF and Category2 variable equals to CF (step 7003).

Figure 71:
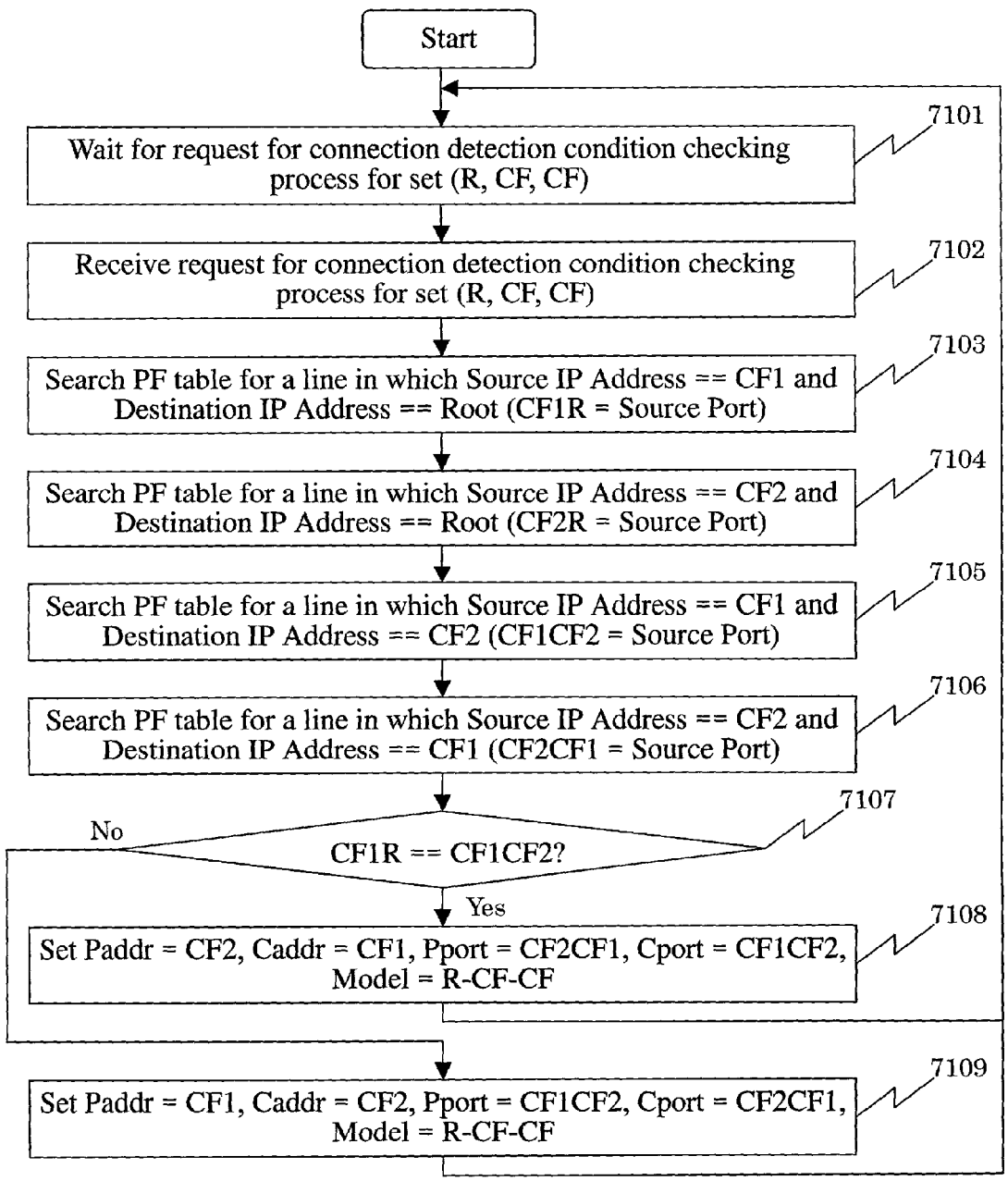
FIG. 71 is a flowchart showing a process in which the auto discovery module checks the connection detection conditions for a set (R, CF, CF) in creating the TS table, in the network configuration automatic recognition method according to the present invention.

If Category1 variable equals to CF and Category2 variable equals to CF at the step 7003, then the auto discovery module 613 executes the connection detection condition checking process for a set (R, CF, CF) in FIG. 71 (step 7004), and returns to the step 7001.

If the condition that Category1 variable equal to CF and Category2 variable equal to CF is not satisfied at the step 7002, the auto discovery module 613 checks whether Category1 variable equals to CF and Category2 variable equals to IF, or Category1 variable equals to IF and Category2 variable equals to CF (step 7005). If Category1 variable equals to CF and Category2 variable equals to IF, or Category1 variable equals to IF and Category2 variable equals to CF at the step 7005, then the auto discovery module 613 executes the connection detection condition checking process for a set (R, CF, IF) in FIG. 72 (step 7006), and returns to the step 7001.

If neither of the conditions that Category1 variable equal to CF and Category2 variable equal to IF and that Category1 variable equal to IF and Category2 variable equal to CF is satisfied at the step 7005, the auto discovery module 613 checks whether Category1 variable equals to CF and Category2 variable equals to SF, or Category1 variable equals to SF and Category2 variable equals to CF (step 7007). If Category1 variable equals to CF and Category2 variable equals to SF, or Category1 variable equals to SF and Category2 variable equals to CF at the step 7007, then the auto discovery module 613 executes the connection detection condition checking process for a set (R, CF, SF) in FIG. 75 (step 7008), and returns to the step 7001.

If neither of the conditions that Category1 variable equal to CF and Category2 variable equal to SF and that Category1 variable equal to SF and Category2 variable equal to CF is satisfied at the step 7007, the auto discovery module 613 checks whether Category1 variable equals to IF and Category2 variable equals to IF (step 7009). If Category1 variable equals to IF and Category2 variable equals to IF at the step 7009, then the auto discovery module 613 executes the connection detection condition checking process for a set (R, IF, IF) in FIG. 78 (step 7010), and returns to the step 7001. If the condition that Category1 variable equal to IF and Category2 variable equal to IF is not satisfied at the step 7009, the auto discovery module 613 checks whether Category1 variable equals to IF and Category2 variable equals to SF, or Category1 variable equals to SF and Category2 variable equals to IF (step 7011).

Figure 80:
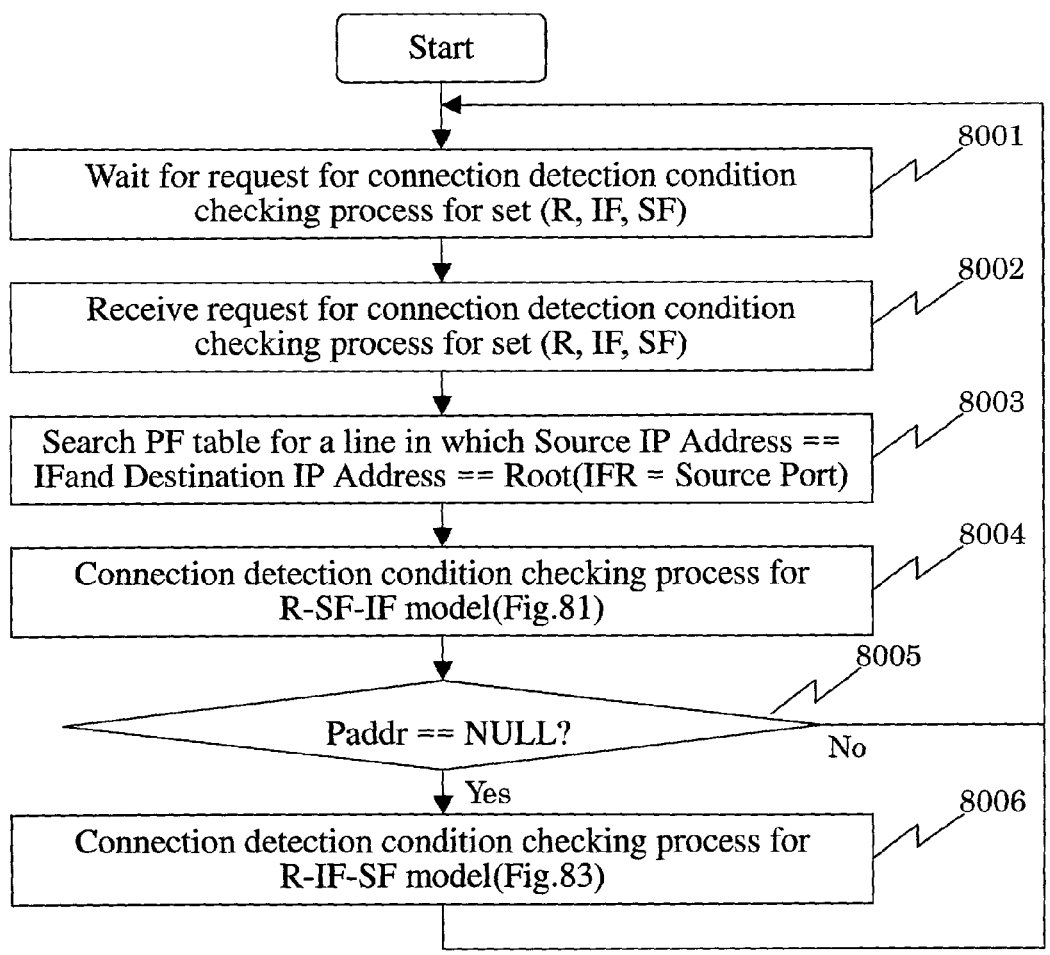
FIG. 80 is a flowchart showing a process in which the auto discovery module checks the connection detection conditions for a set (R, IF, SF) in creating the TS table, in the network configuration automatic recognition method according to the present invention.

If Category1 variable equals to IF and Category2 variable equals to SF, or Category1 variable equals to SF and Category2 variable equals to IF at the step 7011, then the auto discovery module 613 executes the connection detection condition checking process for a set (R, IF, SF) in FIG. 80 (step 7012), and returns to the step 7001.

If neither of the conditions that Category1 variable equal to IF and Category2 variable equal to SF and that Category1 variable equal to SF and Category2 variable equal to IF is satisfied at the step 7011, the auto discovery module 613 checks whether Category1 variable equals to SF and Category2 variable equals to SF (step 7013). If Category1 variable equals to SF and Category2 variable equals to SF at the step 7013, then the auto discovery module 613 executes the connection detection condition checking process for a set (R, SF, SF) in FIG. 85 (step 7014), and returns to the step 7001. If the condition that Category1 variable equal to SF and Category2 variable equal to SF is not satisfied at the step 7013, the auto discovery module 613 returns to the step 7001.

FIG. 71 is a flowchart showing the connection detection condition checking process for a set (R, CF, CF), to be executed by the auto discovery module 613 in creating the TS table 625.

The auto discovery module 613 waits for a request for the connection detection condition checking process for a set (R, CF, CF) (step 7101). Receiving the request for the connection detection condition checking process for a set (R, CF, CF) (step 7102), the auto discovery module 613 searches all the entries of the PF table 624 for an entry whose Source IP Address item has the same value as CF1 variable (identical to Unit1 variable) and whose Destination IP Address item has the same value as Root variable. The value of the Source Port item of that entry is set into CF1R variable (step 7103).

Similarly, the auto discovery module 613 searches all the entries of the PF table 624 for an entry whose Source IP Address item has the same value as CF2 variable (identical to the Unit2 value) and whose Destination IP Address item has the same value as Root variable, and sets the value of the Source Port item of that entry into CF2R variable (step 7104).

Moreover, the auto discovery module 613 searches all the entries of the PF table 624 for an entry whose Source IP Address item has the same value as CF1 variable (identical to Unit1 variable) and whose Destination IP Address item has the same value as CF2 variable (identical to Unit2 variable), and sets the value of the Source Port item of that entry into CF1CF2 variable (step 7105).

Similarly, the auto discovery module 613 searches all the entries of the PF table 624 for an entry whose Source IP Address item has the same value as CF2 variable (identical to Unit2 variable) and whose Destination IP Address item has the same value as CF1 variable (identical to Unit1 variable), and sets the value of the Source Port item of that entry into CF2CF1 variable (step 7106). The value of CF1R variable and the value of CF1CF2 variable are compared with each other (step 7107) to check whether the R and the CF2 are connected to different ports when seen from the CF1 (a comparison between CF2R variable and CF2CF1 variable is also available).

If CF1R variable and CF1CF2 variable are identical in value at the step 7107, the auto discovery module 613 sets the value of CF2 variable into Paddr variable, the value of CF1 variable to Caddr variable, the value of CF2CF1 variable into Pport variable, the value of CF1CF2 variable into Cport variable, and R-CF-CF into Model variable (step 7108), and returns to the step 7101.

If CF1R variable and CF1CF2 variable are not identical in value at the step 7107, the auto discovery module 613 sets the value of CF1 variable into Paddr variable, the value of CF2 variable to Caddr variable, the value of CF1CF2 variable into Pport variable, the value of CF2CF1 variable into Cport variable, and R-CF-CF into Model variable (step 7109), and returns to the step 7101. In FIG. 25, the R-CF-CF model has no connection detection condition; therefore, the connection detection in FIG. 71 is performed by the method of FIG. 17.

Figure 72:
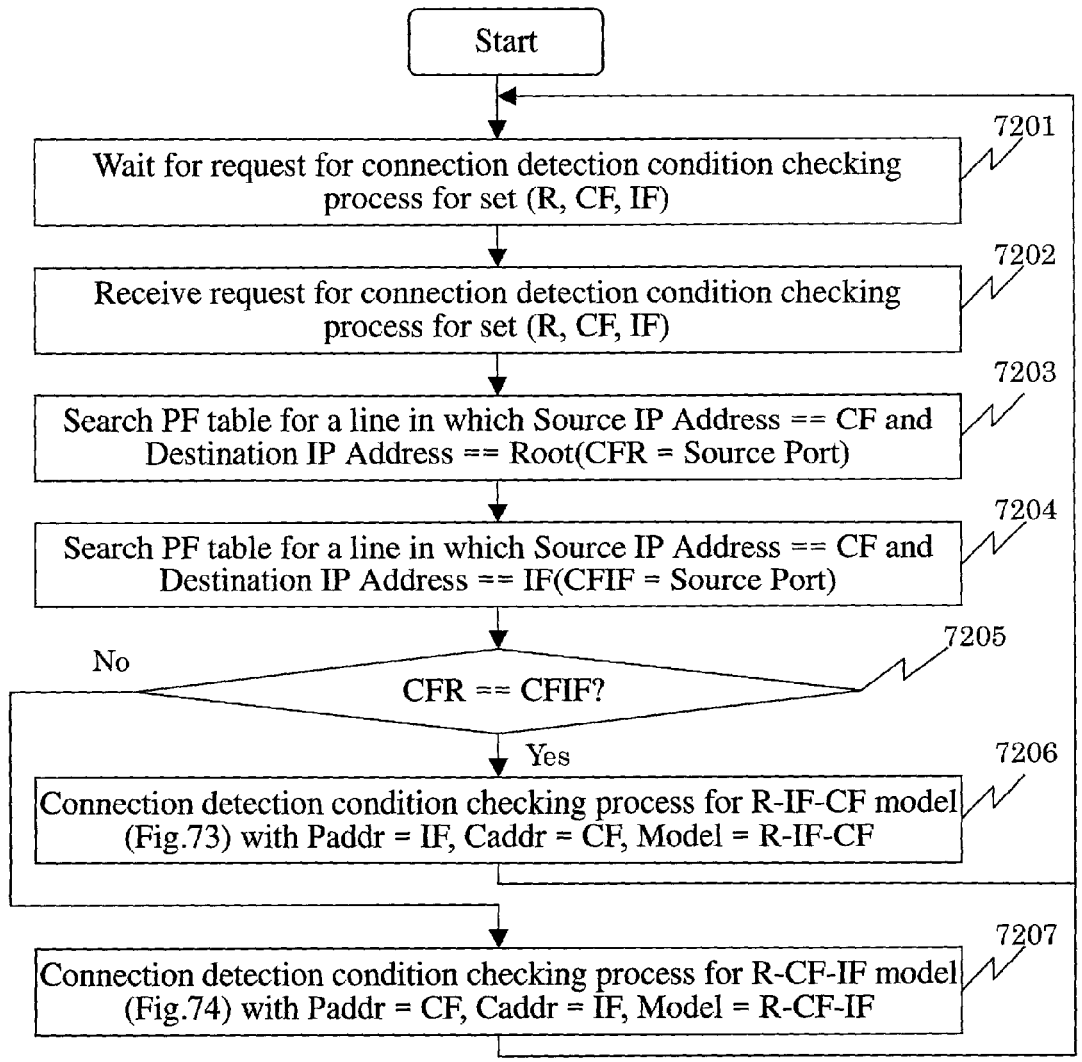
FIG. 72 is a flowchart showing a process in which the auto discovery module checks the connection detection conditions for a set (R, CF, IF) in creating the TS table, in the network configuration automatic recognition method according to the present invention.

FIG. 72 is a flowchart showing the connection detection condition checking process for a set (R, CF, IF), to be executed by the auto discovery module 613 in creating the TS table 625.

The auto discovery module 613 waits for a request for the connection detection condition checking process for a set (R, CF, IF) (step 7201). Receiving the request for the connection detection condition checking process for a set (R, CF, IF) (step 7202), the auto discovery module 613 searches all the entries of the PF table 624 for an entry whose Source IP Address item has the same value as CF variable (a device of either Unit1 variable or Unit2 variable, recognized to be a CF) and whose Destination IP Address item has the same value as Root variable. The value of the Source Port item of that entry is set into CFR variable (step 7203).

Similarly, the auto discovery module 613 searches all the entries of the PF table 624 for an entry whose Source IP Address item has the same value as CF variable (the device of either Unit1 variable or Unit2 variable, recognized to be a CF) and whose Destination IP Address item has the same value as IF variable (a device of either Unit1 variable or Unit2 variable, recognized to be an IF), and sets the value of the Source Port item of that entry into CFIF variable (step 7204). The value of CFR variable and the value of CFIF variable are compared with each other (step 7205) to check whether the R and the IF are connected to different ports when seen from the CF.

If CFR variable and CFIF variable are identical in value at the step 7205, the auto discovery module 613 sets the value of IF variable into Paddr variable, the value of CF variable into Caddr variable, and R-IF-CF into Model variable. Then, the auto discovery module 613 executes the connection detection condition checking process for the R-IF-CF model in FIG. 73 (step 7206), and returns to the step 7201.

If CFR variable and CFIF variable are not identical in value at the step 7205, the auto discovery module 613 sets the value of CF variable into Paddr variable, the value of IF variable into Caddr variable, and R-CF-IF into Model variable. The auto discovery module 613 executes the connection detection condition checking process for the R-CF-IF model in FIG. 74 (step 7207), and returns to the step 7201.

Figure 73:
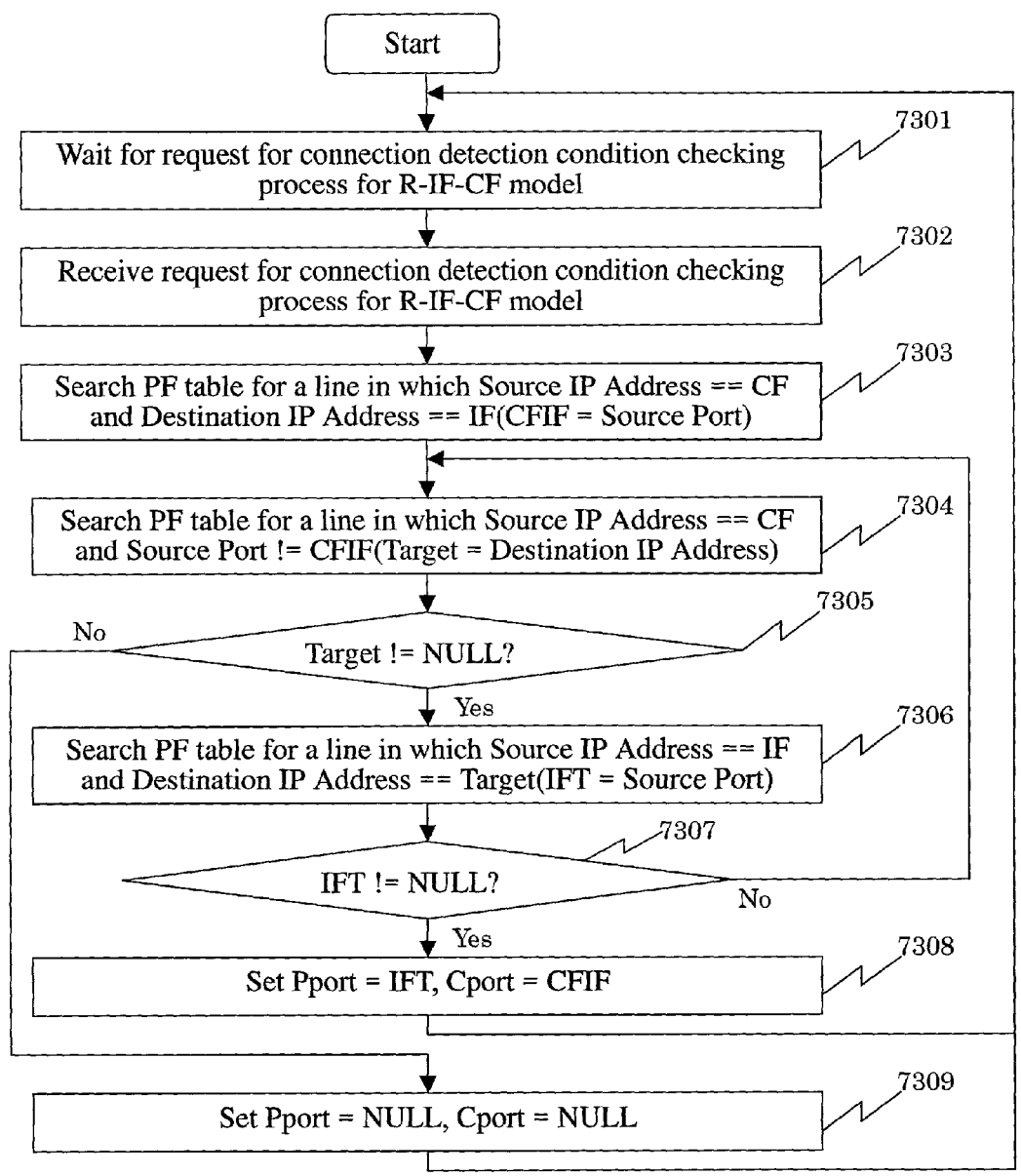
FIG. 73 is a flowchart showing a process in which the auto discovery module checks the connection detection conditions for an R-IF-CF model in creating the TS table, in the network configuration automatic recognition method according to the present invention.

FIG. 73 is a flowchart showing the connection detection condition checking process for the R-IF-CF model, to be executed by the auto discovery module 613 in creating the TS table 625.

The auto discovery module 613 waits for a request for the connection detection condition checking process for the R-IF-CF model (step 7301). Receiving the request for the connection detection condition checking process for the R-IF-CF model (step 7302), the auto discovery module 613 searches all the entries of the PF table 624 for an entry whose Source IP Address item has the same value as CF variable (the device of either Unit1 variable or Unit2 variable, recognized to be a CF in FIG. 72) and whose Destination IP Address item has the same value as IF variable (the device of either Unit1 variable or Unit2 variable, recognized to be an IF in FIG. 72). The value of the Source Port item of that entry is set into CFIF variable (step 7303).

Similarly, the auto discovery module 613 searches all the entries of the PF table 624 for an entry whose Source IP Address item has the same value as CF variable (the device of either Unit1 variable or Unit2 variable, recognized to be CF) and whose Source Port item has a value different from CFIF variable, and sets the value of the Destination IP Address item of that entry into Target variable (step 7304). The auto discovery module 613 successively obtains every Target variable in the step 7304, and checks whether the value of Target variable differs from a NULL value (step 7305).

If Target variable differs from a NULL value at the step 7305, the auto discovery module 613 searches all the entries of the PF table 624 for an entry whose Source IP Address item has the same value as IF variable (the device of either Unit1 variable or Unit2 variable, recognized to be an IF in FIG. 72) and whose Destination IP Address item has the same value as Target variable. The value of the Source Port item of that entry is set into IFT variable (step 7306).

If Target variable equals to a NULL value at the step 7305, the auto discovery module 613 sets a NULL value into both Pport variable and Cport variable (step 7309), and returns to the step 7301.

The auto discovery module 613 checks whether a hit entry exists at the step 7306 and the value of IFT variable differs from NULL (step 7307). If the value of IFT variable differs from NULL at the step 7307, the auto discovery module 613 sets the value of IFT variable into Pport variable and the value of CFIF variable into Cport variable (step 7308), and returns to the step 7301.

If the value of IFT variable equals to NULL at the step 7307, the processing is repeated from the step 7304. In the flow of FIG. 73, connections are detected by the method of FIG. 19 under the connection detection conditions for the R-IF-CF model in FIGS. 25 and 26.

Figure 74:
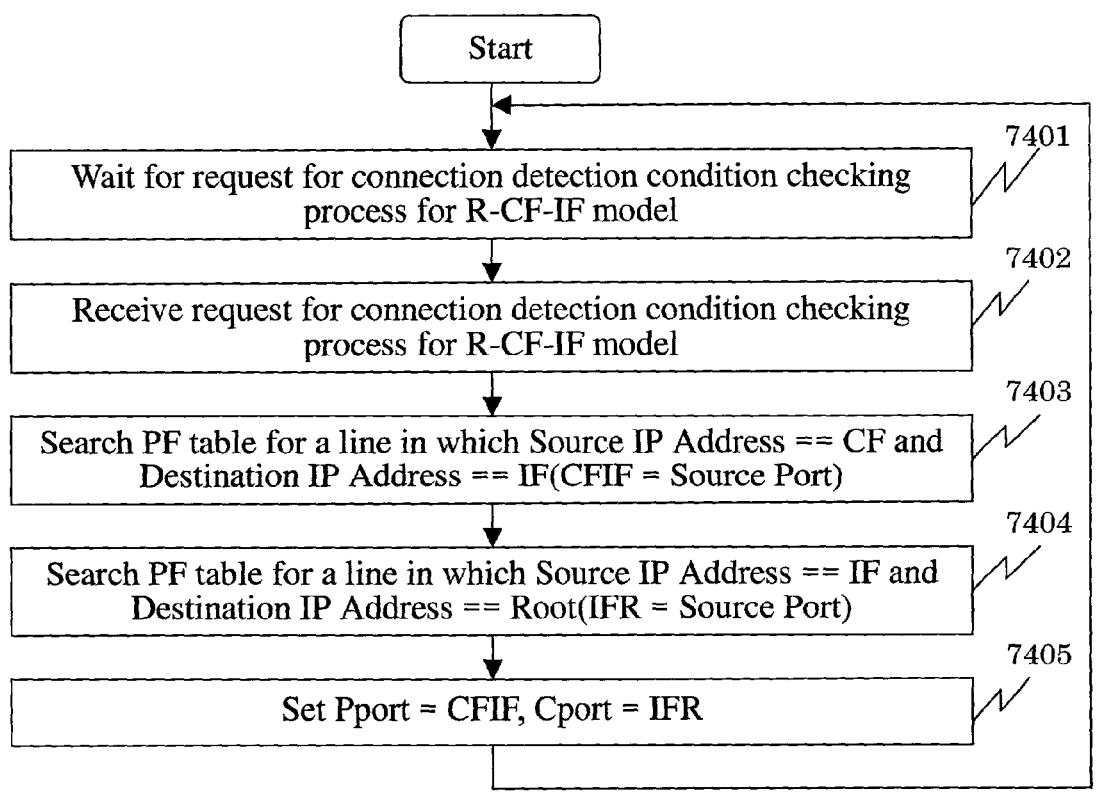
FIG. 74 is a flowchart showing a process in which the auto discovery module checks the connection detection conditions for an R-CF-IF model in creating the TS table, in the network configuration automatic recognition method according to the present invention.

FIG. 74 is a flowchart showing the connection detection condition checking process for the R-CF-IF model, to be executed by the auto discovery module 613 in creating the TS table 625.

The auto discovery module 613 waits for a request for the connection detection condition checking process for the R-CF-IF model (step 7401). Receiving the request for the connection detection condition checking process for the R-CF-IF model (step 7402), the auto discovery module 613 searches all the entries of the PF table 624 for an entry whose Source IP Address item has the same value as CF variable (the device of either Unit1 variable or Unit2 variable, recognized to be a CF in FIG. 72) and whose Destination IP Address item has the same value as IF variable (the device of either Unit1 variable or Unit2 variable, recognized to be an IF in FIG. 72). The value of the Source Port item of that entry is set into CFIF variable (step 7403).

Similarly, the auto discovery module 613 searches all the entries of the PF table 624 for an entry whose Source IP Address item has the same value as IF variable (the device of either Unit1 variable or Unit2 variable, recognized to be an IF) and whose Destination IP Address item has the same value as Root variable, and sets the value of the Source Port item of that entry into IFR variable (step 7404).

Finally, the auto discovery module 613 sets the value of CFIF variable into Pport variable and the value of IFR variable into Cport variable (step 7405), and returns to the step 7401. In FIGS. 25 and 26, the R-CF-IF model has no connection detection condition; therefore, the connection detection in the flow of FIG. 74 is performed by the method of FIG. 17.

Figure 75:
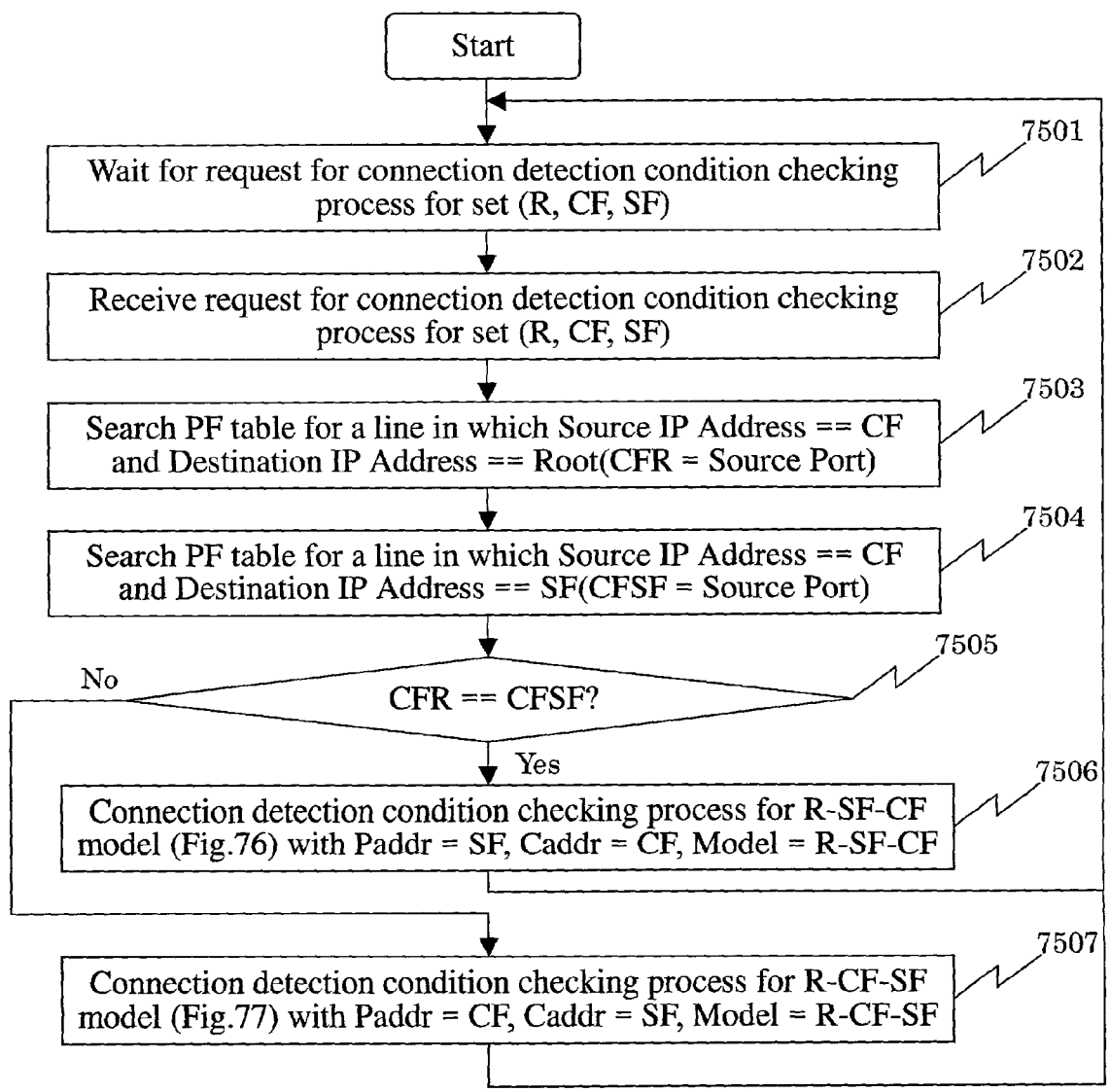
FIG. 75 is a flowchart showing a process in which the auto discovery module checks the connection detection conditions for a set (R, CF, SF) in creating the TS table, in the network configuration automatic recognition method according to the present invention.

FIG. 75 is a flowchart showing the connection detection condition checking process for a set (R, CF, SF), to be executed by the auto discovery module 613 in creating the TS table 625.

The auto discovery module 613 waits for a request for the connection detection condition checking process for a set (R, CF, SF) (step 7501). Receiving the request for the connection detection condition checking process for a set (R, CF, SF) (step 7502), the auto discovery module 613 searches all the entries of the PF table 624 for an entry whose Source IP Address item has the same value as CF variable (a device of either Unit1 variable or Unit2 variable, recognized to be a CF) and whose Destination IP Address item has the same value as Root variable. The value of the Source Port item of that entry is set into CFR variable (step 7503).

Similarly, the auto discovery module 613 searches all the entries of the PF table 624 for an entry whose Source IP Address item has the same value as CF variable (the device of either Unit1 variable or Unit2 variable, recognized to be a CF) and whose Destination IP Address item has the same value as SF variable (a device of either Unit1 variable or Unit2 variable, recognized to be an SF), and sets the value of the Source Port item of that entry into CFSF variable (step 7504). The value of CFR variable and the value of CFSF variable are compared with each other (step 7505) to check whether the R and the SF are connected to different ports when seen from the CF.

If CFR variable and CFSF variable are identical in value at the step 7505, the auto discovery module 613 sets the value of SF variable into Paddr variable, the value of CF variable into Caddr variable, and R-SF-CF into Model variable. Then, the auto discovery module 613 executes the connection detection condition checking process for the R-SF-CF model shown in FIG. 76 (step 7506), and returns to the step 7501.

Figure 77:
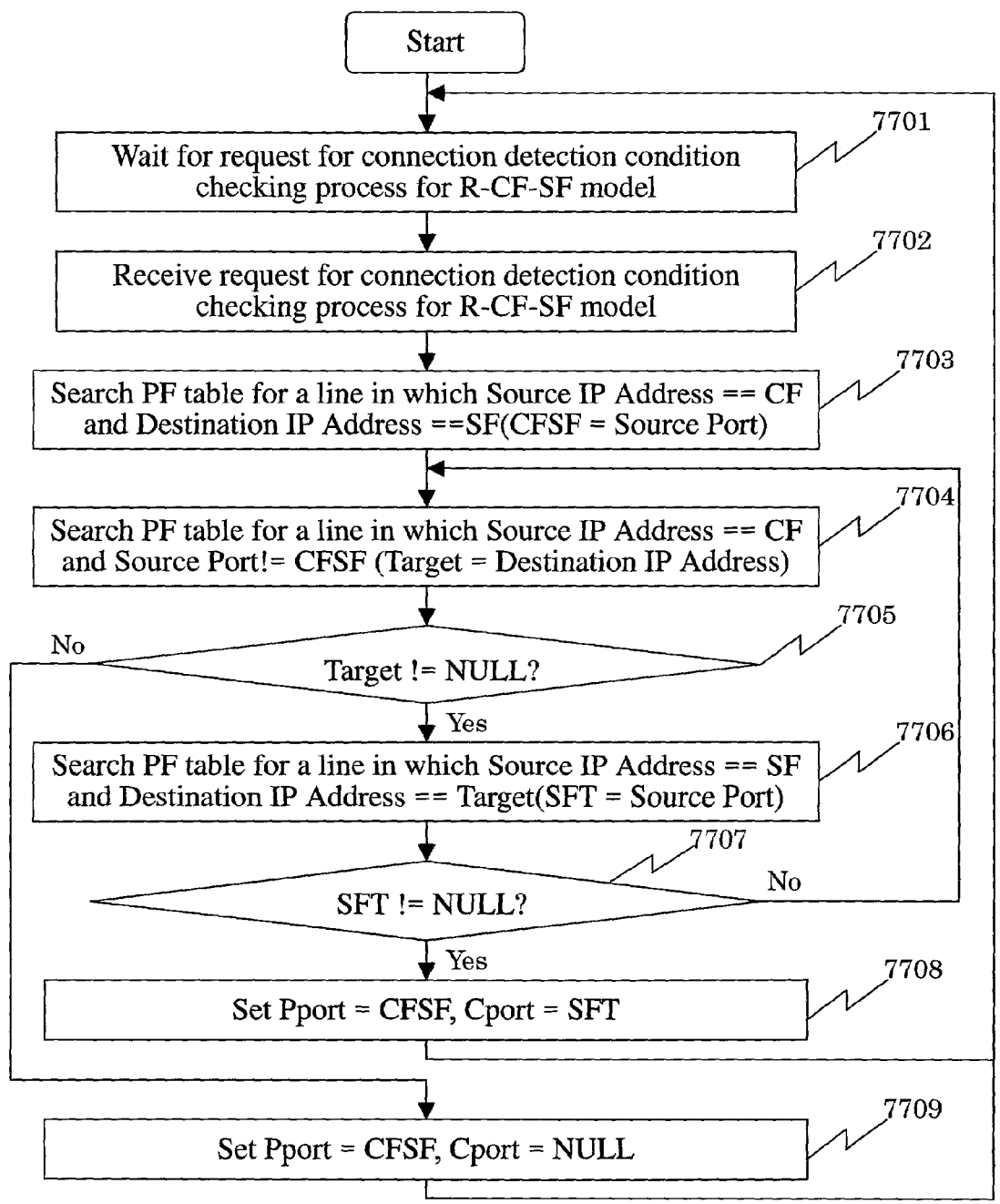
FIG. 77 is a flowchart showing a process in which the auto discovery module checks the connection detection conditions for an R-CF-SF model in creating the TS table, in the network configuration automatic recognition method according to the present invention.

If CFR variable and CFSF variable are not identical in value at the step 7505, the auto discovery module 613 sets the value of CF variable into Paddr variable, the value of SF variable into Caddr variable, and R-CF-SF into Model variable, executes the connection detection condition checking process for the R-CF-SF model shown in FIG. 77 (step 7507), and returns to the step 7501.

Figure 76:
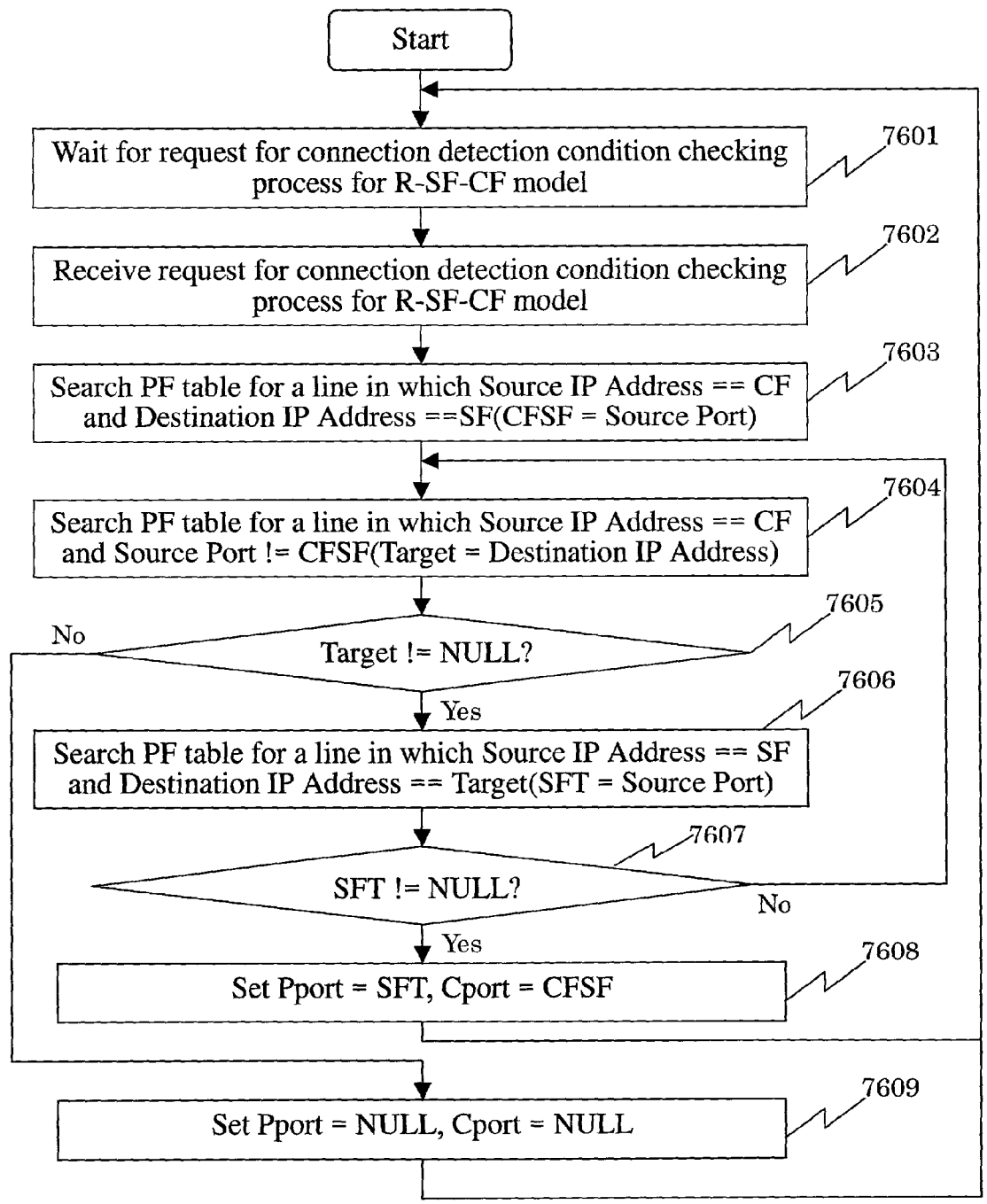
FIG. 76 is a flowchart showing a process in which the auto discovery module checks the connection detection conditions for an R-SF-CF model in creating the TS table, in the network configuration automatic recognition method according to the present invention.

FIG. 76 is a flowchart showing the connection detection condition checking process for the R-SF-CF model, to be executed by the auto discovery module 613 in creating the TS table 625.

The auto discovery module 613 waits for a request for the connection detection condition checking process for the R-SF-CF model (step 7601). Receiving a request for the connection detection condition checking process for the R-SF-CF model (step 7602), the auto discovery module 613 searches all the entries of the PF table 624 for an entry whose Source IP Address item has the same value as CF variable (the device of either Unit1 variable or Unit2 variable, recognized to be a CF in FIG. 75) and whose Destination IP Address item has the same value as SF variable (the device of either Unit1 variable or Unit2 variable, recognized to be an SF in FIG. 75). The value of the Source Port item of that entry is set into CFSF variable (step 7603).

Similarly, the auto discovery module 613 searches all the entries of the PF table 624 for an entry whose Source IP Address item has the same value as CF variable (the device of either Unit1 variable or Unit2 variable, recognized to be a CF) and whose Source Port item has a value different from CFSF variable, and sets the value of the Destination IP Address item of that entry into Target variable (step 7604).

The auto discovery module 613 successively obtains every Target variable in the step 7604, and checks whether the value of Target variable differs from a NULL value (step 7605). If Target variable differs from a NULL value at the step 7605, the auto discovery module 613 searches all the entries in the PF table 624 for an entry whose Source IP Address item has the same value as SF variable (the device of either Unit1 variable or Unit2 variable, recognized to be an SF in FIG. 75) and whose Destination IP Address item has the same value as Target variable. The value of the Source Port item of that entry is set into SFT variable (step 7606).

If Target variable equals to a NULL value at the step 7605, the auto discovery module 613 sets a NULL value into both Pport variable and Cport variable (step 7609), and returns to the step 7601. The auto discovery module 613 checks whether a hit entry exists at the step 7606 and the value of SFT variable differs from NULL (step 7607). If the value of SFT variable differs from NULL at the step 7607, the auto discovery module 613 sets the value of SFT variable into Pport variable and the value of CFSF variable into Cport variable (step 7608), and returns to the step 7601.

If the value of SFT variable equals to NULL at the step 7607, the processing is repeated from the step 7604. In FIG. 76, connections are detected by the method of FIG. 21 under the connection detection conditions for the R-SF-CF model shown in FIGS. 25 and 26.

FIG. 77 is a flowchart showing the connection detection condition checking process for the R-CF-SF model, to be executed by the auto discovery module 613 in creating the TS table 625.

The auto discovery module 613 waits for a request for the connection detection condition checking process for the R-CF-SF model (step 7701). Receiving the request for the connection detection condition checking process for the R-CF-SF model (step 7702), the auto discovery module 613 searches all the entries of the PF table 624 for an entry whose Source IP Address item has the same value as CF variable (the device of either Unit1 variable or Unit2 variable, recognized to be a CF in FIG. 75) and whose Destination IP Address item has the same value as SF variable (the device of either Unit1 variable or Unit2 variable, recognized to be an SF in FIG. 75). The value of the Source Port item of that entry is set into CFSF variable (step 7703).

Similarly, the auto discovery module 613 searches all the entries in the PF table 624 for an entry whose Source IP Address item has the same value as CF variable (the device of either Unit1 variable or Unit2 variable, recognized to be a CF) and whose Source Port item has a value different from CFSF variable, and sets the value of the Destination IP Address item of that entry into Target variable (step 7704).

The auto discovery module 613 successively obtains every Target variable in the step 7704, and checks whether the value of Target variable differs from a NULL value (step 7705). If Target variable differs from a NULL value at the step 7705, the auto discovery module 613 searches all the entries of the PF table 624 for an entry whose Source IP Address item has the same value as SF variable (the device of either Unit1 variable or Unit2 variable, recognized to be an SF in FIG. 75) and whose Destination IP Address item has the same value as Target variable. The value of the Source Port item of that entry is set into SFT variable (step 7706).

If Target variable equals to a NULL value at the step 7705, the auto discovery module 613 sets the value of CFSF variable into Pport variable and a NULL value into Cport variable (step 7709), and returns to the step 7701. The auto discovery module 613 checks whether a hit entry exists at the step 7706 and the value of SFT variable differs from NULL (step 7707). If the value of SFT variable differs from NULL at the step 7707, the auto discovery module 613 sets the value of CFSF variable into Pport variable and the value of SFT variable into Cport variable (step 7708), and returns to the step 7701.

If the value of SFT variable equals to NULL at the step 7707, the processing is repeated from the step 7704. In FIG. 77, connections are detected by the method of FIG. 17 under the connection detection conditions for the R-CF-SF model shown in FIGS. 25 and 26.

Figure 78:
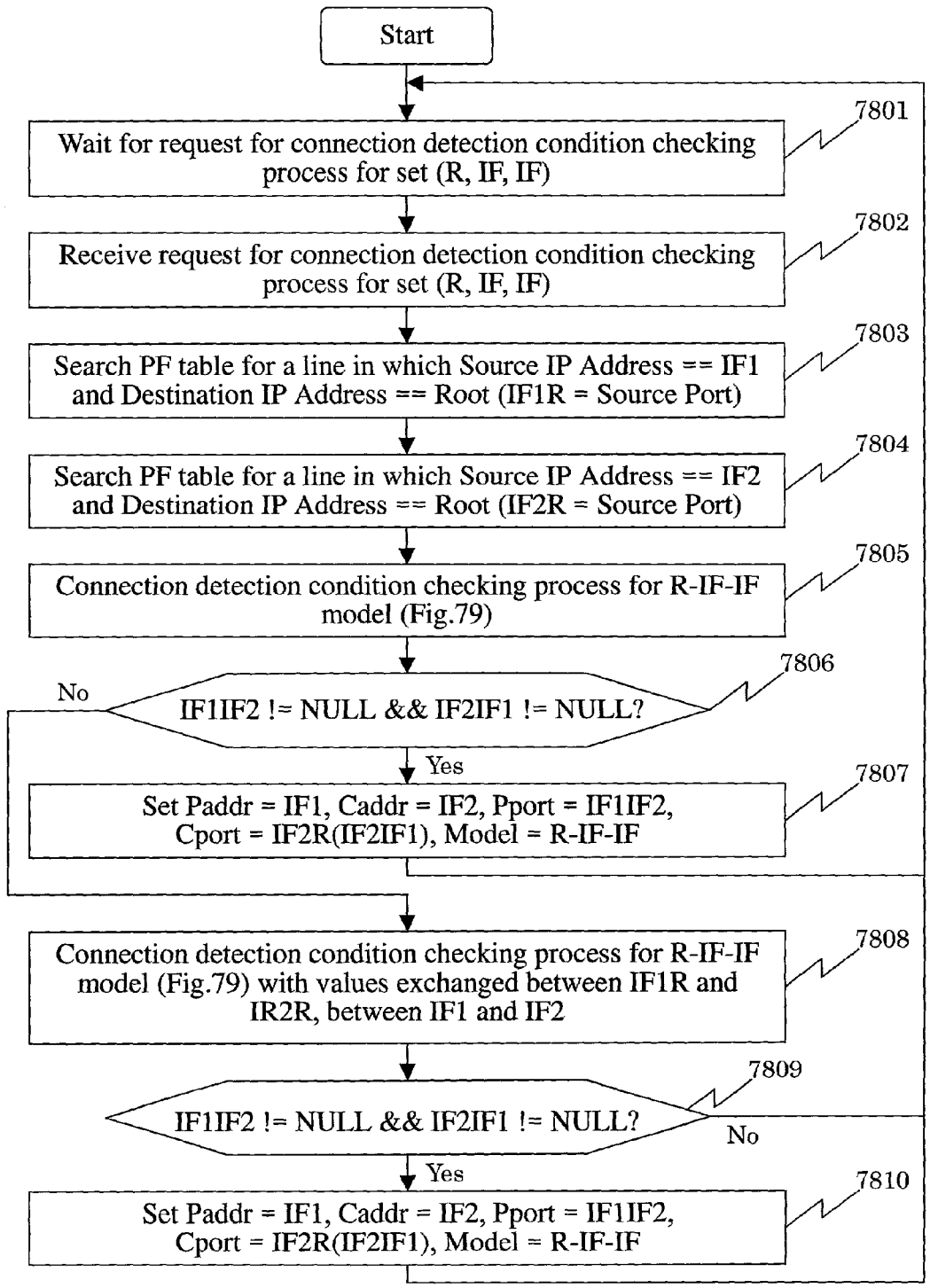
FIG. 78 is a flowchart showing a process in which the auto discovery module checks the connection detection conditions for a set (R, IF, IF) in creating the TS table, in the network configuration automatic recognition method according to the present invention.

FIG. 78 is a flowchart showing the connection detection condition checking process for a set (R, IF, IF), to be executed by the auto discovery module 613 in creating the TS table 625.

The auto discovery module 613 waits for a request for the connection detection condition checking process for a set (R, IF, IF) (step 7801). Receiving a request for the connection detection condition checking process for a set (R, IF, IF) (step 7802), the auto discovery module 613 searches all the entries of the PF table 624 for an entry whose Source IP Address item has the same value as IF1 variable (a device of either Unit1 variable or Unit2 variable) and whose Destination IP Address item has the same value as Root variable. The value of the Source Port item of that entry is set into IF1R variable (step 7803).

Similarly, the auto discovery module 613 searches all the entries in the PF table 624 for an entry whose Source IP Address item has the same value as IF2 variable (a device of either Unit1 variable or Unit2 variable, different from the IF1) and whose Destination IP Address item has the same value as Root variable. The value of the Source Port item of that entry is set into IF2R variable (step 7804).

Figure 79:
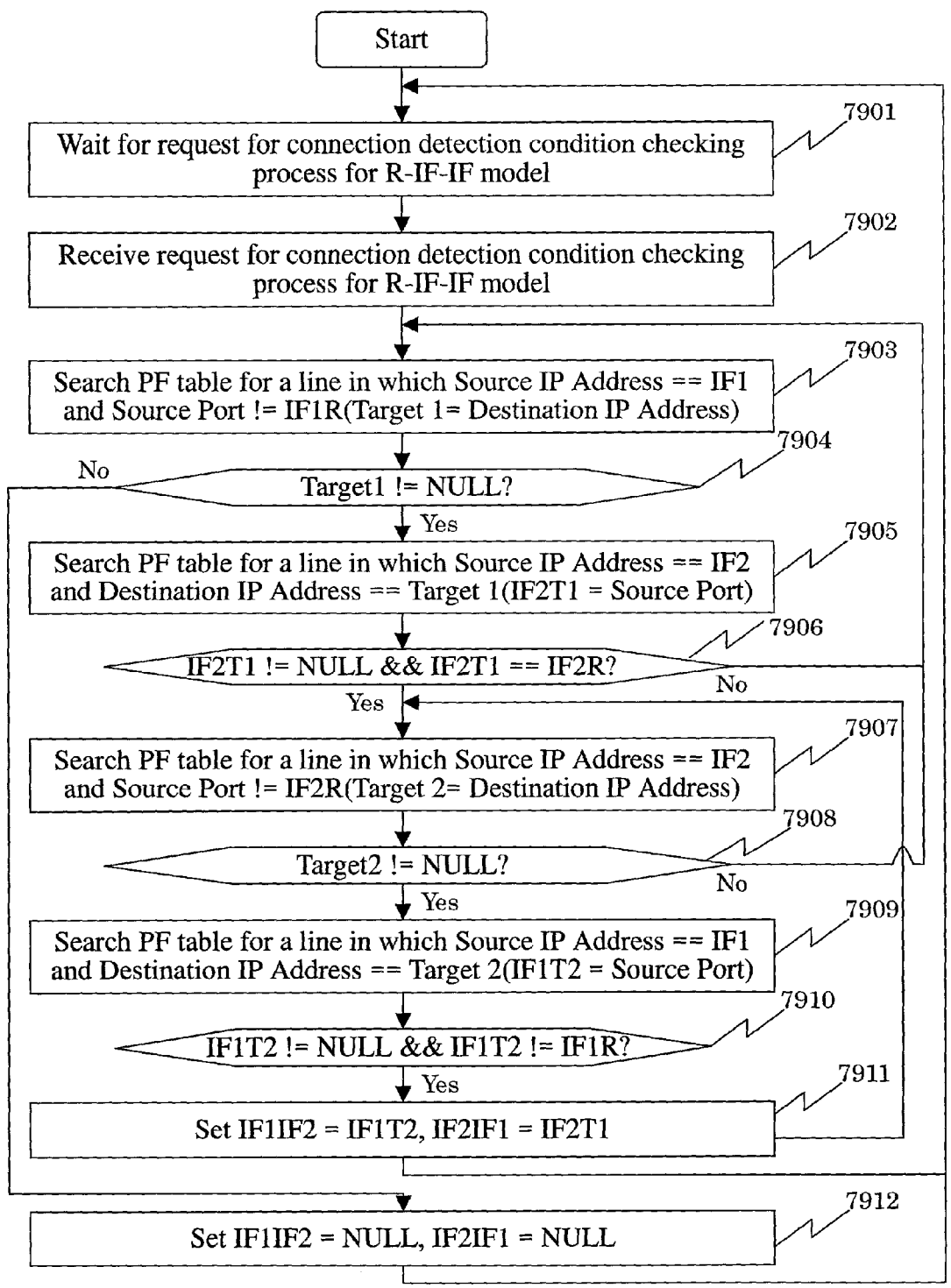
FIG. 79 is a flowchart showing a process in which the auto discovery module checks the connection detection conditions for an R-IF-IF model in creating the TS table, in the network configuration automatic recognition method according to the present invention.

Next, the connection detection condition checking process for the R-IF-IF model shown in FIG. 79 is performed (step 7805) to determine the connection ports (IF1IF2 (IF2IF1)).

The auto discovery module 613 checks whether the conditions that the value of IF1IF2 variable differ from NULL and that the value of IF2IF1 variable differ from NULL are both satisfied (step 7806), so as to see if the connection ports of the IF1 and IF2 are found or not. If at the step 7806 the value of IF1IF2 variable differs from NULL and the value of and IF2IF1 variable differs from NULL as well, the auto discovery module 613 sets the value of IF1 variable into Paddr variable, the value of IF2 variable to Caddr variable, the value of the IF1IF2 into Pport variable, the value of the IF2R (IF2IF1) into Cport variable, and R-IF-IF into Model variable (step 7807), and returns to the step 7801.

If the value of IF1IF2 variable equals to NULL or the value of IF2IF1 variable equals to NULL at the step 7806, the auto discovery module 613 exchanges values between IF1R variable and IF2R variable, and between IF1 variable and IF2 variable. Then the auto discovery module 613 executes the connection detection condition checking process for the R-IF-IF model shown in FIG. 79 (step 7808) to determine the connected ports (IF1IF2 (IF2IF1)). The auto discovery module 613 checks whether the conditions that the value of IF1IF2 variable differ from NULL and that the value of IF2IF1 variable differ from NULL are both satisfied (step 7809), so as to see if the connection ports of the IF1 and IF2 are found or not. If the value of IF1IF2 variable differs from NULL and the value of and IF2IF1 variable also differs from NULL at the step 7809, the auto discovery module 613 sets the value of IF1 variable into Paddr variable, the value of IF2 variable to Caddr variable, the value of the IF1IF2 into Pport variable, the value of the IF2R (IF2IF1) into Cport variable, and R-IF-IF into Model variable (step 7810), and returns to the step 7801. Note that the values of IF1 and IF2 variables set in the step 7810 are the exchanged values of IF1 and IF2 variables set in the step 7807. If the value of IF1IF2 variable equals to NULL or the value of IF2IF1 variable equals to NULL at the step 7809, the auto discovery module 613 returns to the step 7801.

FIG. 79 is a flowchart showing the connection detection condition checking process for the R-IF-IF model, to be executed by the auto discovery module 613 in creating the TS table 625.

The auto discovery module 613 waits for a request for the connection detection condition checking process for the R-IF-IF model (step 7901). Receiving the request for the connection detection condition checking process for the R-IF-IF model (step 7902), the auto discovery module 613 searches all the entries of the PF table 624 for an entry whose Source IP Address item has the same value as IF1 variable (the device of either Unit1 variable or Unit2 variable, recognized to be an IF1 in FIG. 78) and whose Source Port item has a value different from IF1R variable (the connection port of the IF1 device of FIG. 78 to the Root). The value of the Destination IP Address item of that entry is set into Target1 variable (step 7903).

The auto discovery module 613 successively obtains every Target1 variable in the step 7903, and checks whether the value of Target1 variable differs from a NULL value (step 7904). If Target1 variable differs from a NULL value at the step 7904, the auto discovery module 613 searches all the entries of the PF table 624 for an entry whose Source IP Address item has the same value as IF2 variable (the device of either Unit1 variable or Unit2 variable, recognized to be an IF2 in FIG. 78) and whose Destination IP Address item has the same value as Target1 variable. The value of the Source Port item of that entry is set into IF2T1 variable (step 7905).

If Target1 variable equals to a NULL value at the step 7904, the auto discovery module 613 sets a NULL value into both IF1IF2 variable and IF2IF1 variable (step 7912), and returns to the step 7901.

The auto discovery module 613 checks whether a hit entry exists in the step 7905 and the conditions that the value of IF2T1 variable differ from NULL and that the value of IF2T1 variable equal to the value of IF2R variable are both satisfied (step 7906). If the value of IF2T1 variable differs from NULL and the value of IF2T1 variable equals to the value of IF2R variable at the step 7906, then the auto discovery module 613 searches all the entries of the PF table 624 for an entry whose Source IP Address item has the same value as IF2 variable (the device of either Unit1 variable or Unit2 variable, recognized to be an IF2 in FIG. 78) and whose Source Port item has a value different from IF2R variable (the connection port of the IF2 of FIG. 78 to the Root). The value of the Destination IP Address item of that entry is set into Target2 variable (step 7907).

If the value of IF2T1 variable equals to NULL or the value of IF2T1 variable differs from NULL at the step 7906, then the processing is repeated from the step 7903. The auto discovery module 613 successively obtains every Target2 variable in the step 7907, and checks whether the value of Target2 variable differs from a NULL value (step 7908).

If Target2 variable differs from a NULL value at the step 7908, the auto discovery module 613 searches all the entries of the PF table 624 for an entry whose Source IP Address item has the same value as IF1 variable (the device of either Unit1 variable or Unit2 variable, recognized to be an IF1 in FIG. 78) and whose Destination IP Address item has the same value as Target2 variable. The value of the Source Port item of that entry is set into IF1T2 variable (step 7909).

If Target2 variable equals to a NULL value at the step 7908, the processing is repeated from the step 7903. The auto discovery module 613 checks whether a hit entry exists in the step 7909 and the conditions that the value of IF1T2 variable differ from NULL and the value of IF1T2 variable differ from the value of IF1R variable are both satisfied (step 7910). If the value of IF1T2 variable differs from NULL and the value of IF1T2 variable differs from the value of IF1R variable at the step 7910, the auto discovery module 613 sets the value of IF1T2 variable into IF1IF2 variable and the value of IF2T1 variable into IF2T1 variable (step 7911), and returns to the step 7901. If the value of IF1T2 variable equals to NULL or the value of IF1T2 variable equals to the value of IF2R variable at the step 7910, then the processing is repeated from the step 7907.

In the flow of FIG. 79, connections are detected by the method of FIG. 19 under the connection detection conditions for the R-IF-IF model shown in FIGS. 25 and 26.

FIG. 80 is a flowchart showing the connection detection condition checking process for a set (R, IF, SF), to be executed by the auto discovery module 613 in creating the TS table 625.

The auto discovery module 613 waits for a request for the connection detection condition checking process for a set (R, IF, SF) (step 8001). Receiving the request for the connection detection condition checking process for a set (R, IF, SF) (step 8002), the auto discovery module 613 searches all the entries of the PF table 624 for an entry whose Source IP Address item has the same value as IF variable (a device of either Unit1 variable or Unit2 variable, recognized to be an IF) and whose Destination IP Address item has the same value as Root variable. The value of the Source Port item of that entry is set into IFR variable (step 8003).

Figure 81:
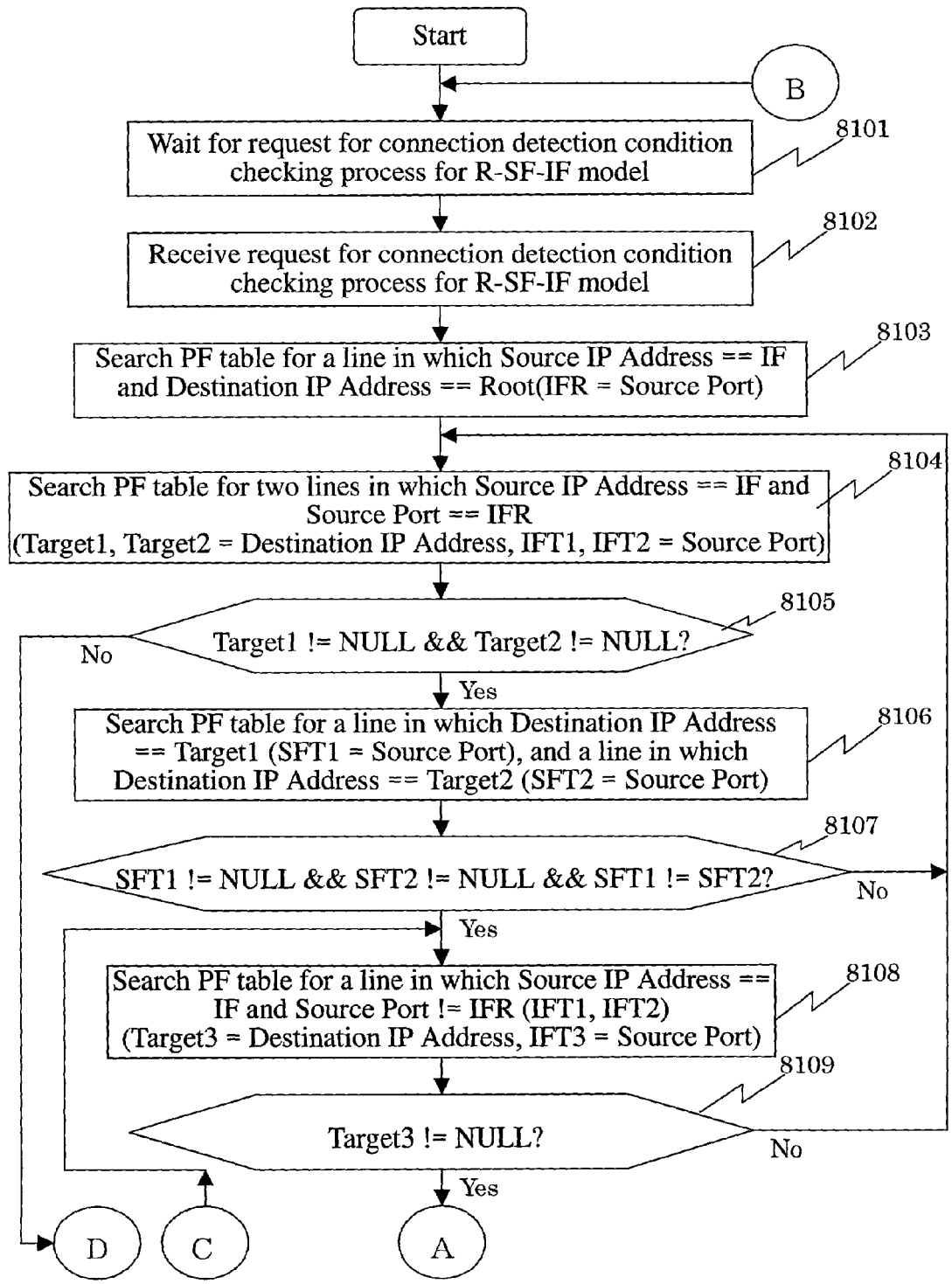
FIG. 81 is a flowchart showing a process in which the auto discovery module checks the connection detection conditions for an R-SF-IF model in creating the TS table, in the network configuration automatic recognition method according to the present invention.

The auto discovery module 613 executes the connection detection condition checking process for the R-SF-IF model shown in FIG. 81 (step 8004), and checks whether the value of Paddr variable set in the step 8004 equals to a NULL value (step 8005). If the value of Paddr variable equals to a NULL value at the step 8005, the auto discovery module 613 executes the connection detection condition checking process for the R-IF-SF model shown in FIG. 83 (step 8006), and returns to the step 8001. If the value of Paddr variable differs from a NULL value at the step 8005, the processing is repeated from the step 8001.

Figure 82:
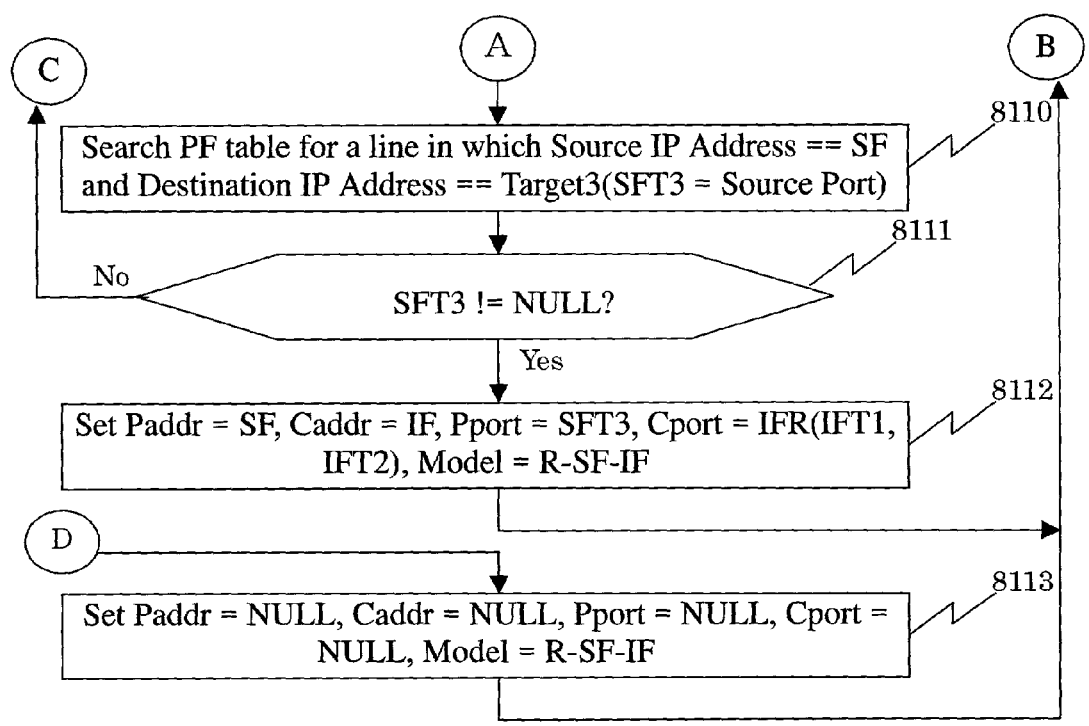
FIG. 82 is a flowchart continued from FIG. 81.

FIGS. 81 and 82 are flowcharts showing the connection detection condition checking process for the R-SF-IF model, to be executed by the auto discovery module 613 in creating the TS table 625.

The auto discovery module 613 waits for a request for the connection detection condition checking process for the R-SF-IF model (step 8101). Receiving the request for the connection detection condition checking process for the R-SF-IF model (step 8102), the auto discovery module 613 searches all the entries of the PF table 624 for an entry whose Source IP Address item has the same value as IF variable (the device of either Unit1 variable or Unit2 variable, recognized to be an IF in FIG. 80) and whose Destination IP Address item has the same value as Root variable. The value of the Source Port item of that entry is set into IFR variable (step 8103).

Similarly, the auto discovery module 613 searches all the entries in the PF table 624 for two entries whose Source IP Address items have the same value as IF variable (the device of either Unit1 variable or Unit2 variable, recognized to be an IF in FIG. 80) and whose Source Port items have the same value as IFR variable. The values of the Destination IP Address items of those entries are set into Target1 and Target2 variables. The values of the Source Port items of the same are set into IFT1 and IFT2 variables (step 8104).

The auto discovery module 613 successively obtains every combination of Target1 and Target2 variables in the step 8104, and checks whether the value of Target1 variable differs from a NULL value and the value of Target2 variable differs from a NULL value as well (step 8105). If the condition of the step 8105 is satisfied, the auto discovery module 613 searches all the entries of the PF table 624 for an entry whose Source IP Address item has the same value as SF variable (the device of either Unit1 variable or Unit2 variable, recognized to be the SF in FIG. 80) and whose Destination IP Address item has the same value as Target1 variable, and sets the value of the Source Port item of that entry into SFT1 variable.

Similarly, the auto discovery module 613 searches all the entries in the PF table 624 for an entry whose Source ID Address item has the same value as SF variable (the device of either Unit1 variable or Unit2 variable, recognized to be the SF in FIG. 80) and whose Destination IP Address item has the same value as Target2 variable, and sets the value of the Source Port item of that entry into SFT2 variable (step 8106).

If the condition of the step 8105 is not satisfied, the auto discovery module 613 sets a NULL value into Paddr variable, a NULL value into Caddr variable, a NULL value into Pport variable, a NULL value into Cport variable, and R-SF-IF into Model variable (step 8113), and returns to the step 8101.

The auto discovery module 613 checks whether hit entries exist in the step 8106, the value of SFT1 variable differs from NULL, the value of SFT2 variable differs from NULL, and the value of SFT1 variable differs from the value of SFT2 variable (step 8107). If the condition of the step 8107 is satisfied, the auto discovery module 613 searches all the entries of the PF table 624 for an entry whose Source IP Address item has the same value as IF variable (the device of either Unit1 variable or Unit2 variable, recognized to be an IF in FIG. 80) and whose Source Port item has a value different from IFR variable (the connection port of the IF of FIG. 80 to the Root), IFT1 variable, and IFT2 variable. The value of the Destination IP Address item of that entry is set into Target3 variable, and the value of the Source Port item of the same is set into IFT3 variable (step 8108).

If the condition of the step 8107 is not satisfied, the processing is repeated from the step 8104.

The auto discovery module 613 successively obtains every Target3 variable in the step 8108, and checks whether the value of Target3 variable differs from a NULL value (step 8109) If Target3 variable differs from a NULL value at the step 8109, the auto discovery module 613 searches all the entries of the PF table 624 for an entry whose Source IP Address item has the same value as SF variable (the device of either Unit1 variable or Unit2 variable, recognized to be an SF in FIG. 80) and whose Destination IP Address item has the same value as Target3 variable. The value of the Source Port item of that entry is set into SFT3 variable (step 8110).

If Target3 variable equals to a NULL value at the step 8109, the processing is repeated from the step 8104. The auto discovery module 613 checks for an entry hit in the step 8110 (step 8111). If the condition of the step 8111 is satisfied, the auto discovery module 613 sets the value of SF variable into Paddr variable, the value of IF variable into Caddr variable, the value of SFT3 variable into Pport variable, the value of IFR variable (the value of IFT1 variable, the value of IFT2 variable) into Cport variable, and Model=R-SF-IF (step 8112), and returns to the step 8101.

If the condition of the step 8111 is not satisfied, the processing is repeated from the step 8108. In FIGS. 81 and 82, connections are detected by the method of FIG. 21 under the connection detection conditions for the R-SF-IF model shown in FIGS. 25 and 26.

Figure 83:
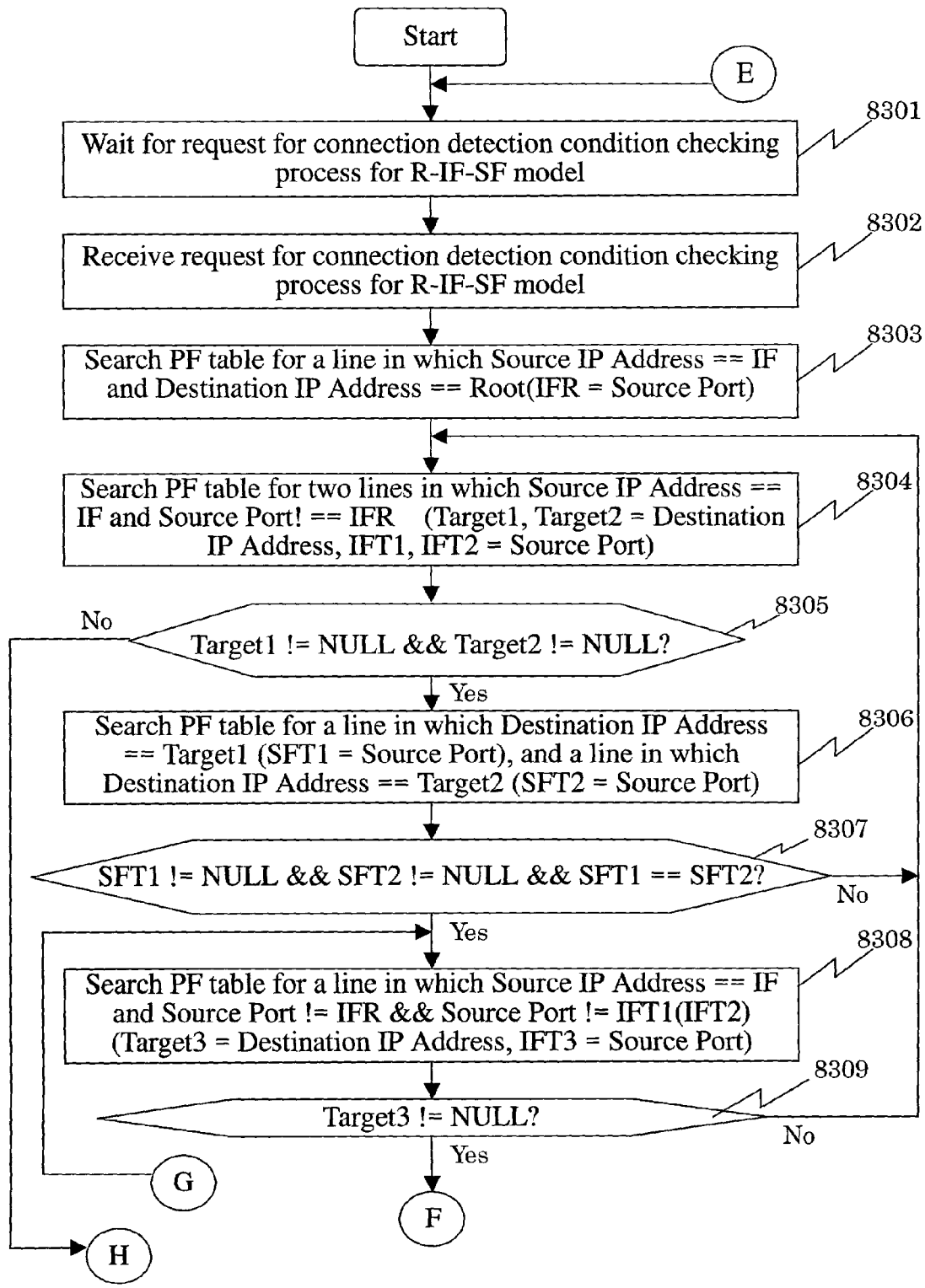
FIG. 83 is a flowchart showing a process in which the auto discovery module checks the connection detection conditions for an R-IF-SF model in creating the TS table, in the network configuration automatic recognition method according to the present invention.
Figure 84:
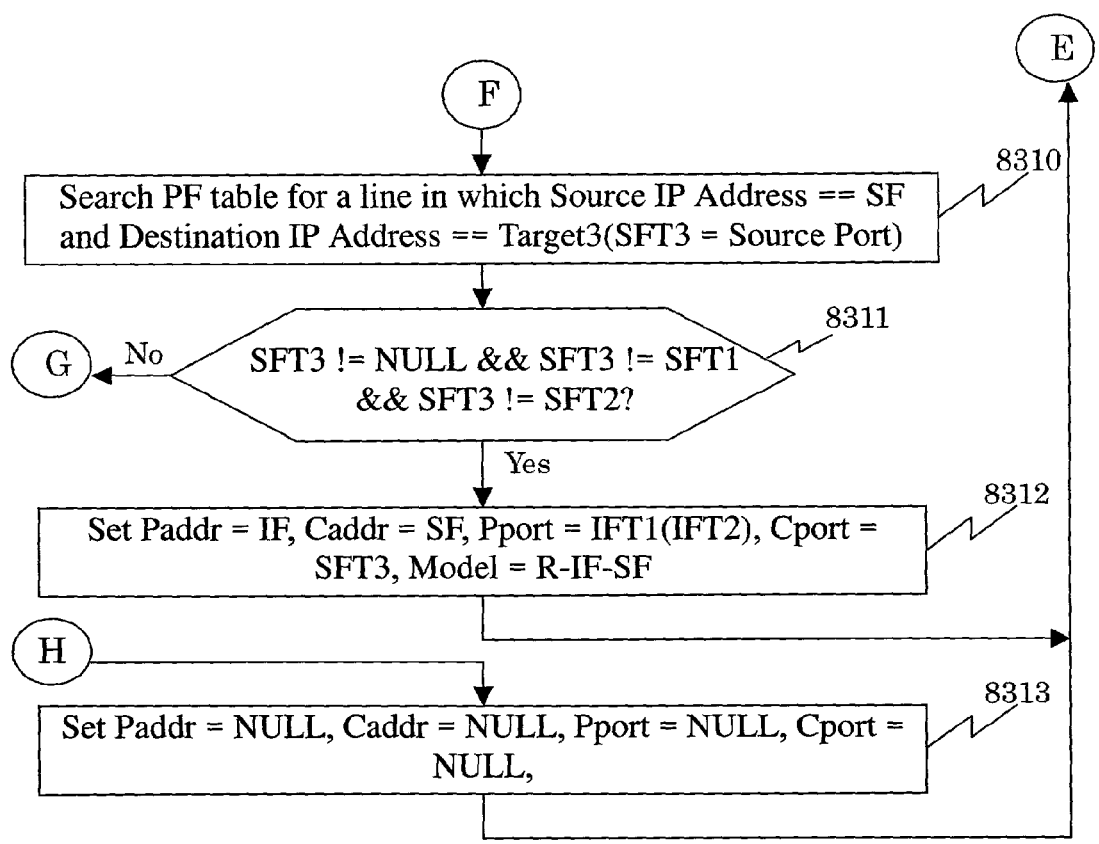
FIG. 84 is a flowchart continued from FIG. 83.

FIGS. 83 and 84 are flowcharts showing the connection detection condition checking process for the R-IF-SF model, to be executed by the auto discovery module 613 in creating the TS table 625.

The auto discovery module 613 waits for a request for the connection detection condition checking process for the R-IF-SF model (step 8301). Receiving the request for the connection detection condition checking process for the R-IF-SF model (step 8302), the auto discovery module 613 searches all the entries of the PF table 624 for an entry whose Source IP Address item has the same value as IF variable (the device of either Unit1 variable or Unit2 variable, recognized to be an IF in FIG. 80) and whose Destination IP Address item has the same value as Root variable. The value of the Source Port item of that entry is set into IFR variable (step 8303).

Similarly, the auto discovery module 613 searches all the entries of the PF table 624 for two entries whose Source IP Address items have the same value as IF variable (the device of either Unit1 variable or Unit2 variable, recognized to be an IF in FIG. 80) and whose Source Port items have a value different from IFR variable. The values of the Destination IP Address items of those entries are set into Target1 and Target2 variables. The values of the Source Port items of the same are set into IFT1 and IFT2 variables (step 8304).

The auto discovery module 613 successively obtains every combination of Target1 and Target2 variables in the step 8304, and checks whether the value of Target1 variable differs from a NULL value and the value of Target2 variable differs from a NULL value as well (step 8305).

If the condition of the step 8305 is satisfied, the auto discovery module 613 searches all the entries of the PF table 624 for an entry whose Source IP Address item has the same value as SF variable (the device of either Unit1 variable or Unit2 variable, recognized to be an SF in FIG. 80) and whose Destination IP Address item has the same value as Target1 variable. The value of the Source Port item of that entry is set into SFT1 variable.

Similarly, the auto discovery module 613 searches all the entries of the PF table 624 for an entry whose Source ID Address item has the same value as SF variable (the device of either Unit1 variable or Unit2 variable, recognized to be the SF in FIG. 80) and whose Destination IP Address item has the same value as Target2 variable. The value of the Source Port item of that entry is set into SFT2 variable (step 8306).

If the condition of the step 8305 is not satisfied, the auto discovery module 613 sets a NULL value into Paddr variable, a NULL value into Caddr variable, a NULL value into Pport variable, a NULL value into Cport variable, and R-IF-SF into Model variable (step 8313), and returns to the step 8301.

The auto discovery module 613 checks whether hit entries exist in the step 8306, the value of SFT1 variable differs from NULL, the value of SFT2 variable differs from NULL, and the value of SFT1 variable equals to the value of SFT2 variable (step 8307). If the condition of the step 8307 is satisfied, the auto discovery module 613 searches all the entries of the PF table 624 for an entry whose Source IP Address item has the same value as IF variable (the device of either Unit1 variable or Unit2 variable, recognized to be an IF in FIG. 80) and whose Source Port item has a value different from IFR variable (the connection port of the IF of FIG. 80 to the Root), IFT1 variable, and IFT2 variable. The value of the Destination IP Address item of that entry is set into Target3 variable and The value of the Source Port item of that entry is set into IFT3 variable (step 8308). If the condition of the step 8307 is not satisfied, the processing is repeated from the step 8304.

The auto discovery module 613 successively obtains every Target3 variable in the step 8308, and checks whether the value of Target3 variable differs from a NULL value (step 8309). If Target3 variable differs from a NULL value at the step 8309, the auto discovery module 613 searches all the entries of the PF table 624 for an entry whose Source IP Address item has the same value as SF variable (the device of either Unit1 variable or Unit2 variable, recognized to be an SF in FIG. 80) and whose Destination IP Address item has the same value as Target3 variable. The value of the Source Port item of that entry is set into SFT3 variable (step 8310). If Target3 variable equals to a NULL value at the step 8309, the processing is repeated from the step 8304.

The auto discovery module 613 checks whether a hit entry exists in the step 8310, the value of SFT3 variable differs from NULL, the value of SFT3 variable differs from the value of SFT1 variable, and the value of SFT3 variable differs from the value of SFT2 variable as well (step 8311). If the condition of the step 8311 is satisfied, the auto discovery module 613 sets the value of IF variable into Paddr variable, the value of SF variable into Caddr variable, the value of IFT1 variable (the value of IFT2 variable) into Pport variable, the value of SFT3 variable into Cport variable, and R-IF-SF into Model variable (step 8312). Then, the processing is repeated from the step 8301.

If the condition of the step 8311 is not satisfied, the processing is repeated from the step 8308. In FIGS. 83 and 84, connections are detected by the method of FIG. 19 under the connection detection conditions for the R-IF-SF model shown in FIGS. 25 and 26.

Figure 85:
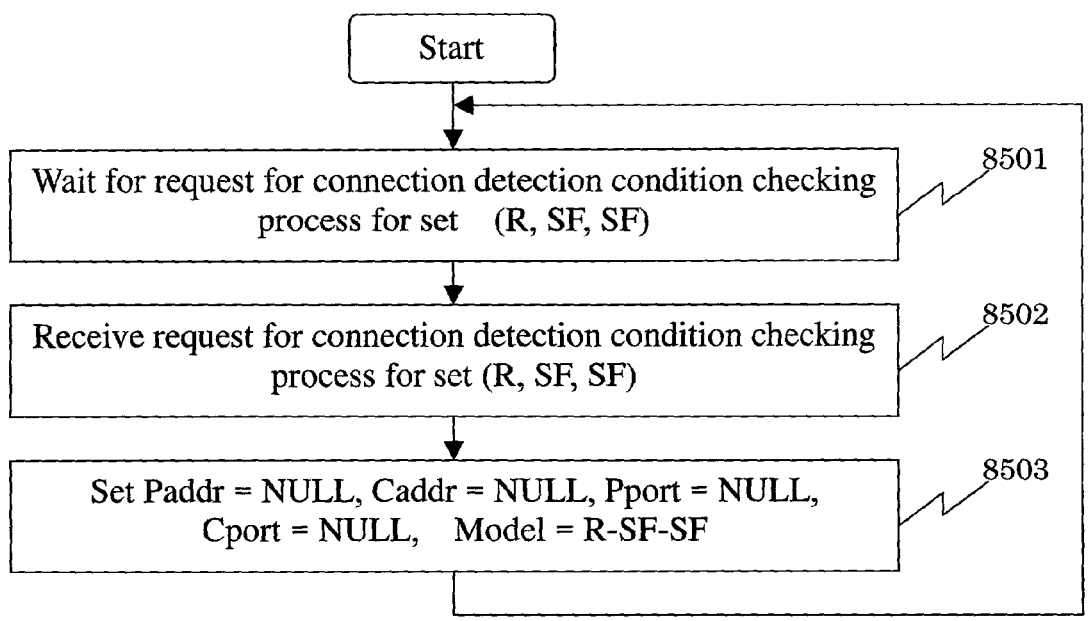
FIG. 85 is a flowchart showing a process in which the auto discovery module checks the connection detection conditions for a set (R, SF, SF) in creating the TS table, in the network configuration automatic recognition method according to the present invention.

FIG. 85 is a flowchart showing the connection detection condition checking process for a set (R, SF, SF), to be executed by the auto discovery module 613 in creating the TS table 625.

The auto discovery module 613 waits for a request for the connection detection condition checking process for a set (R, SF, SF) (step 8501). Receiving the request for the connection detection condition checking process for a set (R, SF, SF) (step 8502), the auto discovery module 613 sets a NULL value into Paddr variable, a NULL value into Caddr variable, a NULL value into Pport variable, a NULL value into Cport variable, and R-SF-SF into Model variable (step 8503), and returns to the step 8501. Referring to FIG. 25 and 26, the R-SF-SF model is incapable of connection detection under any conditions. Therefore, in FIG. 85, the detection of connection is aborted as in FIG. 21.

Figure 86:
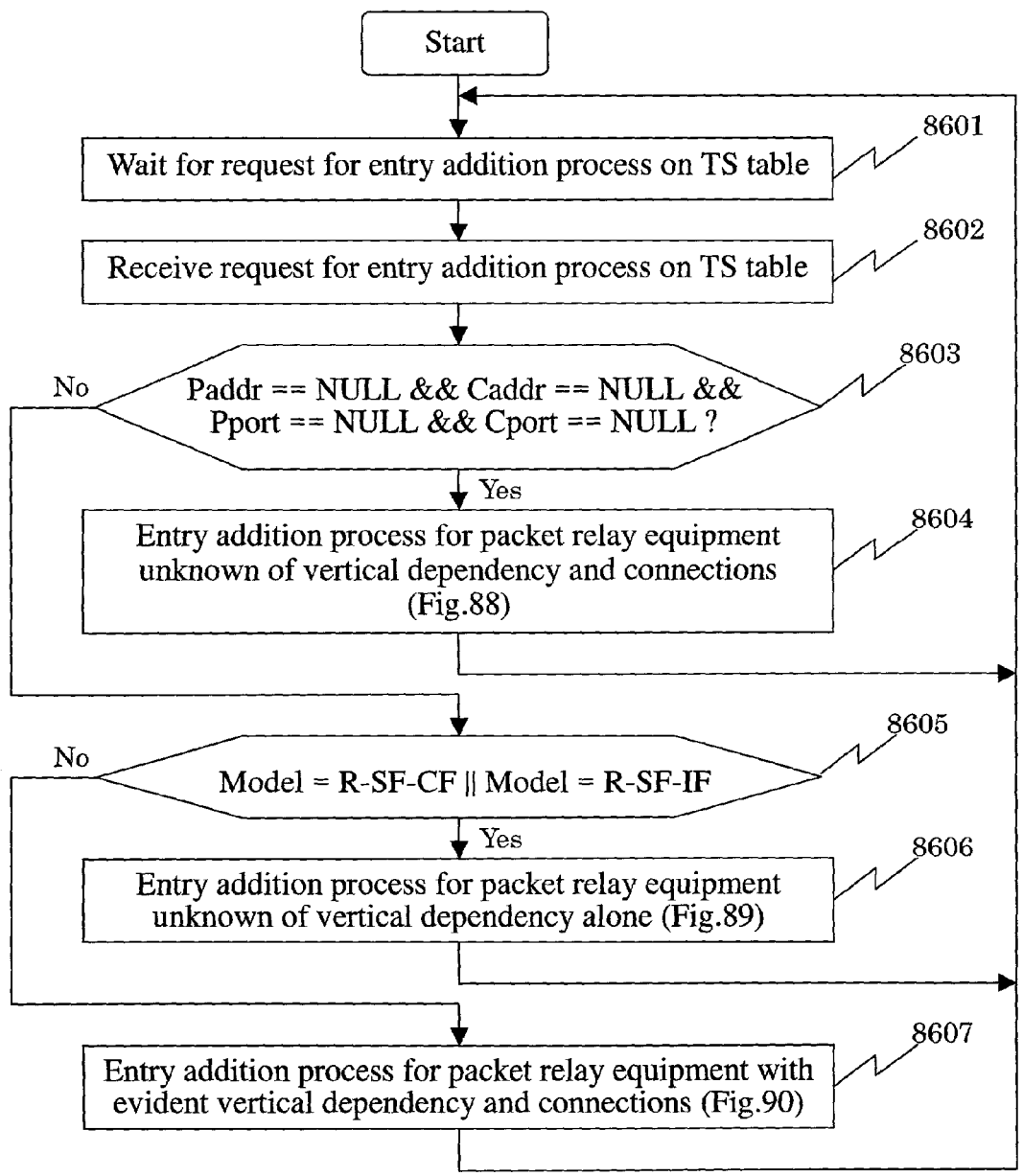
FIG. 86 is a flowchart showing a process in which the auto discovery module adds entries to a TS table in creating the TS table, in the network configuration automatic recognition method according to the present invention.

FIG. 86 is a flowchart showing the entry addition process on a TS table, to be executed by the auto discovery module 613 in creating the TS table 625.

The auto discovery module 613 waits for a request for the entry addition process on the TS table 625 (step 8601). Receiving the request for the entry addition process on the TS table (step 8602), the auto discovery module 613 checks whether Paddr variable equals to a NULL value, Caddr variable equals to a NULL value, Pport variable equals to a NULL value, and Cport variable equals to a NULL value as well (step 8603). If the condition of the step 8603 is satisfied, the auto discovery module 613 executes the entry addition process for packet relay equipment unknown of vertical dependency and connections in FIG. 88 (step 8604). Then, the auto discovery module 613 returns to the step 8601.

If the condition of the step 8603 is not satisfied, the auto discovery module 613 checks whether Model variable equals to R-SF-CF or R-SF-IF (step 8605). If the condition of the step 8605 is satisfied, then the auto discovery module 613 executes the entry addition processing for packet relay equipment unknown of vertical dependency alone, shown in FIG. 89 (step 8606). Then, the auto discovery module 613 returns to the step 8601.

Figure 90:
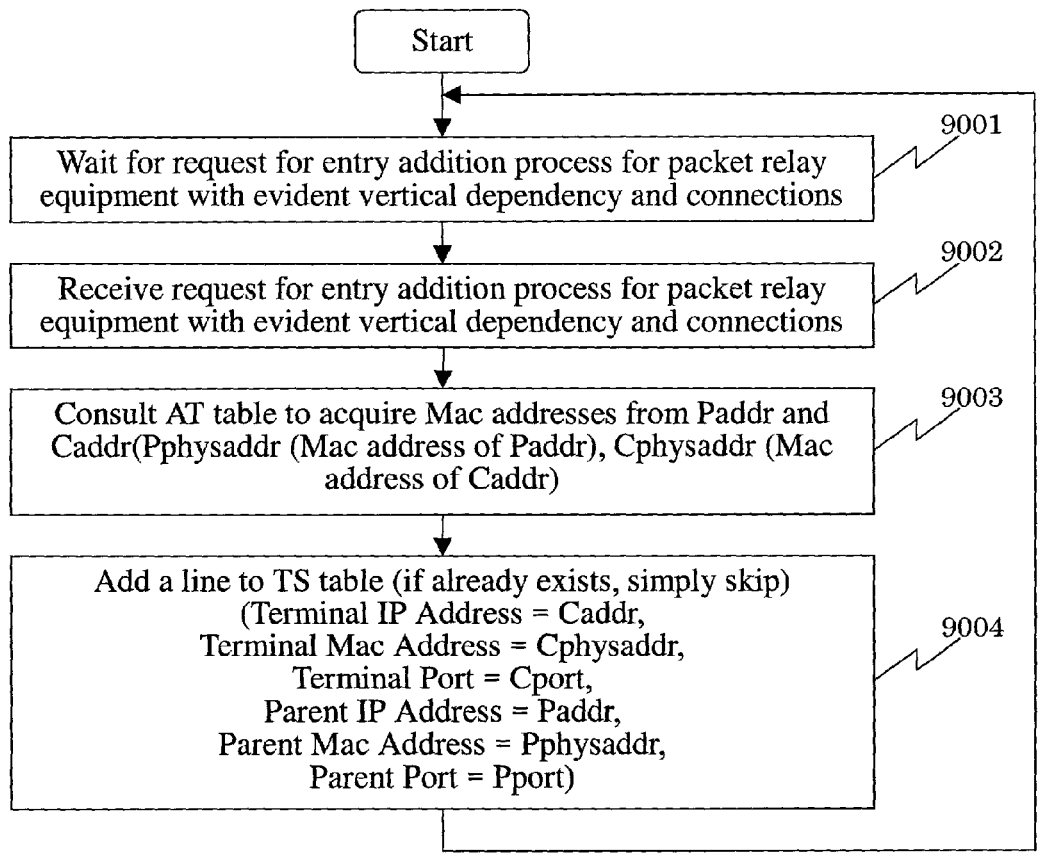
FIG. 90 is a flowchart showing a process in which the auto discovery module adds packet relay equipment with evident vertical dependency and connections in creating the TS table, in the network configuration automatic recognition method according to the present invention.

If the condition of the step 8605 is not satisfied, the auto discovery module 613 executes the entry addition process for packet relay equipment with evident vertical dependency and connections, shown in FIG. 90 are evident (step 8607). Then, the auto discovery module 613 returns to the step 8601.

Figure 87:
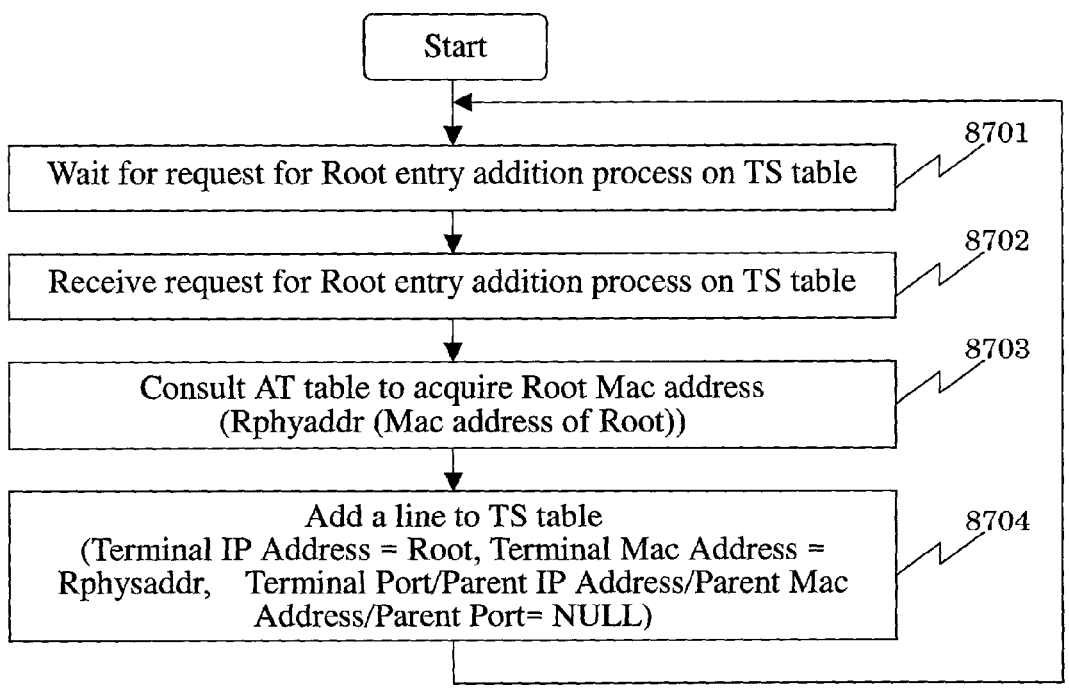
FIG. 87 is a flowchart showing a process in which the auto discovery module adds a Root entry to a TS table in creating the TS table, in the network configuration automatic recognition method according to the present invention.

FIG. 87 is a flowchart showing the Root entry addition process on the TS table 625, to be executed by the auto discovery module 613 in creating the TS table 625.

The auto discovery module 613 waits for a request for the Root entry addition process on the TS table 625 (step 8701). Receiving a request for the Root entry addition process on the TS table 625 (step 8702), the auto discovery module 613 consults the AT table 622 to resolve a Mac address from the IP address in Root variable, and sets the same into Rphysaddr variable (step 8703). Finally, the auto discovery module 613 adds to the TS table 625 an entry in which the Terminal IP Address item has the value of Root variable, the Terminal Mac Address item the value of Rphysaddr variable, the Terminal Port item a NULL value, the Parent IP Address item a NULL value, the Parent Mac Address item a NULL value, and the Parent Port item a NULL value (step 8704). Then, the auto discovery module 613 returns to the step 8701.

Figure 88:
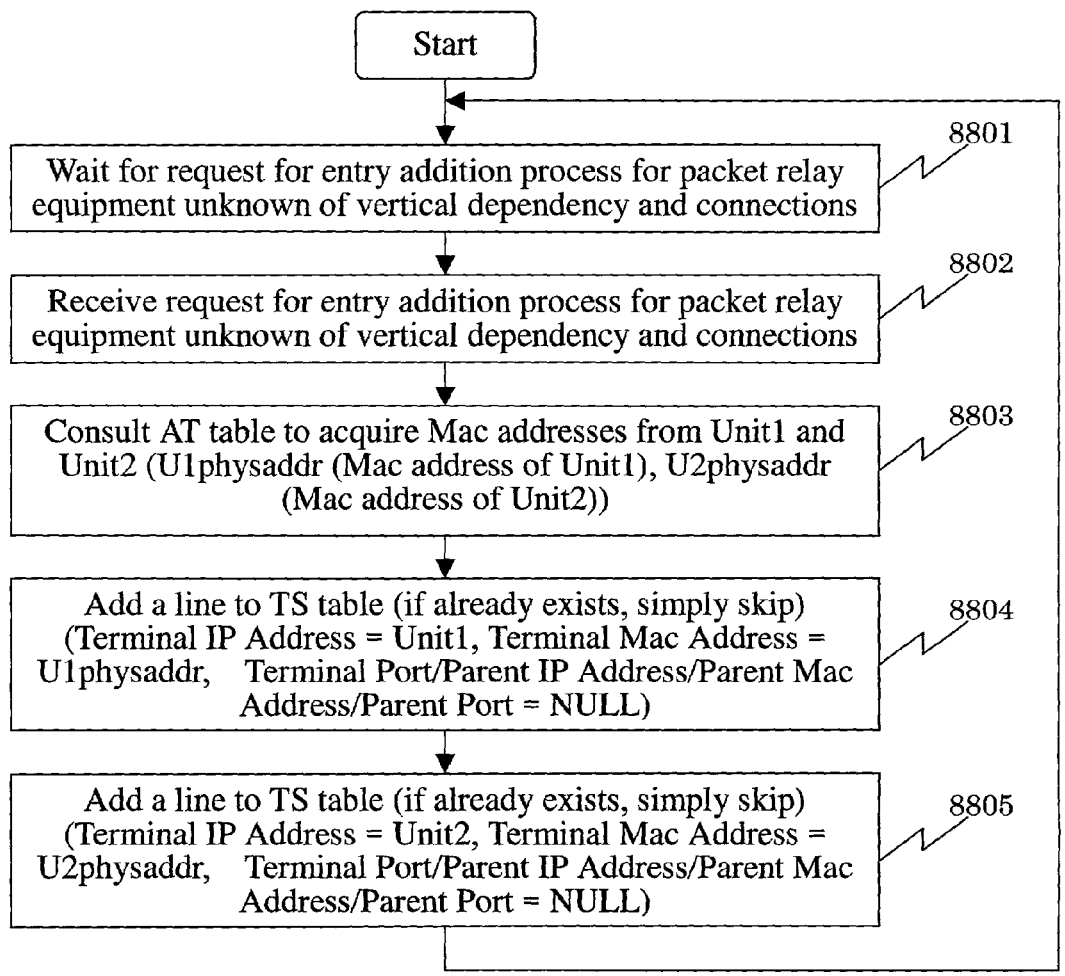
FIG. 88 is a flowchart showing a process in which the auto discovery module adds packet relay equipment unknown of vertical dependency and connections in creating the TS table, in the network configuration automatic recognition method according to the present invention.

FIG. 88 is a flowchart showing the entry addition process for packet relay equipment unknown of vertical dependency and connections, to be executed by the auto discovery module 613 in creating the TS table 625.

The auto discovery module 613 waits for a request for the entry addition process for packet relay equipment unknown of vertical dependency and connections (step 8801). Receiving the request for the entry addition process for packet relay equipment unknown of vertical dependency and connections (step 8802), the auto discovery module 613 consults the AT table 622 to resolve Mac addresses from the IP addresses in Unit1 and Unit2 variables (Unit1 variable and Unit2 variable in FIG. 67 (FIG. 86)), and sets the same into U1physaddr and U2physaddr variables, respectively (step 8803). Finally, the auto discovery module 613 adds to the TS table 625 an entry in which the Terminal IP Address item has the value of Unit1 variable, the Terminal Mac Address item the value of U1physaddr variable, the Terminal Port item a NULL value, the Parent IP Address item a NULL value, the Parent Mac Address item a NULL value, and the Parent Port item a NULL value (step 8804). The auto discovery module 613 also adds an entry in which the Terminal IP Address item has the value of Unit2 variable, the Terminal Mac Address item the value of U2physaddr variable, the Terminal Port item a NULL value, the Parent IP Address item a NULL value, the Parent Mac Address item a NULL value, and the Parent Port item a NULL value (step 8805). Then, the auto discovery module 613 returns to the step 8801.

Figure 89:
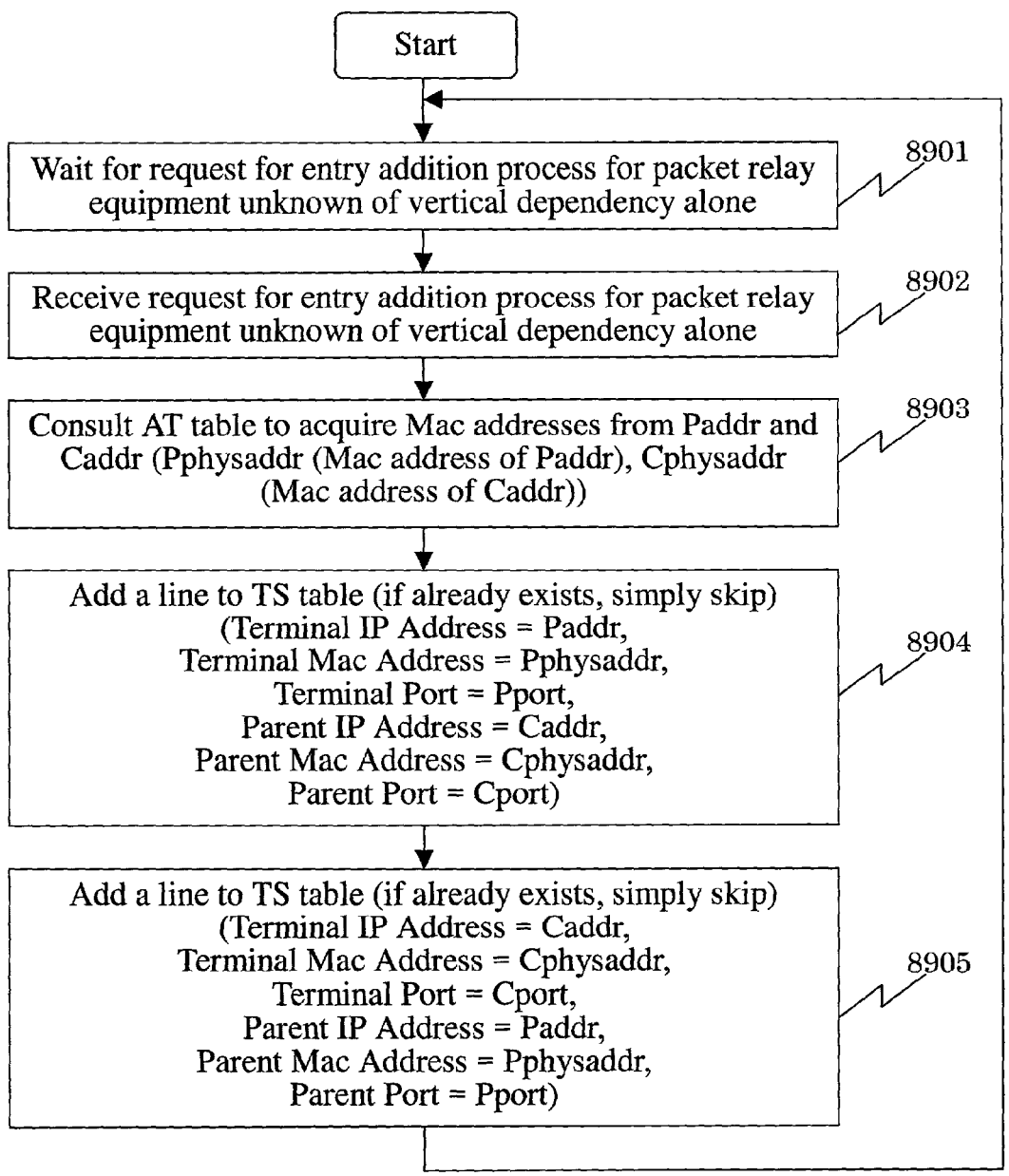
FIG. 89 is a flowchart showing a process in which the auto discovery module adds packet relay equipment unknown of vertical dependency alone in creating the TS table, in the network configuration automatic recognition method according to the present invention.

FIG. 89 is a flowchart showing the entry addition process for packet relay equipment unknown of vertical dependency alone, to be executed by the auto discovery module 613 in creating the TS table 625.

The auto discovery module 613 waits for a request for the entry addition process for packet relay equipment unknown of vertical dependency alone (step 8901). Receiving the request for the entry addition process for packet relay equipment unknown of vertical dependency alone (step 8902), the auto discovery module 613 consults the AT table 622 to resolve Mac addresses from the IP addresses in Paddr and Caddr variables (Paddr variable and Caddr variable in FIGS. 71-84), and sets the same into Pphysaddr and Cphysaddr variables, respectively (step 8903).

Finally, the auto discovery module 613 adds to the TS table 625 an entry in which the Terminal IP Address item has the value of Paddr variable, the Terminal Mac Address item the value of Pphysaddr variable, the Terminal Port item the value of Pport variable, the Parent IP Address item the value of Caddr variable, the Parent Mac Address item the value of Cphysaddr variable, and the Parent Port item the value of Cport variable (step 8904). The auto discovery module 613 also adds an entry in which the Terminal IP Address item has the value of Caddr variable, the Terminal Mac Address item the value of Cphysaddr variable, the Terminal Port item the value of Cport variable, the Parent IP Address item the value of Paddr variable, the Parent Mac Address item the value of Pphysaddr variable, and the Parent Port item the value of Pport variable (step 8905). Then, the auto discovery module 613 returns to the step 8901.

FIG. 90 is a flowchart showing the entry addition process for packet relay equipment with evident vertical dependency and connections, to be executed by the auto discovery module 613 in creating the TS table 625.

The auto discovery module 613 waits for a request for the entry addition process for packet relay equipment with evident vertical dependency and connections (step 9001). Receiving the request for the entry addition process for packet relay equipment with evident vertical dependency and connections (step 9002), the auto discovery module 613 consults the AT table 622 to resolve Mac addresses from the IP addresses in Paddr and Caddr variables (Paddr variable and Caddr variable in FIGS. 71-84), and sets the same into Pphysaddr and Cphysaddr variables, respectively (step 9003).

Finally, the auto discovery module 613 adds to the TS table 625 an entry in which the Terminal IP Address item has the value of Caddr variable, the Terminal Mac Address item the value of Cphysaddr variable, the Terminal Port item the value of Cport variable, the Parent IP Address item the value of Paddr variable, the Parent Mac Address item the value of Pphysaddr variable, and the Parent Port item the value of Pport variable (step 9004). Then, the auto discovery module 613 returns to the step 9001.

Figure 92:
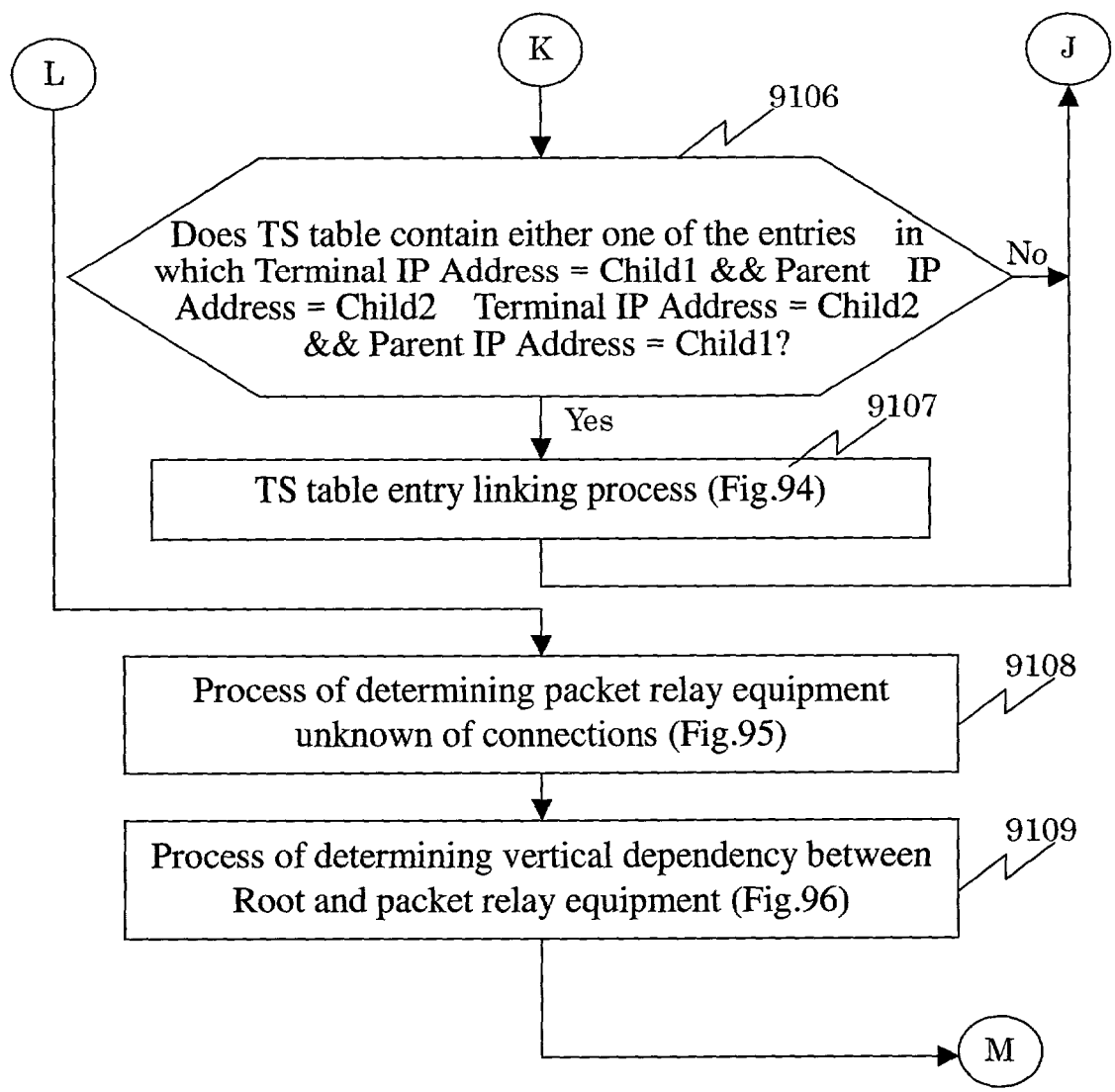
FIG. 92 is a flowchart continued from FIG. 91.

FIGS. 91 and 92 are flowcharts showing the vertical dependency determination process which the auto discovery module 613 executes in creating the TS table 625.

The auto discovery module 613 waits for a request for the vertical dependency determination process (step 9101). Receiving the request for the vertical dependency determination process (step 9102), the auto discovery module 613 checks all the entries of the TS table 625 for a pair of entries having a common value in their Parent IP Address items. If such a pair of entries exist, the auto discovery module 613 sets the values of their Terminal IP Address items into Child1 variable and Child2 variable, respectively, and the value of their Parent IP Address items into Parent variable. Then, the auto discovery module 613 checks for an entry whose Parent IP Address item has the same value as Child1 variable and whose Terminal IP Address item has the same value as Parent variable, as well as an entry whose Parent IP Address item has the same value as Child2 variable and whose Terminal IP Address item has the same value as Parent variable (step 9103).

If the condition of the step 9103 is satisfied, the auto discovery module 613 checks all the entries of the TS table 625 for an entry whose Terminal IP Address item has the same value as Child1 variable and whose Parent IP Address item has the same value as Child2 variable, as well as an entry whose Terminal IP Address item has the same value as Child2 variable and whose Parent IP Address item has the same value as Child1 variable (step 9104).

Figure 95:
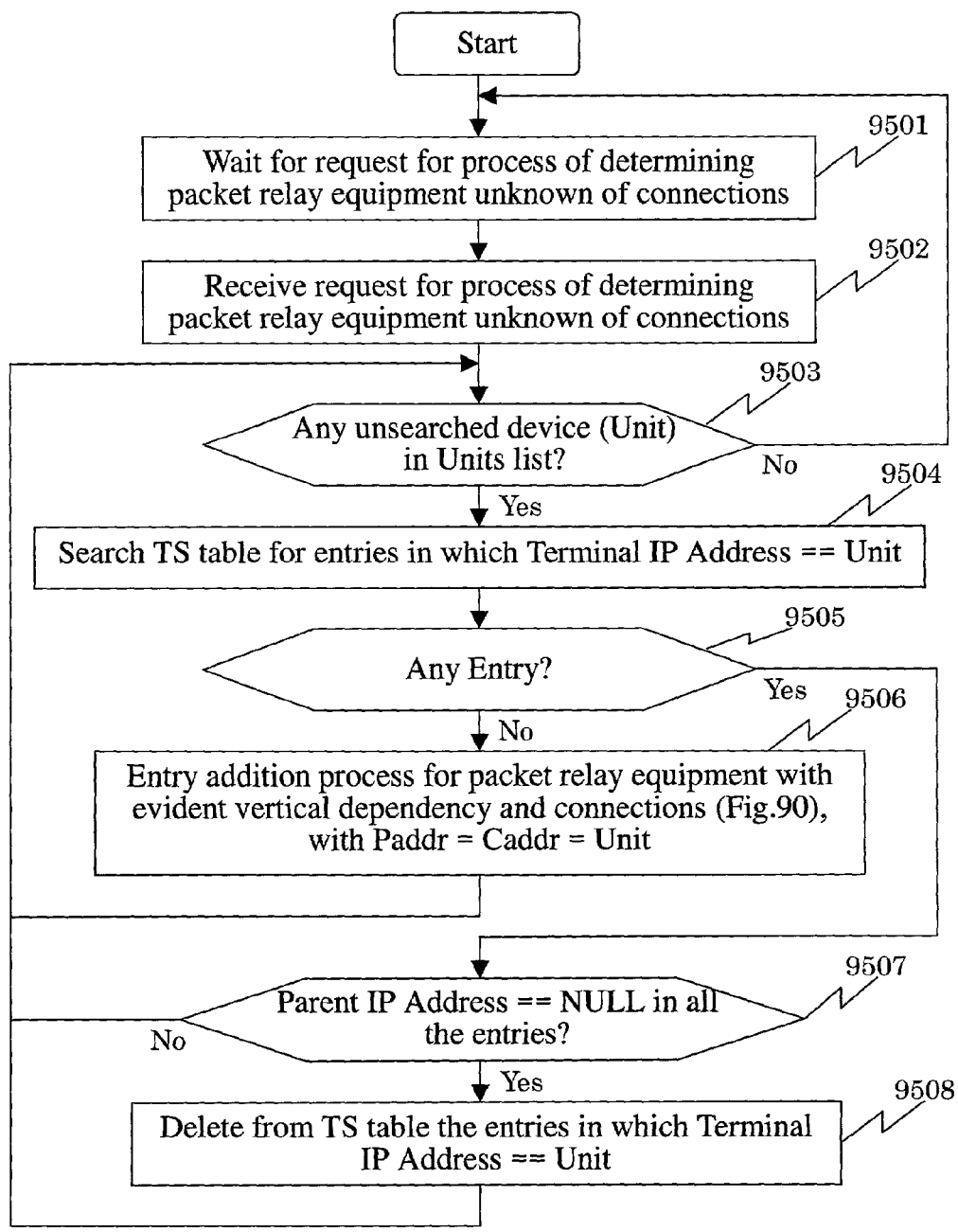
FIG. 95 is a flowchart showing a process in which the auto discovery module determines packet relay equipment unknown of connections in creating the TS table, in the network configuration automatic recognition method according to the present invention.
Figure 96:
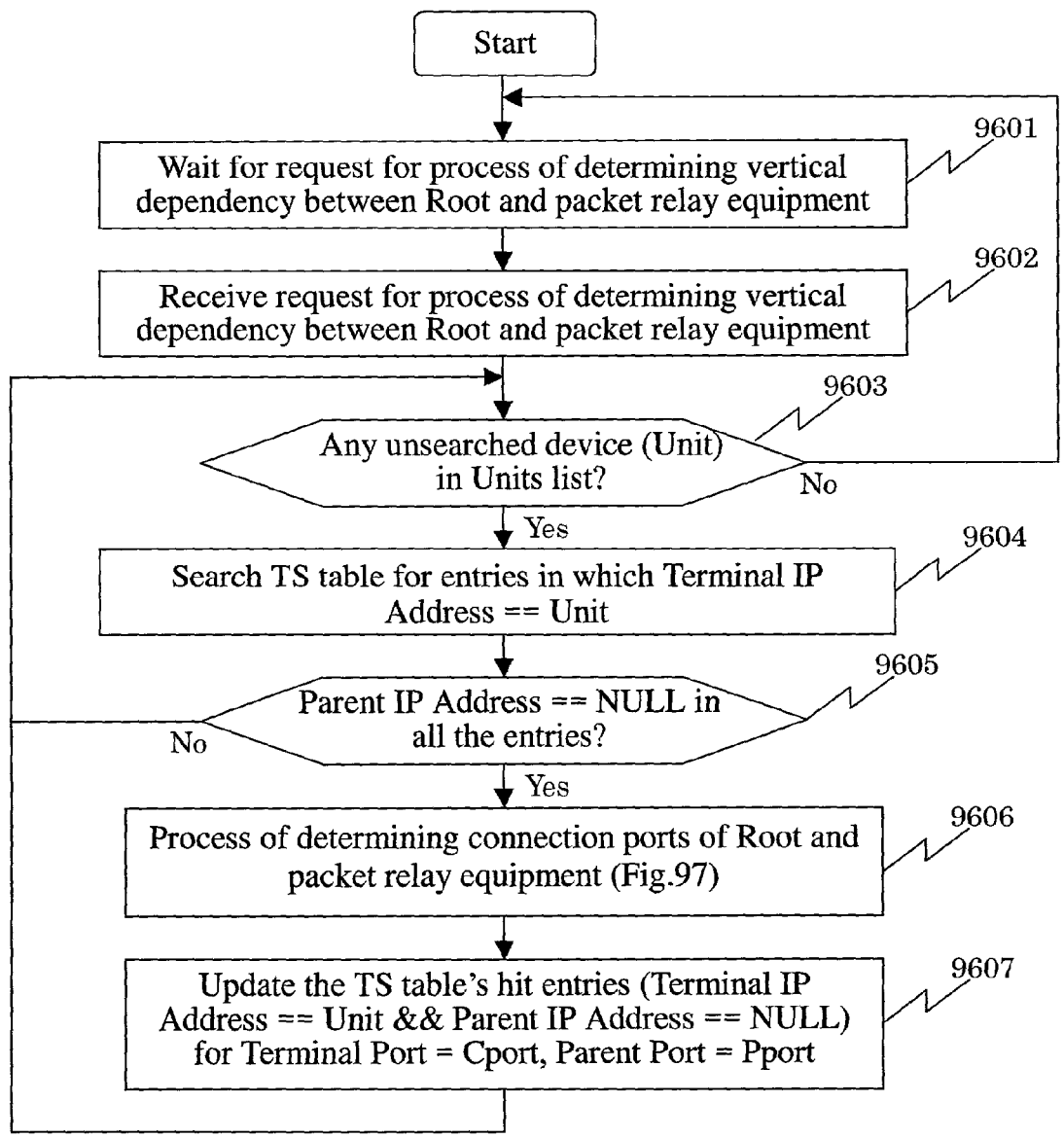
FIG. 96 is a flowchart showing a process in which the auto discovery module determines the vertical dependency between a Root device and packet relay equipment in creating the TS table, in the network configuration automatic recognition method according to the present invention.

If the condition of the step 9103 is not satisfied, the auto discovery module 613 executes the process of determining packet relay equipment unknown of connections in FIG. 95 (step 9108), executes the process of determining vertical dependency between Root and packet relay equipment in FIG. 96 (step 9109), and returns to the step 9101.

Figure 93:
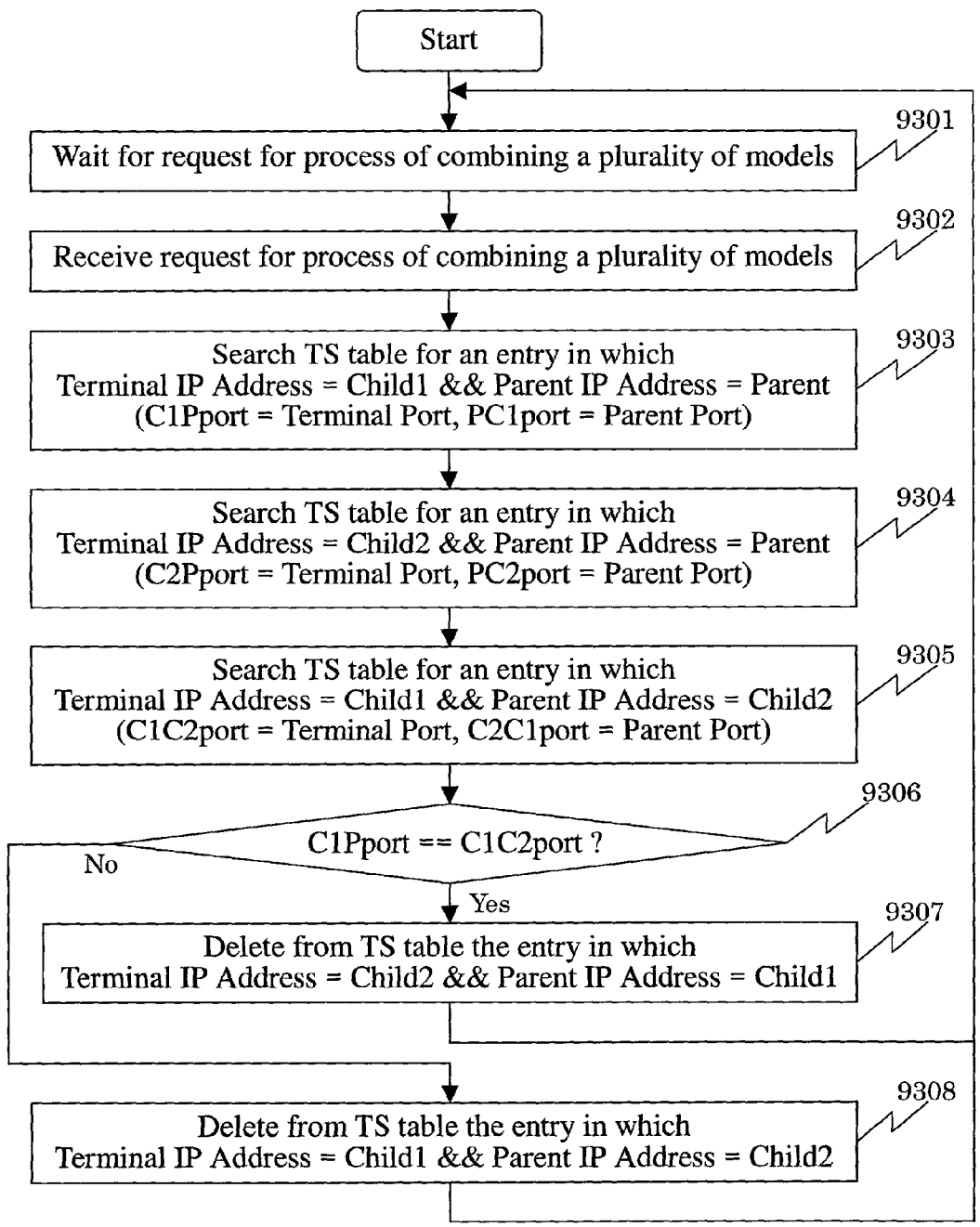
FIG. 93 is a flowchart showing a process in which the auto discovery module combines a plurality of models in creating the TS table, in the network configuration automatic recognition method according to the present invention.

If the condition of the step 9104 is satisfied, the auto discovery module 613 executes the process of combining a plurality of models in FIG. 93 (step 9105), and returns to the step 9103.

If the condition of the step 9104 is not satisfied, the auto discovery module 613 checks all the entries of the TS table 625 for either an entry whose Terminal IP Address item has the same value as Child1 variable and whose Parent IP Address item has the same value as Child2 variable or an entry whose Terminal IP Address item has the same value as Child2 variable and whose Parent IP Address item has the same value as Child1 variable (step 9106). If the condition of the step 9106 is satisfied, the auto discovery module 613 executes the TS table entry linking process in FIG. 94 (step 9107), and returns to the step 9103. If the condition of the step 9106 is not satisfied, the processing is repeated from the step 9103.

FIG. 93 is a flowchart showing the process of combining a plurality of models, to be executed by the auto discovery module 613 in creating the TS table 625.

The auto discovery module 613 waits for a request for the process of combining a plurality of models (step 9301). Receiving the request for the process of combining a plurality of models (step 9302), the auto discovery module 613 searches all the entries of the TS table 625 for an entry whose Terminal IP Address item has the same value as Child1 variable (Child1 variable in FIG. 91) and whose Parent IP Address item has the same value as Parent variable (Parent variable in FIG. 91). The value of the Terminal Port item of that entry is set into C1Pport variable, and the value of the Parent Port item of the same is set into PC1port variable (step 9303).

Similarly, the auto discovery module 613 searches all the entries of the TS table 625 for an entry whose Terminal IP Address item has the same value as Child2 variable (Child2 variable in FIG. 91) and whose Parent IP Address item has the same value as Parent variable (Parent variable in FIG. 91). The value of the Terminal Port item of that entry is set into C2Pport variable, and the value of the Parent Port item of the same is set into PC2port variable (step 9304).

Moreover, the auto discovery module 613 searches all the entries of the TS table 625 for an entry whose Terminal IP Address item has the same value as Child1 variable (Child1 variable in FIG. 91) and whose Parent IP Address item has the same value as Child2 variable (Child2 variable in FIG. 91). The value of the Terminal Port item of that entry is set into C1C2port variable, and the value of the Parent Port item of the same is set into C2C1port variable (step 9305).

Next, the auto discovery module 613 checks whether C1Pport variable and C1C2port variable are identical in value (a comparison between the values of C2Pport variable and C2C1port variable is also available) (step 9306) to check whether the Parent and the Child2 are connected to the same port when seen from the Child1.

If the condition of the step 9306 is satisfied, the auto discovery module 613 deletes from the TS table 625 the entry whose Terminal IP Address item has the same value as Child2 variable and whose Parent IP Address item has the same value as Child1 variable (step 9307). The auto discovery module 613 then returns to the step 9301.

If the condition of the step 9306 is not satisfied, the auto discovery module 613 deletes from the TS table 625 the entry whose Terminal IP Address item has the same value as Child1 variable and whose Parent IP Address item has the same value as Child2 variable (step 9308). The auto discovery module 613 then returns to the step 9301.

In the flow of FIG. 93, the vertical dependency across entries unknown of vertical dependency is detected by the method of FIG. 30 (unnecessary one is deleted from two entries containing the Child1 and Child2).

Figure 94:
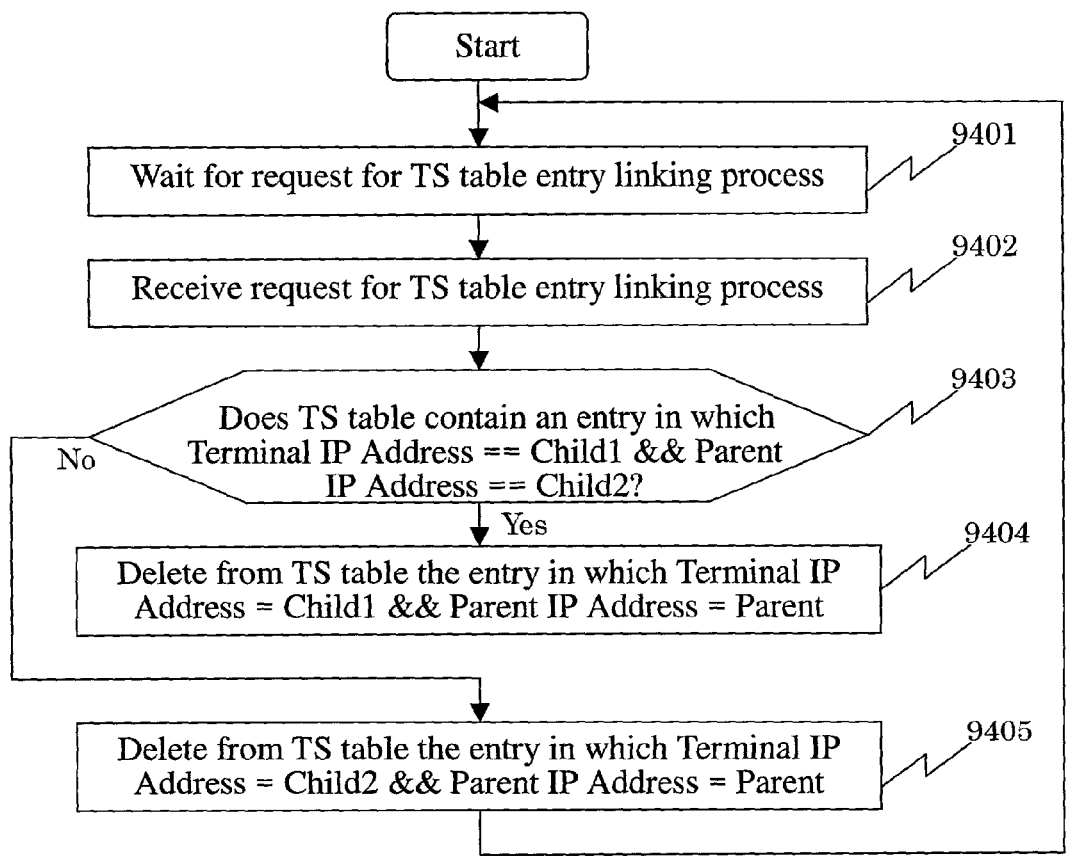
FIG. 94 is a flowchart showing a process in which the auto discovery module links TS table entries in creating the TS table, in the network configuration automatic recognition method according to the present invention.

FIG. 94 is a flowchart showing the linking process on the TS table 625, to be executed by the auto discovery module 613 in creating the TS table 625.

The auto discovery module 613 waits for a request for the TS table linking process (step 9401). Receiving the request for the TS table linking process (9402), the auto discovery module 613 checks all the entries of the TS table 625 for an entry whose Terminal IP Address item has the same value as Child1 variable (Child1 variable in FIG. 91) and whose Parent IP Address item has the same value as Child2 variable (Child2 variable in FIG. 91) (step 9403). If the condition of the step 9403 is satisfied, the auto discovery module 613 deletes from the TS table 625 the entry whose Terminal IP Address item as the same value as Child1 variable and whose Parent IP Address item has the same value as Parent variable (Parent variable in FIG. 91) (step 9404). Then, the processing is repeated from the step 9401.

If the condition of the step 9403 is not satisfied, the auto discovery module 613 deletes from the TS table 625 the entry whose Terminal IP Address item has the same value as Child2 variable and whose Parent IP Address item has the same value as Parent variable (Parent variable in FIG. 91) (step 9405). Then, the processing is repeated from the step 9401.

FIG. 95 is a flowchart showing the process of determining packet relay equipment unknown of connections, to be executed by the auto discovery module 613 in creating the TS table 625.

The auto discovery module 613 waits for a request for the process of determining packet relay equipment unknown of connections (step 9501). Receiving the request for the process of determining packet relay equipment unknown of connections (step 9502), the auto discovery module 613 successively obtains every entry in Units list variable (Units list variable in FIG. 67 (FIG. 91)), sets an item value into Unit variable, and checks for unsearched Unit variables (step 9503).

If any unsearched Unit variable exists at the step 9503, the auto discovery module 613 searches the TS table 625 for entries whose Terminal IP Address items have the same values as Unit variables (step 9504).

If there is no unsearched Unit variable at the step 9503, the processing is repeated from the step 9501. The auto discovery module 613 checks whether the entries searched for at the step 9504 (step 9505) exist, and if any at the step 9504, checks whether all of the hit entries have a NULL value in their Parent IP Address items (step 9507).

If there is no hit entry at the step 9505, the auto discovery module 613 executes the entry addition process for packet relay equipment with evident vertical dependency and connections in FIG. 90, with the values of Unit variables set into Paddr variable and Caddr variable (step 9506). Then, the auto discovery module 613 returns to the step 9503.

If all the entries do not have a NULL value in their Parent IP Address items at the step 9507, the processing is repeated from the step 9503.

If all the entries have a NULL value in their Parent IP Address items at the step 9507, the auto discovery module 613 deletes from the TS table 625 the entry whose Terminal IP Address items have the same values as Unit variable (step 9508), and returns to the step 9503.

FIG. 96 is a flowchart showing the process of determining vertical dependency between the Root and packet relay equipment, to be executed by the auto discovery module 613 in creating the TS table 625.

The auto discovery module 613 waits for a request for the process of determining vertical dependency between the Root and packet relay equipment (step 9601). Receiving the request for the process of determining vertical dependency between the Root and packet relay equipment (step 9602), the auto discovery module 613 successively obtains every entry in Units list variable (Units list variable in FIG. 67 (FIG. 91)), sets an item value into unit variable, and checks for unsearched Unit variables (step 9603).

If there is any unsearched Unit variable at the step 9603, the auto discovery module 613 searches the TS table 625 for entries whose Terminal IP Address items have the same value as Unit variable (step 9604).

If there is no unsearched Unit variable at the step 9603, the processing is repeated from the step 9601. If there are hit entries at the step 9604, the auto discovery module 613 checks whether all the entries have a NULL value in their Parent IP Address items (step 9605). If all the entries have a NULL value in their Parent IP Address items at the step 9605, the auto discovery module 613 executes the process of determining connection ports of an Root and packet relay equipment in FIG. 97 (step 9606), to set values into Cport variable and Pport variable. Finally, the auto discovery module 613 sets the value of Unit variable into the Terminal IP Address items, a NULL value into the Parent IP Address items, the value of Cport variable into the Terminal Port items, and the value of Pport variable into the Parent Port items of the hit entries in the TS table 625 for entry update (step 9607). Then, the processing is repeated from the step 9603.

Figure 97:
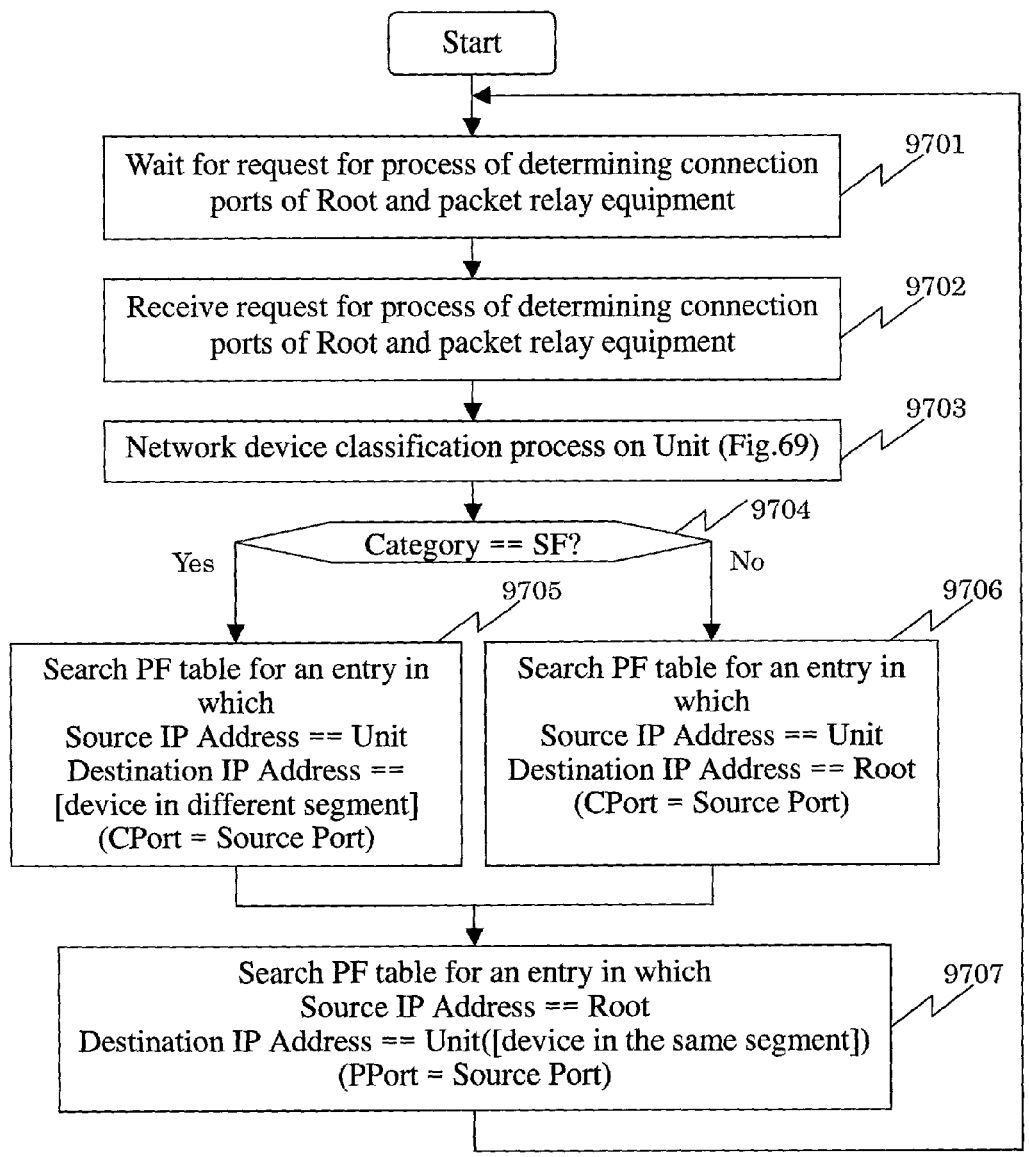
FIG. 97 is a flowchart showing a process in which the auto discovery module determines the connection ports between a Root device and packet relay equipment in creating the TS table, in the network configuration automatic recognition method according to the present invention.

FIG. 97 is a flowchart showing the process of determining vertical dependency between an Root and packet relay equipment, to be executed by the auto discovery module 613 in creating the TS table 625.

The auto discovery module 613 waits for a request for the process of determining vertical dependency between an Root and packet relay equipment (step 9701). Receiving the request for the process of determining vertical dependency between an Root and packet relay equipment (step 9702), the auto discovery module 613 executes the network device classification process of FIG. 69 with Unit variable (Unit variable in FIG. 96) as an argument (step 9703) so that the classification of the device in Unit variable is set into Category variable.

Next, the auto discovery module 613 checks whether Category variable equals to SF (step 9704). If the value of Category variable equals to SF at the step 9704, the auto discovery module 613 searches the PF table 624 for an entry whose Source IP Address item has the same value as Unit variable and whose Destination IP Address item contains an IP Address on the indifferent network segment in search. The value of the Source Port item of that entry is set into Cport variable (step 9705).

If the value of the Category variable differs from SF at the step 9704, the auto discovery module 613 searches the PF table 624 for an entry whose Source IP Address item has the same value as Unit variable and whose Destination IP Address item has the same value as Root variable. The value of the Source Port item of that entry is set into Cport variable (step 9706). After the completion of the step 9705 or 9706, the auto discovery module 613 searches the PF table 624 for an entry whose Source IP Address item has the same value as Root variable (or any IP Address on the network segment in search). The auto discovery module 613 sets the value of the Source Port item of that entry into Pport variable (step 9707), and returns to the step 0701.

In the flow of FIG. 97, connections are detected by the method of FIG. 23 under the connection detection conditions for the R-CF, R-IF, and R-SF models shown in FIGS. 25 and 26.

Figure 98:
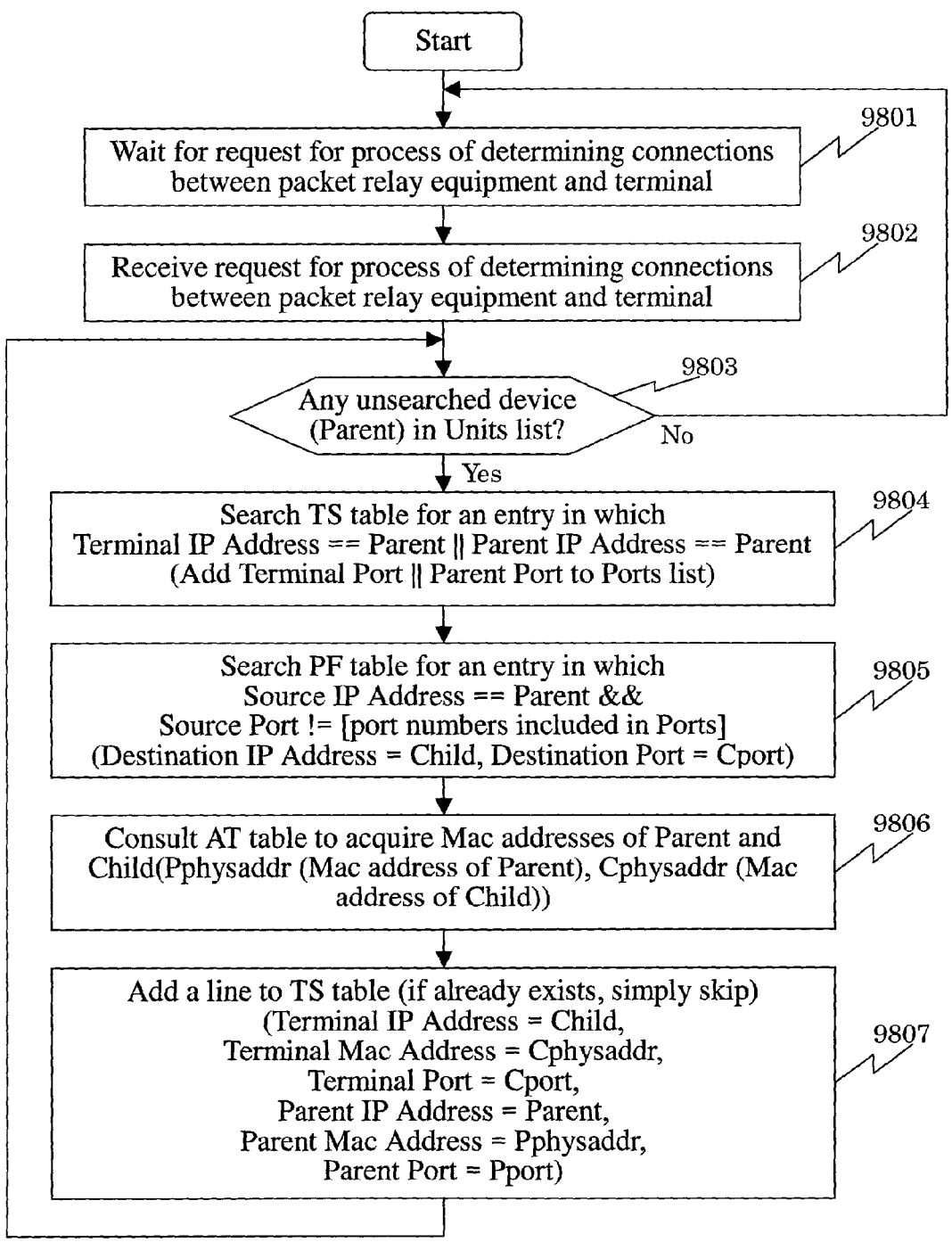
FIG. 98 is a flowchart showing a process in which the auto discovery module determines connections between packet relay equipment and a terminal in creating the TS table, in the network configuration automatic recognition method according to the present invention.

FIG. 98 is a flowchart showing the process of determining connection between packet relay equipment and a terminal, to be executed by the auto discovery module 613 in creating the TS table 625.

The auto discovery module 613 waits for a request for the process of determining connection between packet relay equipment and a terminal (step 9801). Receiving the request for the process of determining connection between packet relay equipment and a terminal (step 9802), the auto discovery module 613 successively acquires every entry in Units list variable (Units list variable in FIG. 67 (FIG. 91)), sets an item value into Parent variable, and checks for unsearched Parent variables (step 9803).

If there is any unsearched Parent variable at the step 9803, the auto discovery module 613 searches the TS table 625 for entries whose Terminal IP Address items have the same value as Parent variable or entries whose Parent IP Address items have the same value as Parent variable. Then , the auto discovery module 613 adds to Ports list variable all the values of the Terminal Port items of the hit entries in the cases where the Terminal IP Address items have the same value as Parent variable) or those of the Parent Port item of the hit entries (in the cases where the Parent IP Address items have the same value as Parent variable (step 9804).

If there is no unsearched Parent variable at the step 9803, the processing is repeated from the step 9801. After the completion of the step 9804, the auto discovery module 613 searches the PF table 624 for an entry whose Source IP Address item equals to Parent variable and whose Source Port item differs from any port number listed in Ports list variable. The value of the Destination IP Address item of the entry is set into Child variable, and the value of the Destination port item of the same is set into Cport variable (step 9805).

Next, by consulting the AT table 622, the auto discovery module 613 converts the IP Addresses in Parent and Child variables into Mac addresses in Pphysaddr and Cphysaddr variables, respectively (step 9806). The auto discovery module 613 adds to the TS table 625 an entry in which the Terminal IP Address item has the value of Child variable, the Terminal Mac Address item the value of Cphysaddr variable, the Terminal Port item the value of Cport variable, the Parent IP Address item the value of Parent variable, the Parent Mac Address item the value of Pphysaddr variable, and the Parent Port item the value of Pport variable (if the same entry already exists, simply skips) (step 9807), and returns to the step 9803.

Figure 99:
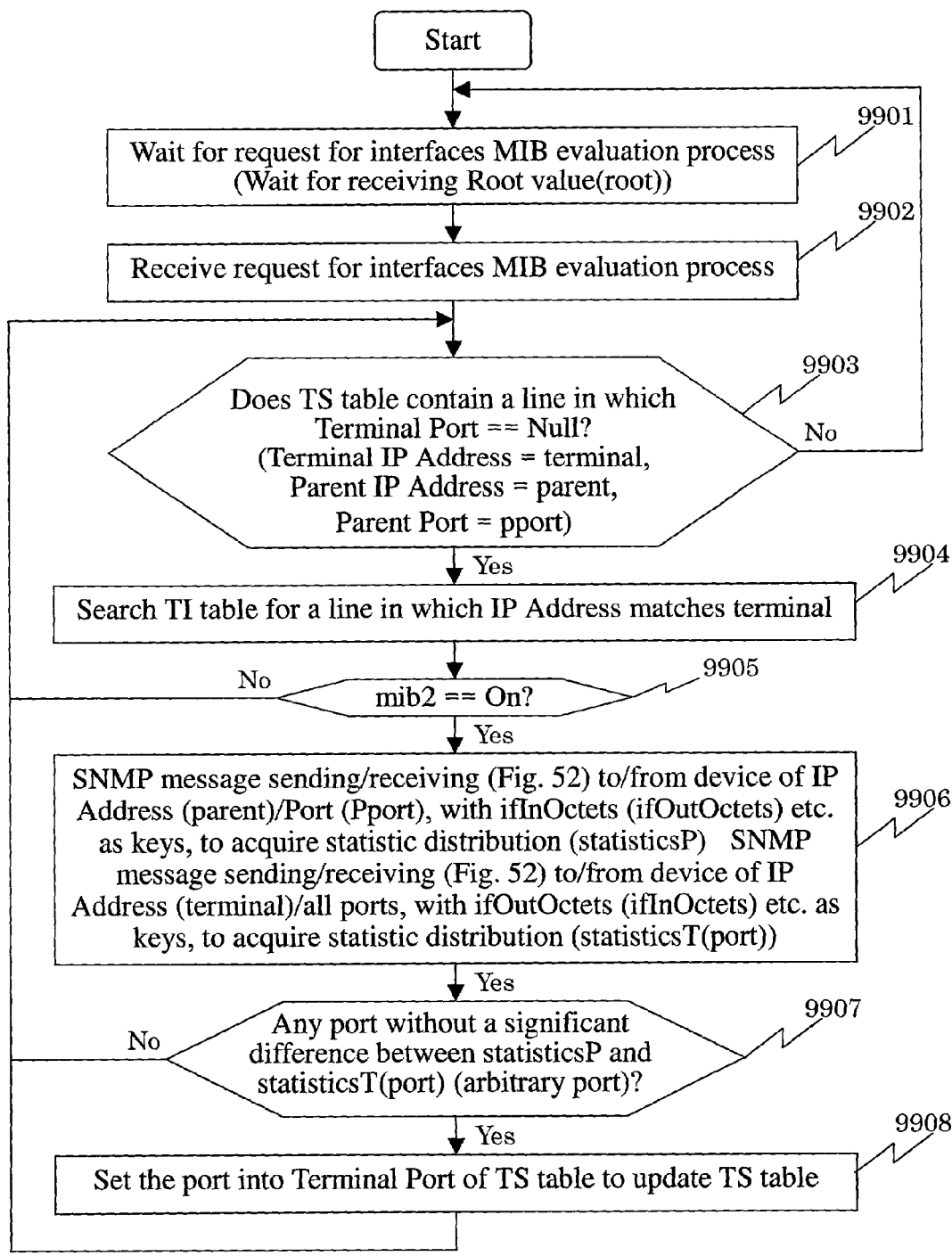
FIG. 99 is a flowchart showing a process in which the auto discovery module evaluates interfaces MIBs in creating the TS table, in the network configuration automatic recognition method according to the present invention.

FIG. 99 is a flowchart showing the process in which the auto discovery module 613 evaluates interfaces MIBs in creating the TS table 625.

The auto discovery module 613 waits for a request for the interfaces MIB evaluation process (step 9901). When it receives the IP address value of the Root device (set in Root variable) as the request for the interfaces MIB evaluation process step 9902), the auto discovery module 613 searches the TS table 625 for an entry having a NULL value in its Terminal Port item, with the Terminal Port item as the key. The values of the Terminal IP Address item, the Parent IP Address item, and the Parent Port item of the hit entry are set into Terminal variable, Parent variable, and Pport variable, respectively (step 9803).

Next, the auto discovery module 613 searches the TI table 623 for an entry equivalent to Terminal variable with the IP Address item as the key, (step 9904), and checks whether the MIB2 item of the hit entry has a value of "1" (True) (step 9905).

If the value of the MIB2 item is "0" (False), the auto discovery module 613 returns to the step 9903. If the value of the MIB2 item is "1" (True), the SNMP Get-Request message sending/receiving of the flow of FIG. 52 is performed on the port having the port number equivalent to Pport variable, of the device having the IP address of Parent variable, with ifInOctets (ifOutOctets) as the object name, so that the statistical distribution is obtained and set into statisticsP variable.

Similarly, the SNMP Get-Request message sending/receiving of the flow of FIG. 52 is performed for all the port numbers of the device having the IP address of Terminal variable with ifOutOctets (ifInOctets) as the object name, so that the statistic distribution is obtained and set into statisticsT [port number] variable (step 9906).

After the completion of the step 9906, the auto discovery module 613 checks for a port number which makes no significant difference between statisticsP variable and statisticsT [port number] (step 9907). If none, the processing is repeated from the step 9903. The significant difference employed here means, for example, that a certain threshold is previously set on a difference between two values and if the difference between two values exceeds the threshold, the two values are determined to be different from each other. If there is any port number with no significant difference, the auto discovery module 613 sets the port number into the Terminal Port item of the corresponding entry in the TS table 625 for the sake of entry update on the TS table 625 (step 9908). After the completion of the step 9908, the processing is repeated from the step 9903.

Figure 100:
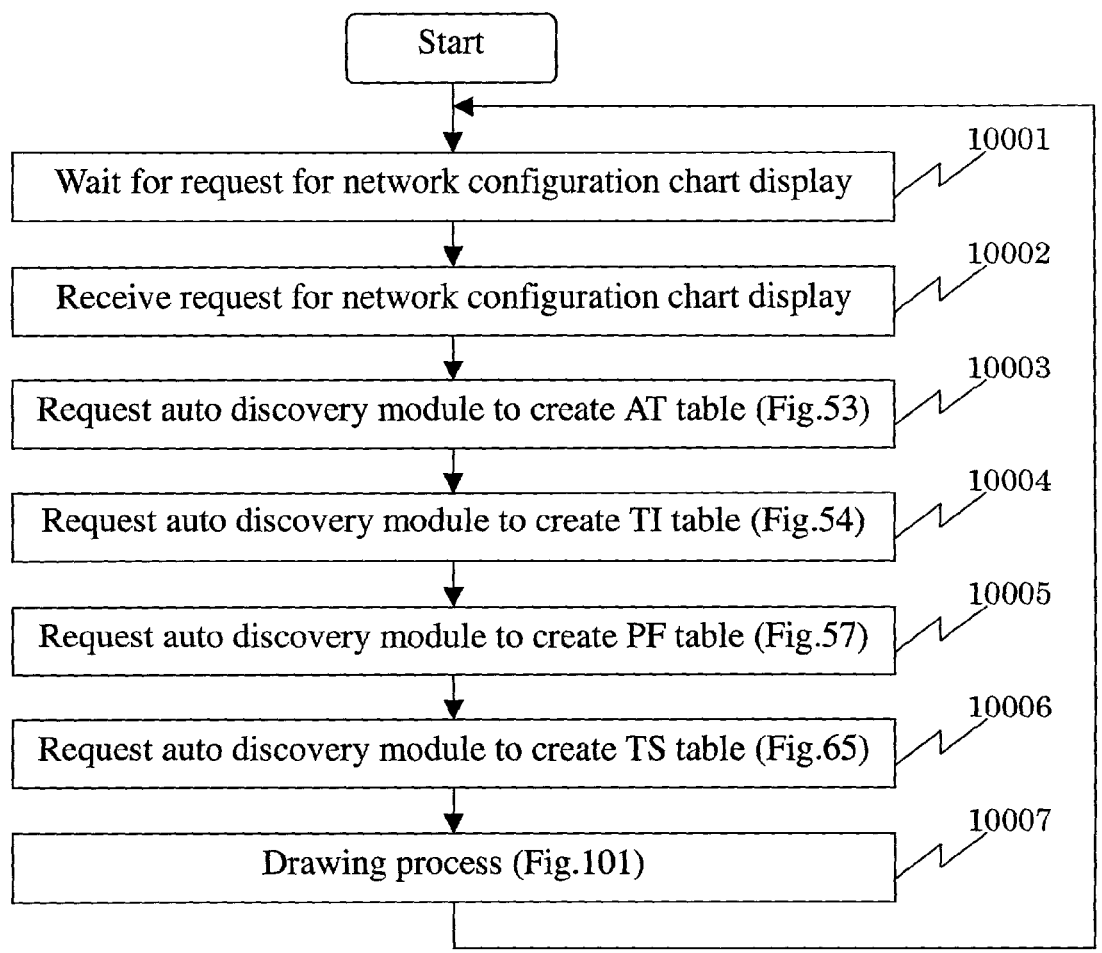
FIG. 100 is a flowchart showing a process in which the chart display program displays a network configuration chart, in the network configuration automatic recognition method according to the present invention.

FIG. 100 is a flowchart showing a process in which the chart display program 604 displays a network configuration chart.

The chart display program 604 waits for a network configuration chart display request (step 10001), and on receiving the network configuration chart display request (step 10002), runs the process of FIG. 53, of creating the AT table 622 by the auto discovery module 613 (step 10003).

Next, the chart display program 604 runs the process of FIG. 54, of creating the TI table 623 by the auto discovery module 613 (step 10004). Next, the chart display program 604 runs the process of FIG. 57, of creating the PF table 624 by the auto discovery module 613 (step 10005).

Next, the chart display program 604 runs the process of FIG. 65, of creating the TS table 625 by the auto discovery module 613 (step 10006). Finally, the chart display program 604 executes the drawing process of FIG. 101 (step 10007), and repeats the processing from the step 10001.

Figure 101:
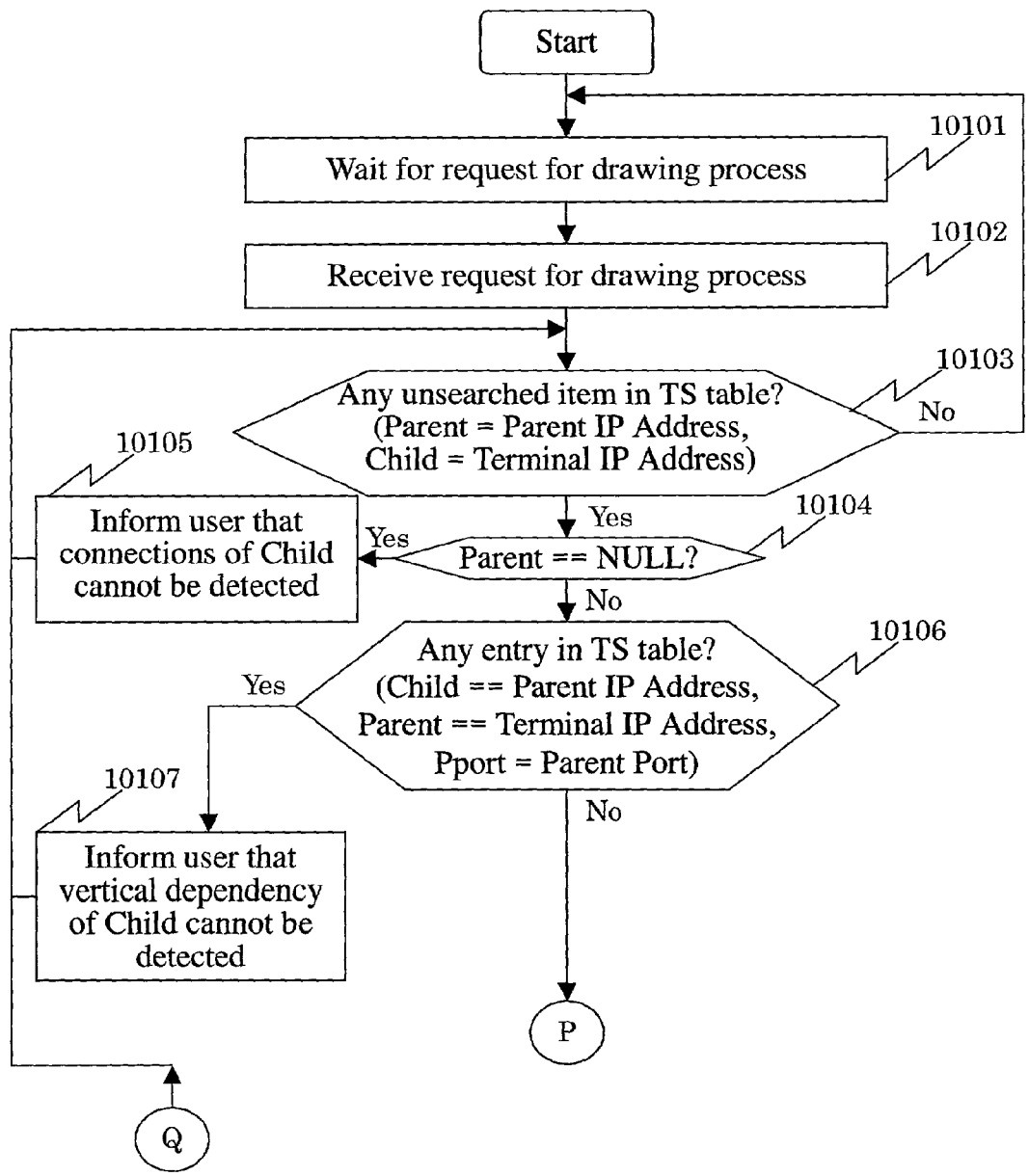
FIG. 101 is a flowchart showing a process in which the chart display program renders on-screen drawing in displaying a network configuration chart, in the network configuration automatic recognition method according to the present invention.
Figure 102:
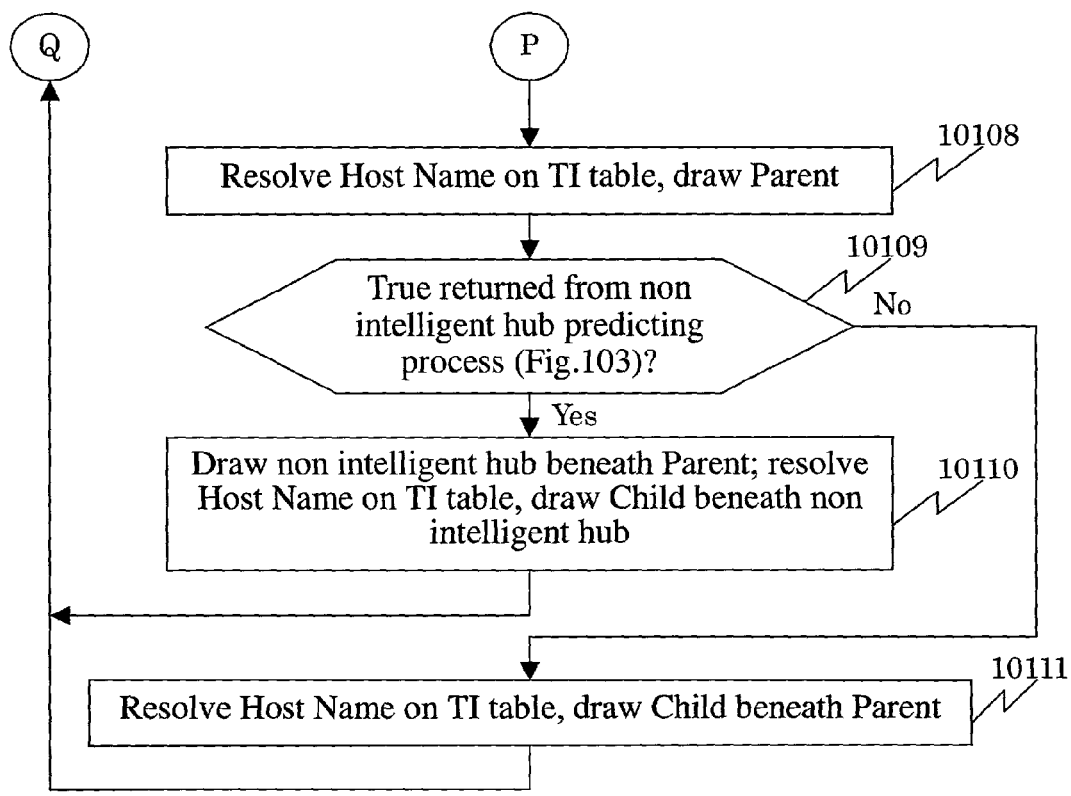
FIG. 102 is a flowchart continued from FIG. 101.

FIGS. 101 and 102 are flowcharts showing a process in which the chart display program 604 renders on-screen drawing in displaying a network configuration chart.

The chart display program 604 waits for a request for the drawing process (step 10101). Receiving the request for the drawing process (step 10102), the chart display program 604 starts to search all the entries of the TS table 625 for unsearched entries. If there is no unsearched entry, the processing is repeated from the step 10101. If there is any unsearched entry, the chart display program 604 sets the value of the Parent IP Address item of that entry into Parent variable, and the value of the Terminal IP Address item of the same into Child variable (step 10103).

Then, the chart display program 604 checks whether the value of Parent variable equals to a NULL value (step 10104). If the value of Parent variable equals to a NULL value, the chart display program 604 informs the user that connection cannot be detected of the Child-variable device (step 10105), and returns to the step 10103.

If the value of Parent variable differs from a NULL value, the chart display program 604 checks all the entries of the TS table 625 for any entry whose Parent IP Address item has the same value as Child variable and whose Terminal IP Address item has the same value as Parent variable, and sets the value of Parent Port item into Pport variable (step 10106).

If there is a hit entry, the chart display program 604 informs the user that vertical dependency cannot be detected of the Child-variable device (step 1017), and returns to the step 10103. If there is not hit entry, the chart display program 604 searches the IP Address items in the TI table 623 with Parent variable and Child variable as the keys, and displays onscreen the value of the Host Name item corresponding to Parent variable of a hit entry (step 10108).

Note that this processing is skipped if the Parent is already drawn or Parent variable has a NULL value.

Figure 103:
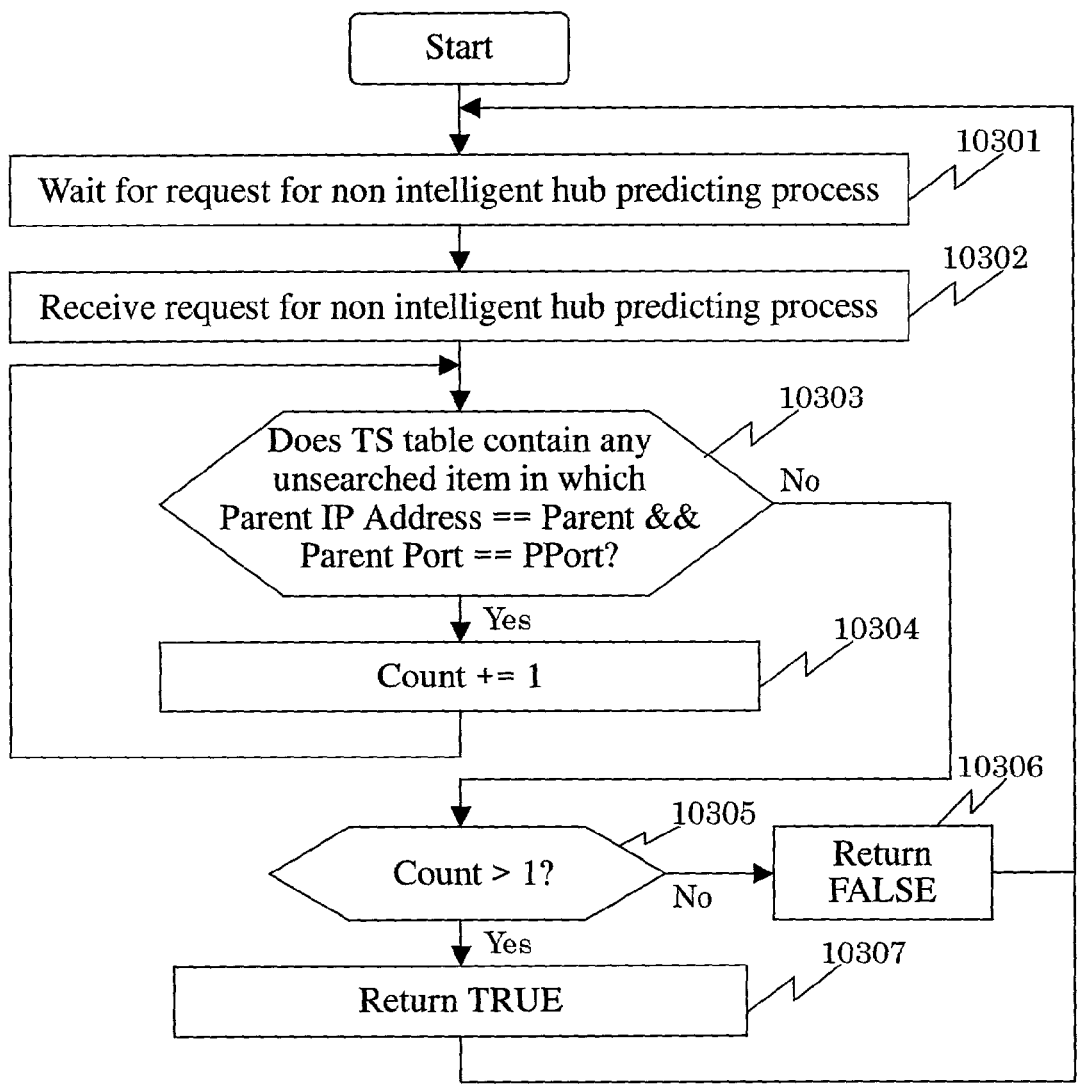
FIG. 103 is a flowchart showing a process in which the chart display program predicts a non-intelligent hub in drawing a network configuration chart, in the network configuration automatic recognition method according to the present invention.

After the completion of the step 10108, the chart display program 604 executes a non-intelligent hub predicting process of FIG. 103 (step 10109) to check whether a non-intelligent hub is operating between the device of Parent variable and the device of Child variable.

If the return value of the non-intelligent hub predicting process is "1" (True), the chart display program 604 draws a non-intelligent hub to immediately below the device of Parent variable, and draws the value of the Host Name item corresponding to the device of Child variable of the hit entry to immediately below the non-intelligent hub (step 10110). Note that this processing is skipped if a non-intelligent hub is already drawn to immediately below the Parent-variable device.

If the return value of the non-intelligent hub predicting process is "0+ (False), the chart display program 604 draws the value of the Host Name item corresponding to the device of Child variable in the hit entry to immediately below the Parent (step 10111). After the completion of either of the steps 10110 and 10111, the processing is repeated from the step 10103.

The non-intelligent hub predicting process is intended for the recognition of non-intelligent hub operation, and thus is incapable of predicting the hierarchical structure and the number of steps of non-intelligent hubs. Thus, a process can also be added here to prompt the user to select the actual connection configuration from among possible connection configurations by using GUI and the like.

FIG. 103 is a diagram showing the process in which the chart display program 604 predicts a non-intelligent hub in drawing a network configuration chart.

The chart display program 604 waits for a request for the non-intelligent hub predicting process (step 10301). When the chart display program 604 receives a value of the Parent IP Address item (set into Parent variable) and a value of the Parent Port item (set into Pport variable) in the TS table 625 as the request for the non-intelligent hub predicting process (step 10302), it searches the Parent IP Address items and the Parent Port items in the TS table 625 for a hit entry with Parent variable and Pport variable as the keys (step 10303).

If there is a hit entry, the chart display program 604 increments the value of Count variable (Count variable is initialized to "0") (step 10304), and repeats the processing from the step 10303.

If there is not hit entry, the chart display program 604 checks whether Count variable is greater than "1" (step 10305), and if Count variable is smaller than or equal to "1," returns False (step 10306). If Count variable is greater than "1," True is returned (step 10307).

After the completion of either of the steps 10306 and 10307, the processing is repeated from the step 10301.

In the non-intelligent hub predicting process, the presence of a non-intelligent hub is predicted when a plurality of devices are connected directly to the same port of a single piece of packet relay equipment.

Figure 104:
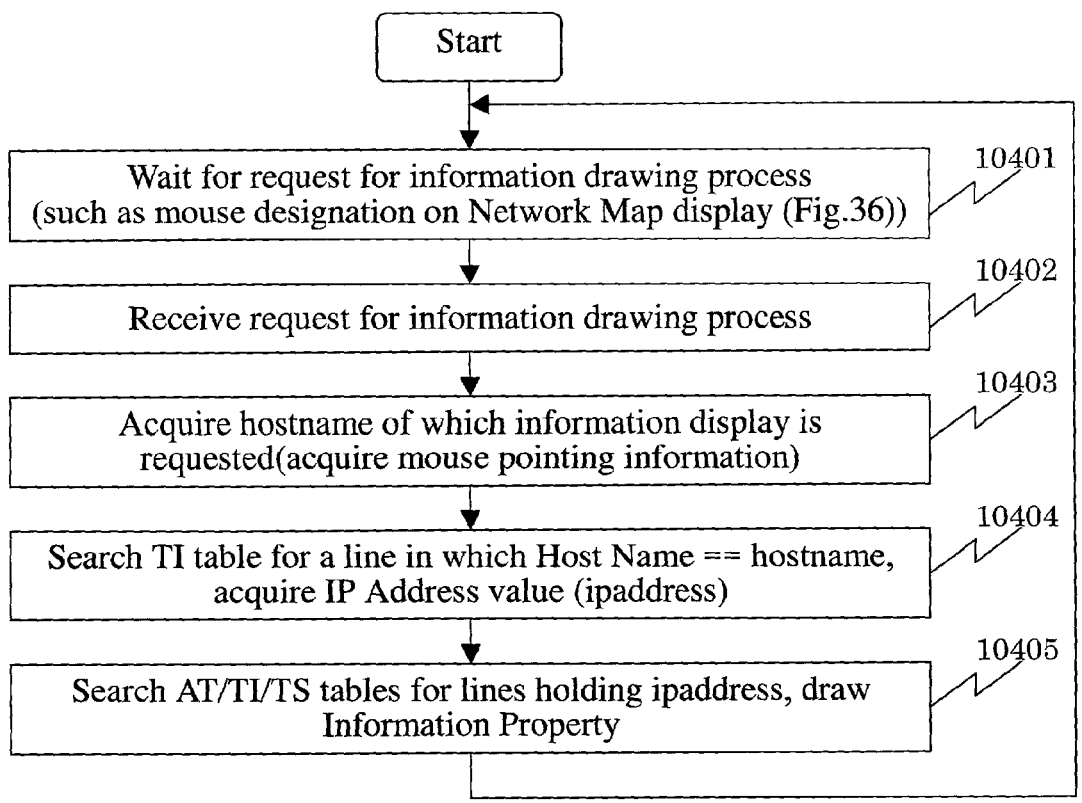
FIG. 104 is a flowchart showing a process in which the chart display program displays device information at user events, in the network configuration automatic recognition method according to the present invention.

FIG. 104 is a flowchart showing a process in which the chart display program 604 displays device information at user events.

The chart display program 604 waits for a device information display request (step 10401). Receiving the device information display request in the form of a mouse event from the user such as the user's mouse-clicking on a device display area on the network configuration chart (step 10402), the chart display program 604 renders GUI display, such as the highlight of the device display area on the network configuration chart, and then obtains the corresponding hostname (step 10403).

The chart display program 604 searches the Host Name items in the TI table 623 with the required hostname as the key, and sets the value of the IP Address item of the hit entry into ipaddress variable (step 10404). Finally, the chart display program 604 searches the AT table 622, the TI table 623, and the TS table 625 with ipaddress variable as the key, and draws the information of the acquired entry onto the device information display area (step 10405). Then, the processing is repeated from the step 10401.

Figure 105:
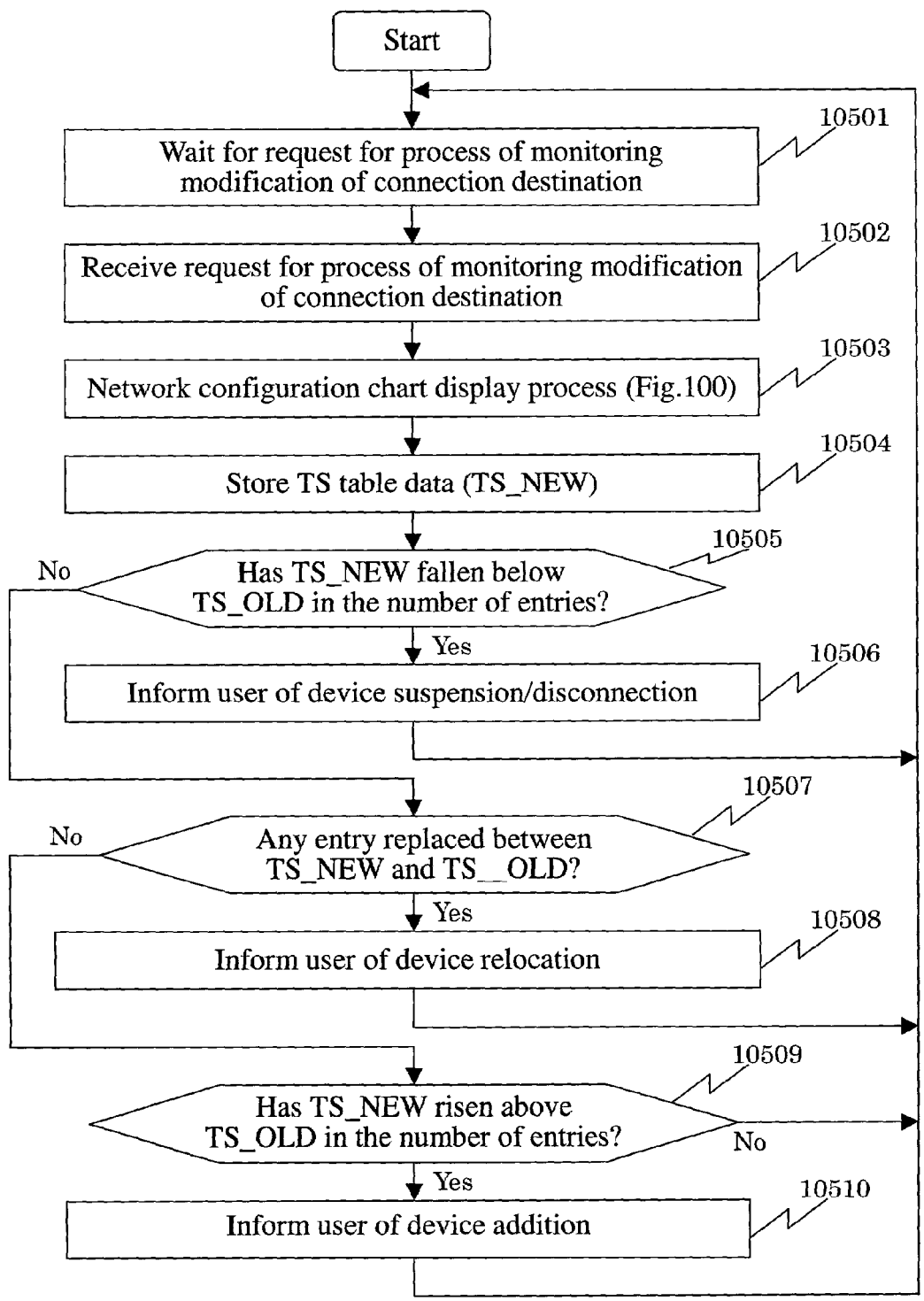
FIG. 105 is a flowchart showing a process in which the chart display program monitors a modification of connection destination, in the network configuration automatic recognition method according to the present invention.

FIG. 105 is a flowchart showing a process in which the chart display program 604 monitors a modification of connection destination.

The chart display program 604 waits for a request for the process of monitoring a modification of connection destination (step 10501). Receiving the request for the process of monitoring a modification of connection destination (step 10502), the chart display program 604 executes the network configuration chart display process of FIG. 100 to draw the network configuration detected (step 10503).

Next, the TS table data created during the detection of the network configuration is stored into the area for TS_NEW (step 10504).

Here, TS_NEW and TS_OLD (initialized to a NULL value) are compared to check for a decrease in the number of entries (step 10505). Note that the comparison cannot be made and thus is ignored when TS_OLD equals to a NULL value. If TS_NEW has fallen below TS_OLD in the number of entries, the chart display program 604 informs the user of device suspension or disconnection (step 10506), and returns to the step 10501.

If TS_NEW has not decreased from TS_OLD in the number of entries, the chart display program 604 checks whether TS_OLD and TS_OLD have entries replaced therebetween (in which case they are identical in IP Address item values but different in Parent IP Address/Parent Port) (step 10507). If there is any entry replaced between TS_NEW and TS_OLD, the chart display program 604 informs the user of device relocation (step 10508), and returns to the step 10501.

If there is not entry replaced between TS_NEW and TS_OLD, the chart display program 604 checks whether TS_NEW has risen above TS_OLD in the number of entries (step 10509). If TS_NEW has risen above TS_OLD in the number of entries, the chart display program 604 informs the user of new device addition (step 10510), and returns to the step 10501.

The chart display program 604 also returns to the step 10501 when TS_NEW has not increased in the number of entries as compared with TS_OLD.

Figure 106:
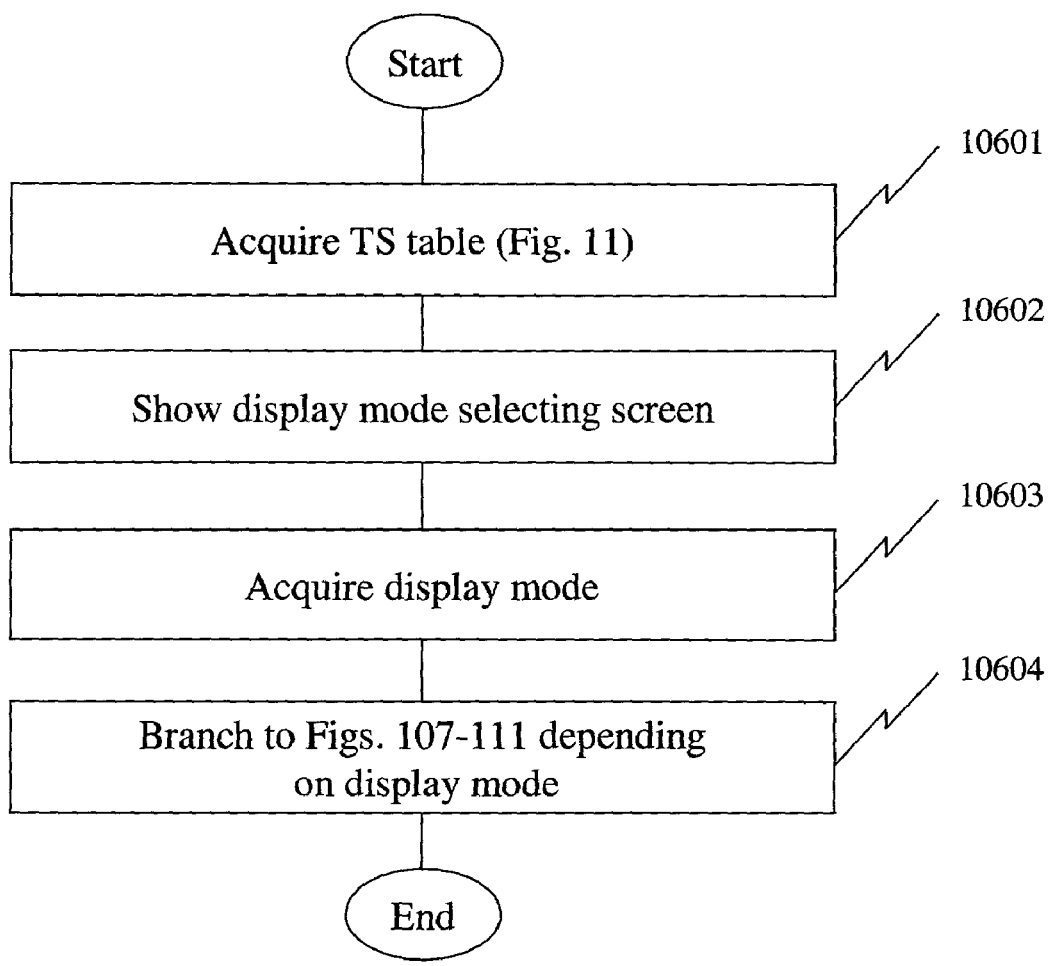
FIG. 106 is a flowchart showing the operation of the chart display program running on the administrator terminal according to the present invention.

FIG. 106 is a flowchart showing the operation of the chart display program 604 for display mode selection/alteration.

Receiving a request for the display mode selection/alteration from the user, the chart display program 604 acquires the TS table 625 of FIG. 11 (step 10601). Next, the chart display program 604 displays a screen to select the display mode of packet relay equipment objects, distribution objects, and connection objects (step 10602). After a display mode is determined (step 10603), the chart display program 604 branches in ten possible ways (FIGS. 107-111) depending on the display mode (step 10604).

Alternatively, the TS table 625 may be received through the network after collected by other terminals.

Figure 107:
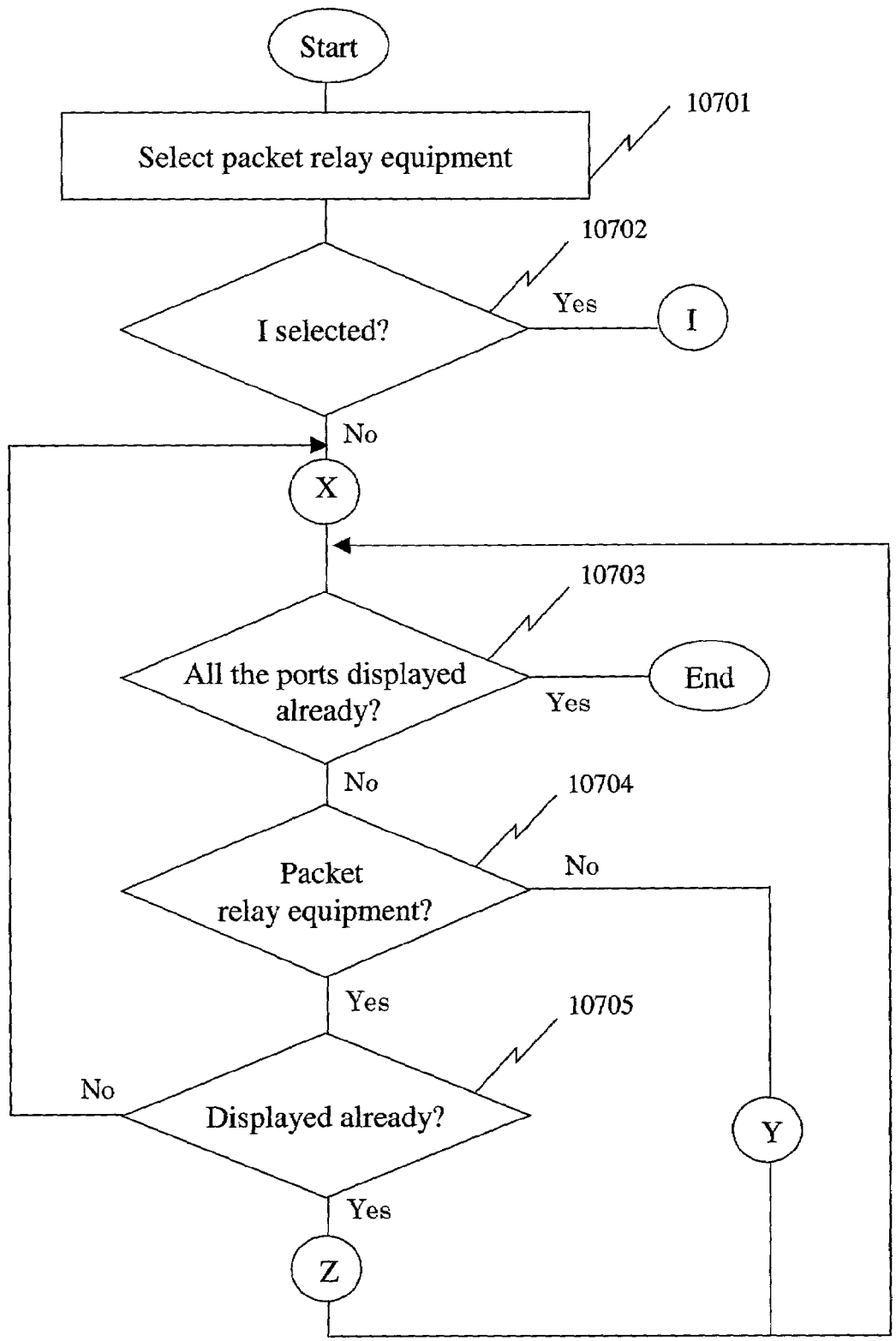
FIG. 107 is a flowchart showing the operation of the chart display program running on the administrator terminal according to the present invention.

FIG. 107 is a flowchart showing the operation of the chart display program 604 to display a network configuration according to the individual display modes.

Figure 108:
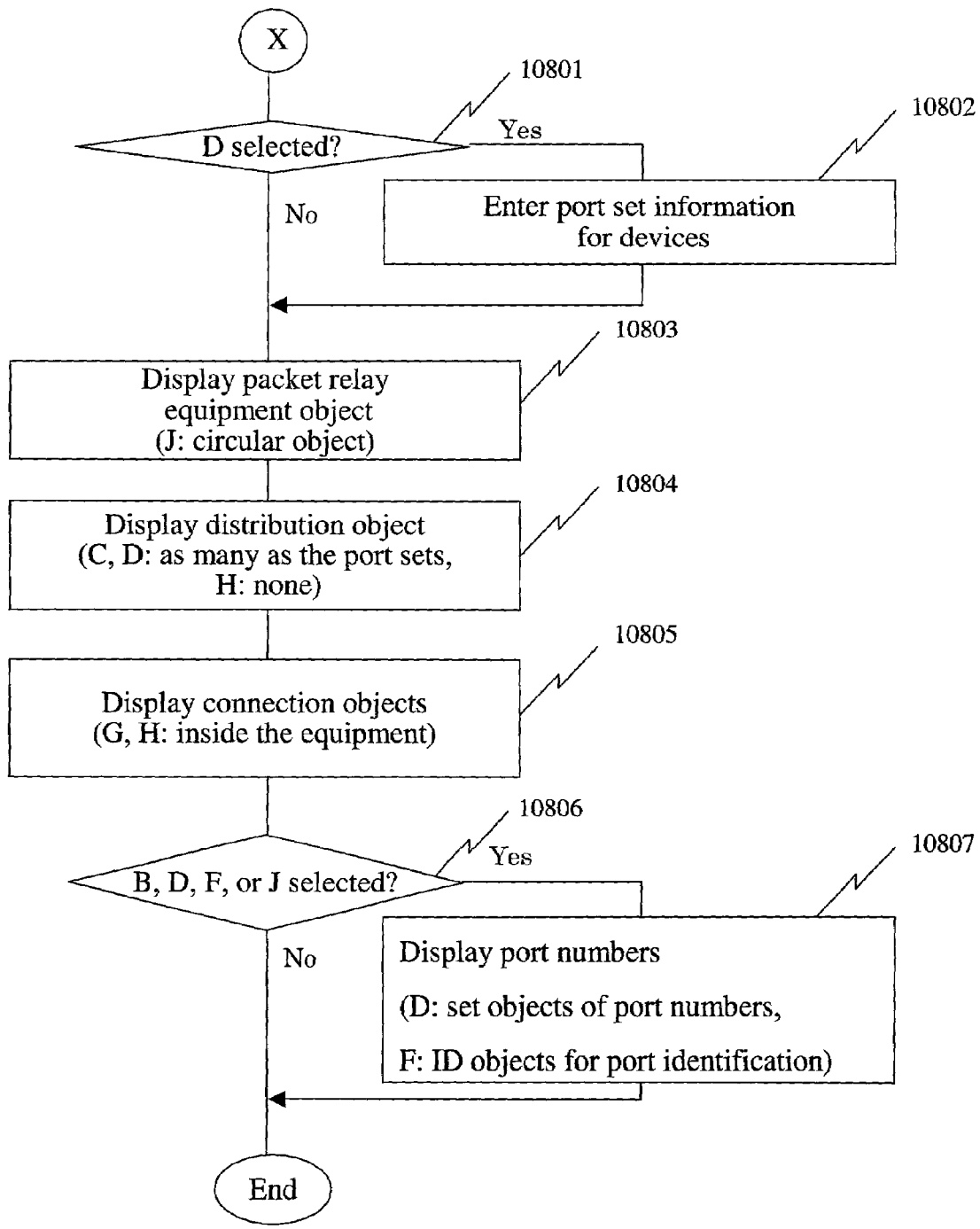
FIG. 108 is a flowchart showing the operation of the chart display program running on the administrator terminal according to the present invention.

A piece of packet relay equipment to be the starting point of display is selected from the TS table 625 of FIG. 11 (step 10701). The chart display program 604 checks whether the display mode selected is 5009I (step 10702), and if so, executes the processing I in FIG. 111. If the display mode selected is not I at the step 10702, the processing X in FIG. 108 is executed. Next, the chart display program 604 checks whether all the connection ports have been displayed (step 10703). If not, the chart display program 604 makes determinations in the order of port numbers as to whether the devices connected are packet relay equipment (step 10704). If not, the chart display program 604 executes the processing Y in FIG. 109, and returns to the step 10703.

If the devices connected are packet relay equipment, the chart display program 604 determines whether they have been displayed (step 10705). If already displayed, the chart display program 604 executes the processing Z in FIG. 110, and returns to the step 10703. If not, it returns to the processing X in FIG. 108.

FIG. 108 is a flowchart showing the operation of the chart display program 604 to display packet relay equipment according to the individual display modes.

The chart display program 604 checks whether the button 5009D is selected (step 10801), and if so, executes a process of entering port set information for devices (step 10802). If a button other than 5009D is not selected at the step 10801 or after the completion of the step 10802, the chart display program 604 displays an equipment object (step 10803). If the button 5009J is selected, a circular object is employed as the equipment object. Next, the chart display program 604 displays a distribution object or distribution objects (step 10804). If the button 5009C or 5009D is selected, a distribution object is displayed for each of the port sets. If the button 5009H is selected, no distribution object is displayed. Next, the chart display program 604 displays connection objects (step 10805). If the button 5009G or 5009H is selected, the distribution objects are displayed inside the equipment object. Then, the chart display program 604 checks whether the button 5009B, 5009D, 5009F, or 5009J is selected (step 10806), and if so, displays port numbers (step 10807). If the button 5009D is selected, set objects of port numbers are displayed. If the button 5009F is selected, ID objects for port identification are displayed.

Figure 109:
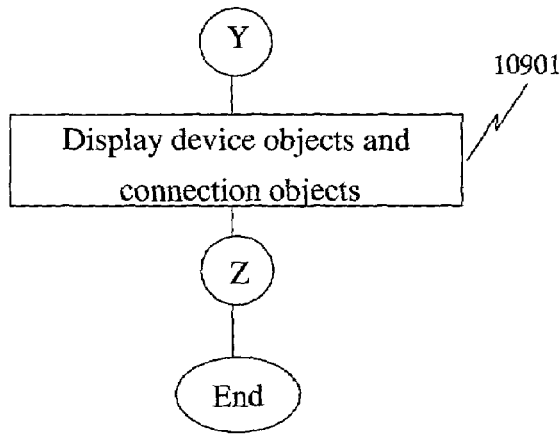
FIG. 109 is a flowchart showing the operation of the chart display program running on the administrator terminal according to the present invention.

FIG. 109 is a flowchart showing the operation of the chart display program 604 to display devices other than the packet relay equipment according to the individual display modes.

Figure 110:
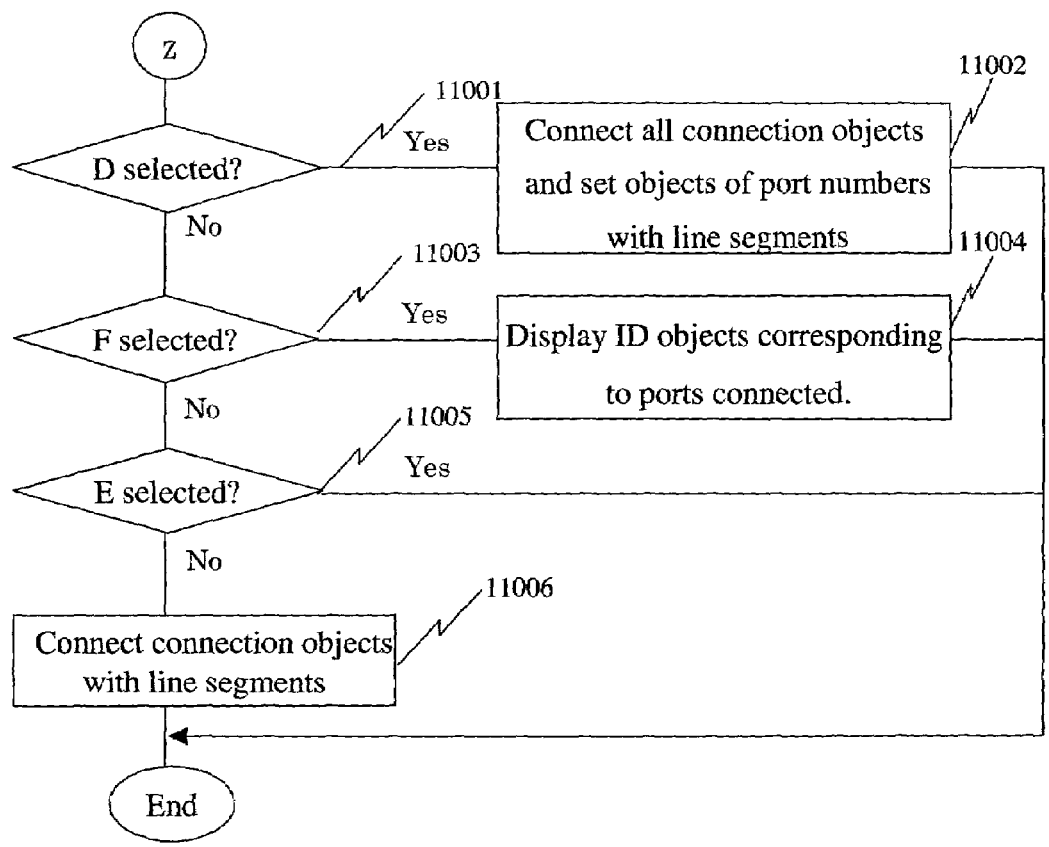
FIG. 110 is a flowchart showing the operation of the chart display program running on the administrator terminal according to the present invention.

The chart display program 604 displays devices objects and connection objects (step 10901), and executes the processing Z in FIG. 110.

FIG. 110 is a flowchart showing the operation of the chart display program 604 to display the connections between pieces of packet relay equipment according to the individual display modes.

The chart display program 604 checks whether the button 5009D is selected (step 11001), and if so, connects all the connection objects and the set objects of port numbers with line segments (step 11002). If a button other than 5009D is not selected at the step 11001, the chart display program 604 checks whether the button 5009F is selected (step 11003). If the button 5009F is selected at the step 11003, the chart display program 604 displays ID objects corresponding to the ports connected (step 11004). If a button other than 5009F is selected at the step 11003, the chart display program 604 checks whether the button 5009E is selected (step 11005). If a button other than 5009E is selected at the step 11005, the chart display program 604 links the connection objects to each other with line segments (step 11006), and terminates.

Figure 111:
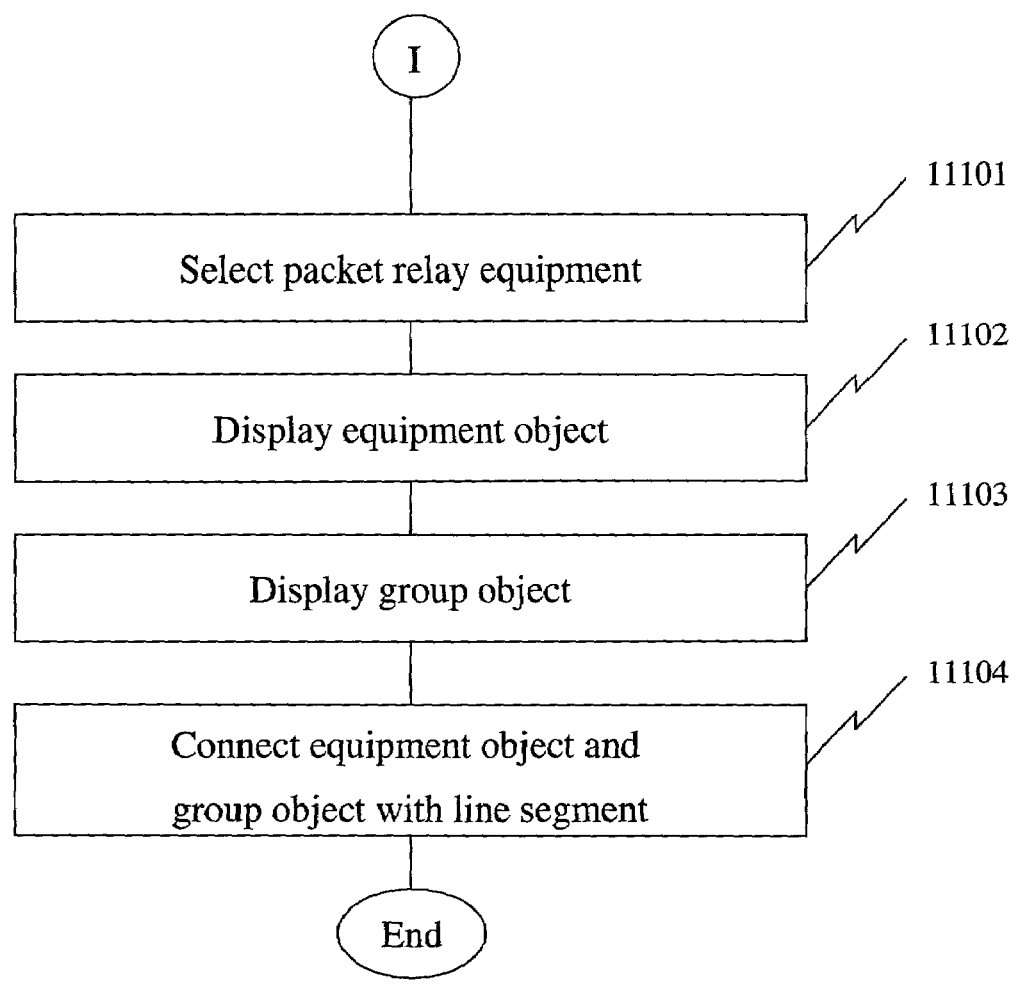
FIG. 111 is a flowchart showing the operation of the chart display program running on the administrator terminal according to the present invention.

FIG. 111 is a flowchart showing the operation of the chart display program 604 when the button 5009I is selected.

Initially, a piece of packet relay equipment to be the starting point of display is selected from the TS table 625 in FIG. 11 (step 11101). The chart display program 604 displays a packet relay equipment object on-screen (step 11102), displays a group object (step 11103), connects the group object and the packet relay equipment object with a line segment (step 11104), and terminates.

Figure 112:
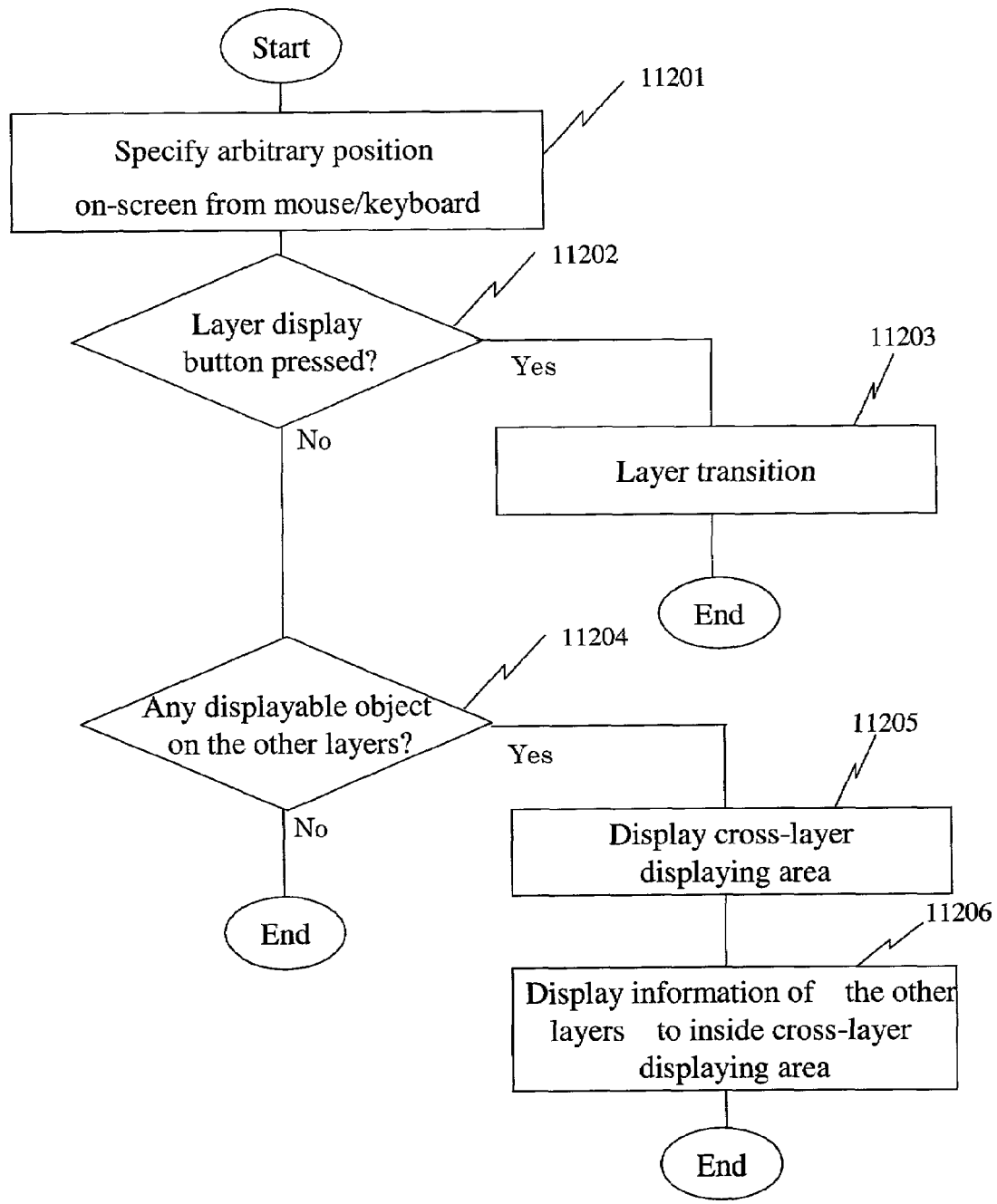
FIG. 112 is a flowchart showing the operation for layer information display, of the chart display program running on the administrator terminal according to the present invention.

FIG. 112 is a flowchart showing the processing for layer transition by the chart display program 604.

The user specifies an arbitrary position on-screen through mouse or keyboard operations (step 11201). Then, the chart display program 604 checks for a layer display button in the position specified (step 11202), and if the user presses the layer display button, effects a layer transition (step 11203). When the user selects anything other than layer display buttons, the chart display program 604 checks whether displayable objects exist in the specified position on the other layers (step 11204). If any displayable objects exists, the chart display program 604 displays a cross-layer displaying area in the specified position on the current layer (step 11205), and displays the displayable object(s) or the other layers to inside the cross-layer displaying area (step 11206).

In the above-described embodiment of the present invention, ICMP echo requests are sent from an administrator terminal implementing an SNMP manager to individual network devices in the network node so that active network devices are detected on the basis of responses therefrom. Then, transfer requests for information stored in the management information bases of the respective network devices are sent to the SNMP agents in the individual network devices detected, so that the types of the network devices in the network node are detected based on the information stored in the management information bases returned. Accordingly, at least one administrator terminal can automatically detect the physical device configuration inside the network node without requiring implementation of any special software other than SNMP and irrespective of the mode of SNMP implementation.

Besides, a set of physical addresses of network devices connected to ports of a network device is obtained from the management information base of the network device, the network device being a type of device to have a bridge function. In addition, information as to physical-IP address correspondence is also obtained from the management information base of a network device having a routing function. Then, the devices connected to the ports of the network device having a bridge function are recognized at an IP level based on the acquired information as to physical-IP address correspondence. This allows the IP-level detection of port-by-port connections of network devices.

Moreover, network devices from which responses to the ICMP echo requests are returned are recognized to be active, and network devices from which no response is returned are to be non-existent. With reference to the information as to physical-IP address correspondence, if there is correspondence information of any network device other than those recognized to be active, then this network device is recognized to be inactive. Accordingly, not only the network devices in action but also network devices temporarily suspended can be detected.

Furthermore, the management information base of a network device having a bridge function or a repeater function is checked for stored information on inactive network devices connected to ports of the network device. If any, then connections of the inactive network devices are detected based on the stored information. Therefore, connections of the inactive network devices can be detected even when the stored information in the management information bases of the same cannot be obtained.

Besides, whether a plurality of network devices having a bridge function exist is detected. If detected, then whether one of the network devices having a bridge function is connected to a particular port of a parent device is detected, with one of the other network devices having a bridge function as the parent device. If any, a device configuration of each connection destination of a child device is retrieved with that network device as the child device, so as to recognize port-to-port connections between the network devices having a bridge function. This allows the detection of vertically dependent connections.

In addition, a difference is obtained between a set of physical addresses of the network devices connected to ports of the parent device connected to the child device and the sum of sets of physical addresses of the network devices connected to all the ports of the child device excepting those ports connected to the parent device, so as to recognize a network device or network devices interposed between the parent device and the child device. This allows the detection of vertically or horizontally dependent connections.

Moreover, in the cases where the presence of a plurality of devices is detected between the parent device and the child device, detections are made as to whether these devices each have any of a routing function, a bridge function, and a repeater function. If none, then the presence of non-intelligent packet relay equipment is predicted. This allows the detection of non-intelligent packet relay equipment.

Furthermore, physical addresses stored in the management information bases of the parent and child devices recognized of connections are checked. When the physical address of the child device is not stored in the management information base of the parent device or when the physical address of the parent device is not stored in the management information base of the child device, such an arbitrary device as commonly included in the sets of physical addresses of the devices connected to particular ports of the parent and child devices is selected so that the recognition of connection between the parent and child devices is narrowed based on the connection ports of the parent and child devices to the device selected. This makes it possible to cope with imperfections in the stored information, such as missing cache in the management information base.

Besides, the value of update frequency of the source physical address of a latest received frame in an arbitrary port of a network device having a repeater function is acquired to recognize the number of active devices connected to that arbitrary port from the value. Moreover, unless the value of update frequency is "0" or ¢1," the value of the source physical address of a latest received frame in the arbitrary port is acquired at regular time intervals to recognize the physical addresses of all the network devices connected to that arbitrary port. Accordingly, it is possible to detect both the number and the physical addresses of network devices connected to any port of a network device having a repeater function.

In addition, the value of update frequency of the source physical address of a latest received frame in an arbitrary port of a network device having a repeater function is acquired at regular time intervals so that the value can be checked for a change to recognize whether the network device having a repeater function is in conformity with RFC specifications.

Moreover, an arbitrary port of a network device having a bridge function and a network device having a repeater function can be temporarily locked out so that if a network device whose connections cannot be recognized on the basis of information stored in the management information bases of the network device having a bridge function and the network device having a repeater function responds to an ICMP echo request packet before the lockout but no longer responds after the lockout, this device is recognized to be connected to the arbitrary port.

Furthermore, port-by-port statistics as to send/receive frames of a network device having a bridge function and a network device having a repeater function can be collected at regular time intervals so that if network devices whose connections cannot be recognized on the basis of information stored in the management information bases of the network having a repeater function have a pair of ports with no significant difference, the pair of ports are recognized to be connected to each other.

Besides, information stored in the management information bases of the active network devices is collected at regular time intervals and stored into a storage area on the administrator terminal. Then, previously collected contents and the currently collected contents can be compared for a difference to detect activation, suspension, modification of connection destination, modification of IP address, and the like of the active network devices.

Moreover, a model table of connections between devices is created from information as to connections between network devices, so as to detect connections between network devices or present detection conditions by each model of the connections between devices or by combining a plurality of models of the connections between devices.

While the above-described embodiment has been configured to existing SNMP protocols, it is obvious that modifications may be made to details of the configuration in practice upon SNMP protocol updates.

The network devices are not limited to those connected through a wired network, and may be connected through a wireless network.

As is apparent from the foregoing description, according to the present invention, at least one administrator terminal can automatically detect the physical device configuration inside a network node in a network environment including SNMP-implemented intelligent packet relay equipment in operation, without requiring implementation of any special software other than SNMP and irrespective of the mode of SNMP implementation.

Besides, the detection is not limited to network devices interposed between a bridge and devices connected to the bridge. Configurations such as types and connections can be detected of all the devices on the network.

Furthermore, even when hubs are cascaded one another or when a plurality of terminals are connected to a repeater, the connections thereof can be detected.

There also is such an effect that the presence can be detected of even non-intelligent devices not implementing SNMP protocols.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A method of automatically recognizing a network configuration, for automatically recognizing a device configuration on a network system having a network node including at least one or more intelligent network devices each implementing an SNMP agent and a management information base, the method comprising:
   a first step of sending an ICMP echo request from an administrator terminal implementing an SNMP manager to individual network devices in the network node, and detecting existence and non-existence of network devices on the basis of responses therefrom, the administrator terminal implementing an SNMP manager, wherein the network devices include at least one device having plural IP addresses except for a router;
   a second step of
   creating plural different SNMP messages each for inquiring whether or not the network devices support IP forwarding function and one or more of management information bases included in each SNMP message wherein the management information bases (MIBs) include a bridge MIB a repeater MIB and a printer MIB,
   sending the plural SNMP messages one by one to the SNMP agents in network devices of which existence was detected to exist in the first step, and detecting the types of the network devices in the network node based on information of success and failure of sending and receiving the plural SNMP messages and based on combinations of information stored in management information bases included in the received SNMP messages, wherein the types of the individual network devices and roles of the individual network devices in the network node are determined based on the combinations of the information stored in the management information bases included in the received SNMP messages and wherein the type of device does not indicate the role of device primarily in terms of the device having the plural IP addresses except for the routers;

a third step of acquiring a set of physical addresses of network devices connected to ports of a network devices from the management information base of the network device, the network device being a type of device to have a bridge function;

a fourth step of acquiring information as to physical IP address correspondence from the management information base of a network device having a routing function; and a fifth step of recognizing at an IP level the network devices connected to each of the ports of the network device having a bridge function, based on the acquired information as to physical-IP address correspondence.

2. The method of automatically recognizing a network configuration according to claim 1, further comprising a sixth step of: recognizing that network devices from which a response to the ICMP echo request is returned are active and network devices from which no response is returned are nonexistent; and referring to the information as to physical-IP address correspondence acquired in the fourth step, and if there is correspondence information of any network device other than those recognized to be active, recognizing this network device to be inactive.

3. The method of automatically recognizing a network configuration according to claim 2, further comprising the step of checking the management information base of a network device having a bridge function or a repeater function for stored information on inactive network devices connected to ports of the network device, and if any, detecting connections of the inactive network devices based on the stored information.

4. The method of automatically recognizing a network configuration according to claim 1, further comprising the step of detecting the presence of a plurality of network devices having a bridge function, based on the contents of the management information bases of the network devices acquired at the second step, and if the presence of a plurality of them is detected, then detecting whether one of the network devices having a bridge function is connected to a particular port of a parent device with one of the other network devices having a bridge function as the parent device, and if any, then retrieving a device configuration of each connection destination of a child device with that network device as the child device, thereby recognizing port-to-port connections between the network devices having a bridge function.

5. The method of automatically recognizing a network configuration according to claim 4, comprising the step of, in the cases where the presence of a plurality of devices is detected between the parent device and the child device, detecting whether these devices each have any of a routing function, a bridge function, and a repeater function, and if none, then predicting the presence of non-intelligent packet relay equipment.

6. The method of automatically recognizing a network configuration according to claim 4, comprising the step of checking physical addresses stored in the management information bases of the parent and child devices recognized of connection, and when the physical address of the child device is not stored in the management information base of the parent device or when the physical address of the parent device is not stored in the management information base of the child device, selecting such an arbitrary device as commonly included in the sets of physical addresses of the devices connected to particular ports of the parent and child devices so that the recognition of connection between the parent and child devices is narrowed based on the connection ports of the parent and child devices to the device selected.

7. The method of automatically recognizing a network configuration according to claim 1, comprising the steps of:
acquiring the value of update frequency of the source physical address of a latest received frame in an arbitrary port of a network device having a repeater function, so as to recognize the number of active devices connected to that arbitrary port from the value; and,
unless the value of update frequency is "0" or "1," acquiring the value of the source physical address of a latest received frame in the arbitrary port at regular time intervals, so as to recognize the physical addresses of all the network devices connected to that arbitrary port.

8. The method of automatically recognizing a network configuration according to claim 1, further comprising the step of acquiring the value of update frequency of the source physical address of a latest received frame in an arbitrary port of a network device having a repeater function at regular time intervals, and checking for a change in the value to recognize whether the network device has a repeater function.

9. The method of automatically recognizing a network configuration according to claim 1, further comprising the step of temporarily locking out an arbitrary port of a network device having a bridge function and a network device having a repeater function by using the administrator terminal, and if a network device whose connection cannot be recognized on the basis of information stored in the management information bases of the network device having a bridge function and the network device having a repeater function responds to an ICMP echo request packet before the lockout but no longer responds after the lockout, recognizing this device to be connected to the arbitrary port.

10. The method of automatically recognizing a network configuration according to claim 1, comprising the step of collecting port-by-port statistics as to send/receive frames of a network device having a bridge function and a network device having a repeater function at regular time intervals, and if network devices whose connections cannot be recognized on the basis of information stored in the management information bases of the network device having a bridge function and the network device having a repeater function have a pair of ports to fall within a range of values of the statistics arbitrarily set by port, recognizing this pair of ports to be in connection.

11. The method of automatically recognizing a network configuration according to any one of claims 2-10, comprising the step of collecting information stored in the management information bases of the active network devices at regular time intervals, storing the same into a storage area on the administrator terminal, and comparing previously collected contents and the currently collected contents for a difference to detect activation, suspension, modification of connection destination, modification of IP address, and the like of the active network devices.

12. The method of automatically recognizing a network configuration according to any one of claims 2-10, comprising the step of creating a model table of connections between devices on the basis of information as to connections between network devices, and referring to the model table to detect connections between network devices by each model of the connections between devices or by combining a plurality of models of the connections between devices.

13. The method of automatically recognizing a network configuration according to any one of claims 1-10, comprising the step of expanding a recognized network configuration into logical chart data, creating chart data including a physical device configuration arranged on a physical floor map or the like, and displaying at least one set of chart data on a display screen.

14. A system for automatically recognizing a network configuration, wherein an administrator terminal implementing an SNMP manager automatically recognizes a device configuration on a network system having a network node including at least one or more intelligent network devices each implementing an SNMP agent and a management information base, the administrator terminal implementing an SNMP manager comprising:

first means for sending an ICMP echo request to individual network devices in the network node, and detecting existence or non-existence of network devices on the basis of responses therefrom, wherein the network devices include at least one device having plural IP addresses except for a router;

second means for creating plural SNMP messages, each of the plural SNMP messages inquiring whether or not the network devices support IP forwarding function and one or more of management information bawl included in each SNMP message wherein the management information bases (MIBs) include a bridge MIB, a repeater MIB and a printer MIB, sending the plural SNMP messages one by one to the SNMP agents in network devices of which existence was detected by the first means, and detecting the types of the network devices in the network node based on information of success and failure of sending and receiving the plural SNMP messages and based on combinations of information stored in the management information bases included in the received SNMP messages, wherein the types of the individual network devices and roles of the individual network devices in the network node are determined based on the combinations of the information stored in the management information bases included in the received SNMP messages and wherein the type of device does not indicate the role of device primarily in terms of the device having the plural IP addresses except for the router;

third means for acquiring a set of physical addresses of network devices connected to ports of a network device from the management information base of the network device, the network device being a type of device to have a bridge function;

fourth means for acquiring information as to physical-IP address correspondence from the management information base of a network device having a routing function; and, fifth means for recognizing at an IP level the devices connected to each of the ports of the network device having a bridge function, based on the acquired information as to physical-IP address correspondence.

15. A method of automatically recognizing a network configuration, for automatically recognizing a device configuration on a network system having a network node including at least one or more intelligent network devices each implementing an SNMP agent and a management information base, the method comprising:

a first step of sending an ICMP echo request from an administrator terminal implementing an SNMP manager to individual network devices in the network node, and detecting existence and non-existence of network devices on the basis of responses therefrom, wherein the network devices include at least one device having plural IP addresses except for a router; and, a second step of creating plural SNMP messages, each of the plural SNMP messages inquiring whether or not the network devices support IP forwarding function and one or more of management information bases included in each SNMP message wherein the management information bases (MIBs) include a bridge MIB, a repeater MIB and a printer MIB, sending the plural SNMP messages one by one to the SNMP agents in the network devices of which existence was detected in the first step, and detecting the types of the network devices in the network node based on information of success and failure of sending and receiving the plural SNMP messages and combinations of information stored in management information bases included in the received SNMP messages, wherein the types of the individual network devices and roles of the individual network devices in the network node are determined based on the combinations of the information stored in the management information bases included in the received SNMP messages and wherein the type of device does not indicate the role of device primarily in terms of the device having the plural IP addresses except for the router.

* * * * *